(12) United States Patent
Sueyoshi et al.

(10) Patent No.: US 7,240,345 B2
(45) Date of Patent: Jul. 3, 2007

(54) DATA PROCESSING APPARATUS AND ASSOCIATED METHOD

(75) Inventors: Masahiro Sueyoshi, Kanagawa (JP); Fumio Kubono, Tokyo (JP); Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 802 days.

(21) Appl. No.: 10/257,472

(22) PCT Filed: Feb. 15, 2002

(86) PCT No.: PCT/JP02/01324

§ 371 (c)(1), (2), (4) Date: May 14, 2003

(87) PCT Pub. No.: WO02/065287

PCT Pub. Date: Aug. 22, 2002

(65) Prior Publication Data

US 2004/0015948 A1    Jan. 22, 2004

(30) Foreign Application Priority Data

| Feb. 16, 2001 | (JP) | 2001-39969 |
| Feb. 16, 2001 | (JP) | 2001-40414 |
| Feb. 16, 2001 | (JP) | 2001-40415 |
| Feb. 16, 2001 | (JP) | 2001-40705 |
| Feb. 19, 2001 | (JP) | 2001-42396 |
| Feb. 19, 2001 | (JP) | 2001-42397 |
| Feb. 19, 2001 | (JP) | 2001-42445 |
| Feb. 19, 2001 | (JP) | 2001-42446 |
| Aug. 30, 2001 | (JP) | 2001-262288 |

(51) Int. Cl.
*G06F 9/45* (2006.01)

(52) U.S. Cl. .................................................... 717/161
(58) Field of Classification Search ......... 717/151–161
See application file for complete search history.

(56) References Cited

U.S. PATENT DOCUMENTS 4,047,161 A * 9/1977 Davis .......................... 718/108

(Continued)

FOREIGN PATENT DOCUMENTS

EP              704796         4/1996

(Continued)

OTHER PUBLICATIONS

Staicu et al., "Effective Use of Networked Reconfigurable Resources", In Proceedings, Military Applications of Programmable Logic Devices, Laurel, MD, pp. 1-6, Sep. 2001.*

(Continued)

*Primary Examiner*—Ted T. Vo
(74) *Attorney, Agent, or Firm*—Oblon, Spivak, McClelland, Maier & Neustadt, P.C.

(57) ABSTRACT

In accordance with a plurality of processing requests, a SAM chip generates IC card entity data including job execution order data showing an order of execution of a plurality of jobs forming processing in accordance with a processing request and status data showing a state of progress of execution of said plurality of jobs for each of said processing requests. Further, the SAM chip selects one entity data from said plurality of entity data, selects and executes the job to be executed next based on the status data and processing order data of said selected entity data, and updates the status data in accordance with execution of said job.

37 Claims, 114 Drawing Sheets

U.S. PATENT DOCUMENTS 6,243,778 B1 * 6/2001 Fung et al. .................. 710/113
6,378,071 B1 4/2002 Sasaki et al.

FOREIGN PATENT DOCUMENTS

| | | |
|---|---|---|
| EP | 735488 | 10/1996 |
| EP | 0 862 124 A2 | 9/1998 |
| EP | 961193 | 12/1999 |
| JP | 47-15499 | 1/1982 |
| JP | 65-68835 | 3/1989 |
| JP | 2-297235 | 12/1990 |
| JP | 3-147158 | 6/1991 |
| JP | 5-94299 | 4/1993 |
| JP | 5-233460 | 9/1993 |
| JP | 6-89348 | 3/1994 |
| JP | 10-49443 | 2/1998 |
| JP | 10-63580 | 3/1998 |
| JP | 10-78919 | 3/1998 |
| JP | 10-301856 | 11/1998 |
| JP | 11-282667 | 10/1999 |
| JP | 2000-122861 | 4/2000 |
| JP | 2000-163269 | 6/2000 |
| JP | 2003-353216 | 12/2000 |
| JP | 2001-28025 | 1/2001 |
| WO | 97/14999 | 4/1997 |

OTHER PUBLICATIONS

Ed Ort, "Writing a Java Card Applet", http://developers.sun.com, pp. 1-8, Jan. 2001.*

* cited by examiner

FIG.6

| SERVICE TYPE ELEMENT | ADDRESS | SERVICE NUMBER | KEY VERSION INFORMATION | KEY INFORMATION |
|---|---|---|---|---|
| Rc | ... | ... | ... | ... |
| Rd | ... | ... | ... | ... |
| Wc | ... | ... | ... | ... |
| Wd | ... | ... | ... | ... |

SDT20_1

FIG. 8

- SC COMMAND: DECLARATION OF MAXIMUM SIMULTANEOUS PROCESSING
- SO COMMAND: DECLARATION OF STORAGE SITE OF DATA READ FROM CARD
- SI COMMAND: DECLARATION OF STORAGE SITE OF DATA TO BE WRITTEN IN CARD
- SL COMMAND: DECLARATION OF STORAGE SITE OF LOG DATA AT TIME OF OPERATING CARD
- CI COMMAND: DECLARATION OF CARD ISSUER
- SF COMMAND: DECLARATION OF CARD SERVICE TYPE ELEMENT. CITATION OF NAME DEFINED BY SDT
- CR COMMAND: READ OPERATION. INSTRUCTS ACTUAL STORAGE SITE OF DATA ON CARD BASED ON CARD SERVICE TYPE
- CW COMMAND: WRITE OPERATION. INSTRUCTS ACTUAL STORAGE SITE OF DATA ON CARD BASED ON CARD SERVICE TYPE
- CS COMMAND: LINKING FUNCTION BETWEEN SERVICE TYPE ELEMENTS
- CF COMMAND: ACTUAL DEFINING FUNCTION OF LINKING FUNCTION

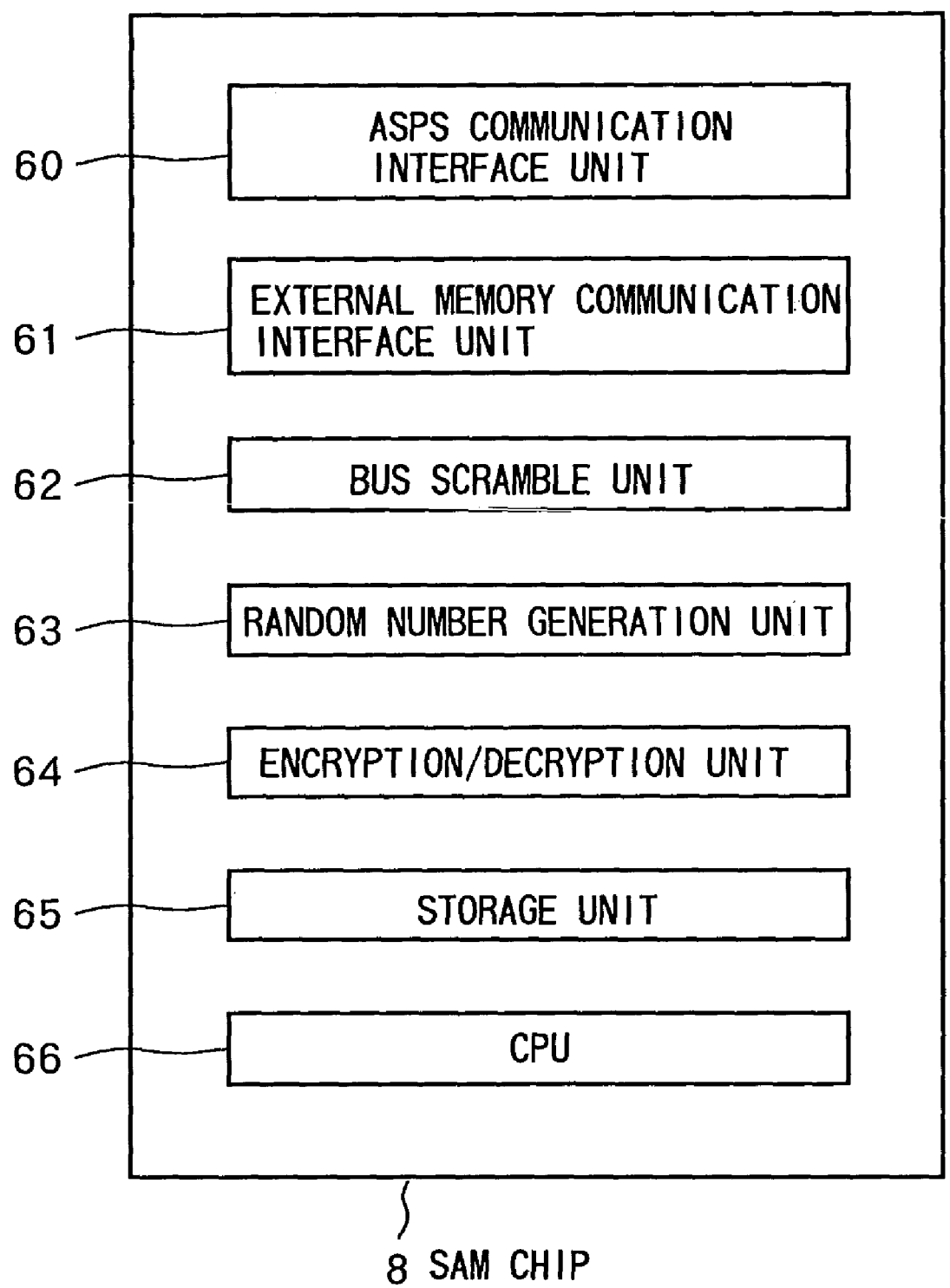

FIG.24

| FW NUMBER | START ADDRESS | ADDRESS LENGTH | DOWNLOAD(DL) SIGNATURE VERIFICATION KEY | EXECUTION SIGNATURE VERIFICATION KEY | MODULE NAME |
|---|---|---|---|---|---|
| ⋮ | ⋮ | ⋮ | ⋮ | ⋮ | ⋮ |

FIG.38

| IC CARD TYPE INFORMATION | AD IDENTIFICATION PROCESSING |
|---|---|
| C_1 | AP_1 |
| C_2 | AP_2 |
| C_3 | AP_3 |

FIG.39

| | AP_1 | AP_2 | AP_3 |
|---|---|---|---|
| AP_1 | | ○ | ○ |
| AP_2 | ○ | | × |
| AP_3 | × | ○ | |

267 CPU

FIG.85

| RETURN VALUE | TYPE OF CORRESPONDING IC CARD |
|---|---|
| 1 | TYPE A |
| 2 | TYPE B |
| 3 | TYPE A |

FIG.86

| ADDRESS | DATA |
|---|---|
| 100H | 08H |
| 101H | 10H |
| 102H | 56H |
| 103H | 92H |

FIG.87

| ADDRESS | DATA |
|---|---|
| 100H | 08H |
| 101H | 10H |
| 102H | 73H |
| 103H | 92H |

FIG.88

| APPLICATION PROGRAM | CORRESPONDING IC CARD |
|---|---|
| AP1 | TYPE A |
| AP2 | TYPE B |
| AP3 | TYPE C |

FIG.92

|  | FROM | TO |
|---|---|---|
| OS | 0000H | 0FFFH |
| MAIN | 1000H | 1FFFH |
| AP1 | 2000H | 2FFFH |
| AP2 | 3000H | 3FFFH |
| AP3 | 4000H | 4FFFH |

FIG. 93

| | OS | MAIN | AP1 | AP2 | AP3 |
|---|---|---|---|---|---|
| OS | | × | × | × | × |
| MAIN | ○ | | ○ | ○ | ○ |
| AP1 | ○ | ○ | | × | ○ |
| AP2 | ○ | ○ | ○ | | × |
| AP3 | ○ | ○ | × | × | |

FIG.95

|      | FROM  | TO    |
|------|-------|-------|
| OS   | 8000H | 8FFFH |
| MAIN | 9000H | 9FFFH |
| AP1  | A000H | AFFFH |
| AP2  | B000H | BFFFH |
| AP3  | C000H | CFFFH |

FIG.96

|      | OS | MAIN | AP1 | AP2 | AP3 |
|------|----|------|-----|-----|-----|
| OS   |    | ×    | ×   | ×   | ×   |
| MAIN | × |      | ×   | ×   | ×   |
| AP1  | × | ○    |     | ○   | ×   |
| AP2  | × | ○    | ×   |     | ×   |
| AP3  | × | ○    | ○   | ×   |     |

FIG.98

|      | FROM  | TO    |
|------|-------|-------|
| OS   | 8000H | 8FFFH |
| MAIN | 9000H | 9FFFH |
| AP1  | A000H | AFFFH |
| AP2  | B000H | BFFFH |
| AP3  | C000H | CFFFH |

FIG. 99

| | OS | MAIN | AP1 | AP2 | AP3 |
|---|---|---|---|---|---|
| OS | | × | × | × | × |
| MAIN | × | | × | × | × |
| AP1 | × | × | | ○ | ○ |
| AP2 | × | × | ○ | | ○ |
| AP3 | × | × | ○ | × | |

PM_1 PROGRAM MODULE

PM_1 PROGRAM MODULE

| MODULE NAME | ID NUMBER | KEY INFORMATION |
|---|---|---|
| − | # 0 | NONE |
| MODULE A | # 1 | KEY1 |
| MODULE B | # 2 | KEY2 |
| MODULE C | # 3 | KEY3 |

FIG.119

- SC COMMAND: DECLARATION OF MAXIMUM SIMULTANEOUS PROCESSING
- SO COMMAND: DECLARATION OF STORAGE SITE OF DATA READ FROM CARD
- SI COMMAND: DECLARATION OF STORAGE SITE OF DATA TO BE WRITTEN IN CARD
- SL COMMAND: DECLARATION OF STORAGE SITE OF LOG DATA AT TIME OF OPERATING CARD
- CI COMMAND: DECLARATION OF CARD ISSUER
- SF COMMAND: DECLARATION OF APE
- CR COMMAND: READ OPERATION. INSTRUCTS ACTUAL STORAGE SITE OF DATA ON CARD BASED ON CARD SERVICE TYPE
- CW COMMAND: WRITE OPERATION. INSTRUCTS ACTUAL STORAGE SITE OF DATA ON CARD BASED ON CARD SERVICE TYPE
- CS COMMAND: LINKING FUNCTION BETWEEN SERVICE TYPE ELEMENTS
- CF COMMAND: ACTUAL DEFINING FUNCTION OF LINKING FUNCTION

FIG.120

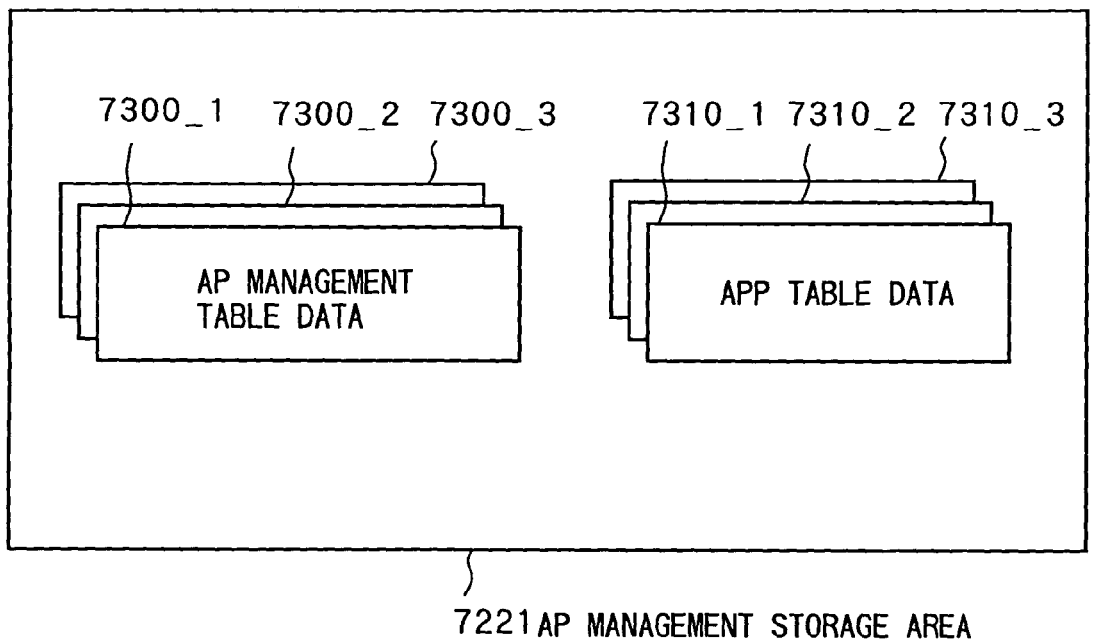

FIG.121

| APE_N | APE_ID | | IEI | OTHER PARTY SAM_ID | OTHER PARTY AP_ID | K_CARDA | K_SAM | SET _APP | FLAG _IP | FLAG _STR |
|---|---|---|---|---|---|---|---|---|---|---|
| | APE _TYPE | APE_ INS_NUM | | | | | | | | |
| SERVICE A | IC ACCESS KEY | 1008 | INTERNAL | OWN SAM_ID | N/A | XX1...XXn | N/A | N/A | NOT POSSIBLE | N/A |
| SERVICE C | IC ACCESS KEY | 101C | INTERNAL | 43.17.19.19 | 1 | YY1...YYn | TT1...TTn | 310_1 | NOT POSSIBLE/ POSSIBLE | SETTING OF HOLDABLE/ NOT HOLDABLE ONLY WHEN DISCLOSABLE |
| SERVICE B | IC ACCESS KEY | 100C | EXTERNAL | 43.13.137.1 | 2 | ACQUIRE KEY BY SAM LINKAGE, THEN HOLD WHEN HOLDABLE | SS1...SSn | OTHER SAM 310 | N/A | N/A |
| SERVICE B LOG | FINAL SYSTEM CONFIGURATION | COLLECTION ID | EXTERNAL | 43.13.137.1 | 2 | ACQUIRE KEY BY SAM LINKAGE, THEN HOLD WHEN HOLDABLE | SS1...SSn | OTHER SAM 310 | NOT POSSIBLE/ POSSIBLE | SETTING OF HOLDABLE/ NOT HOLDABLE ONLY WHEN DISCLOSABLE |

FIG.123

| APE_ID | READ | WRITE | EXECUTE |
|---|---|---|---|
| SERVICE B ACCESS KEY | 1 | 0 | 1 |
| SERVICE B LOG | 1 | 1 | 0 |
| SERVICE B LOG 2 | 1 | 0 | 0 |
| AREA REGISTRATION KEY PACKAGE | 1 | 0 | 0 |
| AREA DELETION KEY PACKAGE | 1 | 0 | 0 |

765 STORAGE UNIT

601

DATA PROCESSING APPARATUS AND ASSOCIATED METHOD

BACKGROUND OF THE INVENTION

The present invention relates to a data processing method, its apparatus, its program, a semiconductor circuit, and an authentication apparatus useful in the case of conducting a transaction through a network using an IC (integrated circuit) built into a card or a mobile terminal apparatus.

At the present time, communication systems using IC cards etc. for transactions through the Internet and other networks are being developed.

In such a communication systems, a server receives from for example reader/writers of IC cards or PCs (personal computers) processing requests using the IC cards and performs user authentication, data encryption and decryption, and other processing.

In the above explained communication system, however, it is envisioned that processing requests for a large number of IC cards will be received simultaneously or in short time periods.

In this case, the server has to be able to efficiently handle such processing requests.

Further, a server sometimes executes a plurality of application programs for processing for procedures relating to a plurality of settlement businesses and performs processing using selected application programs in accordance with the processing requests. Such processing requests also have to be efficiently handled.

Further, in the above explained communication system, the application program executed by the server has to describe codes using key information for accessing IC cards and operational commands for operating the IC cards. Here, the key information and operational commands can be known only by the manager of the server if expecting security of transactions using the IC cards.

Therefore, in the past, the manager of the server produced and customized the application programs upon request from the above service providers.

With the manager of the server producing and customizing application programs in this way, however, there is the problem that the load on the manager becomes great.

Further, in the above explained server, for example, application programs of a plurality of credit card companies or other businesses run. Such application programs are produced by the individual businesses and downloaded to the server using personal computers etc.

As explained above, however, when the above explained server runs application programs of a plurality of businesses, it is necessary to ensure that the processing of each application program not be monitored or tampered with by another application program.

On the other hand, there is a demand for providing diverse services while transferring data between application programs.

Further, individual businesses download their application programs to the server, then debug them in accordance with need.

When individual businesses download application programs to the server or debug those application programs in this way, however, it is necessary to prevent programs in the server from being illicitly tampered with.

As a technique for realizing this, for example, there is the technique of authentication processing using key information when accessing the server. Usually, such key information is stored in the memory of a terminal apparatus (personal computer), however, so there is the possibility of illicit use and there is a problem in security.

Further, the LSI forming the above explained server has a built-in CPU. The CPU sometimes accesses a memory outside of the LSI chip.

In such a case, data flows over the bus provided between the LSI chip and external memory, so that data can be viewed by probing the bus.

When the above explained server performs e-commercial transactions, personal authentication, and other highly confidential processing, however, as explained above, there is a problem in security if the data is probed.

Further, the above explained server is sometimes comprised of a single computer.

In this case, a single computer runs a plurality of programs relating to a plurality of services provided by different businesses. When those services handle highly confidential data such as with settlements, there is the problem that there is a possibility of the highly confidential data owned by each business being illicitly acquired or tampered with by another business.

Further, there have been the following problems when using a conventional general computer as the above explained computer.

FIG. 133 shows the basic configuration of a general computer 601.

In the computer 601 shown in FIG. 133, a CPU 602 performs processing using the instructions and data of a program read from a memory 603.

The CPU 602 outputs an address for access in the memory 603 to an address bus 604.

Further, the CPU 602 reads from the memory 603 or writes in it according to a control signal S602.

The module A, module B, and module C stored in the memory 603 are processing units of a program having specific functions.

A debugger 605 checks the operation of the CPU 602 at the time of development of a program. It uses a HALT signal to temporarily halt the operation of the CPU 602, read internal information of the CPU 602, and inform that information to the program developer.

Here, in FIG. 133, it is assumed that the module A has a basic function used by the module B or the module C.

Here, assume that the routine of the basic function included in the module A is highly confidential. In such a case, since the module A is a basic function, it is necessary to provide an environment enabling the developer of the module B or module C to develop its program. As one means for this, there is the method of distributing a library.

This is expressed in an intermediate language between a higher language and machine language (normally called an "assembly language"), but analysis is relatively easy. There is a high possibility that the processing routine of a program desired to be kept confidential will end up becoming known.

Further, as another means, the basic module (in this example, the module A) is stored in the memory 603 in advance and, rather than using it as a library, the developer develops the software assuming that the basic module is present at a specific location.

Even with this means, however, there is the problem that it is not that hard for the developers of the modules B and C to read the module A stored in the memory 603. At this time, the read content is in a machine language of a level which the CPU 602 executes, but there are tools for converting this machine language to an assembly language. The routine can be analyzed relatively easily.

Further, there is the problem that the developers of the modules B and C can temporarily halt the execution by the CPU 602 in the middle of execution of the module A at the development stage of their programs so as to learn the data handled or the content of the same and thereby learn the entire processing routine of the program of the module A.

Further, an application program running on the above explained server handles key data, charging data, log data, and other high security data set by the service provider, so there has been a demand for protecting it from illicit tampering or monitoring.

BRIEF SUMMARY OF THE INVENTION

A first object of the present invention is to provide a data processing method, semiconductor circuit, and program able to efficiently perform processing in accordance with a large number of processing requests.

A second object of the present invention is to provide a data processing method, semiconductor circuit, and program enabling a user to produce and customize an application program of the user to be executed by a server without allowing the user to learn highly confidential information.

A third object of the present invention is to provide a data processing method, semiconductor circuit, and program able to prevent each individual application program from being influenced by another application program when the same semiconductor circuit runs a plurality of application programs.

A fourth object of the present invention is to provide a data processing method, semiconductor circuit, and program allowing transfer of data between application programs in accordance with need while preventing each application program from being illicitly tampered with, monitored, etc. by the user of another application program when the same semiconductor circuit runs a plurality of application programs.

A fifth object of the present invention is to provide a data processing method, semiconductor circuit, authentication apparatus, and program enabling the content of access to a server or other semiconductor circuit to be restricted in accordance with rights to the same.

A sixth object of the present invention is to provide a semiconductor circuit and data processing method enabling the confidentiality of data to be maintained even when transmitting highly confidential data between the semiconductor circuit and a semiconductor storage circuit through an external bus.

A seventh object of the present invention is to provide a data processing apparatus enabling the confidentiality of instructions and data to be maintained between programs when executing a plurality of programs.

An eighth object of the present invention is to provide a semiconductor circuit enabling the confidentiality of a program to be executed to be improved.

A ninth object of the present invention is to provide a data processing apparatus, its method, and its program enabling the security of an application program running on the server to be improved when providing a service using an IC or other integrated circuit.

To achieve the above explained objects, the data processing method of the first aspect of the invention is a data processing method performed by a semiconductor circuit in accordance with a plurality of processing requests, comprising the steps of: generating job management data including job execution order data showing an order of execution of a plurality of jobs forming processing in accordance with a processing request and status data showing the state of progress of execution of the plurality of jobs for each of the plurality of processing requests, selecting one job management data from the generated plurality of job management data based on a predetermined rule, selecting a job to be executed next based on the status data and the processing order data of the selected job management data, executing the selected job, and updating the status data of the selected job management data in accordance with the execution of that job.

In the data processing method of the first aspect of the invention, first, the semiconductor circuit generates job management data including job execution order data showing an order of execution of a plurality of jobs forming processing in accordance with a processing request and status data showing the state of progress of execution of the plurality of jobs for each of the plurality of processing requests.

Next, the semiconductor circuit selects one job management data from the generated plurality of job management data based on a predetermined rule.

Next, the semiconductor circuit selects the job to be executed next based on the status data and the processing order data of the selected job management data.

Next, the semiconductor circuit executes the selected job.

Next, the semiconductor circuit updates the status data of the selected job management data in accordance with execution of that job.

Further, the data processing method of the first aspect of the invention preferably further comprises a step of updating the status data of the selected job management data, then selecting one job management data from the plurality of data modules.

Further, the data processing method of the first aspect of the invention preferably further comprises a step of selecting one job management data from the plurality of data modules after updating the status data of the selected job management data.

Further, the data processing method of the first aspect of the invention preferably further comprises a step of deleting the job management data when all jobs forming the processing in accordance with the processing request finish being executed.

Further, the data processing method of the first aspect of the invention preferably further comprises a step of receiving the processing requests from an integrated circuit having a storage unit storing data to be used for processing for a procedure performed with the semiconductor circuit or a communication apparatus inputting and outputting data with the integrated circuit.

A semiconductor circuit of a second aspect of the invention is a semiconductor circuit for processing data in accordance with a plurality of processing requests, comprising an interface for inputting the plurality of processing requests, a storage circuit for storing job management data including job execution order data showing an order of execution of a plurality of jobs forming processing in accordance with a processing request and status data showing a state of progress of execution of the plurality of jobs, and a control circuit for generating the job management data for each of the input plurality of processing requests and storing it in the storage circuit, selecting one job management data from the generated plurality of job management data, selecting and executing the job to be executed next based on the status data and the processing order data of the selected job management data, and updating the status data of the selected job management data in accordance with the execution of that job.

In the semiconductor circuit of the second aspect of the invention, the interface inputs a plurality of processing requests.

Next, the control circuit generates job management data including job execution order data showing an order of execution of a plurality of jobs forming processing in accordance with a processing request and status data showing a state of progress of execution of the plurality of jobs in accordance with the plurality of processing requests and stores them in the storage circuit.

Next, the control circuit selects one job management data from the plurality of job management data.

Next, the control circuit selects and executes the job to be executed next based on the status data and the processing order data of the selected job management data and updates the status data of the selected job management data in accordance with execution of that job.

A program of a third aspect of the invention is a program to be executed by a semiconductor circuit for processing data in accordance with a plurality of processing requests, comprising a routine for generating job management data including job execution order data showing an order of execution of a plurality of jobs forming processing in accordance with a processing request and status data showing the state of progress of execution of the plurality of jobs for each of the plurality of processing requests, a routine for selecting one job management data from the generated plurality of job management data, a routine for selecting the job to be executed next based on the status data and the processing order data of the selected job management data, a routine for executing the selected job, and a routine for updating the status data of the selected job management data in accordance with the execution of the job.

A data processing method of a fourth aspect of the invention is a data processing method performed by a semiconductor circuit running an application program for processing relating to a procedure using an integrated circuit, wherein the semiconductor circuit can view correspondence instructing data indicating correspondence between operation codes used for the application program to operate the integrated circuit and the names of the operations, that is, the operation names, having the semiconductor circuit receive as input an operation describing program describing the operations of the application program using the operation names, and having the semiconductor circuit obtain the operation codes corresponding to the operation names described in the operation describing program by viewing the correspondence instructing data and use the obtained operation codes to define the processing of the application program.

Further, the data processing method according to the fourth aspect of the invention preferably further comprises having the correspondence instructing data further show the correspondence between the operation names and key information used when the integrated circuit performs operations corresponding to those operation names and having the semiconductor circuit obtain the key information corresponding to the operation names described in the operation describing program by viewing the correspondence instructing data and use that obtained key information to define the processing of the application program.

Further, the data processing method of the fourth aspect of the invention preferably further comprises having the semiconductor circuit generate job management data including job execution order data showing an order of execution of a plurality of jobs forming processing of the application program and status data showing the state of progress of execution of the plurality of jobs, select the job to be executed next based on the status data and the processing order data of the job management data, execute the selected job, and update the status data of the selected job management data in accordance with the execution of that job.

A semiconductor circuit of a fifth aspect of the invention is a semiconductor circuit for running an application program for performing processing relating to a procedure using an integrated circuit, comprising a storage circuit for storing correspondence instructing data indicating correspondence between operation codes used for the application program to operate the integrated circuit and names of the operations, that is, operation names, an interface for inputting an operation describing program describing the operation of the application program using the operation names, and a control circuit for obtaining the operation codes corresponding to the operation names described in the input operation describing program by viewing the correspondence instructing data and using the obtained operation codes to define the processing of the application program.

In the semiconductor circuit of the fifth aspect of the invention, the interface inputs the operation describing program describing the operation of the application program using the operation names.

Next, the control circuit obtains the operation codes corresponding to the operation names described in the input operation describing program by viewing the correspondence instructing data.

Next, the control circuit uses the obtained operation codes to define the processing of the application program.

A program of a sixth aspect of the invention is a program to be executed by a semiconductor circuit running an application program for performing processing relating to a procedure using an integrated circuit, comprising: a routine for inputting an operation describing program describing an operation of the application program using names of operations for the integrated circuit, that is, operation names, a routine for viewing correspondence instructing data indicating correspondence between operation codes used by the application program for operating the integrated circuit and the operation names to obtain the operation codes corresponding to the operation names described in the operation describing program, and a routine for using the obtained operation codes to define processing of the application program.

A data processing method of a seventh aspect of the invention is a data processing method performed by a semiconductor circuit executing an application program, comprising the steps of: protecting each of a plurality of program modules forming the application program by a firewall allocated to the program module in advance in a plurality of firewalls, registering a program module linked with firewall identification information for identifying the firewall allocated to the program module, and executing the program module conditional on the registration being performed.

The data processing method of the seventh aspect of the invention preferably further comprises a step of allowing data transfer or data viewing among a plurality of program modules registered linked with the same firewall identification information and prohibiting data transfer or data viewing among a plurality of program modules registered linked with different firewall identification information.

The data processing method of the seventh aspect of the invention preferably further comprises the steps of: registering a program module further linked with download key information to be used when downloading the program module from the outside of the semiconductor circuit to the semiconductor circuit and, when receiving a download request for the program module, using the download key information registered linked with the program module to judge if download is possible and downloading the program module when judging that download is possible.

A semiconductor circuit of an eighth aspect of the invention is a semiconductor circuit for running an application program, protecting each of a plurality of program modules forming the application program by a firewall allocated to each program module in advance in a plurality of firewalls, registering a program module linked with firewall identification information for identifying the firewall allocated to the program module, and executing the program module conditional on the registration being performed.

A program of a ninth aspect of the invention is a program to be executed by a semiconductor circuit for executing an application program, comprising a routine for protecting each of a plurality of program modules forming the application program by a firewall allocated to each program module in advance in a plurality of firewalls, a routine for registering a program module linked with firewall identification information for identifying the firewall allocated to the program module, and a routine for executing the program module conditional on the registration being performed.

A data processing method of a 10th aspect of the invention is a data processing method performed by a semiconductor circuit for executing an application program, comprising the steps of: independently executing a plurality of application programs protected by firewalls, registering in advance a condition for allowing communication between the application programs performed through the firewalls, judging if a communication request satisfies the registered condition when an application program generates a request for communication with another application program, and executing communication between the application programs in accordance with the communication request when judging that it satisfies the registered condition.

A semiconductor circuit of an 11th aspect of the invention is a semiconductor circuit which independently executes a plurality of application programs protected by firewalls, registers in advance a condition for allowing communication between the application programs performed through the firewalls, judges if a communication request satisfies the registered condition when an application program generates a request for communication with another application program, and executes communication between the application programs in accordance with the communication request when judging that it satisfies the registered condition.

The semiconductor circuit of the 11th aspect independently executes a plurality of application programs protected by firewalls.

Further, that semiconductor circuit registers in advance a condition for allowing communication between the application programs performed through the firewalls.

Further, that semiconductor circuit judges if a communication request satisfies the registered condition when an application program generates a request for communication with another application program.

Further, that semiconductor circuit executes communication between the application programs in accordance with the communication request when judging that it satisfies the registered condition.

A program of the 12th aspect of the invention is a program for making a semiconductor circuit execute a routine for independently executing a plurality of application programs protected by firewalls, a routine for registering in advance a condition for allowing communication between the application programs performed through the firewalls, a routine for judging if a communication request satisfies the registered condition when an application program generates a request for communication with another application program, and a routine for executing communication between the application programs in accordance with the communication request when judging that it satisfies the registered condition.

A data processing method of a 13th aspect of the invention is a data processing method by which a semiconductor circuit or a semiconductor storage apparatus accessible by the semiconductor circuit downloads a program running in the semiconductor circuit, comprising the steps of: having the semiconductor circuit have a software structure comprised of a plurality of layers and having download signature verification key information corresponding to each layer able to be viewed by the semiconductor circuit, having the semiconductor circuit verify download signature information generated in accordance with a download request using the download signature verification key information when receiving the download request, and having the semiconductor apparatus allow the issuer of the download request to download a program of a layer corresponding to the download signature verification key information used for that verification conditional on the download signature information being legitimate.

Further, the data processing method of the 13th aspect of the invention further comprises a steps of: having an authentication apparatus store access master key information corresponding to a layer to which a program allowed to be downloaded belongs, having the authentication apparatus transmit the download request to the semiconductor circuit, and having the authentication apparatus use that access master key information to generate the download signature information and transmit that download signature information to the semiconductor circuit.

Further, the data processing method of the 13th aspect of the invention further comprises a steps of: having an authentication apparatus store identification information of the semiconductor circuit and having the authentication apparatus encrypt use the identification information as plain text using the access master key information to generate download master key information and use that download master key information to generate the download signature information.

A semiconductor circuit of a 14th aspect of the invention is a semiconductor circuit having a software structure comprised of a plurality of layers, wherein the semiconductor circuit is able to view download signature verification key information corresponding to each layer, verifies download signature information generated in accordance with a download request using the download signature verification key information when receiving a download request, and allows the issuer of the download request to download a program of a layer corresponding to the download signature verification key information used for that verification to that semiconductor circuit or a semiconductor storage circuit accessible by the semiconductor circuit conditional on the download signature information being legitimate.

The semiconductor circuit of the 14th aspect of the invention, when receiving a download request, verifies the download signal information generated corresponding to that download request using download signature verification key information.

Further, that semiconductor circuit allows the issuer of the download request to download a program of a layer corresponding the download signature verification key information used for that verification to that semiconductor circuit or a semiconductor storage circuit accessible by the semiconductor circuit conditional on the download signature information being legitimate.

An authentication apparatus of a 15th aspect of the invention is an authentication apparatus used for authentication when downloading a program running in a semiconductor circuit to a semiconductor circuit having a software structure comprised of a plurality of layers or a semiconductor storage apparatus accessible by that semiconductor circuit, storing access master key information corresponding to a layer to which a program allowed to be downloaded belongs, transmitting the download request to the semiconductor circuit, and using that access master key information to generate the download signature information and transmitting that download signature information to the semiconductor circuit.

The authentication apparatus of the 15th aspect of the invention first transmits the download request to the semiconductor circuit.

Further, the authentication apparatus uses access master key information to generate download signature information.

Further, the authentication apparatus transmits the download signature information to the semiconductor circuit.

A program of a 16th aspect of the invention is a program to be executed by a semiconductor circuit having a software structure comprised of a plurality of layers, comprising a routine for verifying download signature information generated in accordance with a download request when receiving such a download request using the download signature verification key information of a corresponding layer in the plurality of layers, and a routine for allowing the issuer of the download request to download a program of a layer corresponding to the download signature verification key information used for that verification to that semiconductor circuit or a semiconductor storage circuit accessible by the semiconductor circuit conditional on the download signature information being legitimate.

A semiconductor circuit of a 17th aspect of the invention is a semiconductor circuit having a data processing circuit and data input/output processing circuit, wherein the data processing circuit inputs and outputs data with a bus outside of that semiconductor circuit through the data input/output processing circuit, and the data input/output circuit encrypts data input from the data processing circuit in units of predetermined data lengths and outputs the same to the bus, decrypts data input from the bus and outputs the same to the data processing circuit, and performs data input/output transactions through the bus in units of m number of data input/output transactions when Nc/Nb=n where the bus width of the bus is Nb and the data length is Nc and the smallest whole number of n or more is m.

The semiconductor circuit of the 17th aspect of the invention inputs and outputs data with a bus outside of the semiconductor circuit through the data input/output processing circuit.

At this time, the data input/output circuit encrypts the data input from the data processing circuit in units of predetermined data lengths and outputs the same to the bus.

Further, the data input/output circuit decrypts data input from the bus and outputs it to the data processing circuit.

At this time, that data input/output apparatus performs data input/output transactions through the outside bus in units of m number of data input/output transactions when Nc/Nb=n where the bus width of the bus is Nb and the data length is Nc and the smallest whole number of n or more is m.

Further, in the semiconductor circuit of the 17th aspect of the invention, preferably the data input/output circuit, when accessing a semiconductor storage circuit based on a first address input from the data processing circuit, converts the first address to a second address so as to access the semiconductor storage circuit in units of storage areas in which the data of Nc is stored and uses that second address to access the semiconductor storage circuit.

A data processing method of an 18th aspect of the invention is a data processing method performed by a semiconductor circuit when accessing a semiconductor storage circuit when a semiconductor circuit and the semiconductor storage circuit are connected through a bus, comprising the steps of: encrypting data to be written in the semiconductor storage circuit in units of predetermined data lengths and outputting the same to the bus, decrypting data input from the bus, and performing data input/output transactions through the bus in units of m number of data input/output transactions when Nc/Nb=n where the bus width of the bus is Nb and the data length is Nc and the smallest whole number of n or more is m.

A data processing apparatus of a 19th aspect of the invention comprises a storage circuit for storing instructions and data of a plurality of programs, a computation circuit for accessing the storage circuit through a transmission line and using the instructions and data of the plurality of programs to execute the plurality of programs, a connection switching circuit interposed between the transmission line and the storage circuit for setting the transmission line and the storage circuit to one of a connection state and disconnection state based on a control signal, a connection control circuit for generating the control signal for control to set the transmission line and the storage circuit to one of a connection state and disconnection state based on access range defining data defining an address range in the storage circuit able to be accessed while the computation circuit is executing the plurality of programs for each of the plurality of programs, an address in the storage circuit for which the computation circuit issues an access request, and executing program instructing information which which program in a plurality of programs the computation circuit is executing, and an input/output interface circuit for inputting and outputting data with the computation circuit through the transmission line and inputting and outputting data with the outside of that data processing apparatus.

Further, in the data processing apparatus of the 19th aspect of the invention, preferably the connection control circuit generates the control signal indicating to set the transmission line and the storage circuit in a connection state when the address in the storage circuit for which the computation circuit issues an access request is inside the address range corresponding to a program being executed defined by the access range defining data and generates the control signal indicating to set the transmission line and the storage circuit in a disconnection state when it is not inside that address range.

Further, a semiconductor circuit of a 20th aspect of the invention is a semiconductor circuit for executing a program, comprising a first transmission line, a storage circuit for storing instructions or data for executing the program, a computation circuit for operating based on the instructions read through the first transmission line from the storage circuit, a first connection switching circuit for setting the first transmission line and the storage circuit in one of a connection state and disconnection state based on a first control signal, a second connection switching circuit for setting a second transmission line outside of that semiconductor circuit and the first transmission line in one of a connection state and disconnection state based on a second control signal, and a connection control circuit for outputting the second control signal instructing disconnection to the second connection switching circuit when outputting the first control signal instructing connection to the first connection switching circuit and outputting the second control signal instructing connection to the second connection switching circuit when outputting the first control signal instructing disconnection to the first connection switching circuit.

Further, in the semiconductor circuit of the 20th aspect of the invention, the second connection switching circuit is connected through the second transmission line to a storage apparatus at the outside of the semiconductor circuit.

Further, in the semiconductor circuit of the 20th aspect of the invention, when the computation circuit reads instructions from the storage circuit, the connection control circuit outputs the first control signal instructing connection to the first connection switching circuit and outputs the second control signal instructing disconnection to the second connection switching circuit.

A semiconductor circuit of a 21st aspect of the invention is a semiconductor circuit for executing a program, comprising an encryption/decryption circuit for storing encrypted instructions or data of the program, encrypting data to be output through a first transmission line outside of that semiconductor circuit to a storage apparatus, and decrypting encrypted instructions or data input through the first transmission line from the storage apparatus, a computation circuit for performing computation using the decrypted instructions or data, a selection circuit for selecting whether to allow communication between a second transmission line outside of the semiconductor circuit and the computation circuit based on a control signal, and a control circuit for outputting to the selection circuit the control signal for instructing to disallow communication between the second transmission line and the computation circuit while the computation circuit is performing processing using instructions or data of the program.

A data processing apparatus of a 22nd aspect of the invention is a data processing apparatus comprising a storage circuit for storing in predetermined storage areas a plurality of application programs each comprised of a plurality of data modules including processing routine data describing processing routines for communicating with an integrated circuit to provide a service and storing management data showing linked together a data module, first key data used for using another data module in processing according to that data module, and second key data used for transferring data with the integrated circuit in processing according to that data module and a semiconductor circuit performing processing relating to a service based on a data modules, viewing the management data in that processing, using the first key data corresponding to that data module to use another data module, and using the second key data corresponding to that data module to transfer data with the integrated circuit.

Further, in the data processing apparatus of the 22nd aspect of the invention, preferably the storage circuit stores as a data module at least one of log data of processing performed performed using the data module, program data showing a routine for registering the data module in a storage area, program data showing a routine for deleting registration of the data module from the storage area, and program data showing a routine for defining the storage area for storing the application program.

Further, in the data processing apparatus of the 22nd aspect of the invention, preferably when processing in accordance with another data module is to be executed by a semiconductor circuit, the semiconductor circuit uses the management data to obtain first key data corresponding to the predetermined data module and the first key data corresponding to the other data module and uses the other data module from the predetermined data module being executed conditional on the obtained two first key data matching.

A data processing method of a 23rd aspect of the invention is a data processing method whereby a semiconductor circuit for communicating with an integrated circuit to perform processing to provide a service transfers data with a storage circuit, comprising the steps of: when the storage circuit stores in predetermined storage areas a plurality of application programs each comprised of a plurality of data modules including processing routine data describing processing routines for communicating with an integrated circuit to providing a service and stores management data showing linked together a data module, first key data used for using another data module in processing in accordance with that data module, and second key data used for transferring data with the integrated circuit in processing according to that data module, having the semiconductor circuit perform processing relating to a service based on the data modules, having the semiconductor circuit view the management data in the processing relating to the service and use the first key data corresponding to a data module to use another data module, and having the semiconductor circuit use the second key data corresponding to the data module in processing relating to the service to transfer data with the integrated circuit.

A program of a 24th aspect of the invention is a program to be executed by a semiconductor circuit for communicating with an integrated circuit to perform processing for providing services and transferring data with a storage circuit, comprising, when the storage circuit stores in predetermined storage areas a plurality of application programs each comprised of a plurality of data modules including processing routine data describing processing routines for communicating with an integrated circuit to provide services and stores management data showing linked together a data module, first key data used for using another the data module in processing according to that data module, and second key data used for transfer of data with the integrated circuit in processing according to that data module, a routine for performing processing relating to the service based on the data module, a routine for viewing the management data in processing relating to the service and using the first key data corresponding to that data module to use the other data module, and a routine for using the second key data corresponding to that data module in processing relating to the service to transfer data with the integrated circuit.

According to the above explained present invention, the following effects can be achieved.

That is, according to the first to third aspects of the invention, it is possible to provide a data processing method, semiconductor circuit, and program able to efficiently perform processing in accordance with a large number of processing requests.

According to the fourth to sixth aspects of the invention, it is possible to provide a data processing method, semiconductor circuit, and program enabling a user to produce and customize an application program of the user to be executed by the server without informing the user of highly confidential information.

According to the seventh to ninth aspects of the invention, it is possible to provide a data processing method, semiconductor circuit, and program able to prevent each application program from being influenced by another application program when running a plurality of application programs on the same semiconductor circuit.

According to the 10th to 12th aspects of the invention, it is possible to provide a data processing method, semiconductor circuit, and program made in consideration of the above explained prior art and allowing the transfer of data among application programs in accordance with need while preventing each application program from being illicitly tampered with, monitored, etc. by a user of another application program when running a plurality of application programs on the same semiconductor circuit.

According to the 13th to 16th aspects of the invention, it is possible to provide a data processing method, semiconductor circuit, authentication apparatus, and program able to restrict the content of access to a semiconductor circuit of a server etc. in accordance with its right.

According to the 17th and 18th aspects of the invention, it is possible to provide a semiconductor circuit and data processing method able to maintain the confidentiality of data even when transmitting highly confidential data between the semiconductor circuit and semiconductor storage circuit through an external bus.

According to a 19th aspect of the invention, it is possible to provide a data processing apparatus able to maintain the confidentiality of instructions and data between programs when executing a plurality of programs.

According to the 20th and 21st aspects of the invention, it is possible to provide a semiconductor circuit able to improve the confidentiality of the program executed.

According to the 22nd to 24th aspects of the invention, it is possible to provide a data processing apparatus, method, and program able to improve the security of an application program running on a server when providing a service using an IC or other integrated circuit.

BRIEF DESCRIPTION OF THE DRAWINGS

FIG. 6 is a view for explaining service definition table data shown in FIG. 5;

FIG. 8 is a view for explaining commands used in a script program;

FIG. 9 is a functional block diagram of the SAM chip shown in FIG. 1;

FIG. 24 is a view for explaining the format of module management data shown in FIG. 23;

FIG. 38 is a view for explaining AP selection data shown in FIG. 37;

FIG. 39 is a view for explaining inter-AP communication data shown in FIG. 37;

FIG. 85 is a view for explaining the types of IC cards handled by the computer shown in FIG. 83;

FIG. 86 is a view for explaining the storage state of the memory shown in FIG. 83 before writing;

FIG. 87 is a view for explaining the storage state of the memory shown in FIG. 83 after writing;

FIG. 88 is a view for explaining the correspondence between the application programs and types of IC cards shown in FIG. 84;

FIG. 92 is a view for explaining fetch access range defining data shown in FIG. 91;

FIG. 93 is a view of fetch inter-AP call relation defining data shown in FIG. 91;

FIG. 95 is a view for explaining read access range defining data shown in FIG. 94;

FIG. 96 is a view for explaining read inter-AP call relation defining data shown in FIG. 94;

FIG. 98 is a view for explaining write access range defining data shown in FIG. 97;

FIG. 99 is a view for explaining write inter-AP call relation defining data shown in FIG. 97;

FIG. 110 is a view for explaining another SAM chip which the SAM chip shown in FIG. 109 communicates with;

FIG. 111 is a view for explaining another SAM chip which the SAM chip shown in FIG. 109 communicates with;

FIG. 119 is a view for explaining the commands used in an IC card operation macro command script program shown in FIG. 118;

FIG. 120 is a view for explaining the AP management storage area shown in FIG. 115;

FIG. 121 is a view for explaining the AP management table data shown in FIG. 120;

FIG. 122 is a view for explaining the SAM_ID;

FIG. 123 is a view for explaining the APP table data shown in FIG. 120;

FIG. 124 is functional block diagram of the SAM chip shown in FIG. 109;

FIG. 125 is a view for explaining tasks, programs, and data stored in the memory shown in FIG. 124;

FIG. 126 is a view for explaining the format of the IC card entity data 73_x;

FIG. 127 is a view for explaining the state transition of the entity status data shown in FIG. 126;

FIG. 128 is a flow chart of the processing performed by the IC card procedure management task;

FIG. 129 is a view for explaining the processing which the SAM chip performs when accessing processing or data defined by other application element data APE in accordance with a routine defined by application element data APE when executing a job at step ST4 of FIG. 128;

FIG. 130 is a view for explaining the processing which the SAM chip performs when accessing processing or data defined by other application element data APE in accordance with a routine defined by application element data APE when executing a job at step ST4 of FIG. 128;

FIG. 131 is a view for explaining the overall operation of the communication system shown in FIG. 109;

Figure 109:
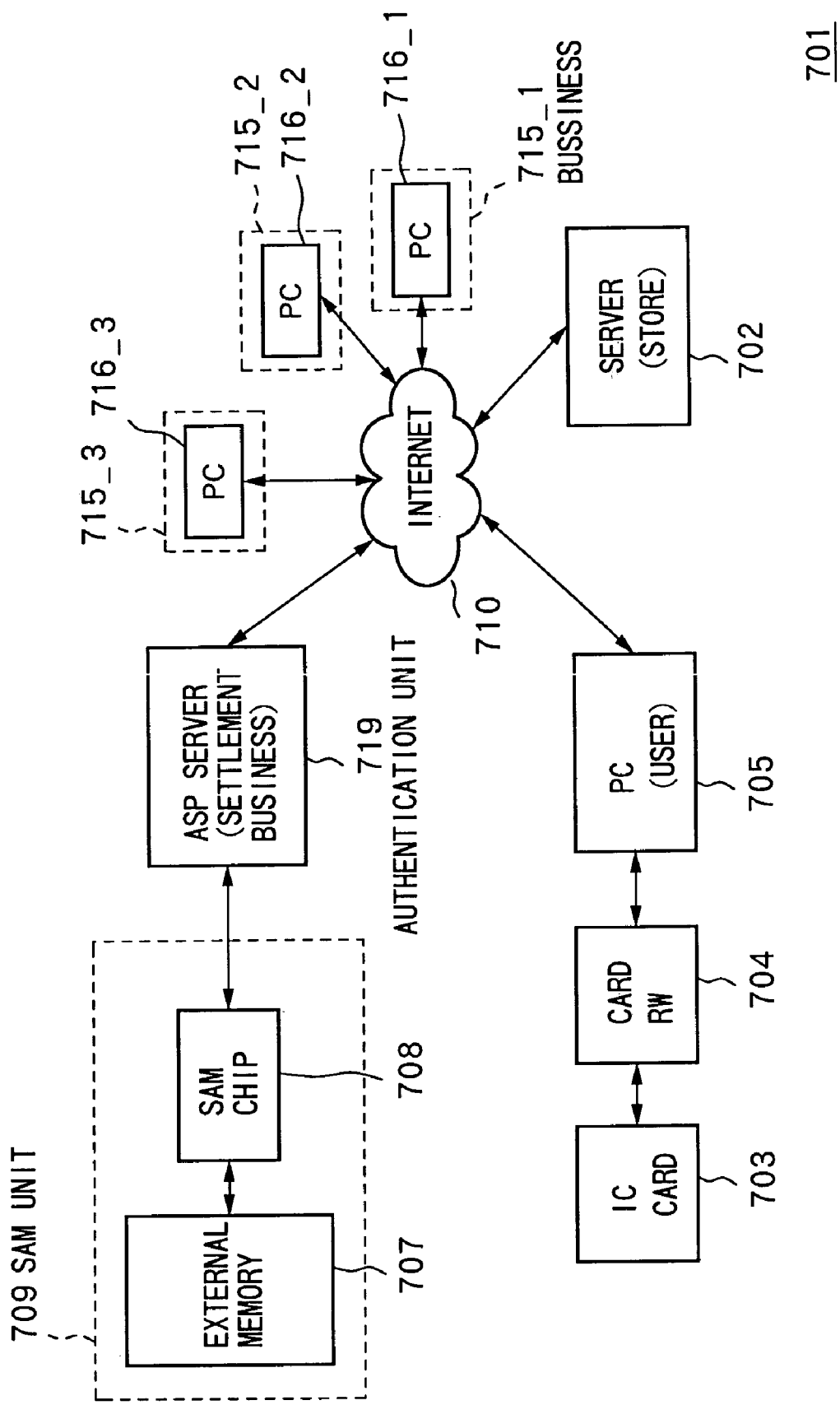
FIG. 109 is a view of the overall configuration of a communication system of the present embodiment.
Figure 132:
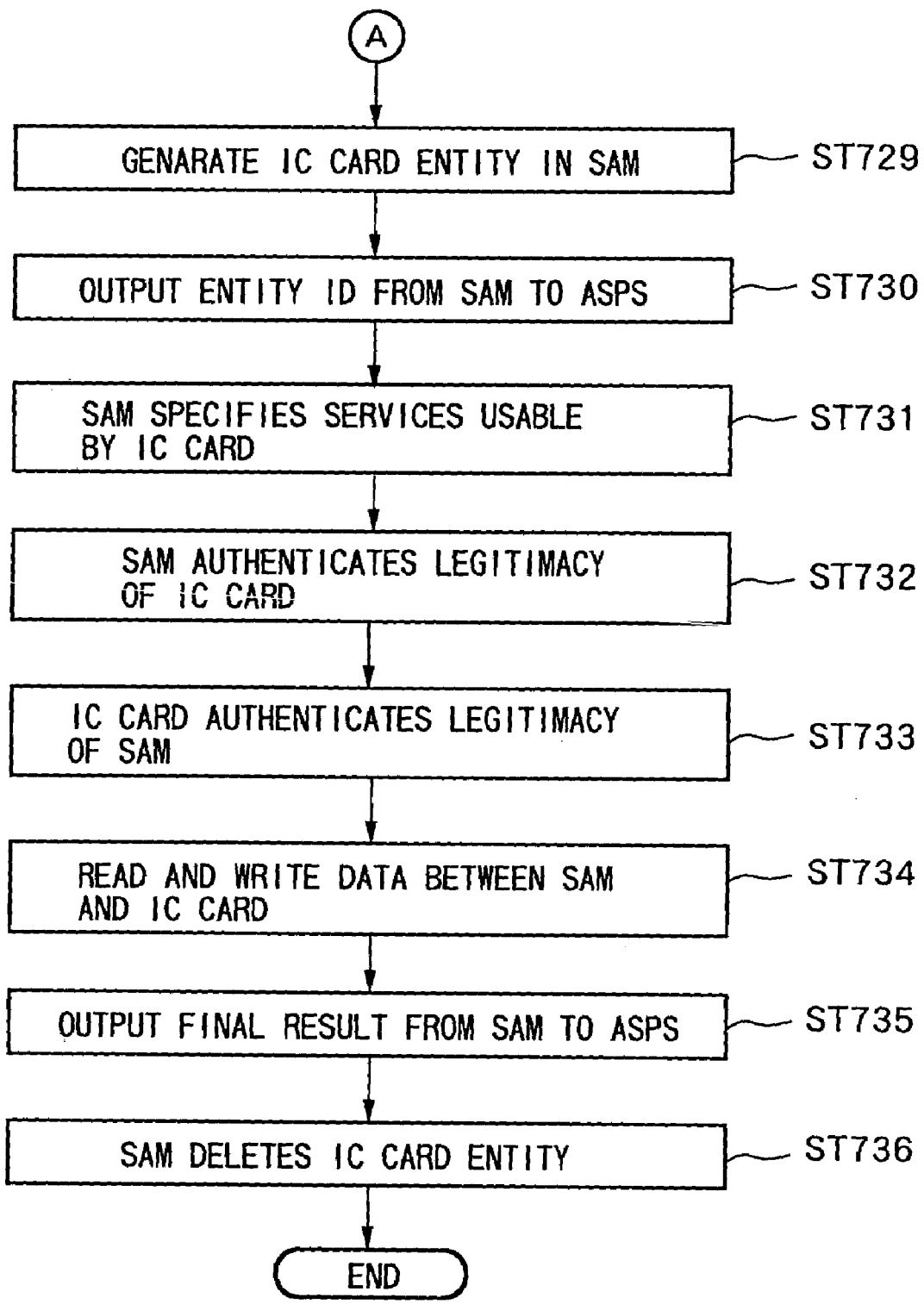
Figure 133:
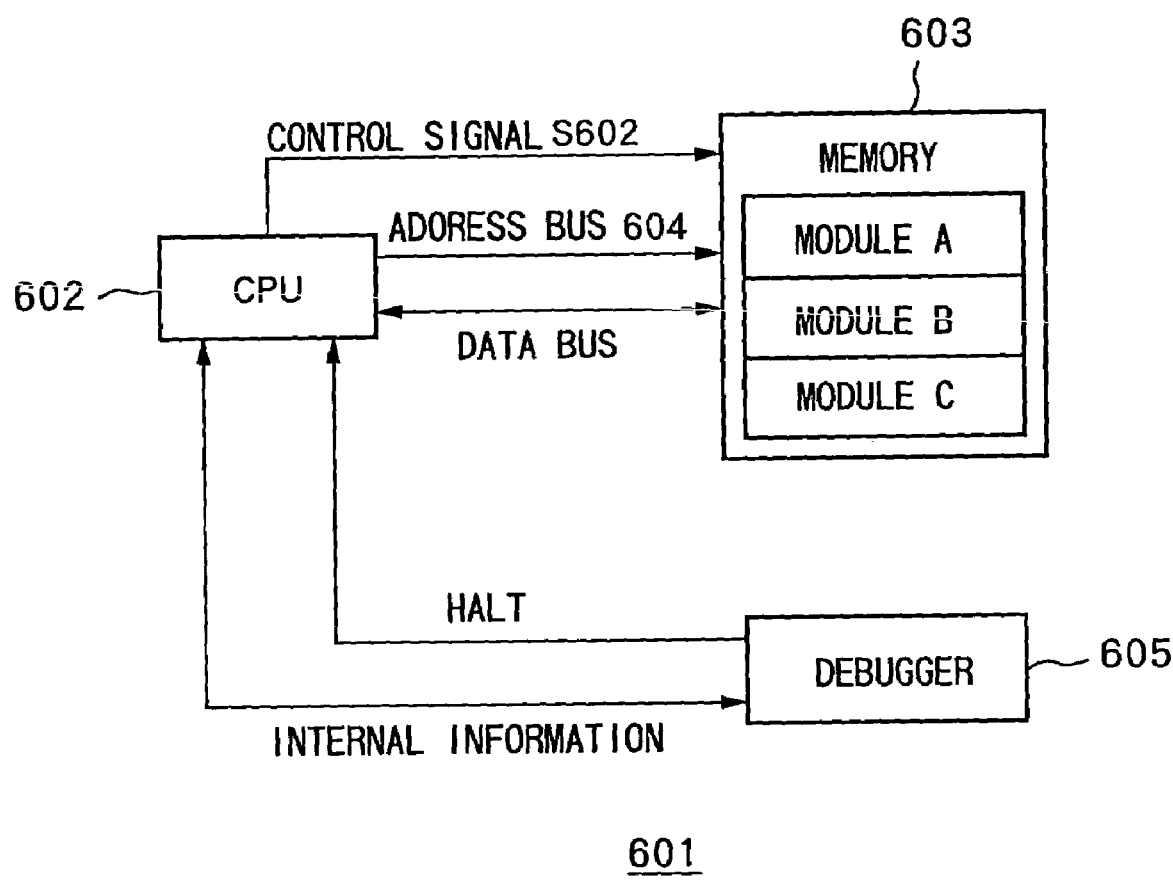

FIG. 132 is a view for explaining the overall operation of the communication system shown in FIG. 109;

FIG. 133 is a view for explaining the prior art;

DETAILED DESCRIPTION OF THE INVENTION

Next, embodiments of the present invention will be explained with reference to the attached drawings.

First Embodiment

The present embodiment is an embodiment corresponding to the first to sixth aspects of the invention.

Figure 1:
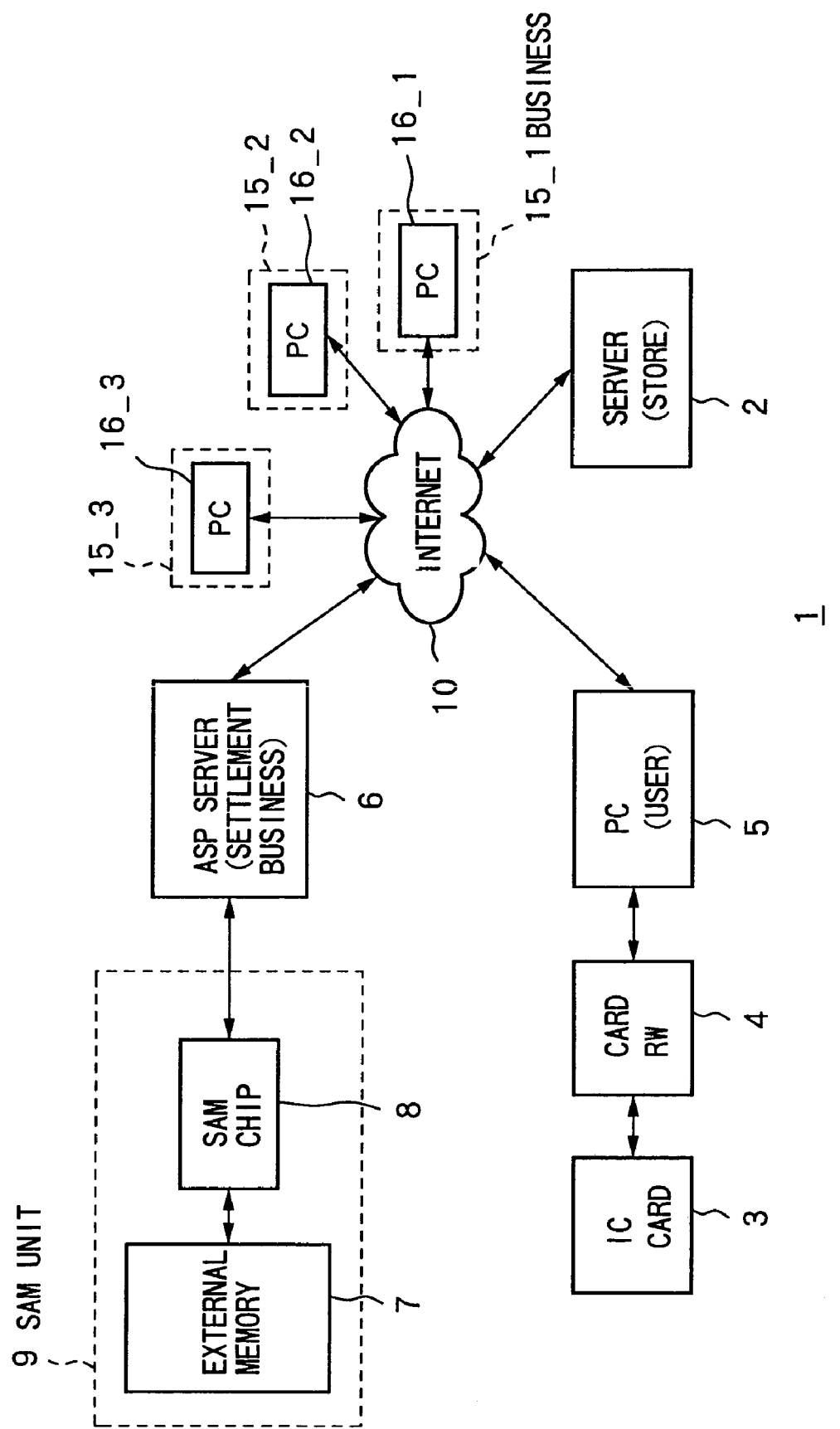
FIG. 1 is a view of the overall configuration of a communication system of an embodiment of the present invention.

FIG. 1 is a view of the overall configuration of a communication system 1 of the present embodiment.

As shown in FIG. 1, the communication system 1 uses a server 2, IC card 3, card reader/writer 4, personal computer 5, ASP (application service provider) server 6, and SAM (secure application module) unit 9 to communicate through the Internet 10 and perform settlement processing or processing for other procedures using the IC card 3 (integrated circuit of the present invention).

The SAM unit 9 has an external memory 7 and a SAM chip (semiconductor circuit of the present invention) 8.

Figure 2:
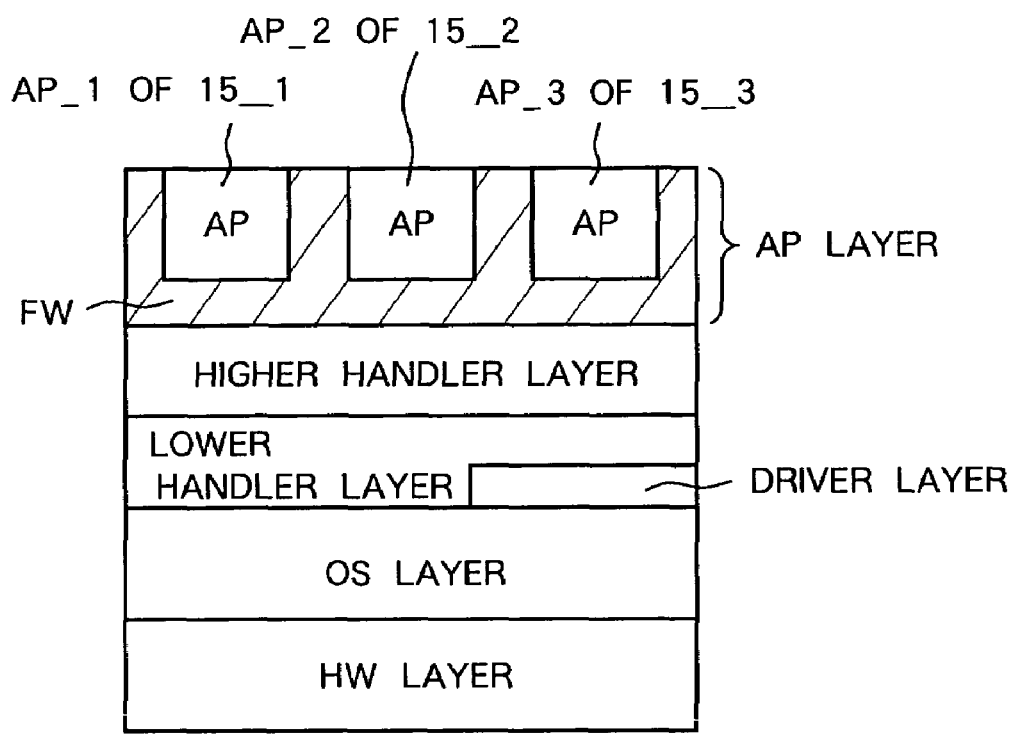
FIG. 2 is a view for explaining the software configuration of a SAM chip shown in FIG. 1.

The SAM chip 8 has the software configuration as shown in FIG. 2.

As shown in FIG. 2, the SAM chip 8 has, from a bottom layer toward a top layer, an HW (hardware) layer, OS layer, lower handler layer, higher handler layer, and AP layer.

The lower handler layer includes a driver layer.

Here, the AP layer includes application programs AP_1, AP_2, and AP_3 defining procedures for use of the IC card 3 by credit card companies or other businesses 15_1, 15_2, and 15_3 shown in FIG. 1.

In the AP layer, the application programs AP_1, AP_2, and AP_3 and the higher handler layer are provided between them with firewalls FW.

The application program AP_1 is defined by a later explained service definition table data (correspondence instructing data) 20_1 and script program (operation describing program) 21_1 stored in an external memory 7.

The application program AP_2 is defined by a later explained service definition table data (correspondence instructing data) 20_2 and script program (operation describing program) 21_2 stored in the external memory 7.

The application program AP_3 is defined by a later explained service definition table data (correspondence instructing data) 20_3 and script program (operation describing program) 21_3 stored in the external memory 7.

The SAM chip 8 is connected through a SCSI port, the Ethernet, etc. to the ASP server 6. The ASP server 6 is connected through the Internet 10 to a plurality of terminal apparatuses including a personal computer 5 of the end user and personal computers 16_1, 16_2, and 16_3 of the businesses 15_1, 15_2, and 15_3.

The personal computer 5, for example, is connected through a serial port or USB port to a Dumb type card reader/writer 4. The card reader/writer 4 realizes for example wireless communication corresponding to the physical level with the IC card 3.

Operational commands to the IC card 3 and response packets from the IC card 3 are generated and analyzed at the SAM unit 9 side. Therefore, the card reader/writer 4, personal computer 5, and ASP server 6 interposed between them only act to store the commands or response content in data payload portions and relay the same. They are not involved in encryption or decryption of data, authentication, and other actual operations in the IC card 3.

The personal computers 16_1, 16_2, and 16_3 can download the later explained script program to the SAM chip 8 to customize their application programs AP_1, AP_2, and AP_3.

Next, the components shown in FIG. 1 will be explained.

[IC Card 3]

Figure 3:
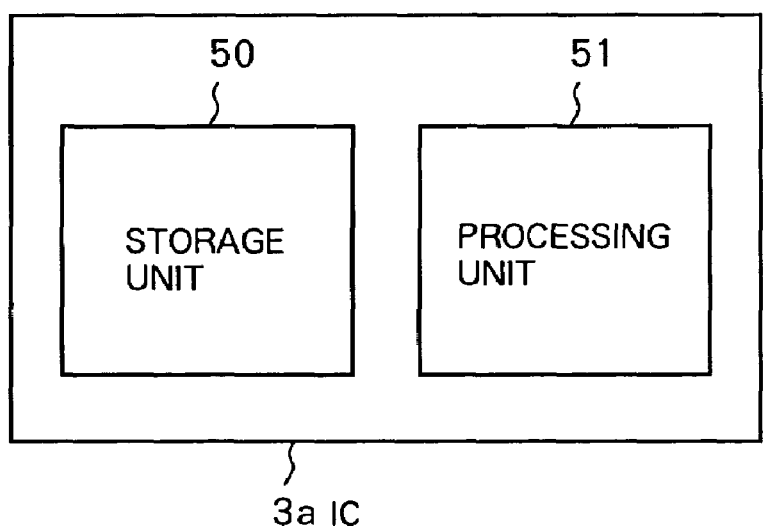
FIG. 3 is a functional block diagram of an IC of an IC card shown in FIG. 1.

FIG. 3 is a functional block diagram of an IC card 3.

As shown in FIG. 3, the IC card 3 has an IC (integrated circuit) 3*a* provided with a storage unit 50 and processing unit 51.

Figure 4:
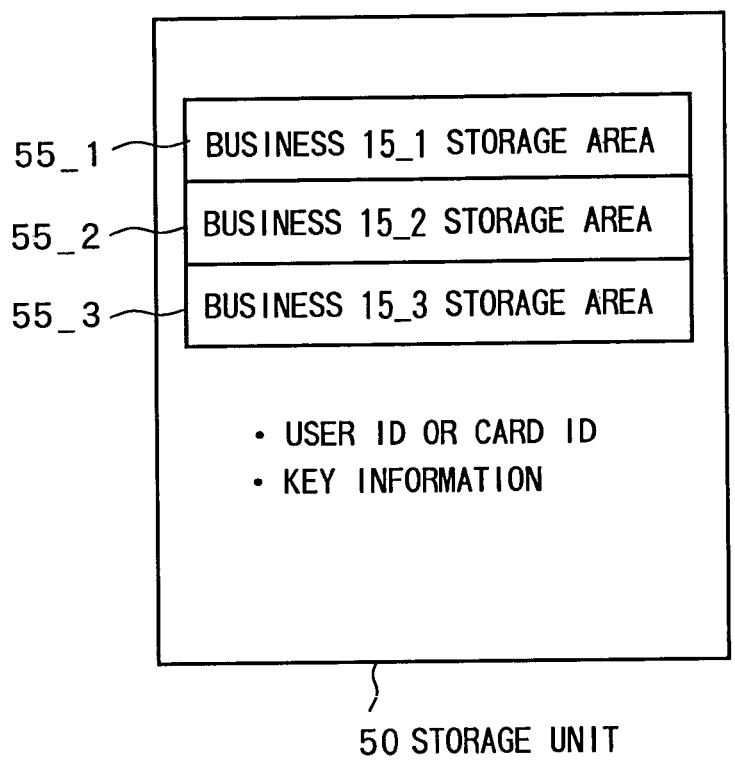
FIG. 4 is a view for explaining information stored in a storage unit shown in FIG. 3.

The storage unit 50, as shown in FIG. 4, has a storage area 55_1 used by a credit card company or other business 15_1, a storage area 55_2 used by a business 15_2, and a storage area 55_3 used by a business 15_3.

Further, the storage unit 50 stores key information used for judging the access right to the storage area 55_1, key information used for judging the access right to the storage area 55_2, and key information used for judging the access right to the storage area storage area 55_3. That key information is used for mutual authentication, encryption and decryption of data, etc.

Further, the storage unit 50 stores identification information of the IC card 3 or the user of the IC card 3.

Next, the SAM unit 9 will be explained in detail.

[External Memory 7]

Figure 5:
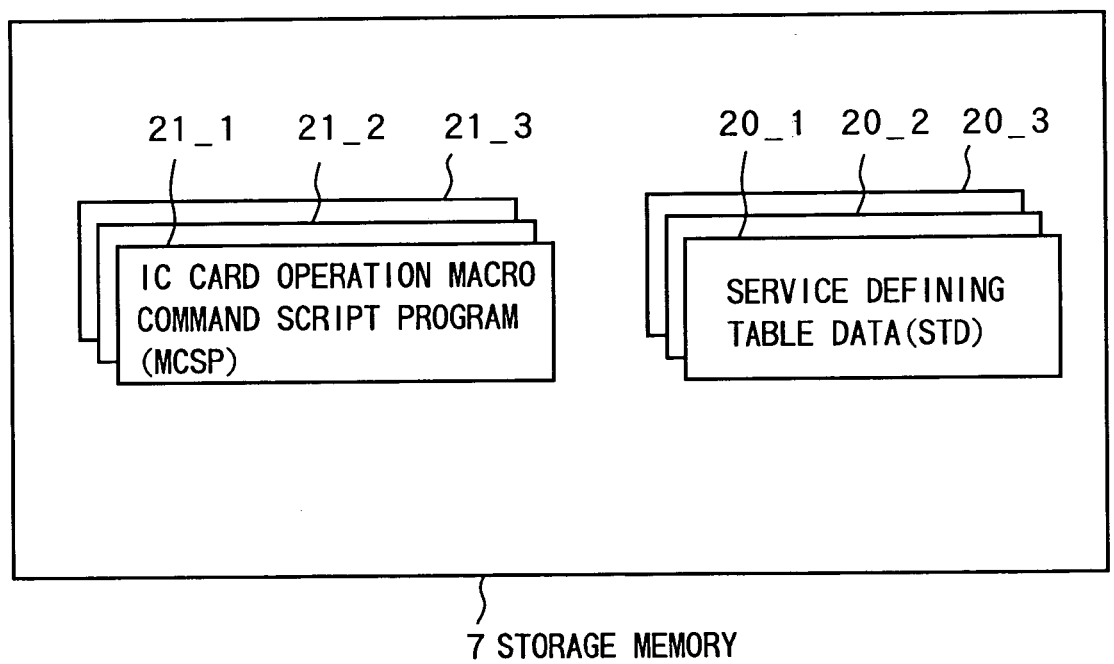
FIG. 5 is a view for explaining information stored in an external memory of the SAM unit shown in FIG. 1.

FIG. 5 is a view for explaining the data and programs stored in the external memory 7 shown in FIG. 1.

As shown in FIG. 5, the external memory 7 stores service definition table data 20_1 and IC card operation macro command script program 21_1 of the business 15_1.

Further, the external memory 7 stores service definition table data 20_2 and IC card operation macro command script program 21_2 of the business 15_2.

Further, the external memory 7 stores service definition table data 20_3 and IC card operation macro command script program 21_3 of the business 15_3.

The service definition table data 20_1, 20_2, and 20_3 have the same format.

Further, the IC card operation macro command script programs 21_1, 21_2, and 21_3 are written using common macro commands.

Further, the service definition table data 20_1, 20_2, and 20_3 and IC card operation macro command script programs 21_1, 21_2, and 21_3 are scrambled to be stored in the external memory 7. The scrambled data and programs are descrambled at the SAM chip 8.

In the present embodiment, the script programs 21_1, 21_2, and 21_3 are produced using the personal computers 16_1, 16_2, and 16_3 shown in FIG. 1 by the businesses 15_1, 15_2, and 15_3 and are downloaded through the SAM chip 8 to the external memory 7.

Further, the service definition table data 20_1, 20_2, and 20_3 are produced by the manager of the SAM unit 9 upon instruction from the businesses 15_1, 15_2, and 15_3.

FIG. 6 is a view for explaining the service definition table data 20_1.

As shown in FIG. 6, the service definition table data 20_1 has entries of service type elements (operation names), addresses, service numbers (operation codes), key version information, and key information.

The "service type element" shows the name assigned to the service provided by the application program of the business 15_1. The service type element is an identifier viewed instead of the service number of the service which the application program of the business 15_1 can use.

In the present embodiment, as shown in FIG. 6, "Rc", "Rd", "Wd", and "Wc" are used as the service type elements of the service definition table data 20_1 corresponding to the business 15_1.

In the present embodiment, the IC card operation macro command script program 21_1 define service content combining a plurality of service type elements and reflects this into the later explained IC card entity data (job management data) so as to be able to provide a service combining services corresponding to a plurality of service type elements.

For example, a service combining a service for reading data from the IC card 3 and a service for writing data in the server 2 can be defined in the IC card entity data.

The service number in the service definition table data 20_1 is an operational command issued to the IC card 3 and analyzable by the IC card 3 when performing a service provided by the business 15_1.

The "address" in the service definition table data 20_1 indicates the address at which data relating to a procedure relating to the corresponding service type element is stored.

The "key version information" in the service definition table data 20_1 shows the version of the key information used when providing that service.

The "key information" in the service definition table data 20_1 is the key information used when providing that service.

For example, key information used when accessing the storage area 55_1 of the IC 3*a* of the IC card 3 shown in FIG. 3 by the service definition table data 20_1 is set.

Further, in the service definition table data 20_2, key information used when accessing the storage area 55_2 of the IC 3*a* is set.

Further, in the service definition table data 20_3, key information used when accessing the storage area 55_3 of the IC 3*a* is set.

Next, the IC card operation macro command script program 21_1 will be explained.

The script program 21_1 is a program for defining the application program of the business 15_1 running on the SAM chip 8 and the procedure of processing performed by the IC card 3 when executing that application program.

Figure 7:
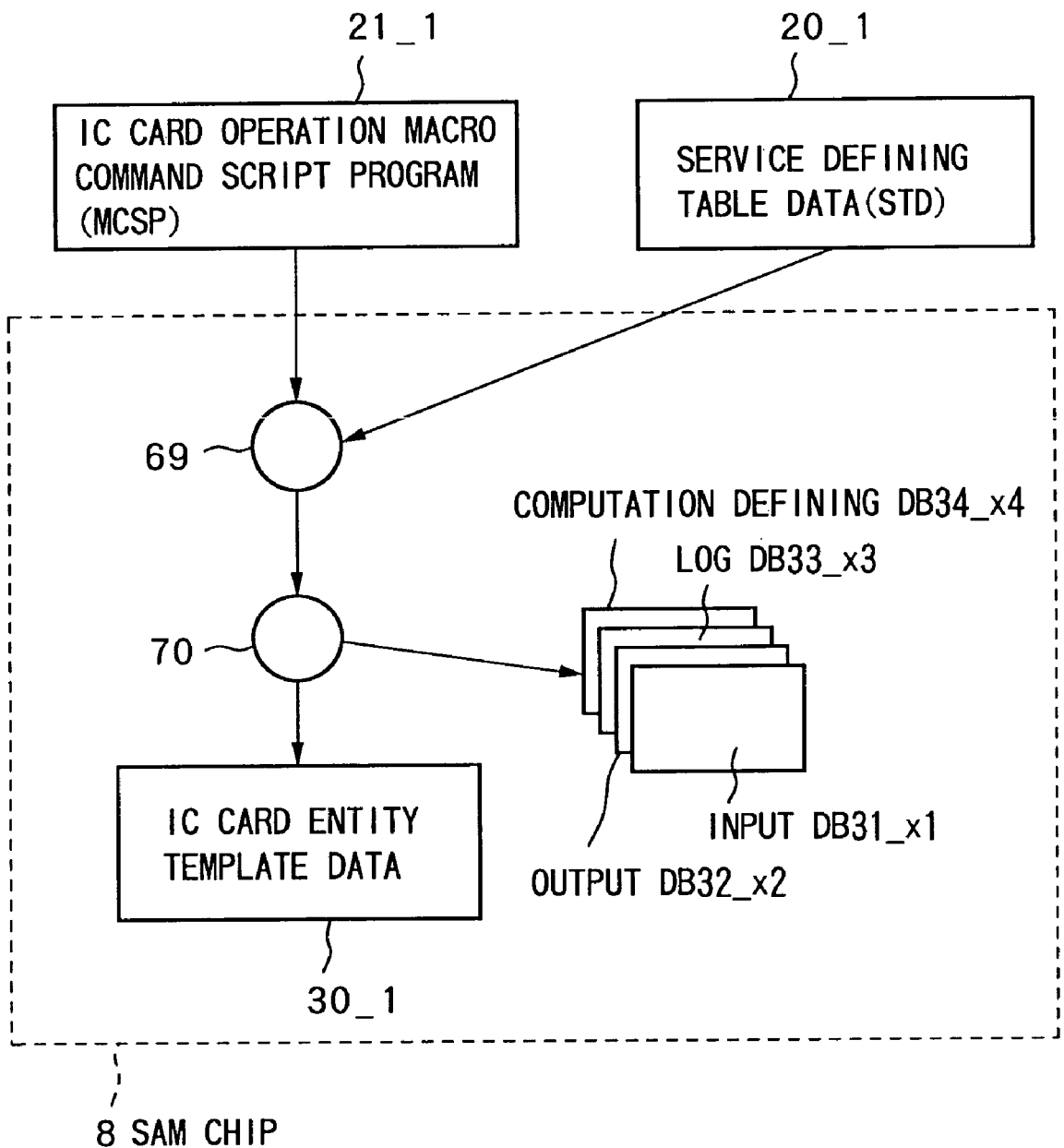
FIG. 7 is a view for explaining the processing in a SAM chip using the service definition table data and script program shown in FIG. 5.

In the present embodiment, as explained later, as shown in FIG. 7, the SAM chip 8 uses the service definition table data 20_1 and script program 21_1 to generate IC card entity template data 30_1, an input data block 31_x1, output data block 32_x2, log data block 33_x3, and computation defining data block 34_x4 used for the procedure relating to the business 15_1.

FIG. 8 is a view for explaining the commands used for describing the IC card operation macro command script programs 21_1, 21_2, and 21_3.

In the commands, commands for the SAM chip 8 itself are given the first letter "S", while commands relating to operation of the IC card 3 are given the first letter "C".

Further, the second letter is selectively used in accordance with the application. For example, for an issuer setting declaration of the IC card 3, it is "I", for a service type element declaration, it is "S", for a simple read declaration from the IC card 3, it is "R", for a simple write declaration to the IC card 3, it is "W", and for a service type element computation definition, it is "F".

The commands used for describing the script programs 21_1, 21_2, and 21_3 include an SC command, SO command, SI command, SL command, SF command, CI command, CS command, CR command, and CW command.

The SC command is a command declaring the number of the maximum number of IC card entity data which the SAM chip 8 can process simultaneously.

For example, when the SAM chip 8 can simultaneously process 1000 IC card entity data, "SC:1000" is described.

The SO command is a command for declaring the data block for forming the output data block 32_x2 in which the data read from the IC card 3 is stored among the data blocks provided in the SAM chip 8 when performing processing using the IC card 3 based on the later explained IC card entity data.

For example, when the data blocks 1 to 10 are provided, when storing the data read from the IC card 3 in the data block 1, "SO:1" is described.

The SI command is a command for declaring the data block for forming the input data block 31_x1 in which the data to be written in the IC card 3 is stored among the data blocks provided in the SAM chip 8 when performing processing using the IC card 3 based on the later explained IC card entity data.

For example, when the data blocks 1 to 10 are provided, when storing the data to be written in the IC card 3 in the data blocks 2, 3, "SI:2,3" is described.

The SL command is a command for declaring the data block forming the log data block 33_x3 for storing the log data relating to an operation among the data blocks provided in the SAM chip 8 when performing processing using the IC card 3 based on the later explained IC card entity data.

For example, when the data blocks 1 to 10 are provided, when storing the log data in the data block 4, "SL:4" is described.

The SF command is a command for providing the data block forming the computation defining data block 34_x4 describing the definition of the relation between the service type elements relating to the IC card 3.

The content of the computation defining data block 34_x4 becomes the pre-processing information of the IC card entity data.

The CI command is a command for declaring the issuer of the IC card 3 (business).

The information specifying the business defined by the CI command becomes the IC card type information of the IC card entity data.

The CS command is a command for declaring simultaneous operation of a plurality of services to the IC card 3 by citing service type elements. The CS command can also declare a function defining processing among service type elements.

For example, it is possible to declare

"CS:"Rc"+"Wc"+"Wd"".

Based on the content of the CS command, service type element designating information of the IC card entity data and processing order information are determined.

The CR command declares to store data read from the IC card 3 in a designated data block when the relation among service type elements is not defined (when SF command is not described).

For example, when storing the data read from the IC card 3 in the data block 1, "CR:SO:1="Rc"" is described.

The CW command declares to write data stored in a designated data block to the IC card 3 when the relation among service type elements is not defined.

For example, when writing data stored in the data block 2 in the IC card 3, "CW:SI:2="Wc"" is described.

The CF command declares the data block describing computation content spanning services.

For example, when describing computation content spanning services in the SF data block 1, "CF:CES_FUNC=SF:1" is described.

Further, the SF data block 1 has described in it, for example, ""Wc"=If ("Wc">10) then ("Wc"−10; "Wd"="Wc"*0.08+"Wd")". This formula expresses the operation of subtracting 10 from the value of Wc when the remaining number of services Wc is larger than 10 and adding a number of points corresponding to 8% of Wc as cumulative points to Wd.

[SAM Chip 8]

FIG. 9 is a functional block diagram of the SAM chip 8 shown in FIG. 1.

As shown in FIG. 9, the SAM chip 8 has an ASPS communication interface unit 60, external memory communication interface unit 61, bus scramble unit 62, random number generation unit 63, encryption/decryption unit 64, storage unit 65, and CPU 66.

The SAM chip 8 is a tamper-resistant module.

The ASPS communication interface unit 60 is an interface used for input and output of data with the ASP server 6 shown in FIG. 1.

The external memory communication interface unit 61 is an interface used for input and output of data with the external memory 7.

The bus scramble unit 62 scrambles output data and descrambles input data when inputting and outputting data through the external memory communication interface unit 61.

The random number generation unit 63 generates random numbers used at the time of authentication processing.

The encryption/decryption unit 64 encrypts data and decrypts encrypted data.

The storage unit 65, as explained later, stores tasks, programs, and data used by the CPU 66.

The CPU 66 executes a predetermined program (program of the present invention) to execute the later explained script download task, script interpretation task, entity generation task (job management data production task) and IC card procedure management task (job management data management task), and other tasks.

Next, the tasks, programs, and data stored in the storage unit 65 will be explained.

Figure 10:
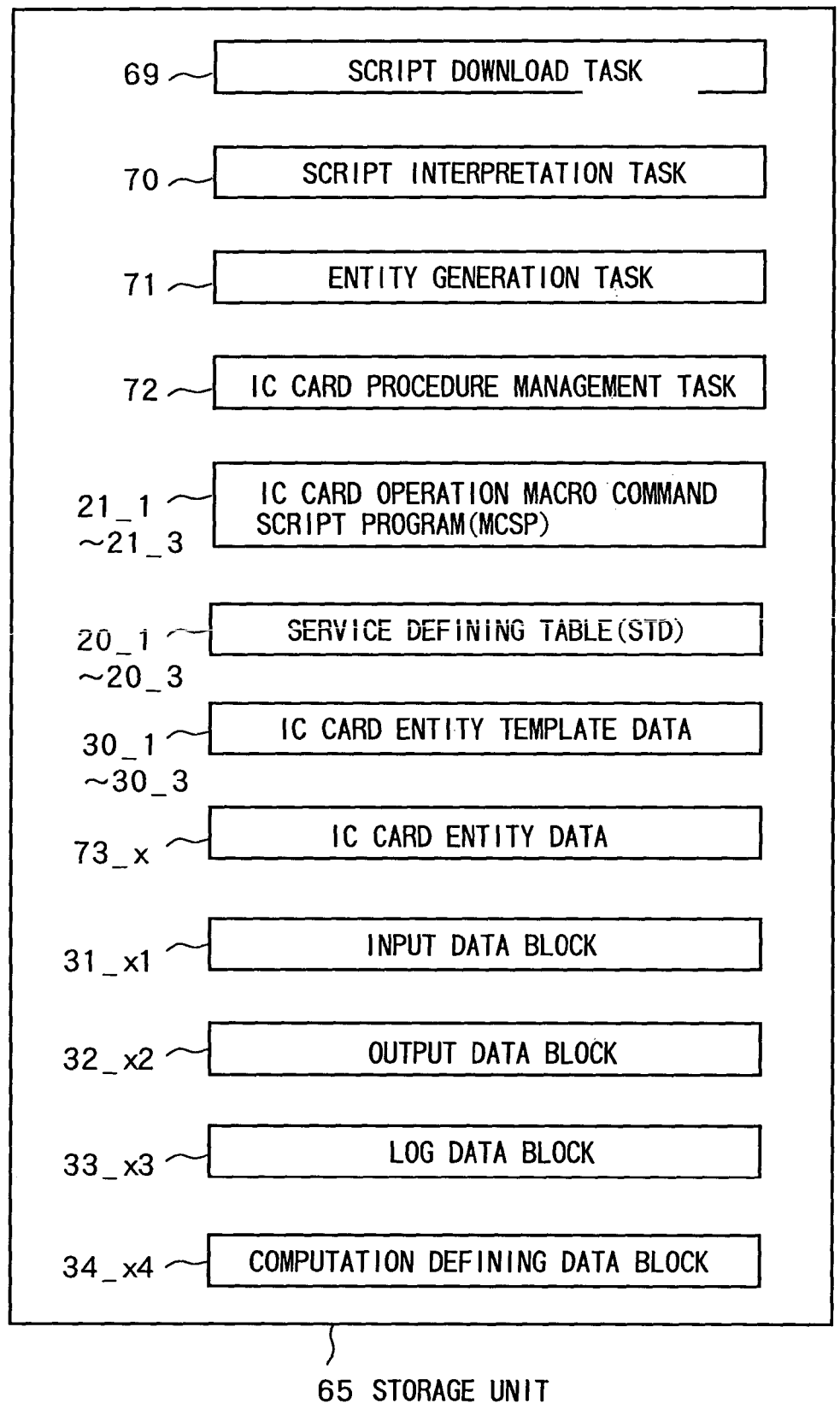
FIG. 10 is a view for explaining the data stored in a storage unit shown in FIG. 9.

FIG. 10 is a view for explaining the tasks, programs, and data stored in the storage unit 65.

As shown in FIG. 10, it stores a script download task 69, script interpretation task 70, entity generation task 71, IC card procedure management task 72, IC card operation macro command script programs 21_1 to 21_3, service definition tables 20_1 to 20_3, IC card entity template data 30_1 to 30_3, IC card entity data 73_x, an input data block 31_x1, output data block 32_x2, log data block 33_x3, and computation defining data block 34_x4.

The script download task 69, as shown in FIG. 7, downloads the service definition table data 20_1 to 20_3 from, for example, the computers of businesses and loads them in the SAM chip 8.

The script interpretation task 70 uses the service definition table data and script program to generate the IC card entity plate data, an input data block, output data block, log data block, and computation defining data block for each business.

The number of data blocks generated for each business is not particularly limited.

When the entity generation task 71 receives from, for example, the ASP server 6 an entity production request, it conducts polling with the IC card 3, then generates the IC card entity data used for processing of a procedure between that IC card 3 and a business using the IC card entity plate data corresponding to that business. At this time, the IC card entity plate data becomes the class, and IC card entity data is generated as an instance of that class.

The processing for generation of the IC card entity data by the entity generation task 71 will be explained in detail later.

The IC card procedure management task 72 uses the one or more IC card entity data 73_x present in the storage unit 65 to execute processing for a procedure between the IC card 3 and businesses 15_1 to 15_3.

In the present embodiment, a plurality of processing for procedures performed between a plurality of IC cards 3 and the businesses 15_1 to 15_3 proceed simultaneously.

The IC card procedure management task 72 executes the plurality of processing for procedures in parallel.

The IC card procedure management task 72 deletes the IC card entity data 73_x when the series of procedures have been completed.

The processing of the IC card procedure management task 72 will be explained in detail later.

The script programs 21_1 to 21_3 are input by the script download task 69 from, for example, the external memory 7 to the storage unit 65.

The service definition table data 20_1 to 20_3 are input by the script download task 69 from, for example, the external memory 7 and stored in the storage unit 65.

The IC card entity template data 30_1 to 30_3 are generated by the script interpretation task 70 and used as templates (classes) when generating the IC card entity data 73_x of the procedures relating to the respective businesses.

The IC card entity data 73_x is generated by the entity generation task 71 using the IC card entity template data 30_1 to 30_3 as for example classes as an instance of the classes.

The input data block 31_x1, output data block 32_x2, log data block 33_x3, and computation defining data block 34_x4 are generated by the script interpretation task 70.

Next, the IC card entity data 73_x will be explained.

The IC card entity data 73_x is generated using IC card entity template data of a corresponding business already generated by entity generation task 71 in the SAM chip 8 when for example the SAM chip 8 receives a processing request for processing using the IC card 3 and the application program of a predetermined business from the ASP server 6.

Figure 11:
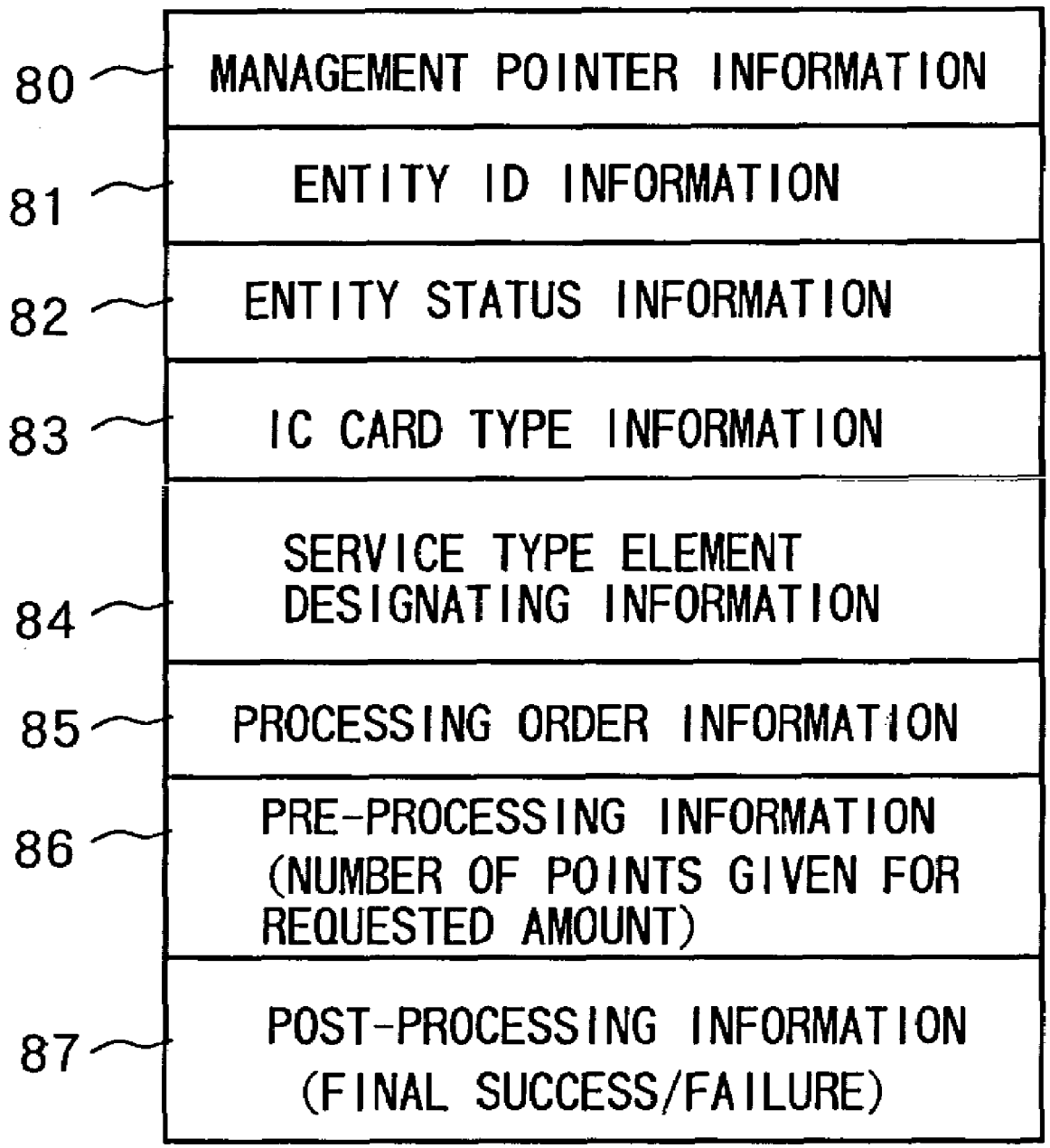
FIG. 11 is a view for explaining the format of IC card entity data generated by the SAM chip.

FIG. 11 is a view for explaining the format of the IC card entity data 73_x.

As shown in FIG. 11, the IC card entity data 73_x has management pointer information 80, entity ID information 81, entity status information (status data) 82, IC card type information 83, service type element designating information 84, processing order information (processing order data) 85, pre-processing information 86, and post-processing information 87.

The management pointer information 80 is a bidirectional pointer for managing the IC card entity data 73_x in the storage unit 65.

The entity ID information 81 is used for a request for generation of IC card entity data 73_x, confirmation of the state of progress, deletion, or the rest of a series of processing using the IC card entity data 73_x. The entity ID information 81 also becomes a return value given to the end user. The entity ID information 81 corresponds to the descriptor when opening a file in a general file system.

The entity status information 82 shows the state of progress of a procedure relating to an IC card 3.

Figure 12:
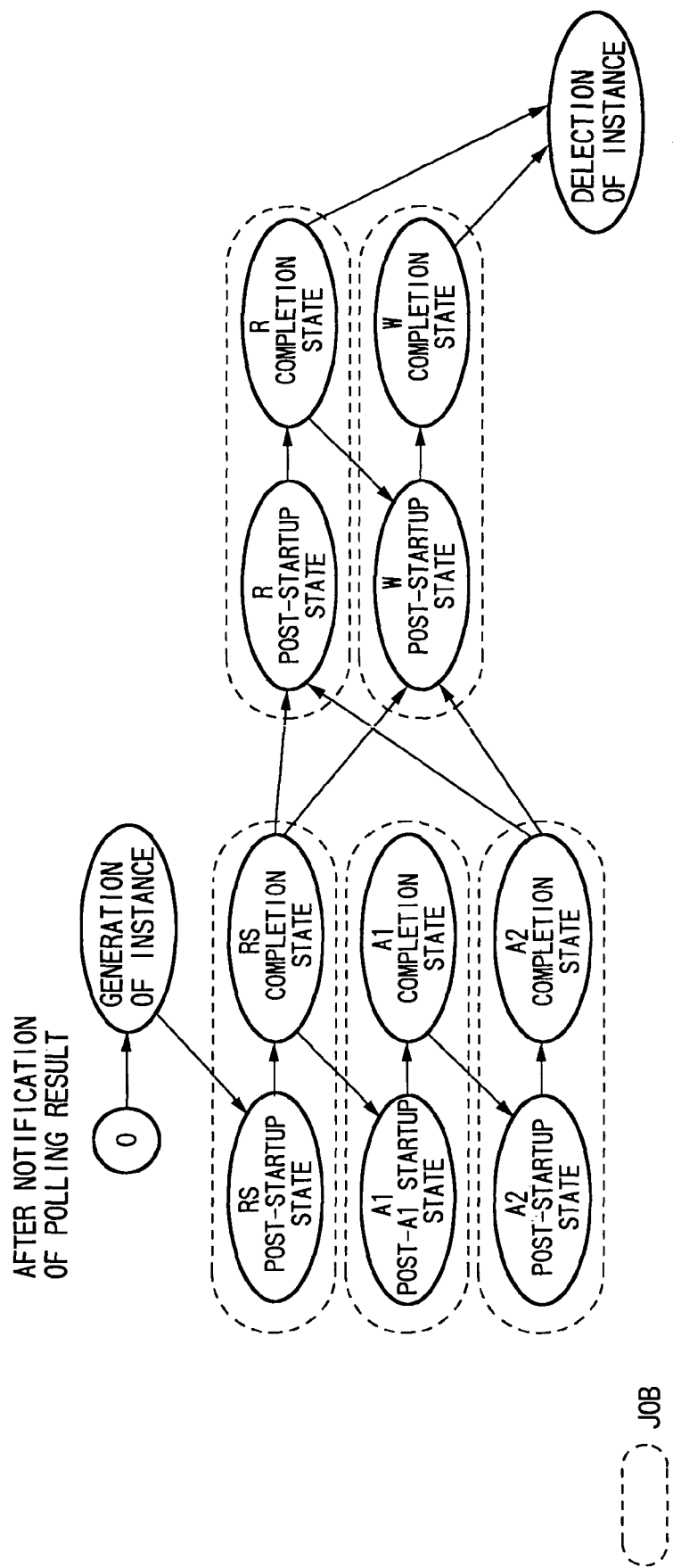
FIG. 12 is a state transition chart of the IC card entity data shown in FIG. 11.

The basic states of the IC card entity data 73_x include, as shown in FIG. 12, the state of processing for investigating the services which the IC card 3 can use (RS), the state of processing by which the SAM chip 8 authenticates the IC card 3 (A1), the state of processing by which the IC card 3 authenticates the SAM chip 8 (A2), the state of processing for reading data from the IC card 3 (R), and the state of processing for writing data in the IC card 3 (W).

In the present embodiment, the processing for investigating the business, the processing for the SAM chip 8 to authenticate the IC card 3, the processing for the IC card 3 to authenticate the SAM chip 8, the processing for reading data from the IC card 3, and the processing for writing data in the IC card 3 correspond to jobs.

A "job", as explained later, is a unit of processing for which an order of execution is determined by the IC card procedure management task 72.

Note that A1 and A2 form the mutual authentication processing between the IC card 3 and SAM chip 8.

Further, in the present embodiment, considering the communication time on the Internet 10, the above-mentioned basic states are, as shown in the state transition chart of FIG. 12, managed divided into post-startup (after issuance of command) states and completed (after receiving response) states.

Specifically, the state of processing using the IC card entity data 73_x is managed by the instance generation (IC card entity data generation) state, RS post-startup state, RS completed state, A1 post-startup state, A1 completed state, A2 post-startup state, A2 completed state, R post-startup state, R completed state, W post-startup state, W completed state, and instance (IC card entity data) deletion state.

The IC card type information 83 is information for specifying the business issuing that IC card 3.

The IC card type information 83 is set with information defined by the CI command in the above-mentioned script program at the time of generation of the IC card entity data 73_x.

The service type element designating information 84 shows the service type elements of the service defined in the service definition table data used in processing using the IC card entity data 73_x.

The service type element designating information 84 is set with one or more service type elements designated by the CS command in the above-mentioned script program at the time of generation of the IC card entity data 73_x.

The processing order information 85 shows the order of execution of services (jobs) used in the processing using the IC card entity data 73_x, that is, the state transition shown in FIG. 12.

That is, the processing order information 85 uses the service type elements to show the order of execution of jobs corresponding to the basic operations of the IC card 3.

Here, the jobs, as explained earlier, correspond to the RS, A1, A2, R, and W shown in FIG. 12. Specific operations on the IC card 3 are realized by the order of processing designated using the jobs. For example, for processing using an IC card 3 with only reading with no mutual authentication, the processing order information 85 is set with "RS->R". Further, in the case of reading and writing with mutual authentication, the processing order information 85 is set with "RS->A1->A2->R->W".

The processing order information 85 is set with the order of jobs shown in FIG. 12 corresponding to the order of service elements designated in the CS command in the above-mentioned script program when generating the IC card entity data 73_x.

The pre-processing information 86 is set from the ASP server 6 side with management data for performing processing using the IC card entity data 73_x.

For example, the pre-processing information 86 is set with points of a computation formula of a service designated in the SF data block.

Further, when an inter-service computation function is not defined, the pre-processing information 86 is set with the requested processing charge.

For example, in the case of settlement, the state relating to the amount of charge or number of points given etc. is set.

The post-processing information 87 is set with data of the processing result of the IC card entity data 73_x required at the ASP server 6 side. For example, in the case of settlement, it is set with data showing the existence of a normal end to the settlement.

Next, a routine for processing by the IC card procedure management task 72 shown in FIG. 10 relating to a plurality of IC cards 3 using a plurality of IC card entity data 73_x will be explained.

The IC card procedure management task 72 is for example constantly being started up on the CPU 66 of the SAM chip 8 shown in FIG. 9.

Figure 13:
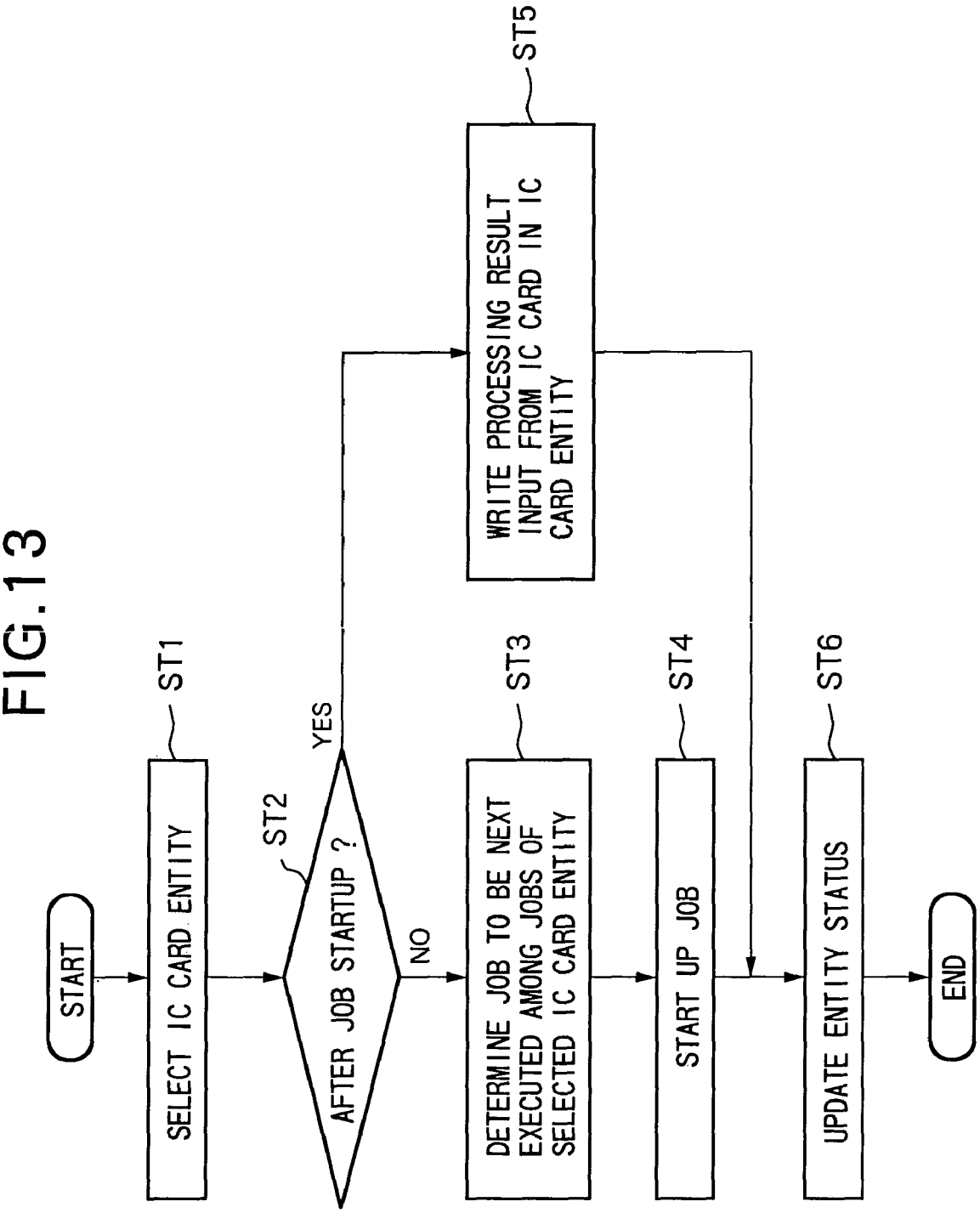
FIG. 13 is a view for explaining a processing routine of an IC card procedure management task shown in FIG. 10.

FIG. 13 is a flow chart of the processing performed by the IC card procedure management task 72.

Step ST1:

The IC card procedure management task 72 selects one IC card entity data 73_x for executing the next processing out of the plurality of IC card entity data 73_x present in the storage unit 65.

The method of selection of that IC card entity data 73_x may be to successively select IC card entity data 73_x present in the storage unit 65 or to assign a priority order and select by priority in the order of the highest priority.

Step ST2:

The IC card procedure management task 72 judges if the job of the IC card entity data 73_x selected at step ST1 has already been started up. When judging that it has been started up, it proceeds to the processing of step ST5, while when judging that it has not been started up, proceeds to the processing of step ST3.

Step ST3:

The IC card procedure management task 72 judges from the entity status information 82 shown in FIG. 11 of the IC card entity data 73_x selected at step ST1 which state of the state transition chart shown in FIG. 12 the processing relating to that entity data is in and decides on the job to be executed next from the processing order information 85.

At this time, the processing order information 85 defines the order of execution of jobs using the service elements set in the service definition table data as explained earlier.

Step ST4:

The IC card procedure management task 72 starts up the job selected at step ST3.

The IC card procedure management task 72 executes the job using the data blocks relating to that job in the above-mentioned input data block 31_x1, output data block 32_x2, log data block 33_x3, and computation defining data block 34_x4.

At this time, the IC card procedure management task 72, when issuing a command to the IC card 3 in execution of a job, uses the service element corresponding to that job as a key to search through the service definition table data to obtain the service number corresponding to that service element (operational command of IC card 3 able to be analyzed by the IC card 3). Further, the IC card procedure management task 72 uses the obtained service number to issue a command to the IC card 3.

Further, the IC card procedure management task 72, as explained using FIG. 4, when key information is required for accessing a storage area of the IC card 3a, uses the service element corresponding to that job to search through the service definition table data and obtain the key information corresponding to that service element. Further, the IC card procedure management task 72 uses that key information to perform mutual authentication with the IC card 3, encryption and decryption of data, and other processing and obtain the right to access a predetermined storage area of the IC card 3.

Step ST5:

Step ST5 is performed when the IC card procedure management task 72 issues a command to the IC card 3 and is waiting for the processing result of the IC card 3.

When the IC card procedure management task 72 receives the processing result from the IC card 3, it sets this in Step ST6:

The IC card procedure management task 72 updates the entity status information 82 of the IC card entity data 73_x shown in FIG. 11.

In this way, in the present embodiment, the IC card procedure management task 72 performs processing for a plurality of IC cards 3 present in the SAM chip 8 in parallel while selecting in order the IC card entity data 73_x for the plurality of IC cards 3. Therefore, the SAM chip 8 can simultaneously proceed with the processing even when receiving processing requests for procedures using a plurality of IC cards 3.

Next, the overall operation of the communication system shown in FIG. 1 will be explained.

Figure 14:
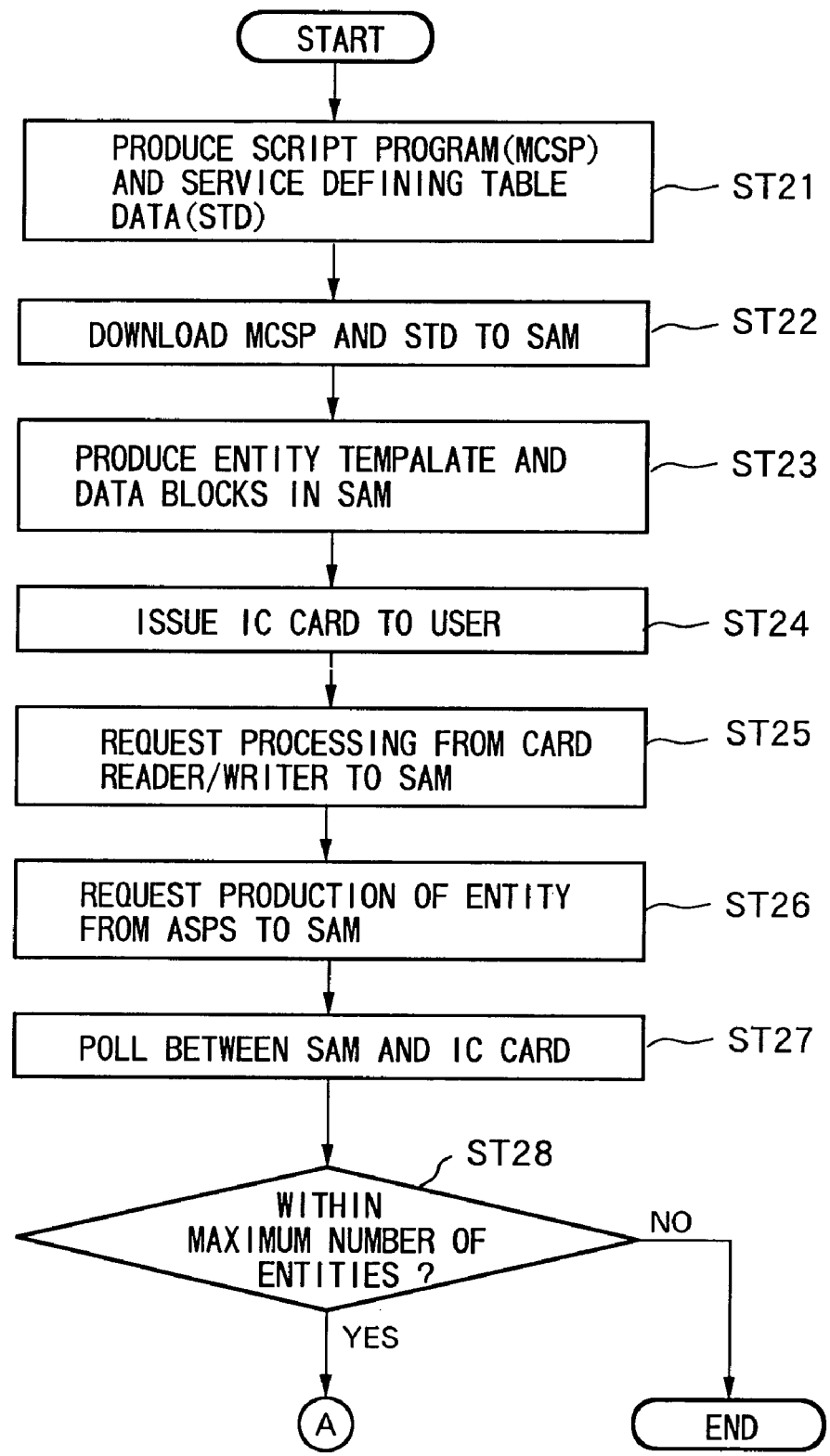
FIG. 14 is a view for explaining the overall operation of the communication system shown in FIG. 1.
Figure 15:
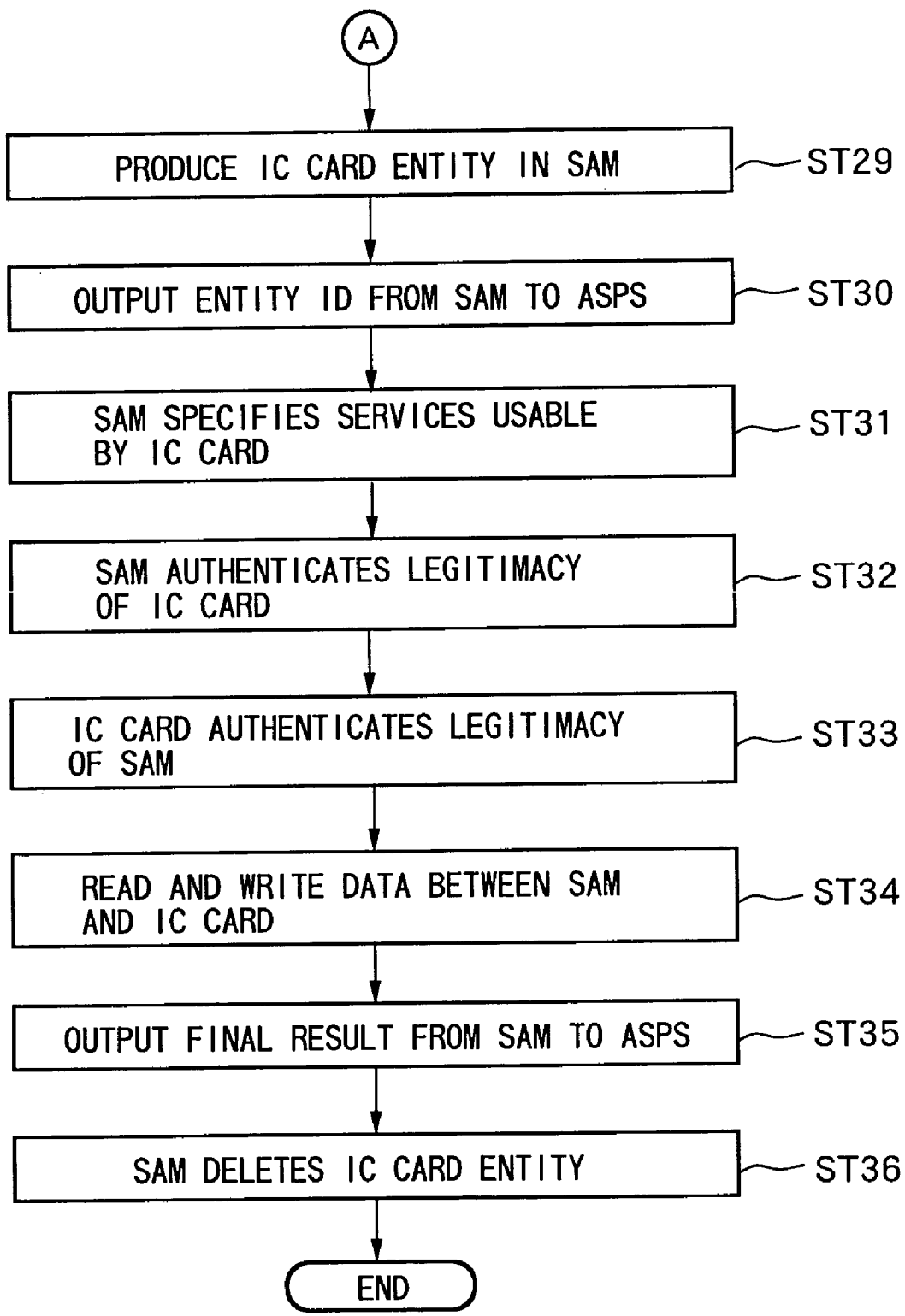
FIG. 15 is a view for explaining the overall operation of the communication system shown in FIG. 1.

FIG. 14 and FIG. 15 are views for explaining the overall operation of the communication system 1 shown in FIG. 1.

Step ST21:

The businesses 15_1 to 15_3 or a party requested by those businesses produce script programs 21_1, 21_2, and 21_3 describing processing for transactions performed by the businesses using the IC card 3 for example on the personal computers 16_1, 16_2, and 16_3 shown in FIG. 1.

Further, the manager of the SAM chip 8 produces service definition table data 20_1, 20_2, and 20_3 corresponding to the businesses 15_1 to 15_3.

Step ST22:

The service definition table data 20_1, 20_2, and 20_3 produced in step ST21 are stored in the external memory 7.

Further, the script programs 21_1, 21_2, and 21_3 produced at step ST21 are downloaded from the personal computers 16_1, 16_2, and 16_3 through the Internet 10, ASP server 6, and SAM chip 8 to the external memory 7. That download processing is managed, as shown in FIG. 7, by the script download task 69 in the SAM chip 8.

Step ST23:

The script interpretation task 70 in the SAM chip shown in FIG. 7 uses the service definition table data and script program to generate the IC card entity plate data, input data block, output data block, log data block, and computation defining data block for each business.

The generated data is stored in the storage unit 65 of the SAM chip 8 shown in FIG. 9.

Step ST24:

The user is issued the IC card 3.

As shown in FIG. 4, the storage unit 50 of the IC 3a of the IC card 3 stores key information used for transactions with the business the user contracts with.

Note that the user and a business may also contract with each other after issuance of the IC card 3 through the Internet 10 etc.

Step ST25:

For example, when the user uses the personal computer to access the server 2 through the Internet 10 to try to purchase a product, the server 2 issues a processing request through the Internet, 10 to the ASP server 6.

Figure 16:
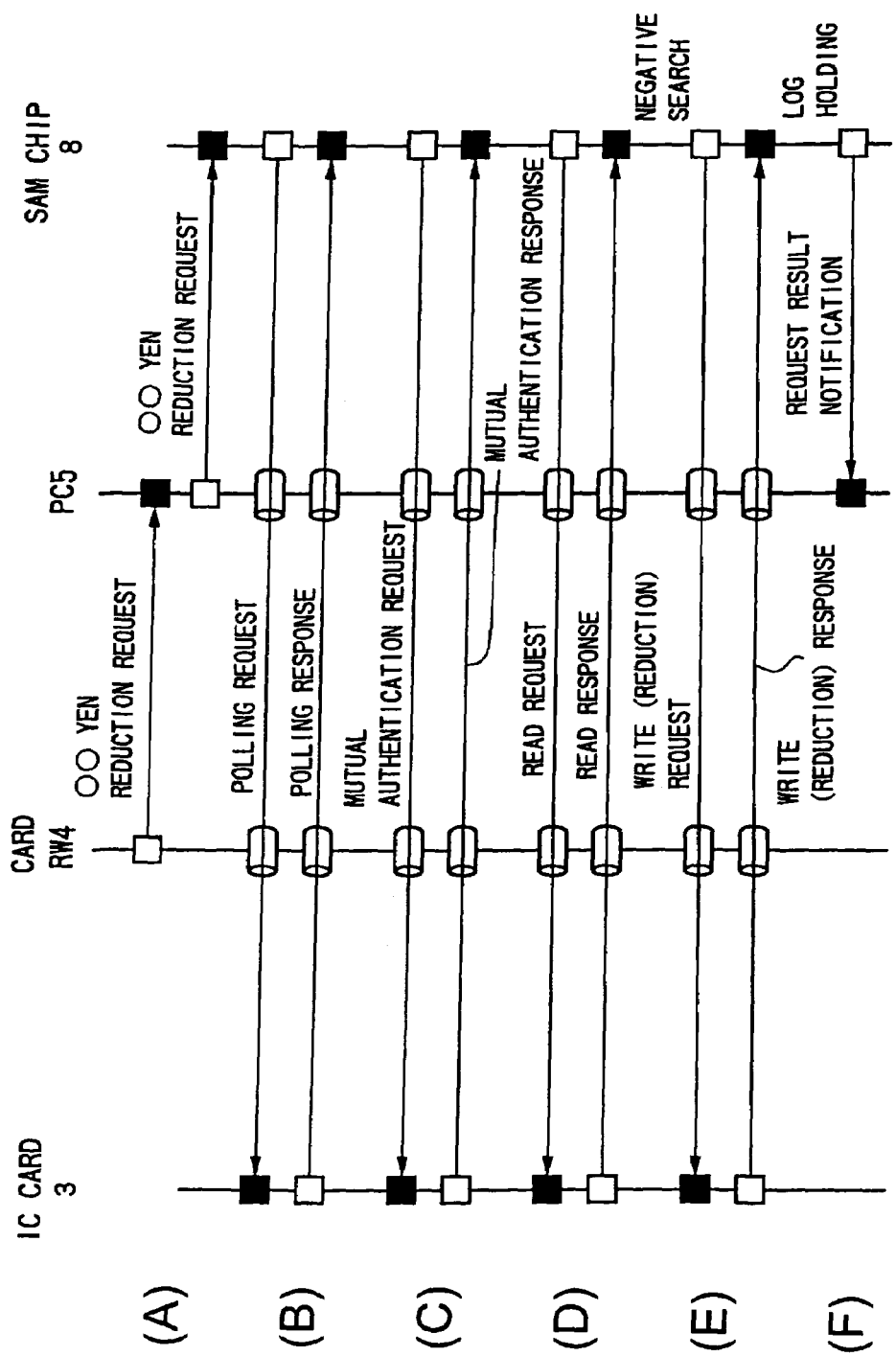
FIG. 16 illustrates a communication protocol and communication exchange between an IC card and SAM chip in accordance with the protocol delineated as steps A–F.

When the ASP server 6 receives a processing request from the server 2, it accesses the personal computer 5 through the Internet 10. Further, as shown in FIG. 16 segment A, a processing request issued by the card reader/writer 4 for the IC card 3 is transmitted through the personal computer 5, Internet 10, and ASP server 6 to the SAM chip 8.

Step ST26:

The ASP server 6 outputs to the SAM chip 8 an entity production request.

That entity production request stores information showing the issuer of the IC card 3.

Step ST27:

When the SAM chip 8 receives an entity production request, as shown in FIG. 16 segment B, it conducts polling with the IC card 3.

Step ST28:

The entity generation task 71 of the SAM chip 8 judges if the number of the IC card entity data 73_x present in the SAM chip 8 after the end of the polling is within the maximum number defined by the SC command of the script program. If within the maximum number, it proceeds to the processing of step ST29, while if not, it ends the processing.

Step ST29:

The entity generation task 71 specifies which business' IC card entity plate data to use based on the information showing the issuer of the IC card 3 stored in the entity production request for example and uses that specified IC card entity plate data to generate the IC card entity data 73_x.

This corresponds to the instance generation shown in FIG. 12.

Step ST30:

The SAM chip 8 outputs to the ASP server 6 the entity ID of the IC card entity data 73_x generated at step ST29.

Step ST31:

The IC card procedure management task 72 of the SAM chip 8 investigates the services which the IC card 3 can use.

This is processing corresponding to the job RS shown in FIG. 12.

Step ST32:

The IC card procedure management task 72 of the SAM chip 8 authenticates the legitimacy of the IC card 3.

This is processing corresponding to the job A1 shown in FIG. 12.

Step ST33:

The IC card 3 authenticates the legitimacy of the SAM chip 8.

This is processing corresponding to the job A2 shown in FIG. 12.

By steps ST32 and ST33, the IC card 3 and SAM chip 8 mutually authenticate each other. This corresponds to FIG. 16 segment C.

Step ST34:

The IC card procedure management task 72 of the SAM chip 8 reads and writes data necessary for the procedure with the IC card 3.

This is processing corresponding to the jobs R and W shown in FIG. 12 and FIG. 16 segments D and E.

Further, the IC card procedure management task 72 uses a computation formula specified based on the pre-processing information 86 of the IC card entity data 73_x to perform predetermined processing for computation using the data read from the IC card 3.

Step ST35:

As shown in FIG. 16 segment F, the IC card procedure management task 72 of the SAM chip 8 outputs the processing result of step ST34 to the ASP server 6.

Step ST36:

For example, the IC card procedure management task 72 deletes the IC card entity data 73_x.

As explained above, according to the communication system 1, it is possible to generate the IC card entity data 73_x for each processing for a procedure occurring with the IC card 3 and to have the IC card procedure management task 72 use the plurality of IC card entity data 73_x to simultaneously proceed with processing for a plurality of IC cards 3.

Further, according to the authentication system 1, since it is sufficient to store the IC card entity data 73_3 actually used for the processing of the IC cards 3 in the storage unit 65, it is possible to use the storage areas of the storage unit 65 efficiently.

Further, according to the authentication system 1, as shown in FIG. 12, since the IC card procedure management task 72 manages the states of execution of the jobs processed divided into post-startup states and completed states, it is possible to start the execution of one job, then start the processing relating to another job in the state while waiting for data from the IC card 3. Therefore, it is possible to eliminate the wait time caused by transfer of data with the IC card 3 through the Internet 10.

Further, according to the authentication system 1, the service definition table data describes a name showing the type of service provided by each business, that is, the service type element, the number of that service used in the IC card 3, and the key information used when providing that service. This is held in the external memory 7. Therefore, businesses 15_1 to 15_3 not developers of the SAM chip 8 can produce their own application programs for running on the SAM chip 8 by the script programs 21_1, 21_2, and 21_3 and download them through the SAM chip 8 into the external memory 7 for customization. That is, without being informed of key information, operational commands for directly operating the IC card 3, or other highly confidential information to the businesses 15_1 to 15_3, these businesses can customize their own application programs. Further, when a business customizes its application program, it does not need to know the key information or card operational commands, so the load on the business is lightened.

Further, according to the authentication system 1, since it is possible to define computation content spanning a plurality of services, it is possible to provide diverse services combining a plurality of services in a range of services executed simultaneously with approval at the IC card 3 side.

Further, according to the authentication system 1, by introducing the concept of a data block, the data input and output with the IC card 3 and the log data can be easily managed.

Figure 17:
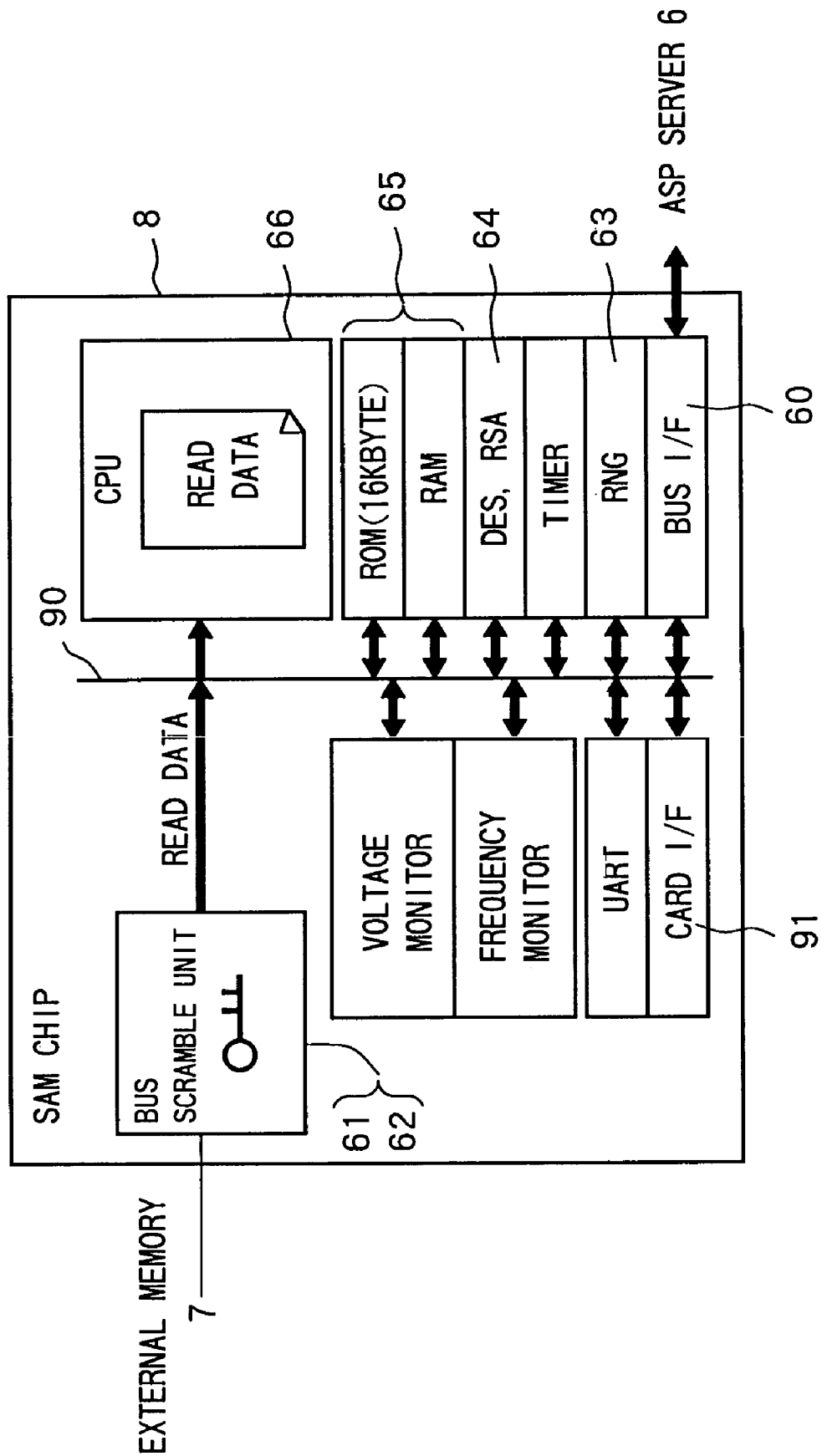
FIG. 17 is a functional block diagram showing more specifically the function blocks of the SAM chip shown in FIG. 9.

FIG. 17 is a functional block diagram showing more specifically the function blocks of the SAM chip 8 shown in FIG. 9.

As shown in FIG. 9, the SAM chip 8 is connected through an internal bus 90 to an ASPS communication interface unit 60, external memory communication interface unit 61, bus scramble unit 62, random number generation unit 63, encryption/decryption unit 64, storage unit 65, and CPU 66.

Figure 18:
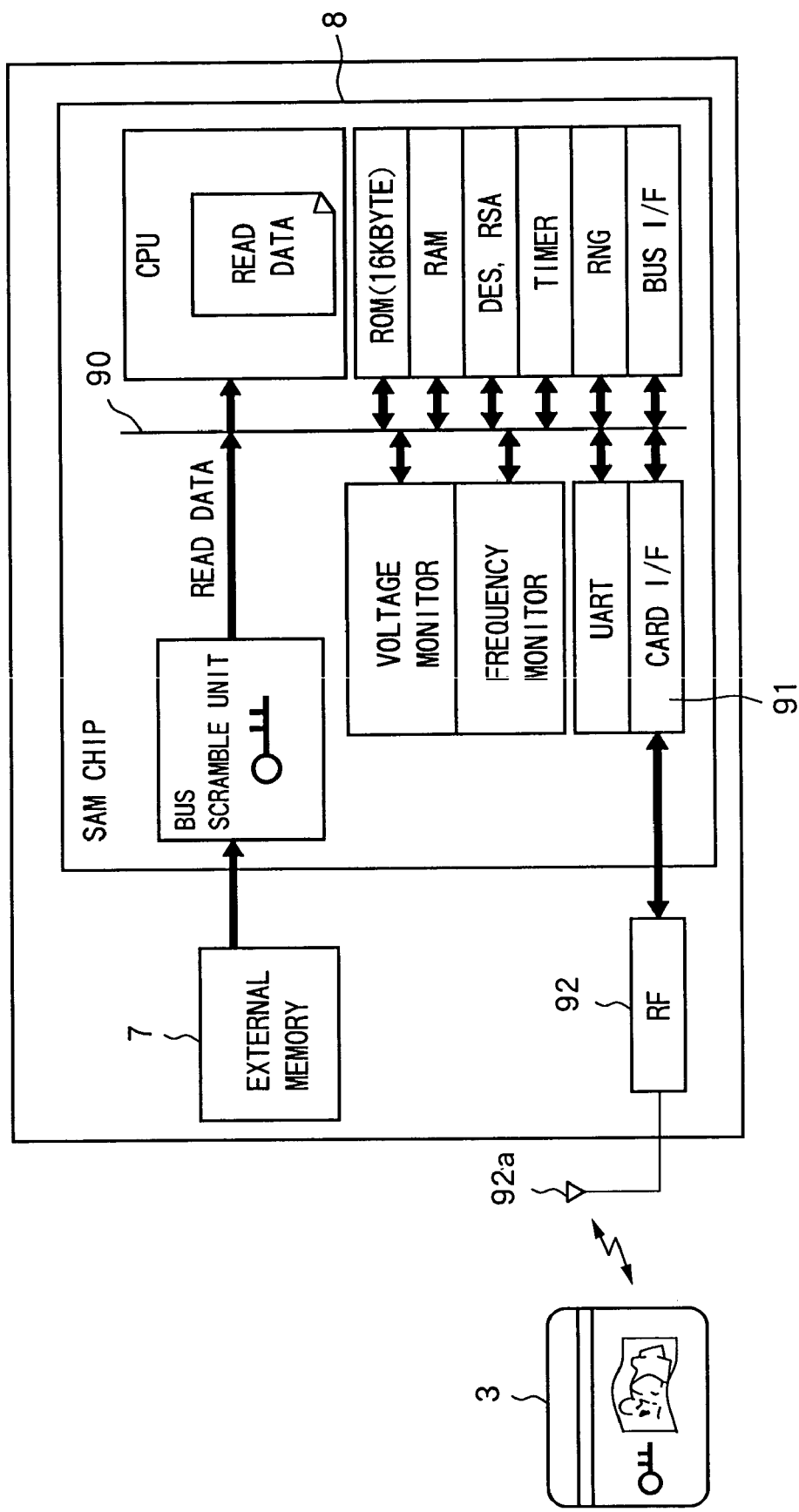
FIG. 18 is a view for explaining another mode of use of the SAM chip.

In the SAM chip 8 shown in FIG. 17, for example as shown in FIG. 18, it is also possible to connect a card I/F unit 91 connected to the internal bus 90 to an RF reception/transmission unit 92 outside of the SAM chip 8 and transfer data with the IC card 3 by a noncontact system through an antenna 92a of the RF reception/transmission unit 92.

Second Embodiment

The present embodiment is an embodiment corresponding to the seventh to ninth aspects of the invention.

Figure 19:
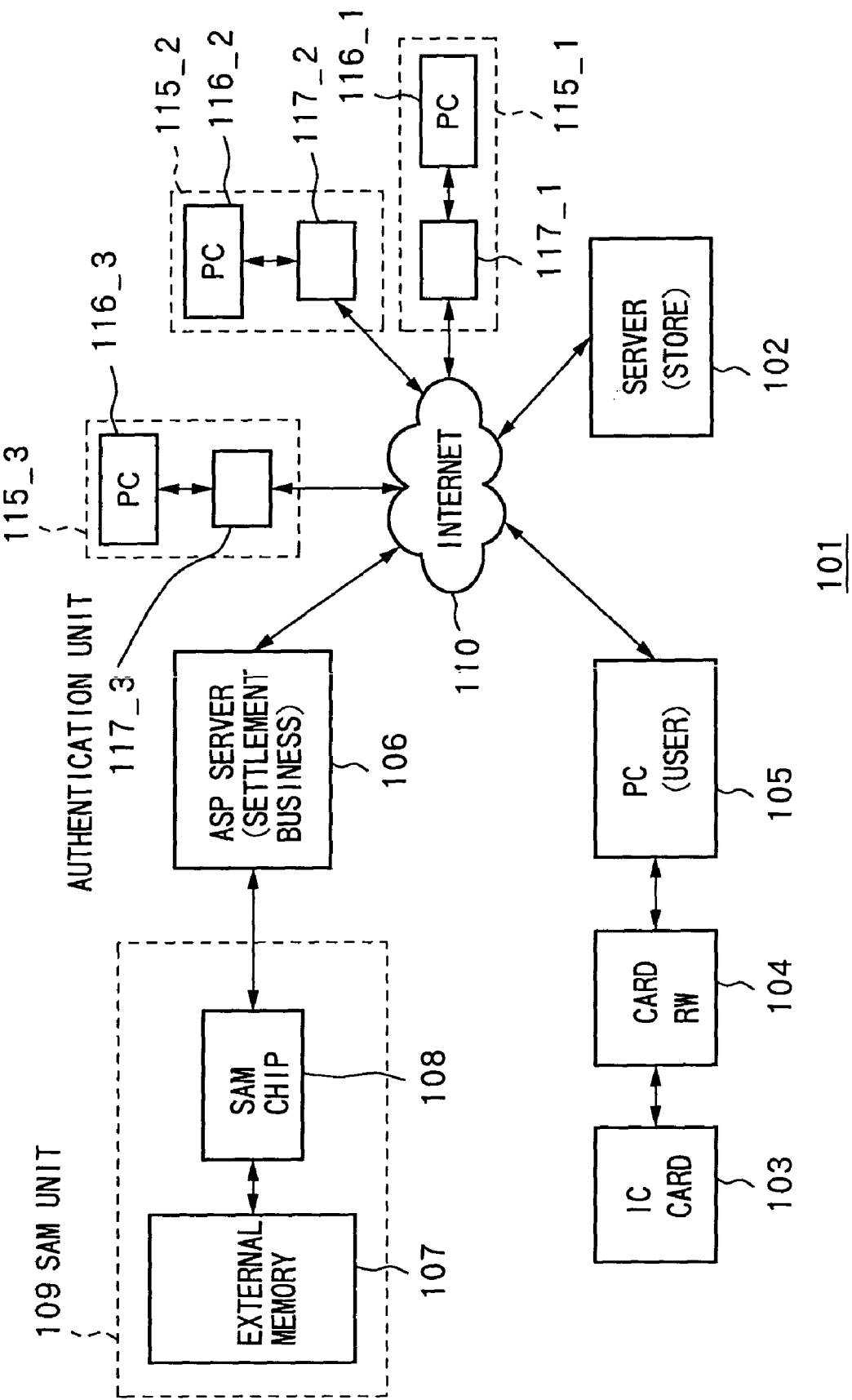
FIG. 19 is a view of the overall configuration of the communication system of an embodiment of the present invention.

FIG. 19 is a view of the overall configuration of a communication system 101 of the present embodiment.

As shown in FIG. 19, the communication system 101 uses the server 102, IC card 103 (integrated circuit of the present invention), card reader/writer 104, personal computer 105, ASP (application service provider) server 106, SAM (secure application module) unit 109, personal computers 116_1, 116_2, and 116_3, and authentication units 117_1, 117_2, and 117_3 to communicate through the Internet 110 and perform settlement processing or other processing for a procedure using an IC card 103.

The SAM unit 109 has an external memory 107 (semiconductor storage circuit of the present invention) and SAM chip 108 (semiconductor circuit of the present invention).

Figure 20:
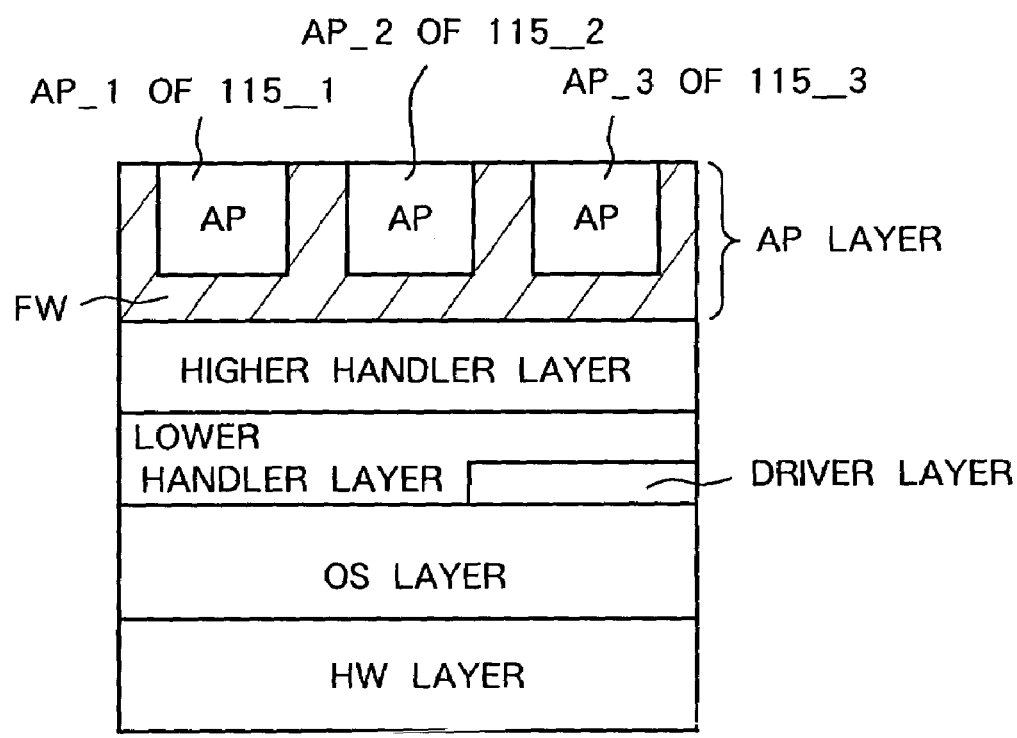
FIG. 20 is a view for explaining the software configuration of the SAM chip shown in FIG. 19.

The SAM chip 108 has the software configuration shown in FIG. 20.

As shown in FIG. 20, the SAM chip 108 has, from the bottom layer toward the top layer, an HW (hardware) layer, OS layer, lower handler layer, higher handler layer, and AP layer in that order.

The lower handler layer includes a driver layer.

Here, the AP layer has application programs AP_1, AP_2, and AP_3 defining procedures using the IC card 103 by the credit card companies or other businesses 115_1, 115_2, and 115_3 shown in FIG. 19.

In the AP layer, the application programs AP_1, AP_2, and AP_3 and the higher handler layer are provided between them with firewalls FW (firewalls of the present invention).

The SAM chip 108 is connected through a SCSI port, the Ethernet, etc. to the ASP server 106. The ASP server 106 is connected through the Internet 110 to a plurality of terminal apparatus including a personal computer 105 of an end user and personal computers 116_1, 116_2, and 116_3 of businesses 115_1, 115_2, and 115_3.

The personal computer 105, for example, is connected through a serial port or USB port to a Dumb type card reader/writer 104. The card reader/writer 104 realizes for example wireless communication corresponding to the physical level with the IC card 103.

The operational commands to the IC card 103 and response packets from the IC card 103 are generated and analyzed at the SAM unit 109 side. Therefore, the card reader/writer 104, personal computer 105, and ASP server 106 between them only act to store the commands and response content in the data payload portion and relay the same and are not involved in the encryption or decryption of data, authentication, or other actual operations in the IC card 103.

The businesses 115_1, 115_2, and 115_3 use their personal computers 116_1, 116_2, and 116_3 to produce the application programs AP_1, AP_2, and AP_3 and download the produced application programs through the authentication units 117_1, 117_2, and 117_3 through the SAM chip 108 to predetermined storage areas in the external memory 107.

At this time, since the businesses 115_1, 115_2, and 115_3 have no relation with each other, the storage areas in the external memory 107 where the application programs AP_1, AP_2, and AP_3 can be downloaded to are decided in advance and whether one has the right to download to such a storage area is verified by the SAM chip 108.

Further, while the application programs AP_1, AP_2, and AP_3 are being executed, the firewalls FW restrict the transfer and viewing of data among the application programs AP_1, AP_2, and AP_3.

When downloading the application programs AP_1, AP_2, and AP_3 to the SAM chip 108, the authentication units 117_1, 117_2, and 117_3, as explained later, perform mutual authentication with the SAM chip 108, produce the download signature verification key information, etc.

Next, the components shown in FIG. 19 will be explained.

[IC Card 103]

Figure 21:
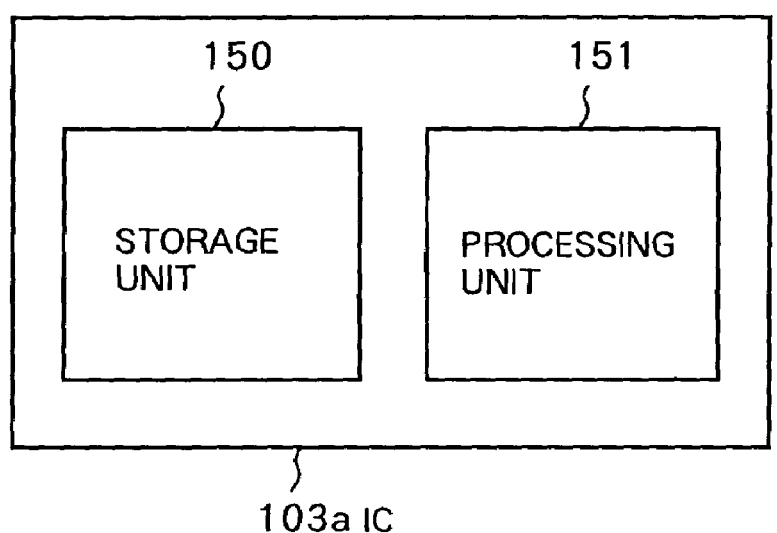
FIG. 21 is a functional block diagram of an IC of the IC card shown in FIG. 19.

FIG. 21 is a functional block diagram of the IC card 103.

As shown in FIG. 21, the IC card 103 has an IC (integrated circuit) 103a provided with a storage unit 150 and processing unit 151.

Figure 22:
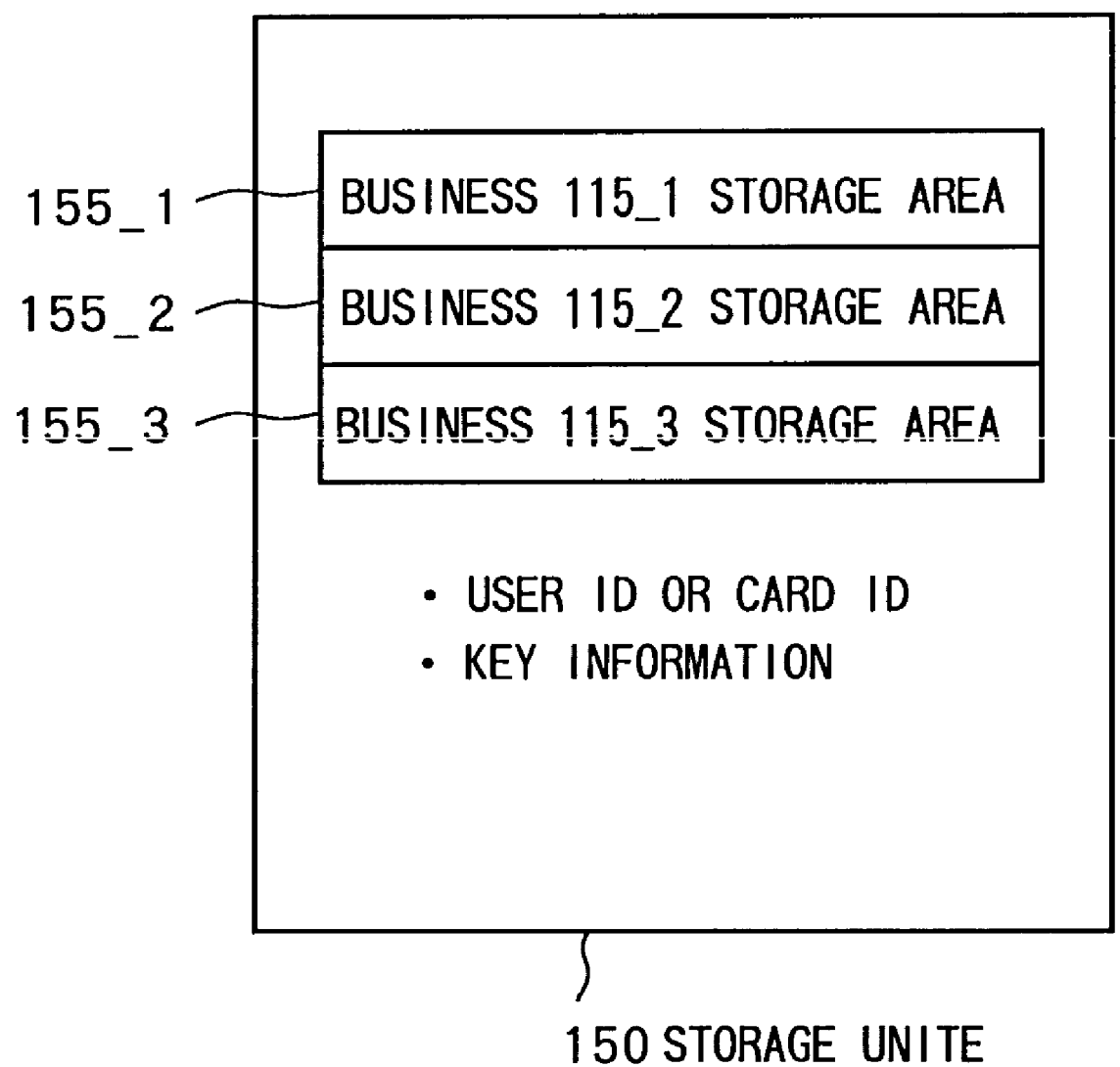
FIG. 22 is a view for explaining information stored in the storage unit shown in FIG. 21.

The storage unit 150, as shown in FIG. 22, has a storage area 155_1 used by a credit card company or other business 115_1, a storage area 155_2 used by a business 115_2, and a storage area 155_3 used by a business 115_3.

Further, the storage unit 150 stores key information used for judging the existence of the right to the storage area 155_1, key information used for judging the access right to the storage area 155_2, and key information used for judging the access right to the storage area 155_3. That key information is specifically used for mutual authentication, encryption and decryption of data, etc.

Further, the storage unit 150 stores identification information of the IC card 103 or IC card 103 user.

Next, the SAM unit 109 will be explained in detail.

[External Memory 107]

Figure 23:
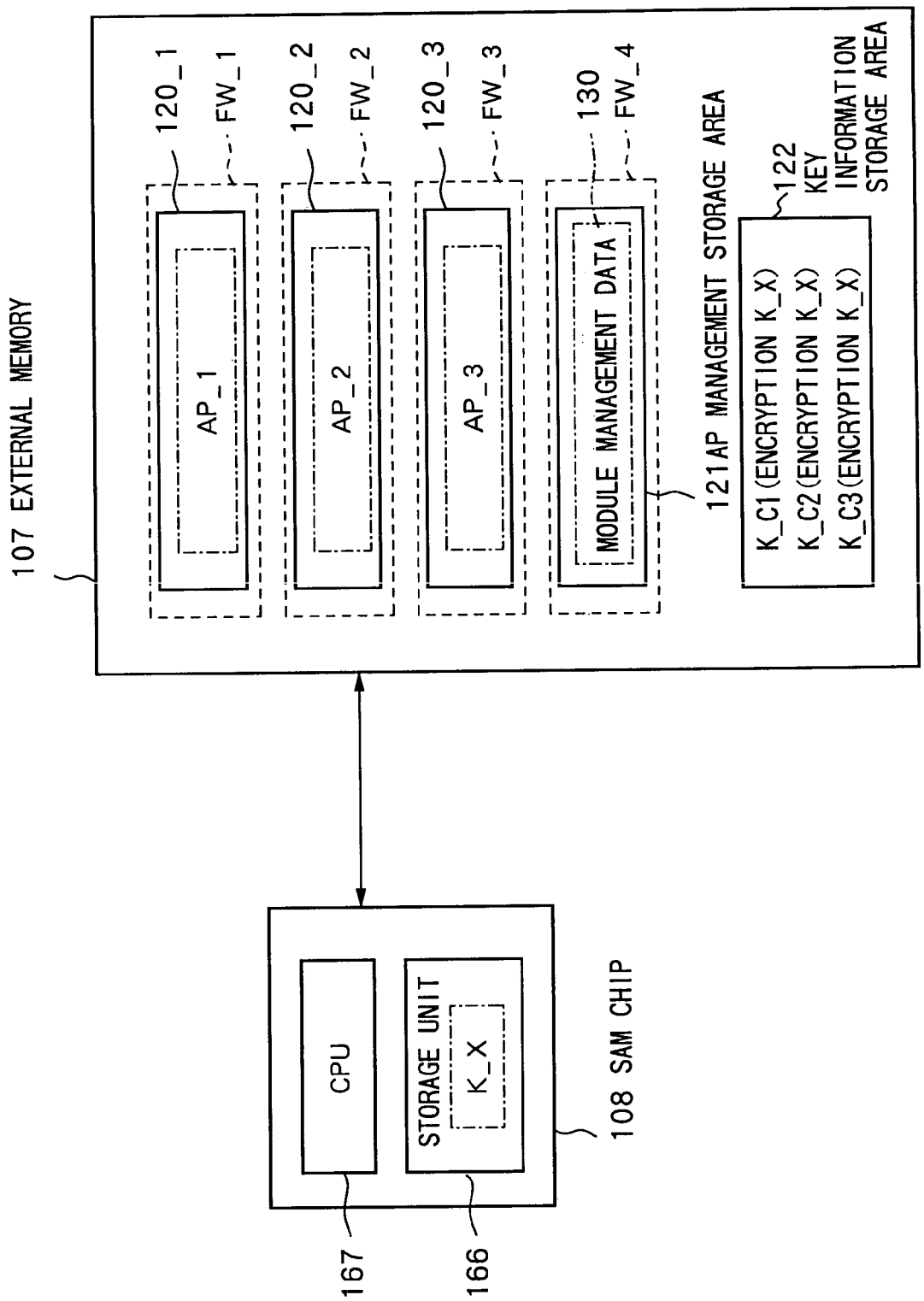
FIG. 23 is a view for explaining an external memory of the SAM unit shown in FIG. 19.

FIG. 23 is a view for explaining the storage areas of the external memory 107.

As shown in FIG. 23, the storage areas of the external memory 107 include an AP storage area 120_1 storage area for storing the application program AP_1 of the business 115_1, an AP storage area 120_2 for storing the application program AP_2 of the business 115_2, an AP storage area 120_3 for storing the application program AP_3 of the business 115_3, an AP management storage area 121 used by the manager of the SAM chip 108, and a key information storage area 122.

The application program AP_1 stored in the AP storage area 120_1 is comprised of a plurality of program modules. Access to the AP storage area 120_1 is restricted by the firewall FW_1.

The application program AP_2 stored in the AP storage area 120_2 is comprised of a plurality of program modules. Access to the AP storage area 120_2 is restricted by the firewall FW_2.

The application program AP_3 stored in the AP storage area 120_3 is comprised of a plurality of program modules. Access to the AP storage area 120_3 is restricted by the firewall FW_3.

In the present embodiment, the above program module is the minimum unit downloaded for example from the outside of the SAM unit 109 to the external memory 107. The number of the program modules forming each application program can be freely determined by the corresponding business.

Further, the application programs AP_1, AP_2, and AP_3 stored in the external memory 107 are scrambled. They are descrambled when read into the SAM chip 108.

Further, the application programs AP_1, AP_2, and AP_3 are., for example, produced by the businesses 115_1, 115_2, and 115_3 using the personal computers 116_1, 116_2, and 116_3 shown in FIG. 19 and are downloaded through the SAM chip 108 to the external memory 107.

Access to the AP management storage area 121 is restricted by the firewall FW_4.

Note that the firewalls FW_1, FW_2, FW_3, and FW_4 correspond to the firewalls FW shown in FIG. 20.

The AP management storage area 121 stores the module management data 130 shown in FIG. 24.

The module management data 130 registers the module names of the program modules downloaded from the personal computers 116_1, 116_2, and 116_3 in advance and the download signature verification key information (download key information of the present invention).

That is, download of a program module is allowed conditional on the module management data 130 having the download signature verification key information registered in it in advance.

Further, the module management data 130 has the module names of the program modules executed by the SAM chip 108 and the execution signature verification key information registered in it.

That is, the right for a program module to be executed by the SAM chip 108 is obtained conditional on the module management data 130 having the execution signature verification key information registered in it in advance.

The module management data 130, as shown in FIG. 24, shows the correspondence of the firewall number of the firewall restricting access to the program module (firewall identification information of the present invention), start address, address length, download signature verification key information, execution signature verification key information, and module name for each program module of the application programs AP_1, AP_2, and AP_3 stored in the AP storage areas 120_1, 120_2, and 120_3.

Here, the firewall number shows the number of the firewall by which access to that program module is restricted.

The start address shows the start address of the storage area for which access is restricted by that firewall.

The address length shows the address length of the storage area for which access is restricted by that firewall.

The download signature verification key information is the key information used for the signature verification performed when downloading a program module through the SAM chip 108 to the external memory 107.

The execution signature verification key information is used for verifying the signature information given to a program module when executing that program module by the SAM chip 108. In the present embodiment, for example, each program module is given signature information showing its legitimacy. When that program module has been illicitly modified or tampered with, it is possible to use the execution signature verification key information to verify that signature information to confirm the legitimacy of that program module.

The module name is the name assigned to that program module.

The key information storage area 122 stores the encrypted key information K_C1 used when accessing the storage area 155_1 of the IC card 103 shown in FIG. 22 by execution of the application program AP_1, the encrypted key information K_C2 used when accessing the storage area 155_2 of the IC card 103 shown in FIG. 22 by execution of the application program AP_2, and the encrypted key information K_C3 used when accessing the storage area 155_3 of the IC card 103 shown FIG. 22 by execution of the application program AP_3.

The key information K_C1, K_C2, and K_C3 are encrypted by the key information K_X.

Access to the key information storage area 122 is allowed only by the manager of the SAM chip 108.

[SAM Chip 108]

Figure 25:
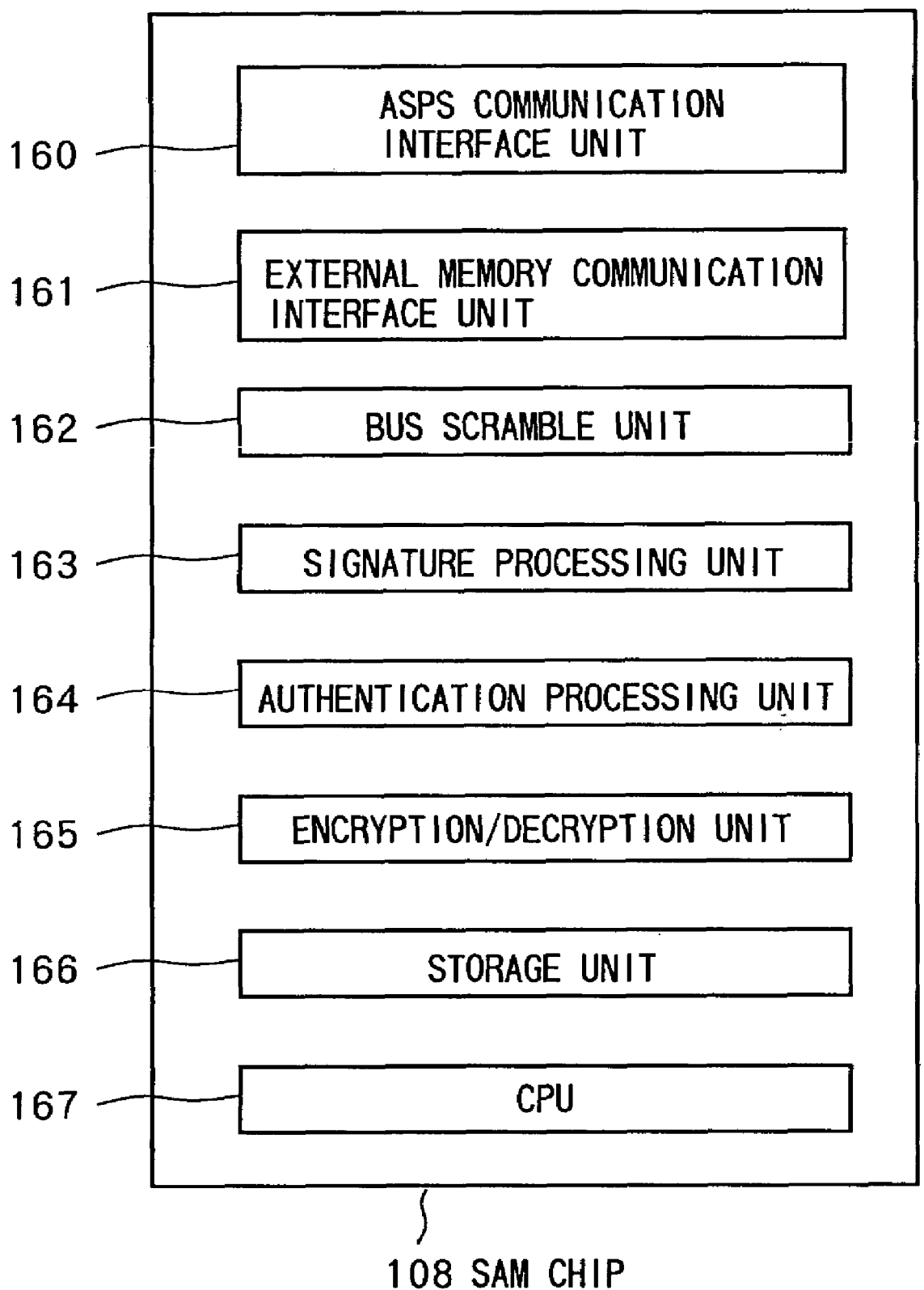
FIG. 25 is a functional block diagram of the SAM chip shown in FIG. 1.

FIG. 25 is a functional block diagram of the SAM chip 108 shown in FIG. 19.

As shown in FIG. 25, the SAM chip 108 has an ASPS communication interface unit 160, external memory communication interface unit 161, bus scramble unit 162, signature processing unit 163, authentication processing unit 164, encryption/decryption unit 165, storage unit 166, and CPU 167.

The SAM chip 108 is a tamper-resistant module.

The ASPS communication interface unit 160 is an interface used for input and output of data with the ASP server 106 shown in FIG. 19.

The external memory communication interface unit 161 is an interface used for input and output of data with the external memory 107.

The bus scramble unit 162 scrambles output data and descrambles input data when inputting and outputting data through the external memory communication interface unit 161.

The signature processing unit 163 as explained later produces a signature and verifies a signature when downloading an application program through the Internet 110 in the external memory 107 and when executing the application program.

The authentication processing unit 164 as explained later performs mutual authentication with the other party when downloading an application program through the Internet 110 to the external memory 107.

The encryption/decryption unit 165 encrypts data and decrypts encrypted data.

The storage unit 166 for example stores the key information K_X for decrypting the key information K_C1, K_C2, and K_C3 stored in the key information storage area 122 of the above-mentioned external memory 107.

The CPU 167 executes tasks as explained later based on a predetermined program (program of the present invention) and executes a designated application program in accordance with execution of the tasks.

Figure 26:
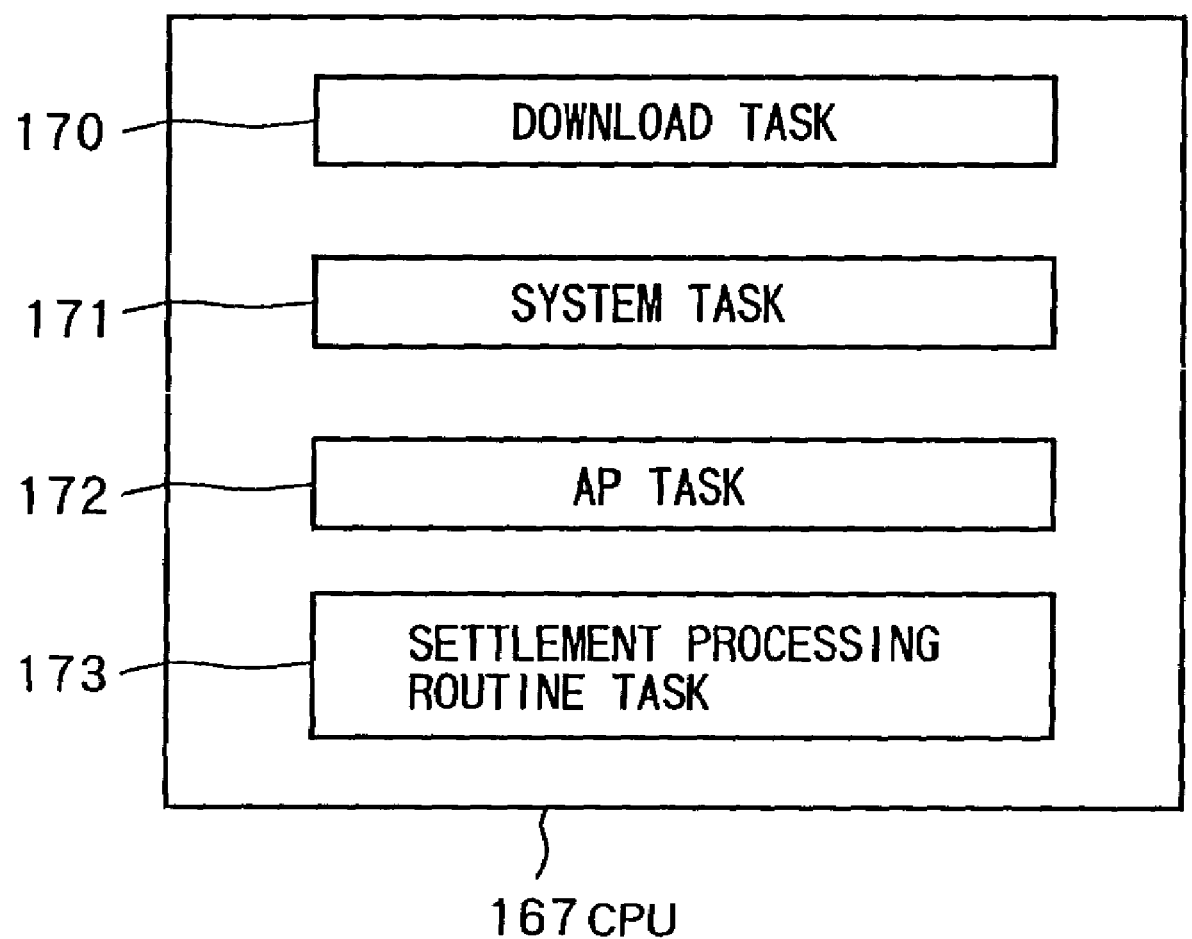
FIG. 26 is a view for explaining tasks executed by the CPU shown in FIG. 25.

FIG. 26 is a view for explaining the tasks executed by the CPU 167.

As shown in FIG. 26, the CPU 167 executes the download task 170, system task 171, AP task 172 (program of the present invention), and settlement processing routine task 173.

The download task 170, as explained later, performs processing for downloading tan application program from outside of the SAM unit 109 through the SAM chip 108 to the external memory 107.

The system task 171 is a task for performing driver management, operations unique to the IC card 103, and other processing.

The AP task 172 comprehensively manages the execution of the application programs AP_1, AP_2, and AP_3 performed when the SAM chip 108 receives a processing request from the ASP server 106 or elsewhere outside of the SAM chip 108.

The settlement processing routine task 173 decides which of the application programs AP_1, AP_2, and AP_3 to use when for example the SAM chip 108 receives a processing request relating to the IC card 103 from the ASP server 106.

Next, examples of the operation of the communication system 101 will be explained.

[Operation for Downloading AP to External Memory]

Figure 27:
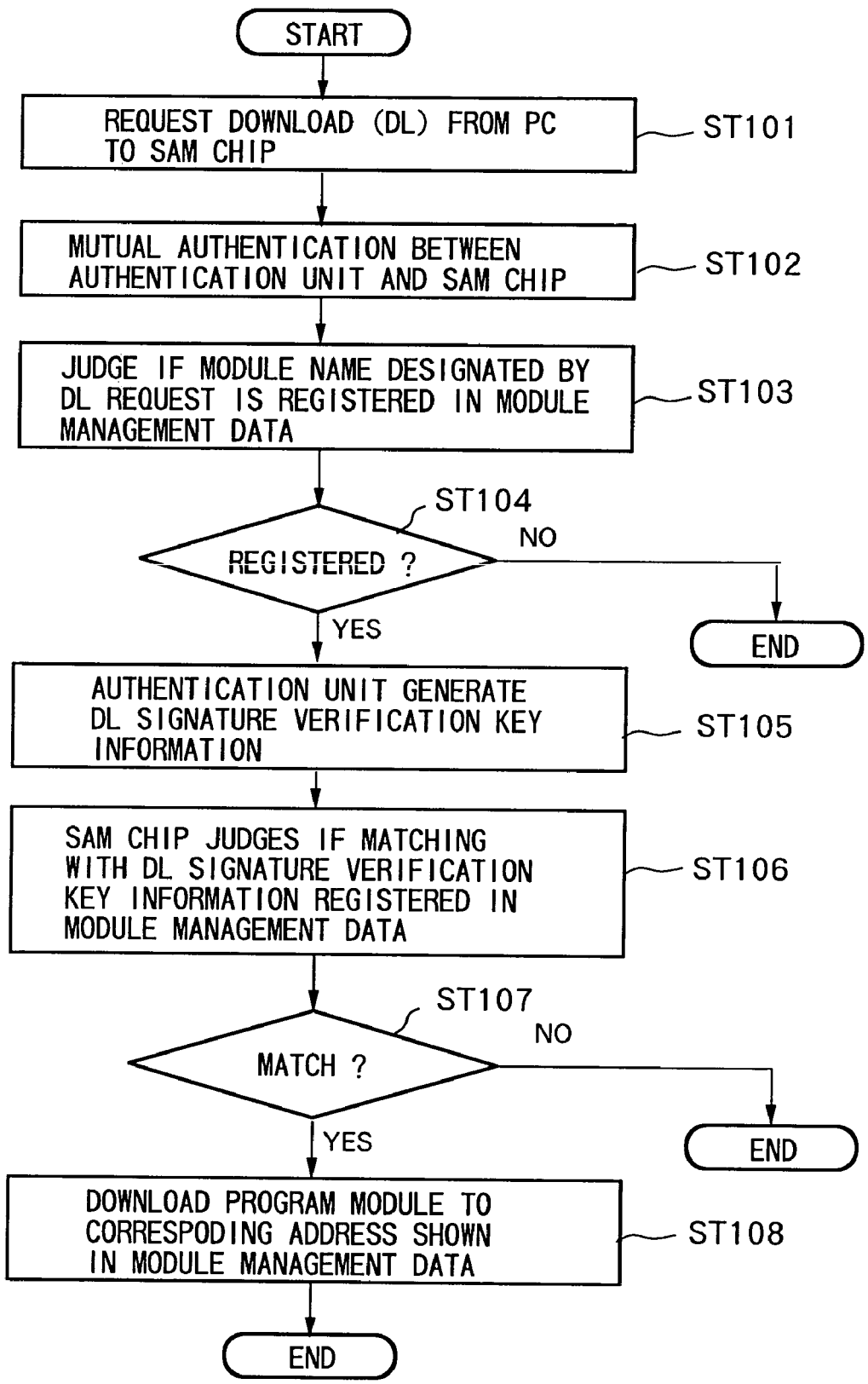
FIG. 27 is a flow chart for explaining the operation for downloading an application program from the personal computer to an external memory shown in FIG. 19.

FIG. 27 is a flow chart for explaining the operation of downloading an application program AP_1 from the personal computer 116_1 shown in FIG. 19 to the external memory 107.

Step ST101:

The personal computer 116_1 shown in FIG. 19 transmits to the SAM chip 108 a download request designating the module name of each program module to be downloaded through the authentication unit 117_1.

Step ST102:

The download task 170 running on the SAM chip 108 shown in FIG. 26 performs mutual authentication with the authentication unit 117_1 connected to the personal computer 116_1. Further, when each others legitimacy is confirmed by the mutual authentication, the processing of step ST103 is performed.

Note that, in the present embodiment, it is possible to use various techniques as the technique for that mutual authentication, but for example the following technique is used.

Both of the authentication unit 117_1 and SAM chip 108 hold identification information of the SAM chip 108, that is, the SAM_ID, and the mutual authentication master key information.

Further, the authentication unit 117_1 encrypts the SAM_ID by the mutual authentication master key information and transmits it to the SAM chip 108. The SAM chip 108 decrypts the received encrypted SAM_ID by the mutual authentication master key and compares it with the SAM ID it holds itself. If matching, it confirms the legitimacy of the authentication unit 117_1. Further, reverse to this, the SAM chip 108 encrypts the SAM_ID by the mutual authentication master key information and transmits it to the authentication unit 117_1. The authentication unit 117_1 decrypts the received encrypted SAM_ID by the mutual authentication master key and compares it with the SAM_ID it holds itself. If matching, it confirms the legitimacy of the SAM chip 108.

Step ST103:

The download task 170 judges whether each module name designated by the download request at step ST101 is registered in the module management data 130 stored in the AP management storage area 121 of the external memory 107.

Step ST104:

The download task 170, when judging at step ST103 that it is not registered, ends the processing without performing the download processing, while when judging that it is registered, performs the processing of step ST105.

Step ST105:

The authentication unit 117_1 encrypts the SAM_ID as plain text using the AP master key KEY-A to generate the download signature verification key information.

Further, it transmits that download signature verification key information or signature information produced using that download signature verification key information to the SAM chip 108.

Step ST106:

The download task 170, when receiving the download signature verification key information at step ST105, judges if the received download signature verification key information matches with the download signature verification key information of the corresponding module name in the module management data 130.

Further, the download task 170, when receiving the signature information at step ST105, uses the download signature verification key information of the corresponding module name in the module management data 130 to judge the legitimacy of that signature information.

Step ST107:

The download task 170 proceeds to the processing of step ST108 when judging that they match at step ST106 or when judging that the signature information is legitimate and ends the processing in other cases.

Step ST108:

The download task 170 specifies the address in the external memory 107 corresponding to the module name designated at step ST101 by viewing the module management data 130 and downloads the program module from the personal computer 116_1 to the specified address on the external memory 107.

[Operation for Execution of Application Program]

Figure 28:
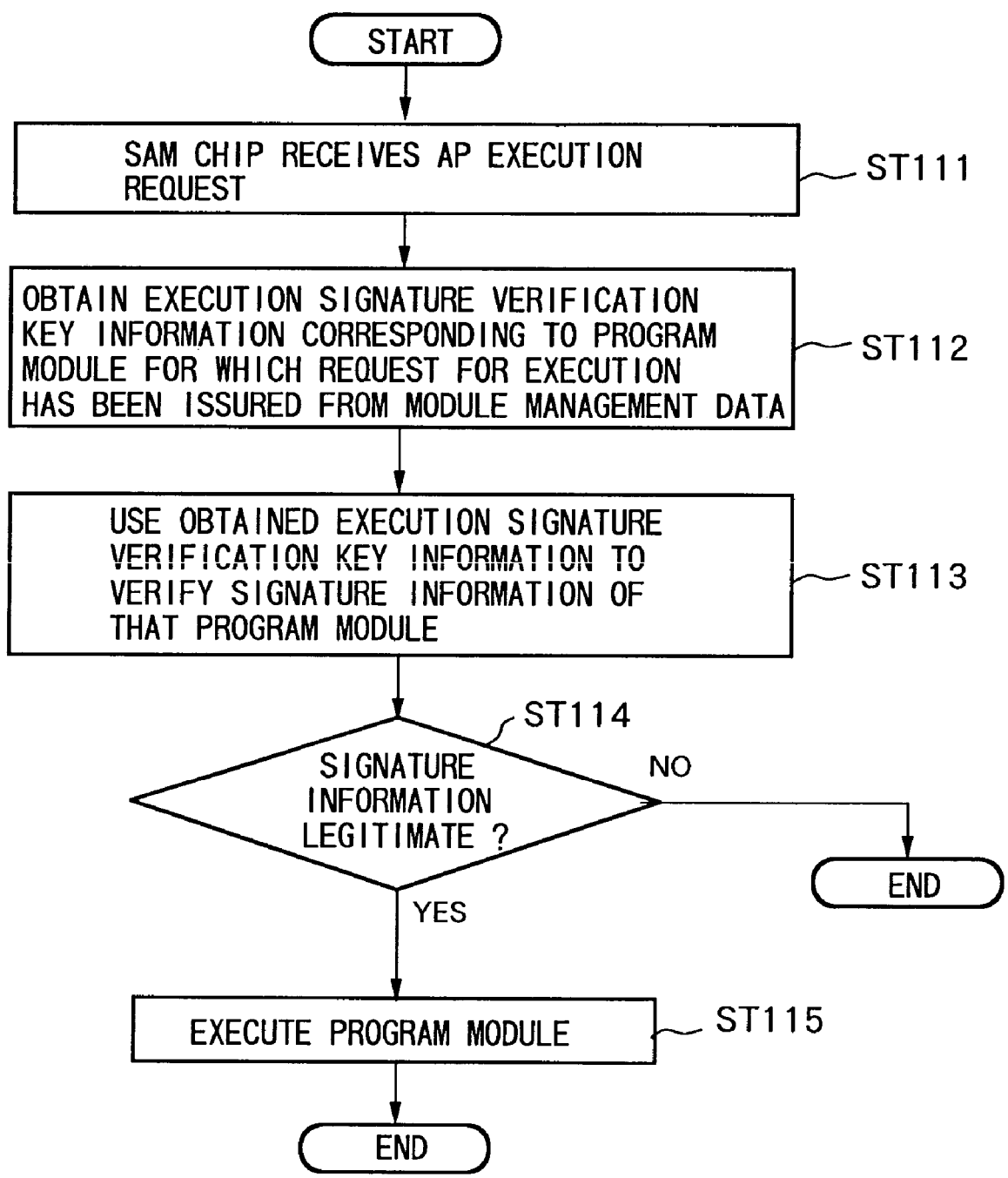
FIG. 28 is a flow chart for explaining the operation of the SAM chip executing an application program shown in FIG. 19.

FIG. 28 is a flow chart for explaining the operation by which the SAM chip 108 shown in FIG. 19 executes the application program AP_1.

Step ST111:

When the SAM chip 108 receives a request for execution of the application program AP_1 for example from the ASP server 106, the AP task 172 shown in FIG. 26 executes the processing of step ST112.

Step ST112:

Before the AP task 172 executes a program module of the application program AP_1, it can obtain execution signature verification key information corresponding to the module names of the program module by referring to the module management data 130.

Step ST113:

The AP task 172 uses the execution signature verification key information obtained at step ST112 to verify the legitimacy of the signal information of that program module.

That is, it judges if the program module has been illicitly altered or tampered with.

Step ST114:

When the AP task 172 verifies at step ST113 that the signature information is legitimate, it proceeds to the processing of step ST115, while when it judges it is not legitimate, it ends the processing.

Step ST115:

The AP task 172 executes the program module for which the signature information has been judged to be legitimate.

Note that, the program module may also be executed by the CPU 167 shown in FIG. 25 as a subroutine in the program.

[Operation During Execution of Application Program]

Figure 29:
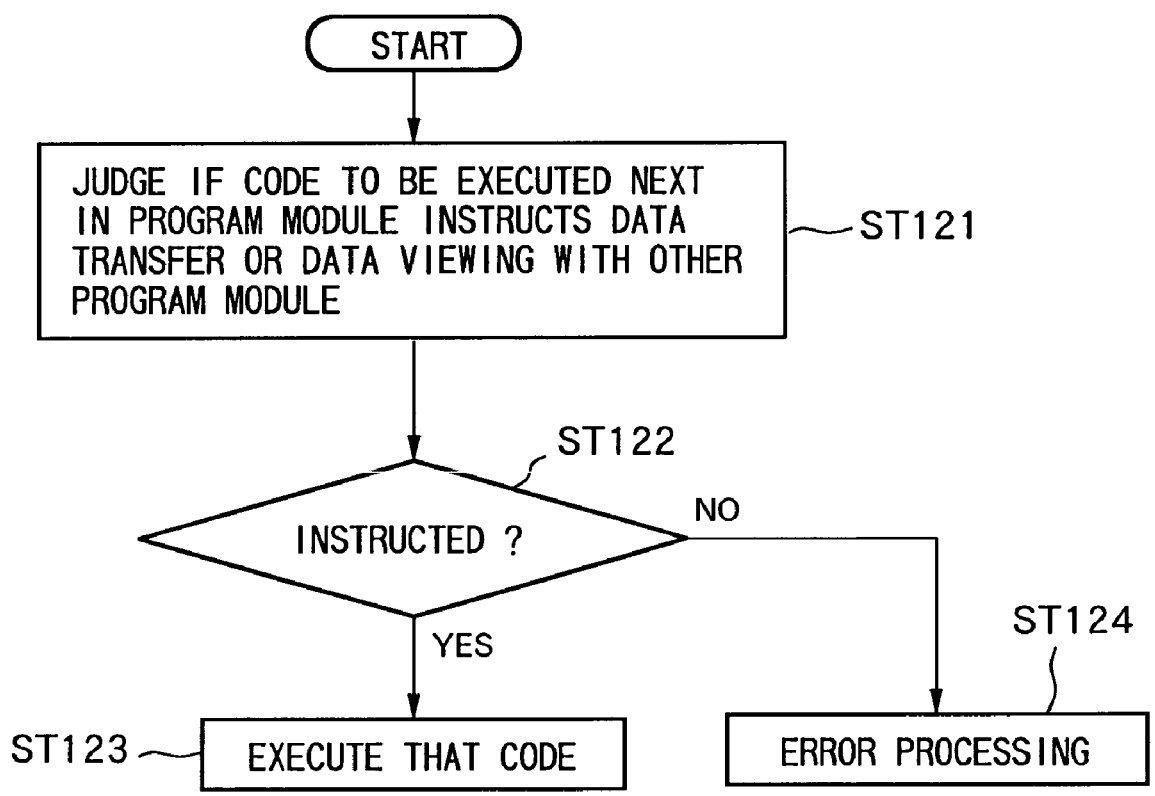
FIG. 29 is a view for explaining the operation during execution of an application program.

FIG. 29 is a view for explaining the operation for execution of an application program.

Step ST121:

When the AP task 172 executes a code in a program module through the processing shown in FIG. 28, it judges whether the code to be executed next is a code instructing data transfer or data viewing with another program module.

Step ST122:

When the AP task 172 judges that the code to be executed next does not instruct data transfer or data viewing with another program module, it proceeds to the processing of step ST124, while when it judges that it does instruct the same, proceeds to the processing of step ST123.

Step ST123:

The AP task 172 executes that code.

Step ST124:

The AP task 172 for example performs error processing without executing that code.

Next, the overall operation of the communication system 101 shown in FIG. 19 will be explained.

Figure 30:
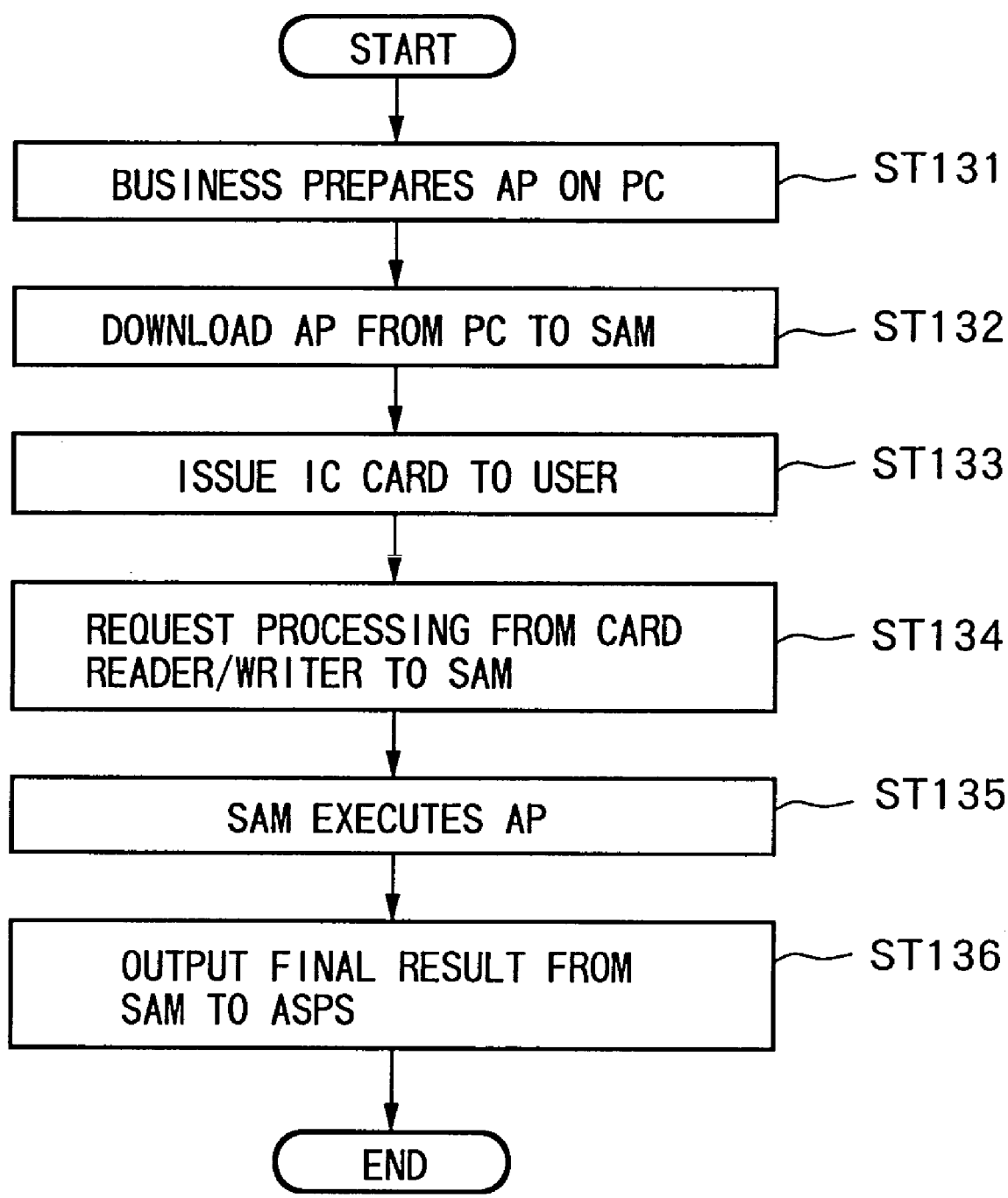
FIG. 30 is a view for explaining the overall operation of the communication system shown in FIG. 19.

FIG. 30 is a view for explaining the overall operation of the communication system 101 shown in FIG. 19.

Step ST131:

The businesses 115_1 to 115_3 or a party requested by these businesses produces the application programs AP_1, AP_2, and AP_3 for enabling the businesses to perform processing relating to transactions performed using the IC card 103 on the personal computers 116_1, 116_2, and 116_3 shown in FIG. 19.

Further, the manager of the SAM chip 108 generates the module management data 130 shown in FIG. 23, scrambles it, and stores it in the external memory 107.

Step ST132:

The application programs AP_1, AP_2, and AP_3 are downloaded through the authentication units 117_1, 117_2, and 117_3 from the personal computers 116_1, 116_2, and 116_3 to the SAM chip 108.

At this time, the processing explained using FIG. 27 is performed.

Step ST133:

The user is issued the IC card 103.

As shown in FIG. 22, the storage unit 150 of the IC 103a of the IC card 103 stores the key information used for transactions by the user with the contracting business.

Note that, the user and a business may also conclude a contract through the Internet 110 etc. after issuance of the IC card 103.

Step ST134:

For example, when the user uses the personal computer 105 to access the server 102 through the Internet 110 to try to purchase a product, the server 102 sends a processing request through the Internet 110 to the ASP server 106.

The ASP server 106, when receiving a processing request from the server 102, accesses the personal computer 105 through the Internet 110. Further, the processing request for the IC card 103 issued by the card reader/writer 104 is transmitted through the personal computer 105, Internet 110, and ASP server 106 to the SAM chip 108.

Step ST135:

The SAM chip 108 selects an application program by the settlement processing routine task 173 in accordance with the processing request received at step ST134 and executes that selected application program.

The processing explained using FIG. 28 and FIG. 29 in the execution of that application program is then performed.

Step ST136:

The SAM chip 108 outputs the result of execution of the application program to the ASP server 106.

As explained above, according to the communication system 101, as explained using FIG. 27, since the SAM chip 108 uses the authentication units 117_1, 117_2, and 117_3 to authenticate the downloader of the application program and allows the download of the application program only to an authorized storage area in the external memory 107, it is possible to prevent an unauthorized party from illicitly exchanging or tampering with an application program in the external memory 107.

Further, according to the communication system 101, when the SAM chip 108 runs a plurality of application programs, since data transfer and data and code viewing among application programs are restricted by the firewalls FW_1, FW_2, and FW_3, it is possible to prevent processing of each application program from being illicitly interfered with or tampered with by another application program. Further, it is possible to improve the confidentiality of each application program.

Further, according to the communication system 101, as explained using FIG. 28, when executing an application program, by verifying whether that application program is being tampered with, it is possible to avoid identity theft or other illicit acts based on an illicitly tampered with application program.

Further, according to the communication system 101, by comprising each application program by a plurality of program modules, it is possible to download to an external memory 107 in units of program modules.

Further, according to the communication system 101, by performing the usual scrambling on the highly confidential key information used for operations on an IC card 103 to encrypt it and storing it in the external memory 107, it is possible to improve the security level of that key information.

Further, according to the communication system 101, since the application program performs encryption and decryption at the time of code access by a bus scramble function, it is possible to prevent an application program stored in the external memory 107 from being illicitly analyzed etc. while halting the processing of the SAM chip 108.

Figure 31:
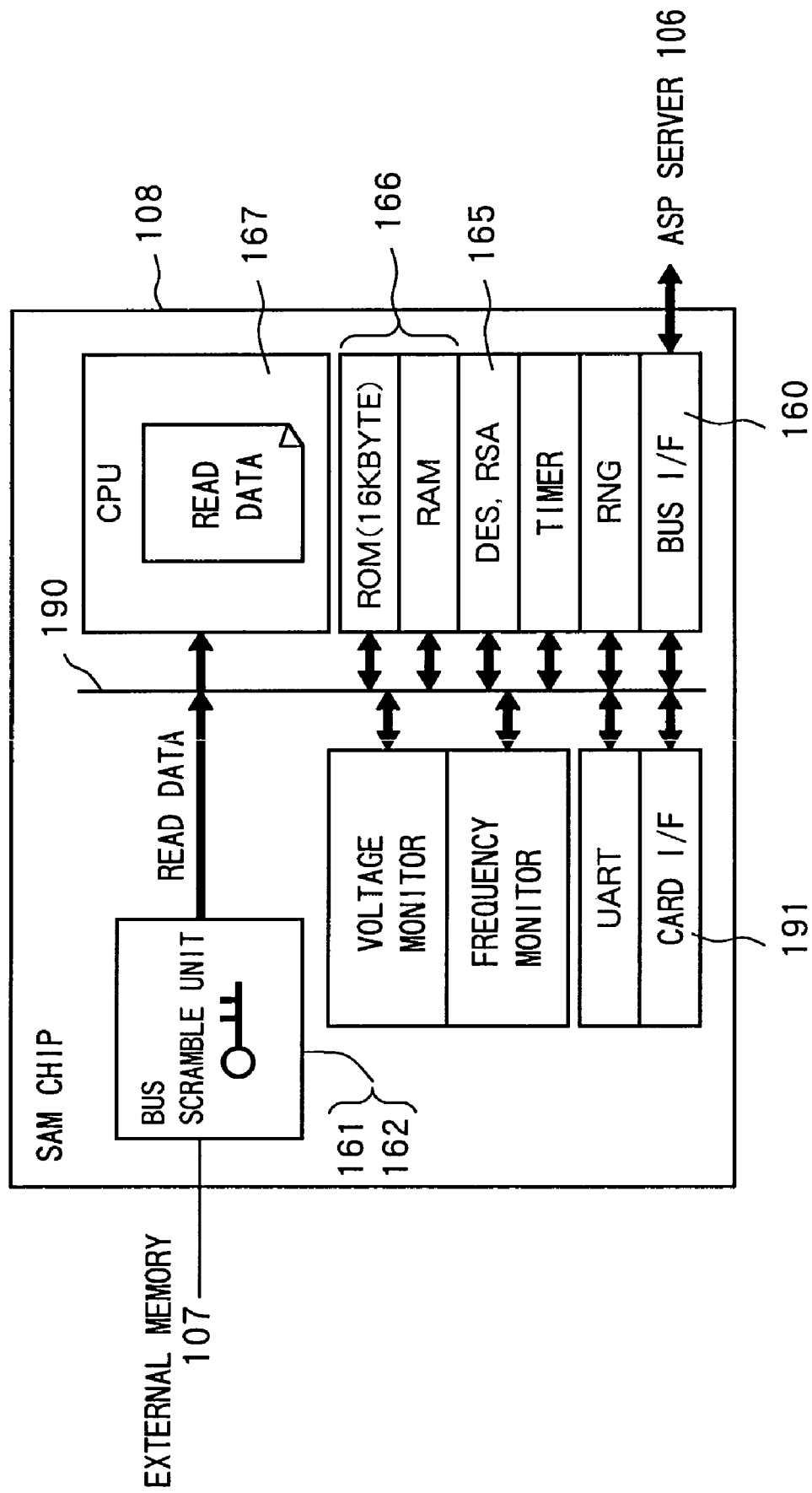
FIG. 31 is a functional block diagram showing more specifically the function blocks of the SAM chip shown in FIG. 25.

FIG. 31 is a functional block diagram showing more specifically the function blocks of the SAM chip 108 shown in FIG. 25.

As shown in FIG. 31, the SAM chip 108 is connected through an internal bus 190 to the ASPS communication interface unit 160, external memory communication interface unit 161, bus scramble unit 162, encryption/decryption unit 165, storage unit 166, and CPU 167.

Part of the functions of the signature processing unit 163 and authentication processing unit 164 shown in FIG. 25 are realized by, for example, the CPU 167.

Figure 32:
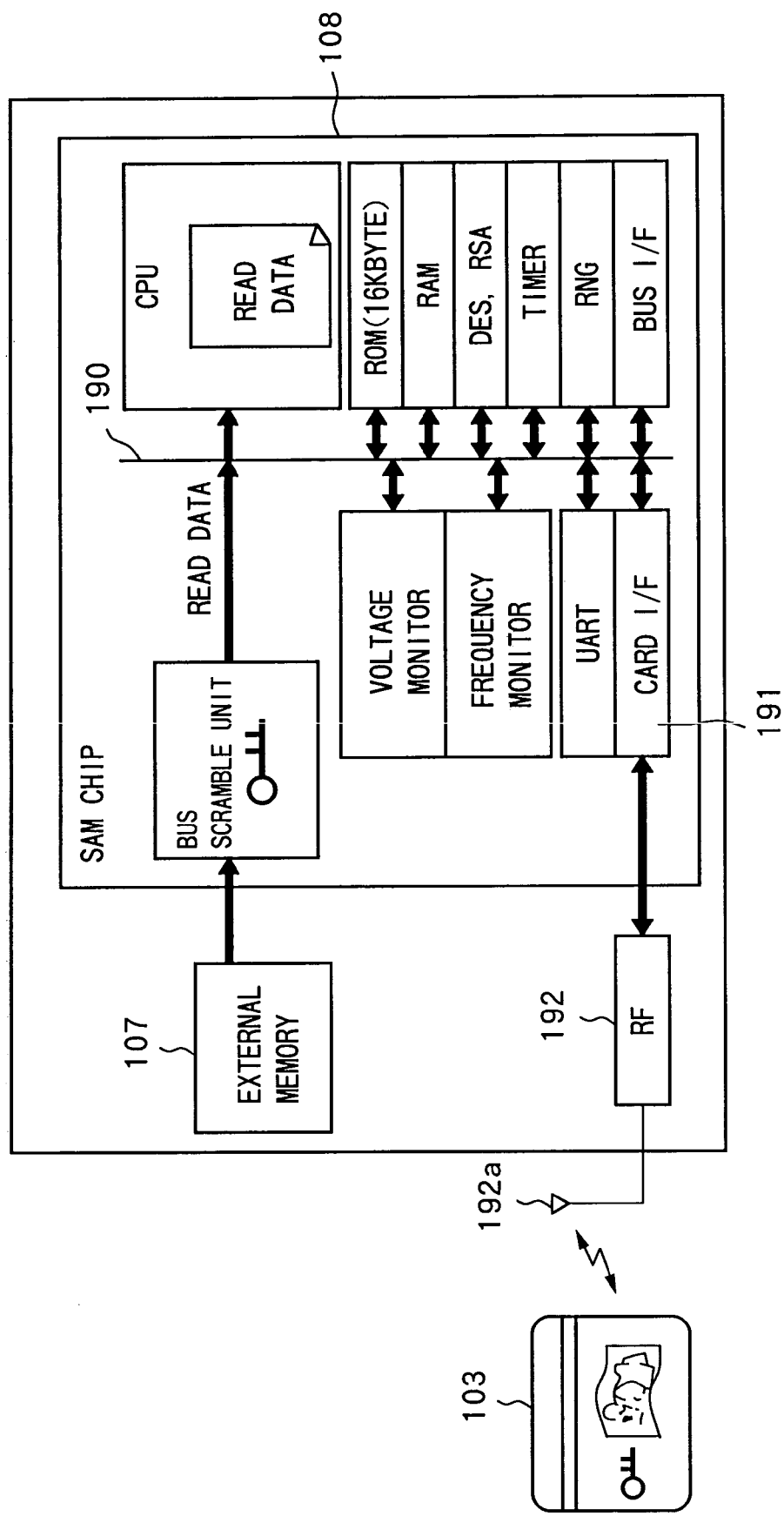
FIG. 32 is a view for explaining another mode of use of the SAM chip.

In the SAM chip 108 shown in FIG. 31, for example as shown in FIG. 32, it is also possible to connect the card I/F unit 191 connected to the internal bus 190 to an RF reception/transmission unit 192 outside of the SAM chip 108 and transfer data with the IC card 103 by a noncontact system through an antenna 192a of the RF reception/transmission unit 192.

Third Embodiment

The present embodiment is an embodiment corresponding to the 10th to 12th aspects of the invention.

Figure 33:
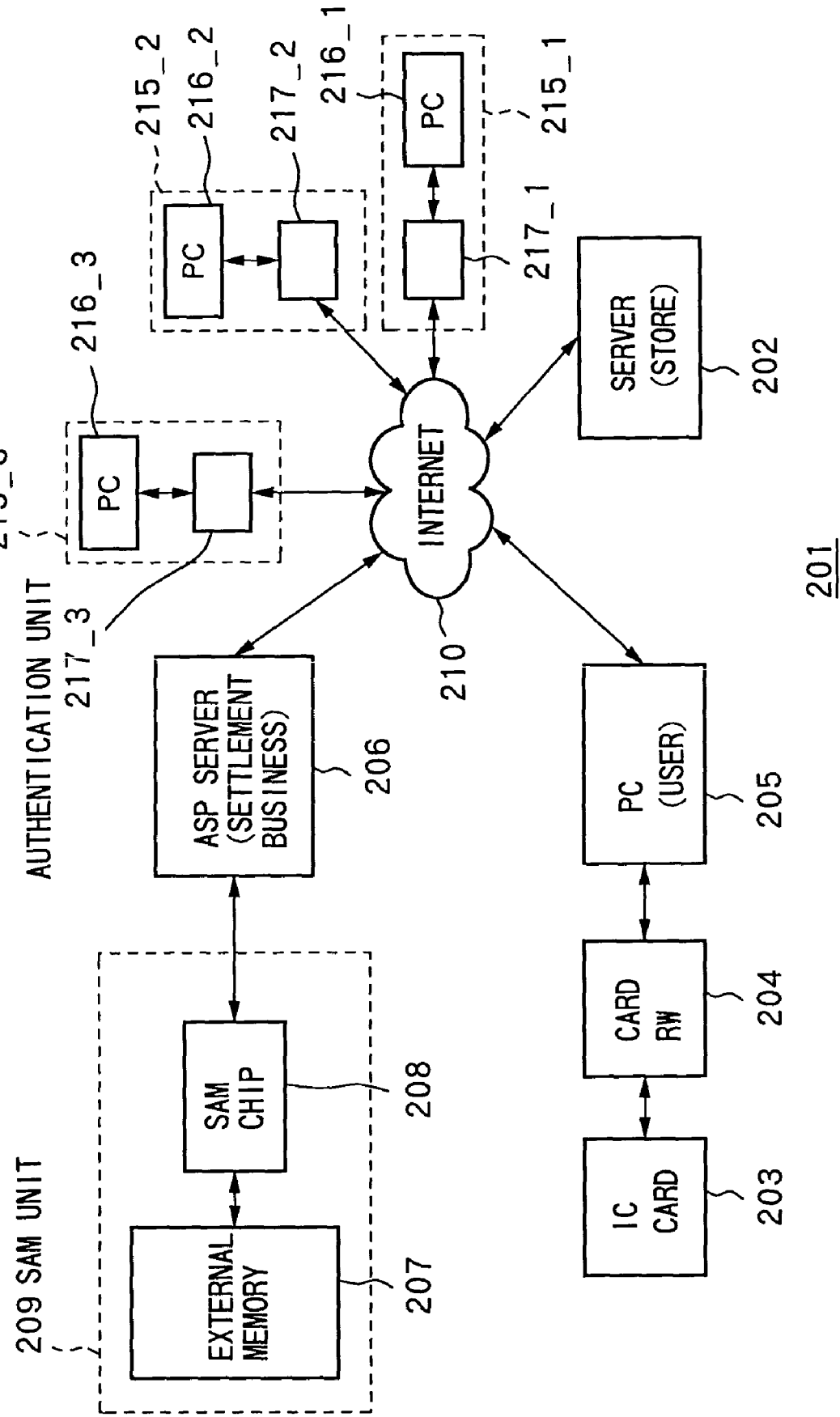
FIG. 33 is a view of the overall configuration of the communication system of an embodiment of the present invention.

FIG. 33 is a view of the overall configuration of a communication system 201 of the present embodiment.

As shown in FIG. 33, the communication system 201 uses a server 202, IC card 203, card reader/writer 204, personal computer 205, ASP (application service provider) server 206, SAM (secure application module) unit 209, personal computers 216_1, 216_2, and 216_3, and authentication units 217_1, 217_2, and 217_3 to communicate through the Internet 210 and perform settlement processing or other processing for a procedure using the IC card 203.

The SAM unit 209 has an external memory 207 and SAM chip 208.

Figure 34:
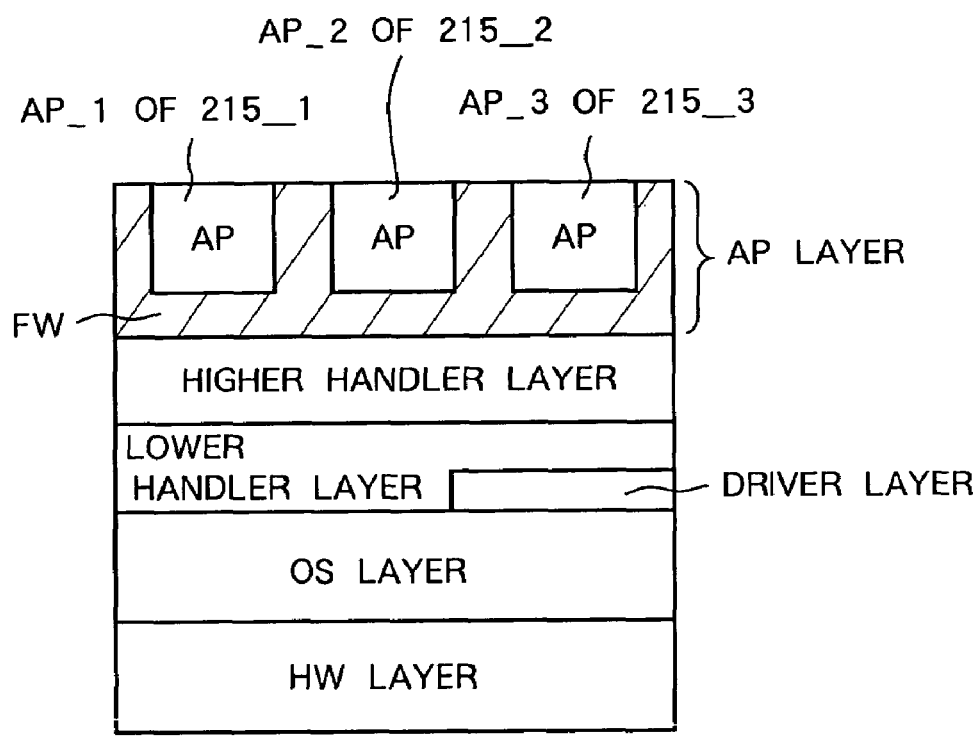
FIG. 34 is a view for explaining the software configuration of the SAM chip shown in FIG. 33.

The SAM chip 208 has the software configuration shown in FIG. 34.

As shown in FIG. 34, the SAM chip 208 has, from the bottom layer toward the top layer, an HW (hardware) layer, OS layer, lower handler layer, higher handler layer, and AP layer in that order.

The lower handler layer includes a driver layer.

Here, AP layer includes application programs AP_1, AP_2, and AP_3 defining procedures using the IC card 203 by the credit card companies or other businesses 215_1, 215_2, and 215_3 shown in FIG. 33.

In the AP layer, the application programs AP_1, AP_2, and AP_3 and the higher handler layer are provided between them with firewalls FW.

The SAM chip 208 is connected through a SCSI port, the Ethernet, etc. to the ASP server 206. The ASP server 206 is connected through the Internet 210 to a plurality of terminal apparatuses including the personal computer 205 of the end user and personal computers 216_1, 216_2, and 216_3 of the businesses 215_1, 215_2, and 215_3.

The personal computer 205, for example, is connected through the serial port or USB port to a Dumb type card reader/writer 204. The card reader/writer 204 realizes for example wireless communication corresponding to the physical level with the IC card 203.

The operational commands to the IC card 203 and the response packets from the IC card 203 are generated and analyzed at the SAM unit 209 side. Therefore, the card reader/writer 204, personal computer 205, and ASP server 206 interposed between them only act to store the commands or response contents in data payload portions and relay the same. They are not involved in the encryption or decryption of data, authentication, or other actual operations in the IC card 203.

The businesses 215_1, 215_2, and 215_3 use the personal computers 216_1, 216_2, and 216_3 to produce the application programs AP_1, AP_2, and AP_3 and download the produced application programs through the authentication units 217_1, 217_2, and 217_3 and through the SAM chip 208 to predetermined storage areas in the external memory 207.

At this time, since the businesses 215_1, 215_2, and 215_3 have no relation with each other, the storage areas in the external memory 207 where the application programs AP_1, AP_2, and AP_3 can be downloaded are predetermined. Whether they have the right to download to those storage areas is verified by the SAM chip 208.

Further, the transfer and viewing of data among the application programs AP_1, AP_2, and AP_3 are restricted by the firewalls FW. The authentication units 217_1, 217_2, and 217_3, as explained later, perform mutual authentication with the SAM chip 209, produce download signature verification key information, etc. when downloading application programs AP_1, AP_2, and AP_3 to the SAM chip 208.

Next, the components shown in FIG. 33 will be explained.

[IC Card 203]

Figure 35:
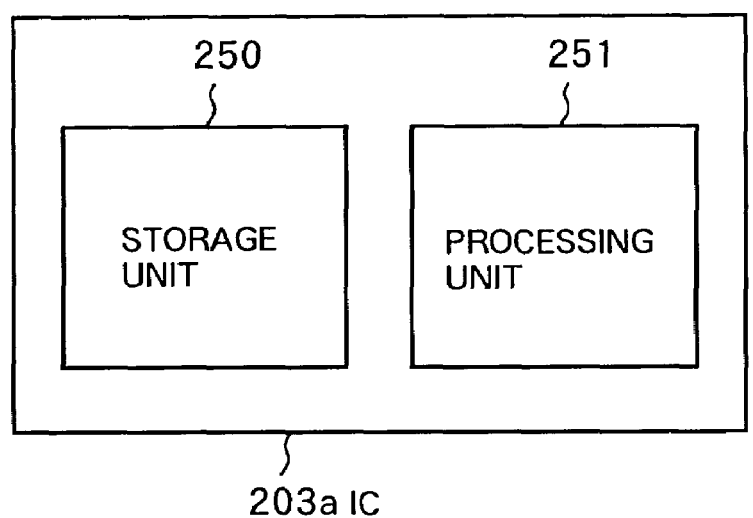
FIG. 35 is a functional block diagram of an IC of the IC card shown in FIG. 33.

FIG. 35 is a functional block diagram of the IC card 203.

As shown in FIG. 35, the IC card 203 has an IC (integrated circuit) 203a provided with a storage unit 250 and processing unit 251.

Figure 36:
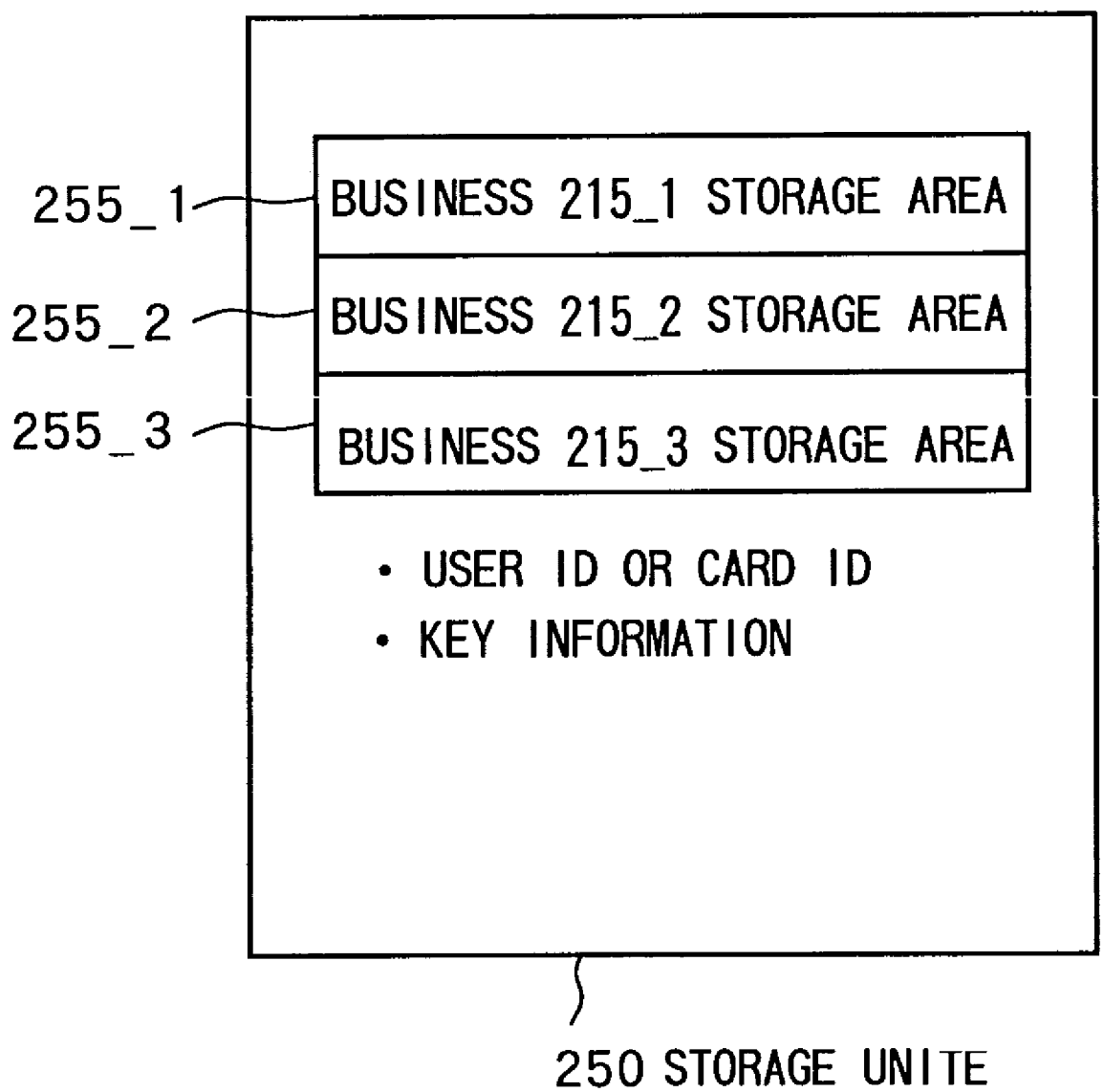
FIG. 36 is a view for explaining the information stored in the storage unit shown in FIG. 35.

The storage unit 250, as shown in FIG. 36, has a storage area 255_1 used by a credit card company or other business 215_1, a storage area 255_2 used by a business 215_2, and a storage area 255_3 used by a business 215_3. Further, the storage unit 250 stores key information used for judging the existence of a right to the storage area 255_1, key information used for judging an access right to the storage area 255_2, and key information used for judging an access right to the storage area 255_3. That key information is specifically used for mutual authentication, encryption and decryption of data, etc.

Further, the storage unit 250 stores the identification information of the IC card 203 or the user of the IC card 203.

Next, the SAM unit 209 will be explained in detail.

[External Memory 207]

Figure 37:
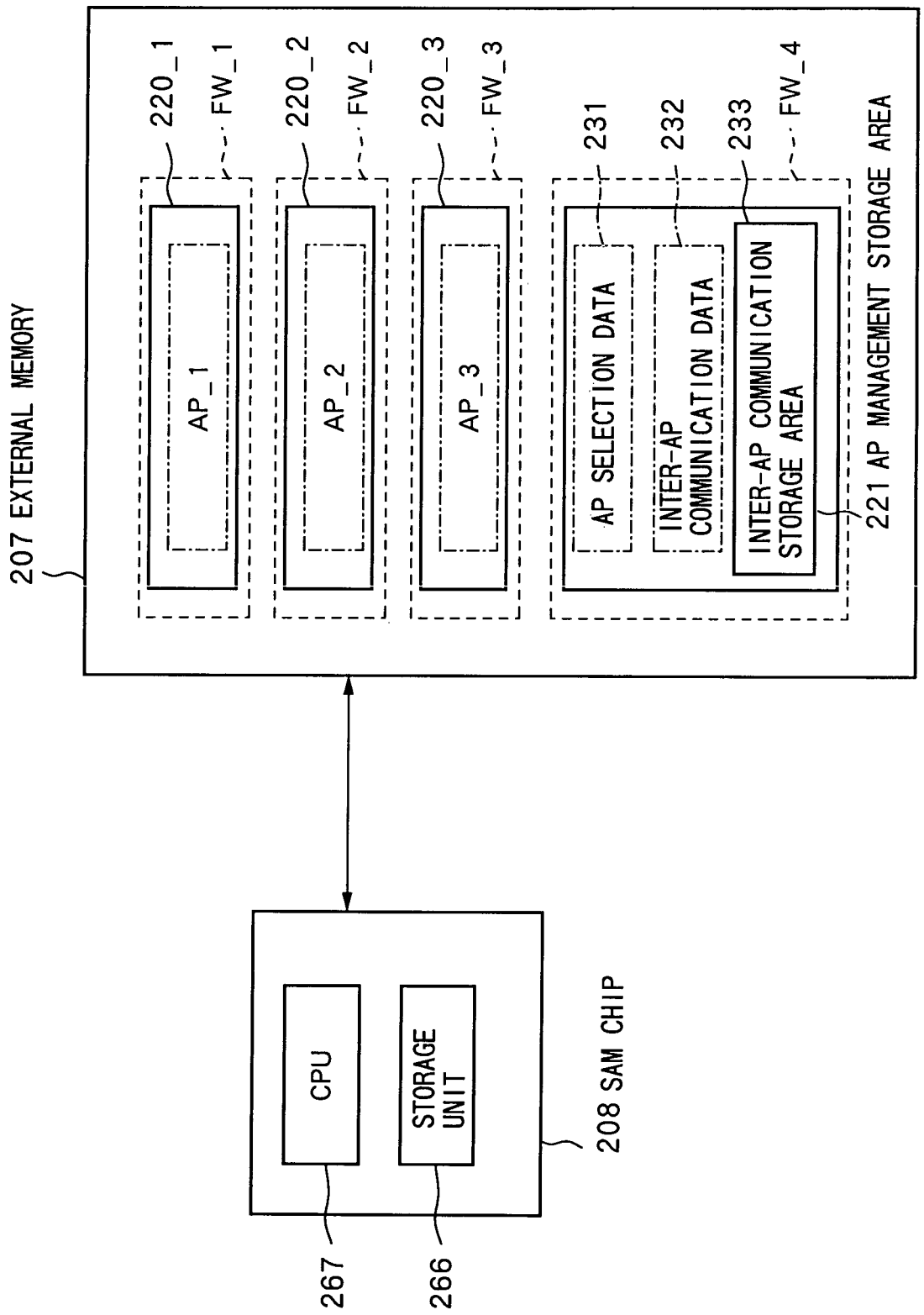
FIG. 37 is a view of the external memory of the SAM unit shown in FIG. 33.

FIG. 37 is a view for explaining the storage areas of the external memory 207.

As shown in FIG. 37, the storage areas of the external memory 207 include a storage area 220_1 in which the application program AP_1 of the business 215_1 is stored, a storage area 220_2 in which the application program AP_2 of the business 215_2 is stored, a storage area 220_3 in which the application program AP_3 of the business 215_3 is stored, and an AP management storage area 221 used by the manager of the SAM chip 208.

The application program AP_1 stored in the AP storage area 220_1 is comprised of a plurality of program modules. Access to the AP storage area 220_1 is restricted by the firewall FW_1.

The application program AP_2 stored in the AP storage area 220_2 is comprised of a plurality of program modules. Access to the AP storage area 220_2 is restricted by the firewall FW_2.

The application program AP_3 stored in the AP storage area 220_3 is comprised of a plurality of program modules. Access to the AP storage area 220_3 is restricted by the firewall FW_3.

In the present embodiment, the above program module is the minimum unit downloaded for example from the outside of the SAM unit 209 to the external memory 207. The number of the program modules forming each application program can be freely determined by the corresponding business.

Further, the application programs AP_1, AP_2, and AP_3 stored in the external memory 207 are scrambled. They are descrambled when read into the SAM chip 208.

Further, the application programs AP_1, AP_2, and AP_3 are, for example, produced by the businesses 215_1, 215_2, and 215_3 using the personal computers 216_1, 216_2, and 216_3 shown in FIG. 33 and are downloaded through the SAM chip 208 to the external memory 207.

Access to the AP management storage area 221 is restricted by the firewall FW_4.

Note that the firewalls FW_1, FW_2, FW_3, and FW_4 correspond to the firewalls FW shown in FIG. 34.

The AP management storage area 221 stores the AP selection data 231 and the inter-AP communication data 232 as shown in FIG. 37.

Here, AP selection data 231 and inter-AP communication data 232 are, for example, registered in advance at the time of setting up the SAM chip 208. Further, the AP selection data 231 and inter-AP communication data 232 can only be rewritten by the manager of the SAM chip 208.

FIG. 38 is a view for explaining the AP selection data 231.

As shown in FIG. 38, the AP selection data 231 shows the IC card type information and AP identification information linked together.

The IC card type information shows the type of the IC card 203 shown in FIG. 33 and, for example, is identification information of the credit card company performing the settlement for a transaction using the IC card 203.

The AP identification information, as shown in FIG. 34, is identification information of the application program operating at the AP layer of the SAM chip 208.

Figure 39:
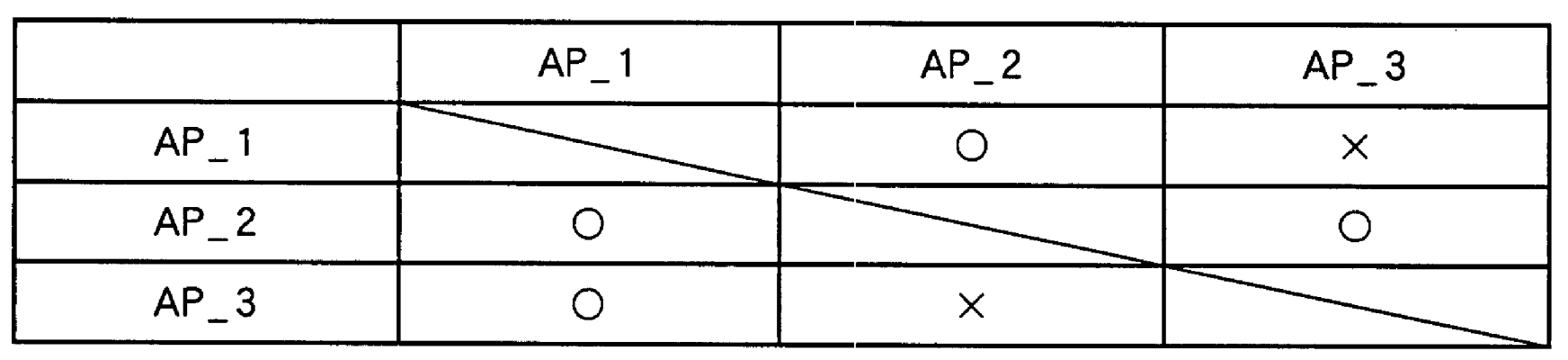

FIG. 39 is a view for explaining the inter-AP communication data 232.

The inter-AP communication data 232 shows whether communication among the application programs AP_1, AP_2, and AP_3 shown in FIG. 34 is possible Specifically, this shows if the communication request to an application program at a row item issued by an application program at a column item shown in FIG. 39 is allowed or not.

For example, a communication request by the application program AP_3 to the application program AP_1 is allowed, but a communication request to the application program AP_2 is rejected.

Further, as shown in FIG. 37, the AP management storage area 221 has an inter-AP communication storage area 233 used for communication (transfer of data) with an application program.

[SAM Chip 208]

Figure 40:
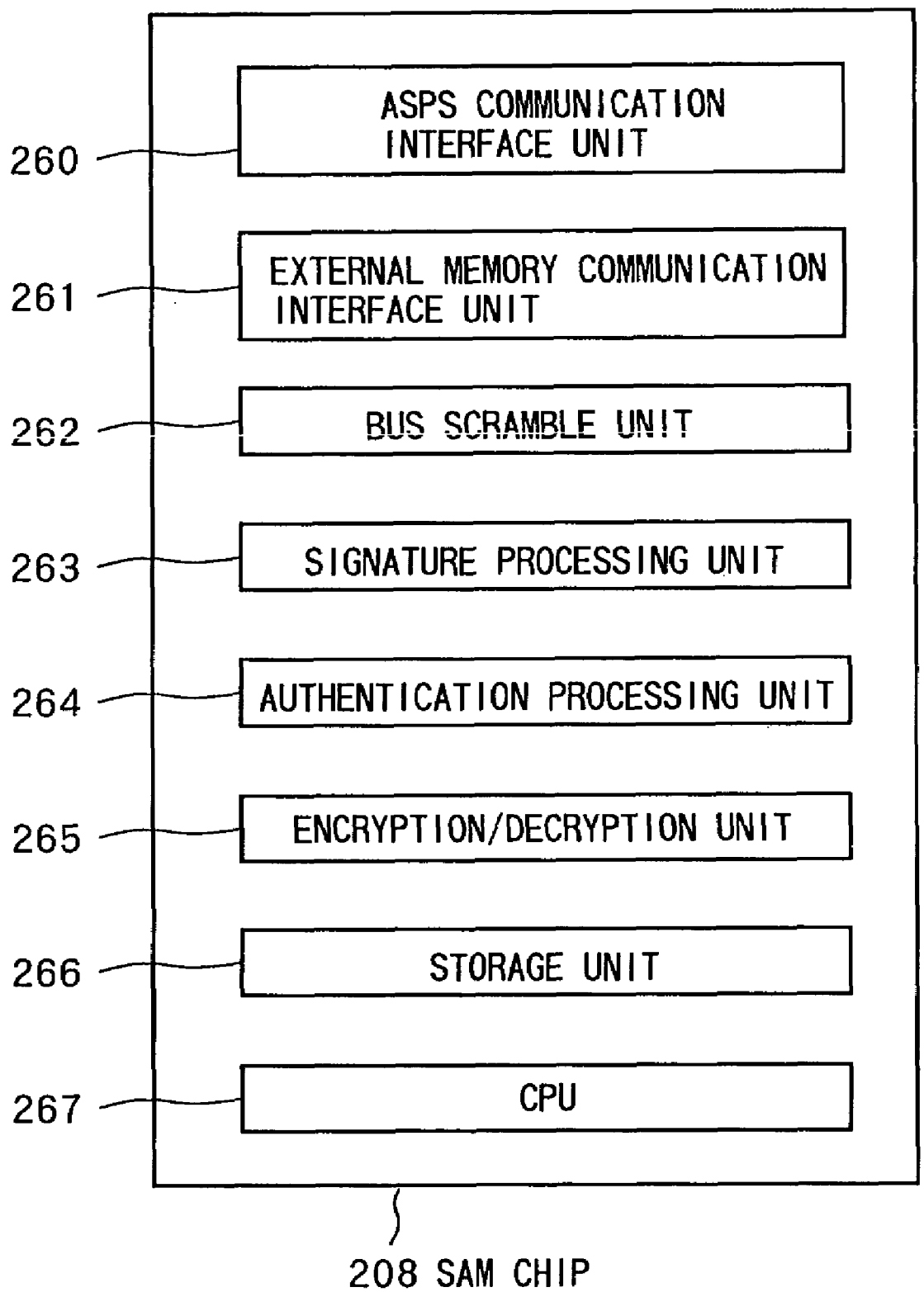
FIG. 40 is a functional block diagram of the SAM chip shown in FIG. 33.

FIG. 40 is a functional block diagram of the SAM chip 208 shown in FIG. 33.

As shown in FIG. 40, the SAM chip 208 has an ASPS communication interface unit 260, external memory communication interface unit 261, bus scramble unit 262, signature processing unit 263, authentication processing unit 264, encryption/decryption unit 265, storage unit 266, and CPU 267.

The SAM chip 208 is a tamper-resistant module.

The ASPS communication interface unit 260 is an interface used for input and output of data with the ASP server 206 shown in FIG. 33.

The external memory communication interface unit 261 is an interface used for input and output of data with the external memory 207.

The bus scramble unit 262 scrambles output data and descrambles input data when inputting and outputting data through the external memory communication interface unit 261.

That is, the external memory 207 stores data in a scrambled state.

The signature processing unit 263, as explained later, produces a signature and verifies a signature when downloading an application program through the Internet 210 to the external memory 207 and when executing an application program.

The authentication processing unit 264, as explained later, performs mutual authentication with the other party when downloading an application program through the Internet 210 to the external memory 207.

The encryption/decryption unit 265 encrypts data and decrypts encrypted data.

The storage unit 266 stores the data required for the processing of the CPU 267.

The CPU 267 executes later explained tasks based on a predetermined program (program of the present invention) and executes an application program designated in accordance with execution of the tasks.

Figure 41:
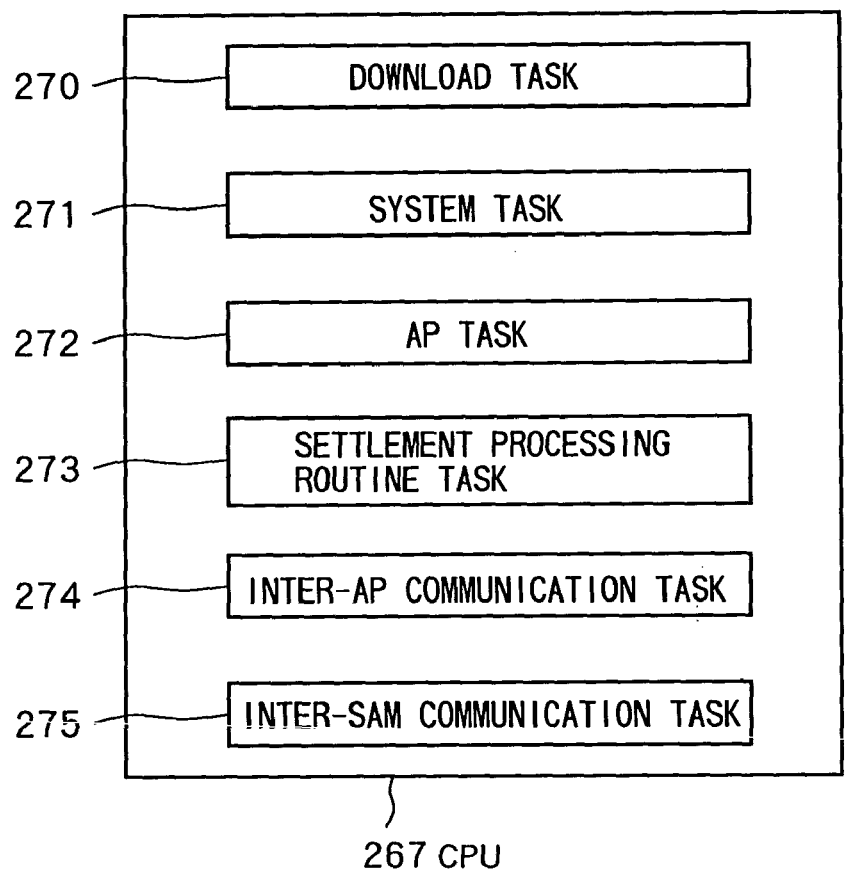
FIG. 41 is a view for explaining tasks executed by the CPU shown in FIG. 40.

FIG. 41 is a view for explaining tasks executed by the CPU 267.

As shown in FIG. 41, the CPU 267 executes a download task 270, system task 271, AP task 272, settlement processing routine task 273, inter-AP communication task 274, and inter-SAM communication task 275.

The download task 270, as explained later, performs processing for downloading an application program from outside of the SAM unit 209 through the SAM chip 208 to the external memory 207.

The system task 271 is a task performing driver management, operations unique to the IC card 203, or other processing.

The AP task 272, for example, comprehensively manages the execution of the application programs AP_1, AP_2, and AP_3 performed when a program request is received by the SAM chip 208 from the ASP server 206 or other place outside of the SAM chip 208.

Figure 42:
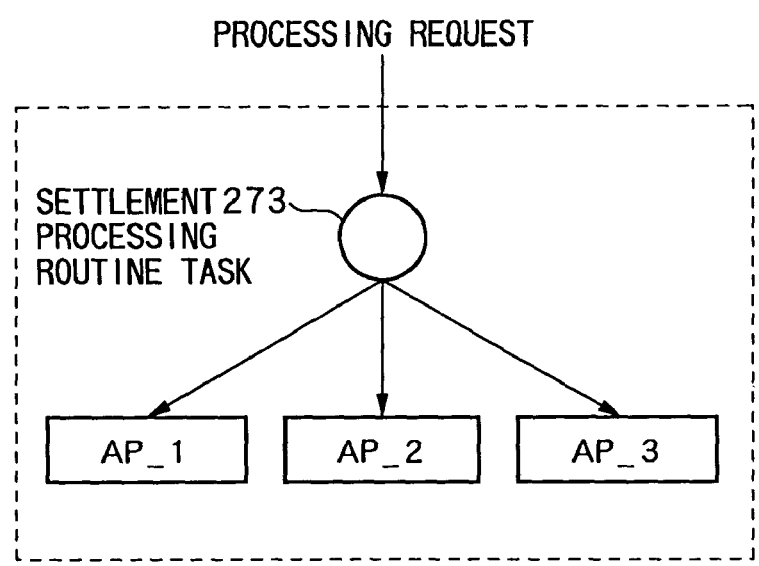
FIG. 42 is a view for explaining the functions of the settlement processing routine task shown in FIG. 41.

As shown in FIG. 42, when the SAM chip 208 receives a processing request relating to the IC card 203 from the ASP server 206, the settlement processing routine task 273 obtains identification information of the AP corresponding to the IC card type information included in that processing request based on the AP selection data 231 shown in FIG. 38 and selects and executes the application programs AP_1, AP_2, and AP_3 corresponding to that AP identification information.

The inter-AP communication task 274 manages communication among the application programs.

Figure 43:
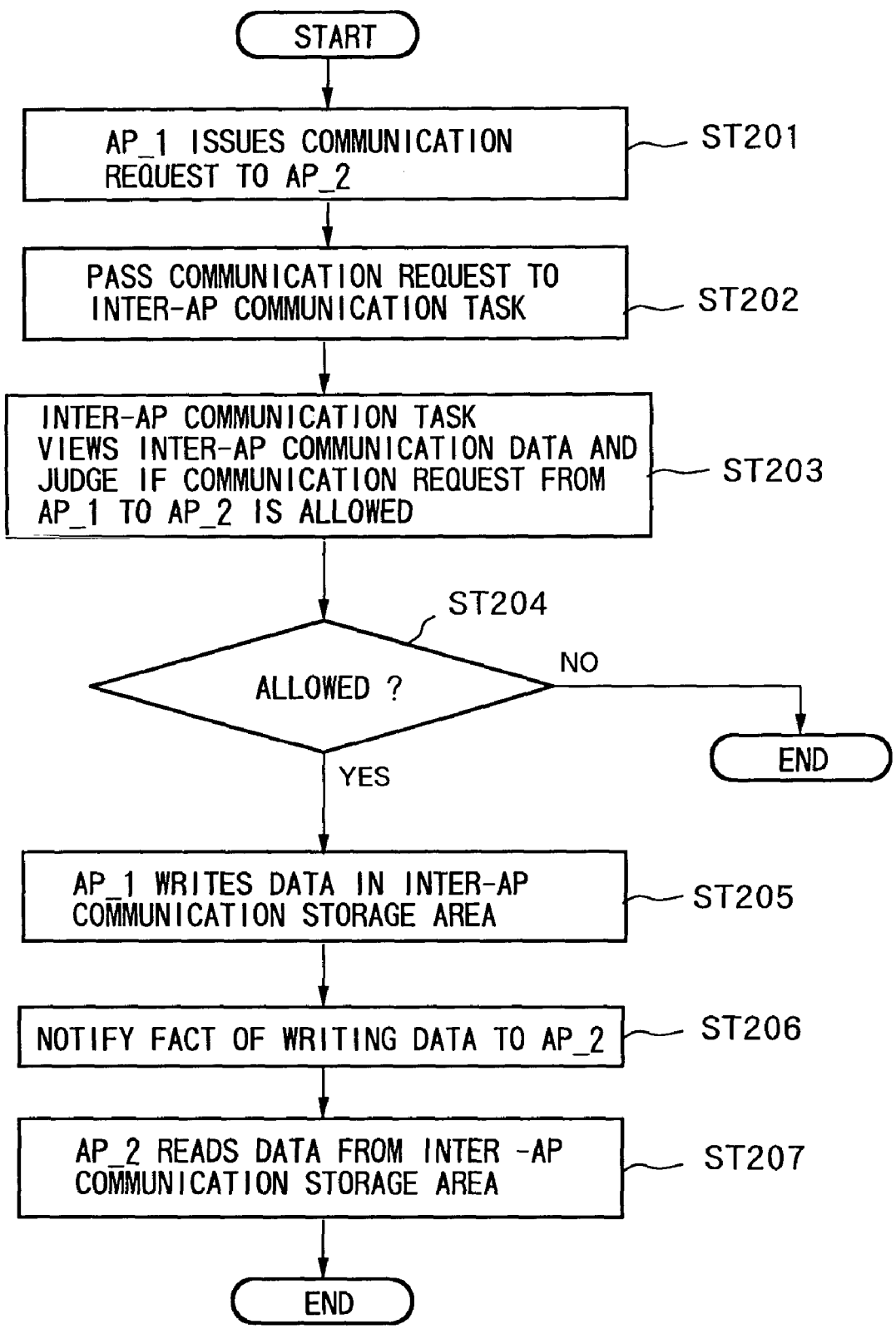
FIG. 43 is a flow chart for explaining the processing of the inter-AP communication task shown in FIG. 41.

FIG. 43 is a flow chart for explaining the processing of the inter-AP communication task 274.

Here, the explanation will be given illustrating the case of the application program AP_1 issuing a communication request for writing data in the AP_2.

Step ST201:

When an application program AP_1 being executed issues a communication request for writing data to AP_2, the processing of step ST202 is performed.

Step ST202:

The communication request issued at step ST201 is received by the inter-AP communication task 274.

Step ST203:

The inter-AP communication task 274 views the inter-AP communication data 232 shown in FIG. 39 and judges if the application program AP_1 can communicate with the AP_2.

Step ST204:

When the inter-AP communication task 274 judges at step ST203 that communication is possible, it executes the processing of step ST205 while when it does not, it ends the processing.

In this example, from FIG. 39, the application program AP_1 can communicate with the AP_2, so the processing of step ST205 is executed.

Step ST205:

Under the control of the inter-AP communication task 274, the application program AP_1 writes data in the inter-AP communication storage area 233 shown in FIG. 37.

Step ST206:

The inter-AP communication task 274 notifies the fact of the data being written to the application program AP_2.

Step ST207:

The application program AP_2 reads data from the inter-AP communication storage area 233 in accordance with the notification received at step ST206.

Due to this, communication between the application programs AP_1 and AP_2 relayed through the firewalls is completed.

Figure 44:
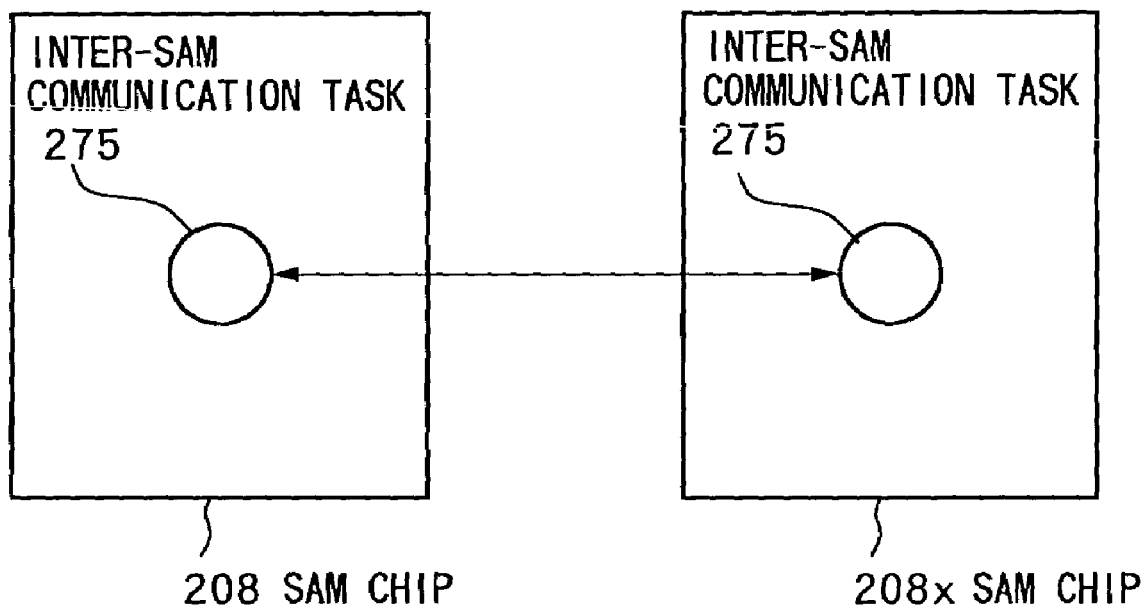
FIG. 44 is a view for explaining the inter-SAM communication task shown in FIG. 41.

The inter-SAM communication task 275, as shown in FIG. 44, in accordance with need, can for example start up the inter-SAM communication task 275 of an SAM chip 208x outside of the SAM chip 208 and issue a remote command to the inter-SAM communication task 275 of that SAM chip 208x.

Such a remote command is issued by the inter-SAM communication task 275 of the SAM chip 208 to the inter-SAM communication task 275 of the SAM chip 208x to request that the SAM chip 208x execute at least part of the processing assigned to the SAM chip 208 when for example the processing load of the SAM chip 208 becomes large and it cannot suitably perform the processing.

Next, the overall operation of the communication system 201 shown in FIG. 33 will be explained.

Figure 45:
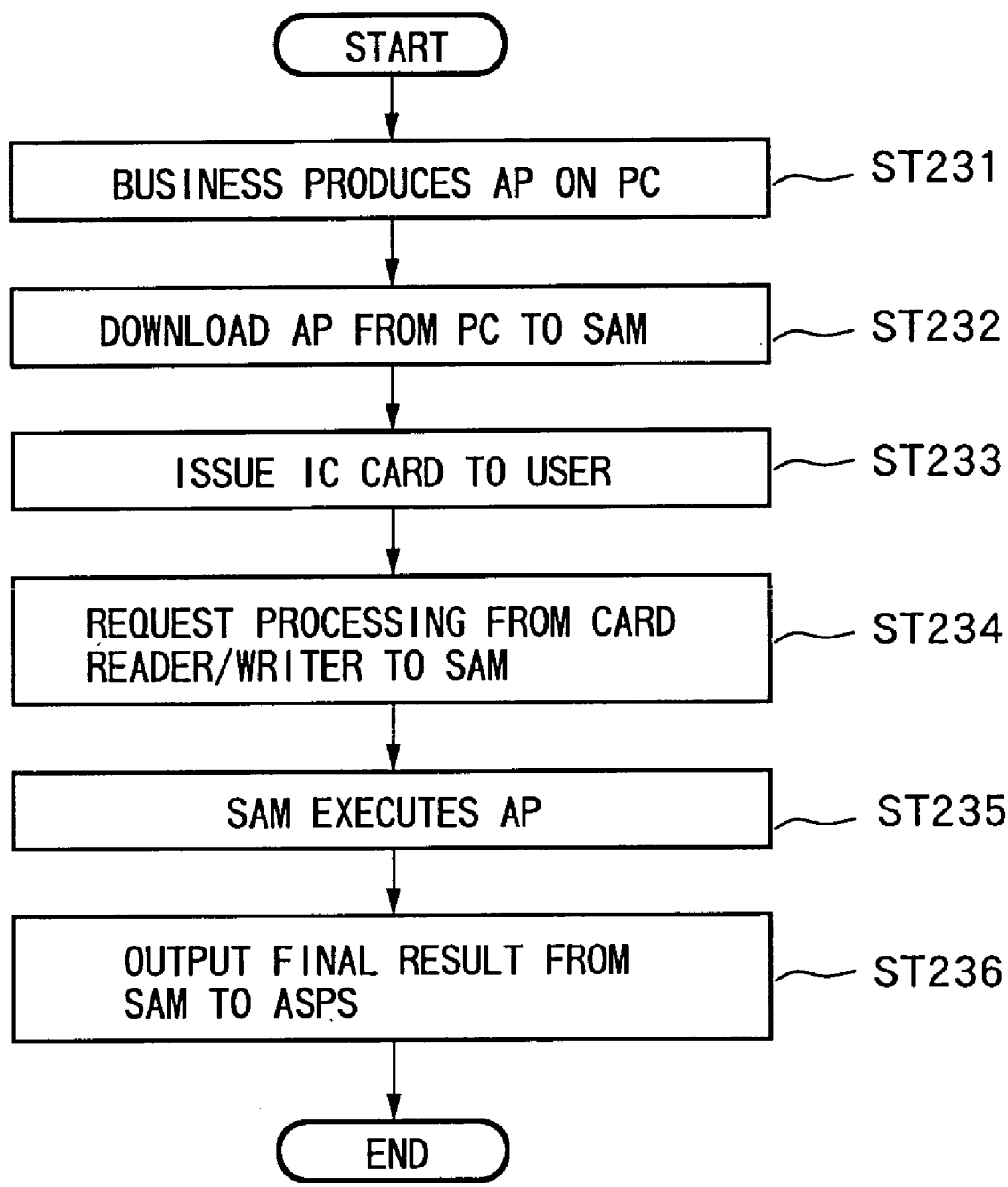
FIG. 45 is a view for explaining the overall operation of the communication system shown in FIG. 33.

FIG. 45 is a view for explaining the overall operation of the communication system 201 shown in FIG. 33.

Step ST231:

The businesses 215_1 to 215_3 or a party requested by these businesses produce application programs AP_1, AP_2, and AP_3 for those businesses to perform processing for transactions using the IC card 203 on the personal computers 216_1, 216_2, and 216_3 shown in FIG. 33.

Step ST232:

The application programs AP_1, AP_2, and AP_3 are downloaded through the authentication units 217_1, 217_2, and 217_3 from the personal computers 216_1, 216_2, and 216_3 to the SAM chip 208.

Step ST233:

The user is issued the IC card 203.

As shown in FIG. 36, the IC 203a of the IC card 203 stores the key information used for transactions with a business which the user has contracted with.

Note that the contract between the user and a business may be concluded after issuance of the IC card 203 through the Internet 210 etc.

Step ST234:

For example, when a user desires to use the personal computer 205 to access the server 202 through the Internet 210 and purchase a product, the server 202 issues a processing request through the Internet 210 to the ASP server 206.

When the ASP server 206 receives a processing request from the server 202, it accesses the personal computer 205 through the Internet 210. Further, the processing request for the IC card 203 issued by the card reader/writer 204 is sent through the personal computer 205, Internet 210, and ASP server 206 to the SAM chip 208.

Step ST235:

The SAM chip 208, in accordance with the processing request received at step ST234, selects the application program by the settlement processing routine task 273 and executes the selected application program.

In the execution of that application program, any communication performed between application programs is performed by the inter-AP communication task 274 as shown in the above-mentioned FIG. 43.

Step ST236:

The SAM chip 208 outputs the results of execution of the application program to the ASP server 206.

As explained above, according to the communication system 201, as shown in FIG. 34 and FIG. 37, the application programs AP_1, AP_2, and AP_3 are restricted from accessing each other by firewalls, so it is possible to prevent application programs from being illicitly monitored and tampered with. Further, it is possible to improve the confidentiality of each application program.

Further, according to the communication system 201, by the inter-AP communication task 274 shown in FIG. 41 using the AP management storage area 221 of the external memory 207 shown in FIG. 37 to perform the processing shown in FIG. 43, communication between application programs is allowed in a preallowed range.

Therefore, it is possible to provide diverse services by synchronization and cooperation of a plurality of application programs.

As such a diverse service, for example, there is the automatic selection of application programs by the settlement processing routine task 273 shown in FIG. 41. That is, while the same level of computation content, for settlement processing differing in settlement protocol according to the issuer of the IC card 203, if the type of the IC card 203 is known, the corresponding application program can be automatically determined. Therefore, by registering the settlement processing at the level of the settlement processing routine task 273, the type of the IC card 203 and the corresponding application program can be automatically determined. Due to this, the load on the developer of the application program can be lightened.

Further, according to the communication system 201, since the information stored in the external memory 207 is scrambled by the bus scramble unit 262 of the SAM chip 208 shown in FIG. 40, there is confidentiality with respect to analysis from the outside.

Further, according to the communication system 201, by the provision of the inter-SAM communication task 275 shown in FIG. 41, it is possible to disperse the processing load of the SAM chip 208 to other SAM chips. Therefore, when mounting the SAM chip 208 in a store server etc. which has to simultaneously handle processing requests for settlement processing from a plurality of terminal apparatuses, it is possible to use the function of the inter-SAM communication task 275 to improve the settlement processing capability using a plurality of SAM chips 208.

Figure 46:
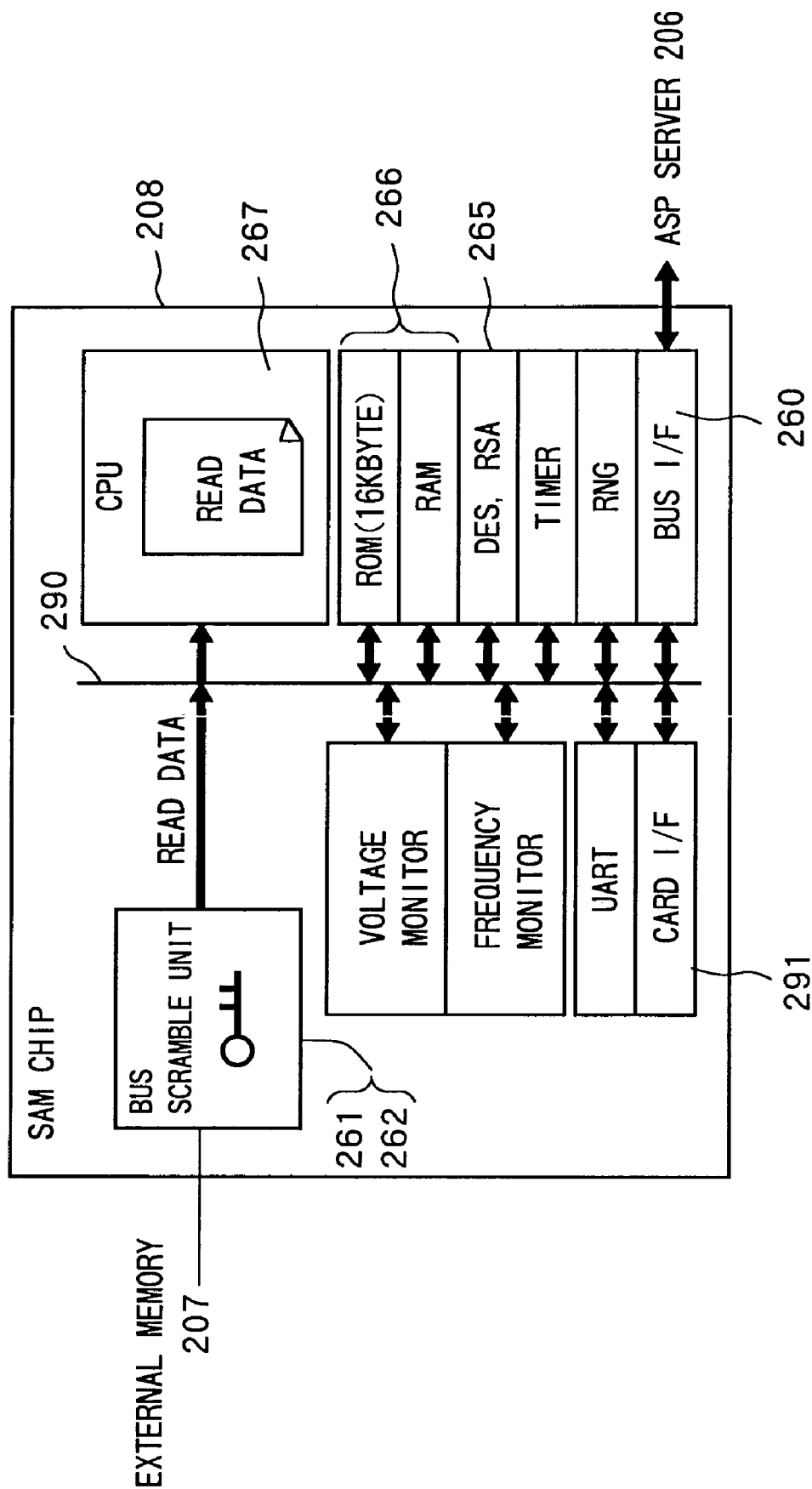
FIG. 46 is a functional block diagram showing more specifically the function blocks of the SAM chip shown in FIG. 40.

FIG. 46 is a functional block diagram showing more specifically the function blocks of the SAM chip 208 shown in FIG. 40.

As shown in FIG. 46, the SAM chip 208 is connected through an internal bus 290 to the ASPS communication interface unit 260, external memory communication interface unit 261, bus scramble unit 262, encryption/decryption unit 265, storage unit 266, and CPU 267.

Part of the functions of the signature processing unit 263 and authentication processing unit 264 shown in FIG. 40 are for example realized by the CPU 267.

Figure 47:
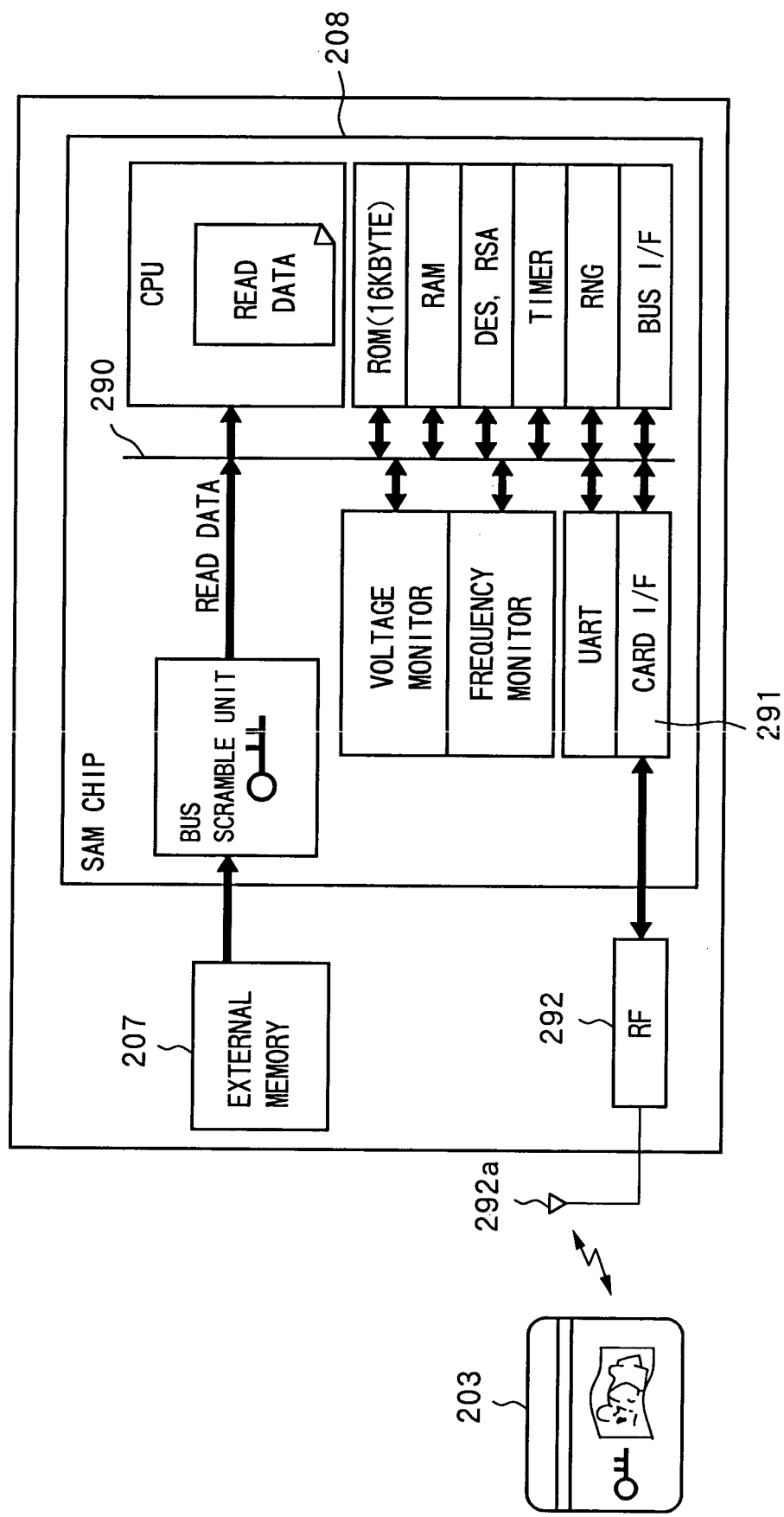
FIG. 47 is a view for explaining another mode of use of the SAM chip.

The SAM chip 208 shown in FIG. 46, for example as shown in FIG. 47, may also connect the card I/F unit 291 connected to the internal bus 290 to an RF reception/transmission unit 292 outside of the SAM chip 208 and transfer data with the IC card 203 by a noncontact system through an antenna 292a of the RF reception/transmission unit 292.

Fourth Embodiment

This embodiment is an embodiment corresponding to the 13th to 16th aspects of the invention.

Figure 48:
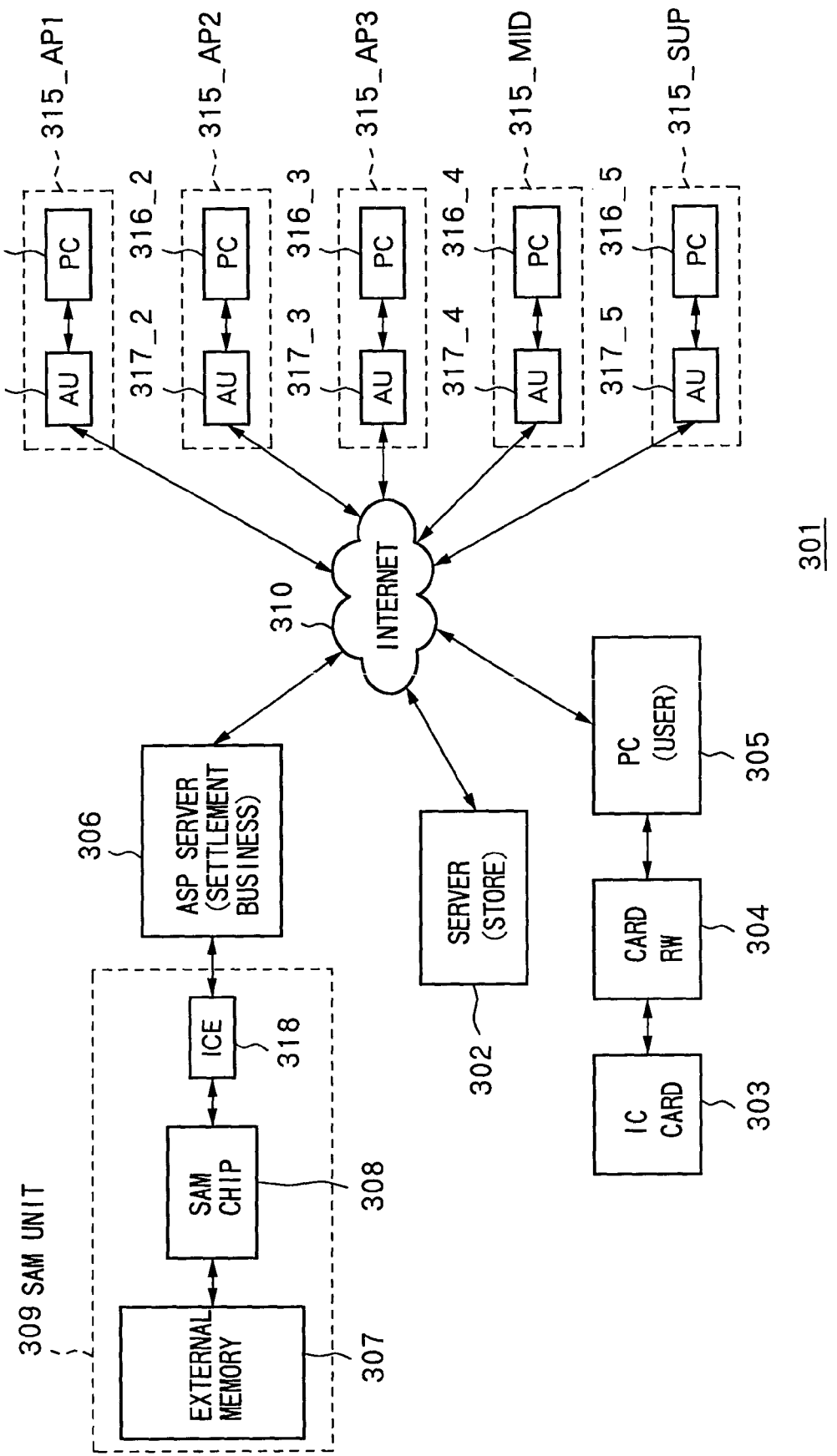
FIG. 48 is a view of the overall configuration of the communication system of an embodiment of the present invention.

FIG. 48 is a view of the overall configuration of the communication system 301 of the present embodiment.

As shown in FIG. 48, the communication system 301 uses the server 302, IC card 303 (integrated circuit of the present invention), card reader/writer 304, personal computer 305, ASP (application service provider) server 306, SAM (secure application module) unit 309, personal computers 316_1, 316_2, 316_3, 316_4, and 316_5, authentication units 317_1, 317_2, 317_3, 317_4, and 317_5 (authentication apparatuses of the present invention), and the ICE (in-circuit emulator) 318 to communicate through the Internet 310 and develop or customize software of the SAM chip 308, perform settlement processing using the IC card 303, etc.

The SAM unit 309 has an external memory 307 (semiconductor storage circuit of the present invention) and SAM chip 308 (semiconductor circuit of the present invention).

Figure 49:
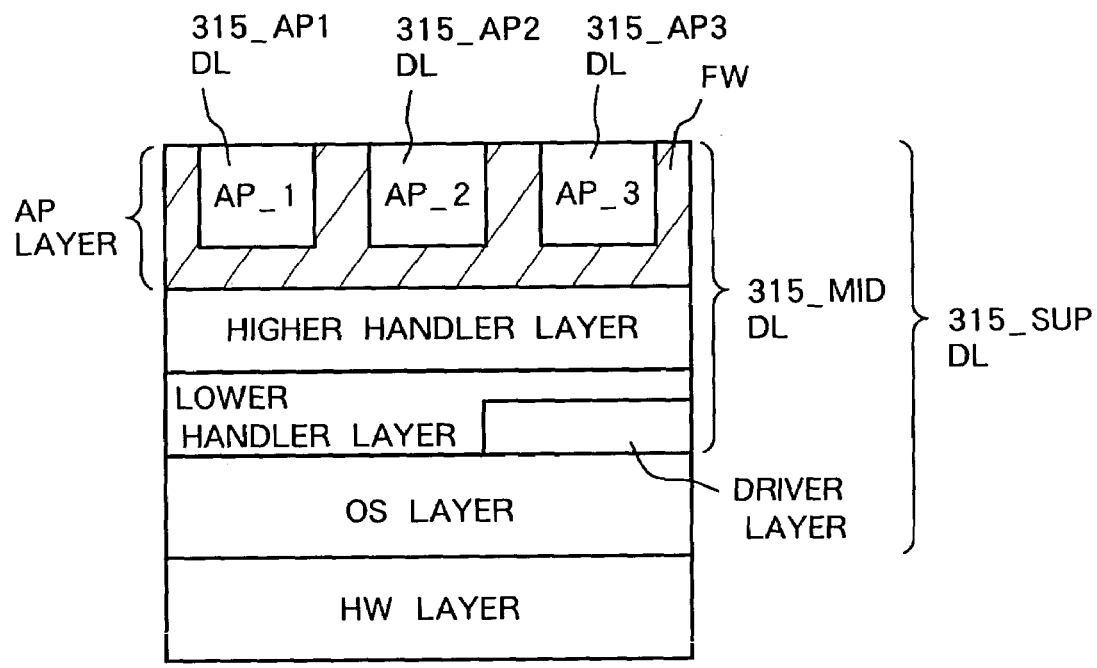
FIG. 49 is a view for explaining the software configuration of the SAM chip shown in FIG. 48.

The SAM chip 308 has a software configuration such as shown in FIG. 49.

As shown in FIG. 49, the SAM chip 308 has, from the lower layer to the upper layer, an HW (hardware) layer, OS layer, lower handler layer, higher handler layer, and application (AP) layer in that order.

The lower handler layer is a layer defining the processing not dependent on the application program and corresponds to the transport layer, network layer, and data link layer in the OSI protocol.

The lower handler layer includes a driver layer.

The driver layer is a layer performing processing relating to the operation of the LSI.

The higher handler layer is a layer defining the processing dependent on the application program and corresponds to a layer higher than the transport layer in OSI protocol.

Here, the OS layer corresponds to the first layer of the present invention, the lower handler layer, driver layer, and higher handler layer correspond to the second layer of the present invention, and the AP layer corresponds to the third layer of the present invention.

The AP layer includes the application programs AP_1, AP_2, and AP_3 defining the procedures for use of the IC card 303 by credit card companies and other businesses 315_AP1, 315_AP2, and 315_AP3 shown in FIG. 48.

In the AP layer, the application programs AP_1, AP_2, and AP_3 and the higher handler layer are provided between them with firewalls FW (firewalls of the present invention).

In the software configuration shown in FIG. 49, the AP layer defines processing specific to each business, for example, the content of settlement processing using the IC card 303. The processing for directly operating the IC card 303 is defined by the layers of the higher handler layer on down.

The SAM chip 308 is connected with the ASP server 306 through a SCSI port, the Ethernet, etc.

The ASP server 306 is connected through the Internet 310 with the personal computers 305, 316_1, 316_2, 316_3, 316_4, and 316_5.

The personal computer 316_1 is used by the business 315_AP1 of the application program AP_1 executed by the SAM chip 308.

The personal computer 316_2 is used by the business 315_AP2 of the application program AP_1 executed by the SAM chip 308.

The personal computer 316_3 is used by the business 315_AP3 of the application program AP_1 executed by the SAM chip 308.

The personal computer 316_4 is used by the software developer 315_MID able to develop a higher handler layer and lower handler layer including the driver layer shown in FIG. 49 of the SAM chip 308.

The personal computer 316_5 is used by the manufacturer of the SAM chip 308, that is, the software developer 315_SUP having the right to manage the SAM chips 308 as a whole.

The businesses 315_AP1, 315_AP2, and 315_AP3 use the personal computers 316_1, 316_2, and 316_3 to produce the application programs AP_1, AP_2, and AP_3 and download the produced application programs through the authentication units 317_1, 317_2, and 317_3 to storage areas allocated in advance in the external memory 307 through the SAM chip 308.

At this time, the businesses 315_AP1, 315_AP2, and 315_AP3 are parties with no relation with each other, so the storage areas in the external memory 307 to which the application programs AP_1, AP_2, and AP_3 can be downloaded are determined in advance. Whether or not one has the right to download to such a storage area is verified by the SAM chip 308.

Further, during execution of the application programs AP_1, AP_2, and AP_3, the firewalls FW restrict the transfer and viewing of data between the application programs AP_1, AP_2, and AP_3.

The software developer 315_MID downloads a predetermined program into the SAM chip 308 through the authentication unit 317_4 in accordance with need to customize the higher handler layer and lower handler layer including the driver layer shown in FIG. 49 of the SAM chip 308 etc.

Further, the software developer 315_SUP downloads a predetermined program into the SAM chip 308 through the authentication unit 317_5 to customize all of the layers shown in FIG. 49.

The authentication units 317_1 to 317_5, as explained later, mutually authenticate and produce download signature verification key information etc. with the SAM chip 308 when downloading a predetermined program from the personal computers 316_1 to 316_5 to the SAM chip 308.

The personal computer 305, for example, is used by the owner of the IC card 303, that is, the end user.

The personal computer 305, for example, is connected through a serial port or USB port to a Dumb type card reader/writer 304. The card reader/writer 304 realizes for example wireless communication corresponding to the physical level with the IC card 303.

The operational commands to the IC card 303 and the response packets from the IC card 303 are generated and analyzed at the SAM unit 309 side. Therefore, the card reader/writer 304, personal computer 305, and ASP server 306 interposed between them only act to store the commands or response contents in the data payload portions and relay the same. They are not involved in the encryption or decryption of data, authentication, or other operations in the IC card 303.

Further, the ICE 318 is an emulator used when debugging a program running on the SAM chip 308.

Next, the components shown in FIG. 48 will be explained.

IC Card 303

The IC card 303 stores the key information etc. necessary for the settlement processing using the SAM chip 308.

Authentication Units 317_1 to 317_5

Figure 50:
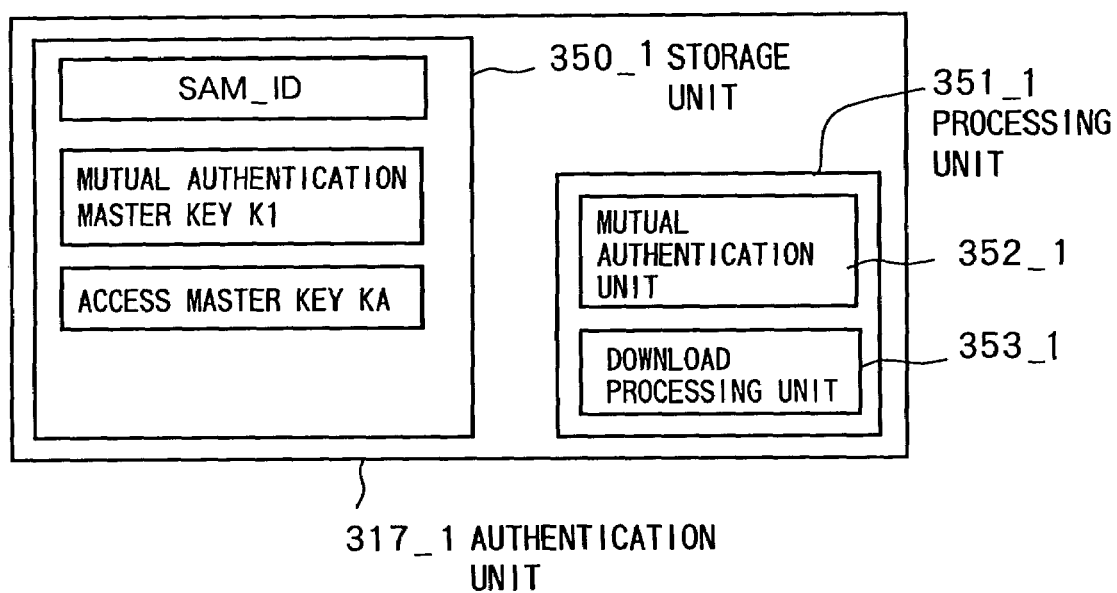
FIG. 50 is a functional block diagram of an authentication unit of a business using the application program shown in FIG. 48.

FIG. 50 is a functional block diagram of the authentication unit 317_1.

As shown in FIG. 50, the authentication unit 317_1 has a storage unit 350_1 and processing unit 351_1.

As shown in FIG. 50, the storage unit 350_1 stores a SAM_ID, mutual authentication master key information K1, and access master key information KA.

The SAM_ID is identification information of the SAM chip 308.

The mutual authentication master key information K1 is, as explained later, used for generating mutual authentication key information K2.

The access master key information KA, as explained later, is used for generating download signature information used when downloading a program in the external memory 307.

The access master key information KA is key information necessary for downloading to the external memory 307 a program of the AP layer of the software structure of the SAM chip 308 shown in FIG. 49.

The processing unit 351_1, as shown in FIG. 50, has a mutual authentication unit 352_1 and download processing unit 353_1.

Figure 51:
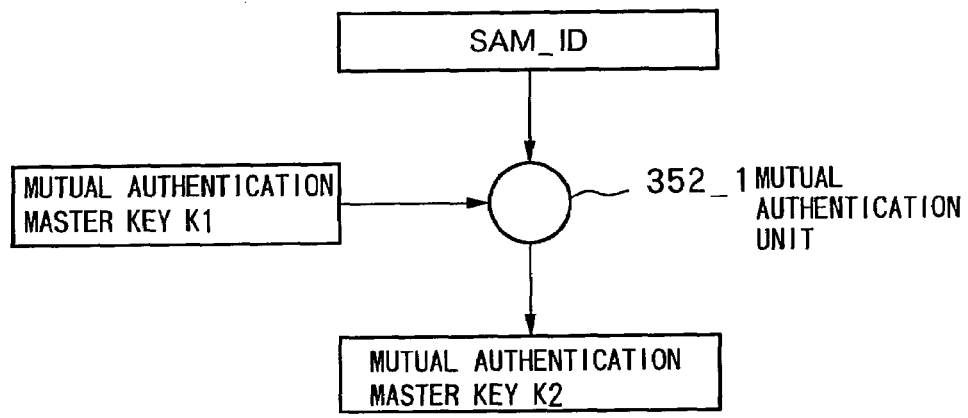
FIG. 51 is a view for explaining the function of the mutual authentication unit shown in FIG. 50.

The mutual authentication unit 352_1, as shown in FIG. 51, when downloading a program to the external memory 307, encrypts the SAM_ID as plain text using the mutual authentication master key information K1 to generate the mutual authentication key information K2 and uses that mutual authentication key information K2 for mutual authentication with the SAM chip 308.

Figure 52:
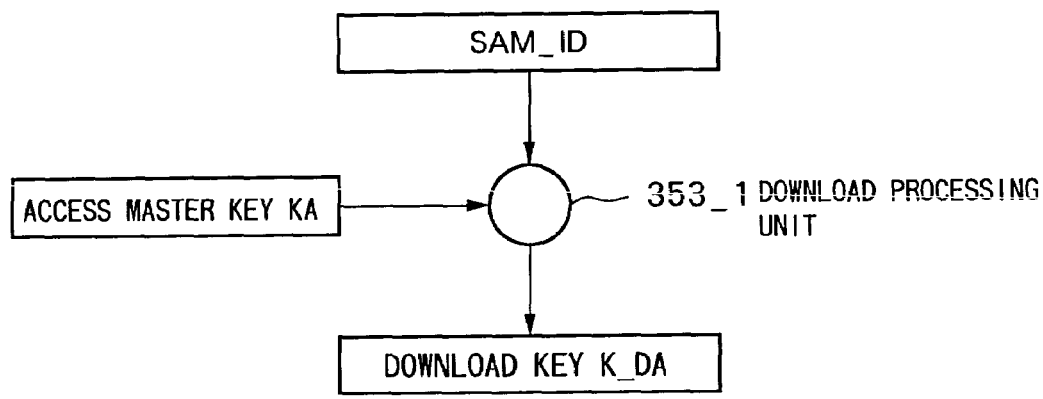
FIG. 52 is a view for explaining the function of the download processing unit shown in FIG. 50.

The download processing unit 353_1, when downloading a program to the external memory 307, as shown in FIG. 52, encrypts the SAM_ID as plain text using the access master key information KA to generate the download key information K_DA. Further, the download processing unit 353_1 uses the download key information K_DA to generate the download signature information and transmits it to the SAM chip 308.

The authentication units 317_2 and 317_3 are configured the same as the above explained authentication unit 317_1. However, for example, the content of the access master key information KA differs for each authentication unit.

Figure 53:
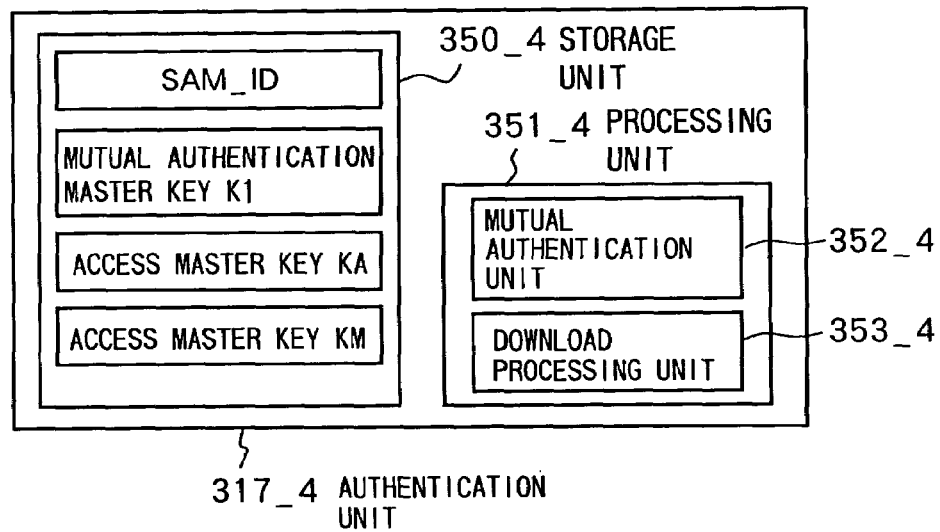
FIG. 53 is a functional block diagram of an authentication unit of a software developer of a handler layer shown in FIG. 48.

FIG. 53 is a functional block diagram of the authentication unit 317_4.

As shown in FIG. 53, the authentication unit 317_4 has a storage unit 350_4 and processing unit 351_4.

As shown in FIG. 53, the storage unit 350_4 stores a SAM_ID, mutual authentication master key information K1, and access master key information KA and KM.

The SAM_ID, mutual authentication master key information K1, and access master key information KA are the same as those explained above.

The access master key information KM is key information for downloading a program of the higher handler layer and the lower handler layer including the driver layer of the software structure of the SAM chip 308 shown in FIG. 49 to the external memory 307 or SAM chip 308.

The processing unit 351_4, as shown in FIG. 53, has a mutual authentication unit 352_4 and download processing unit 353_4.

The mutual authentication unit 352_4 is the same as the mutual authentication unit 352_1 explained in FIG. 51.

Figure 54:
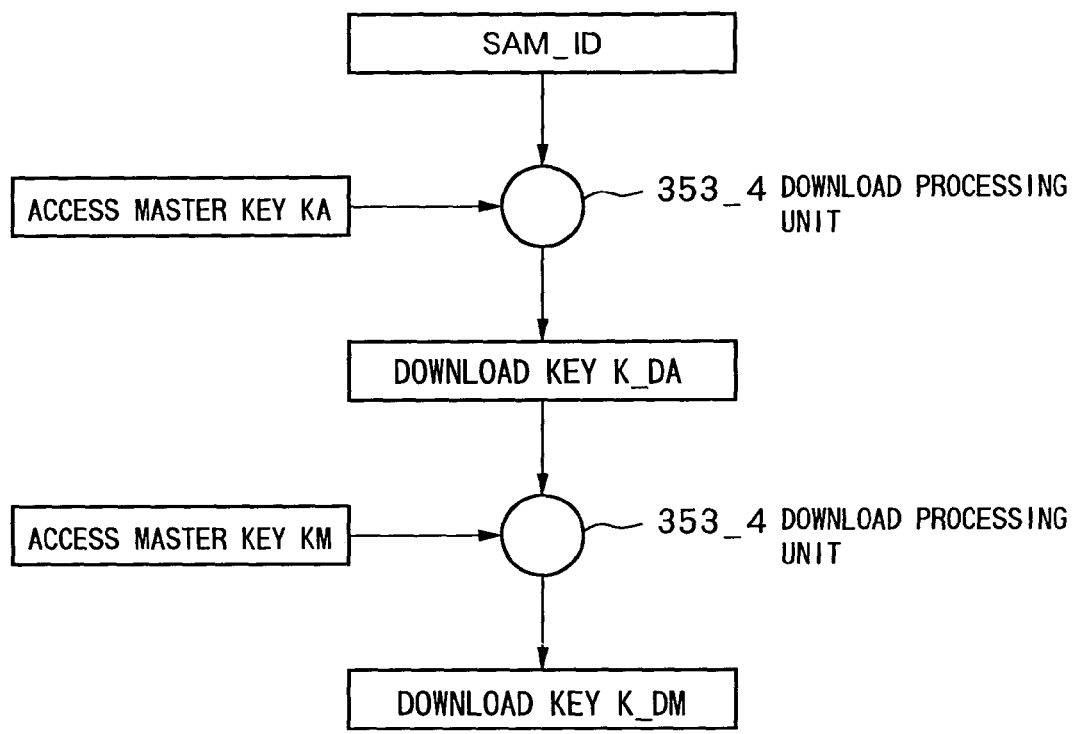
FIG. 54 is a view for explaining the function of the download processing unit shown in FIG. 53.

The download processing unit 353_4, when downloading a program to the external memory 307, as shown in FIG. 54, encrypts the SAM_ID as plain text using the access master key information KA to generate the download key information K_DA. Next, the download processing unit 353_4 encrypts the download key information K_DA as plain text using the access master key information KM to generate the download key information K_DM. Next, the download processing unit 353_4 uses the download key information K_DM to generate the download signature information and transmits it to the SAM chip 308.

Figure 55:
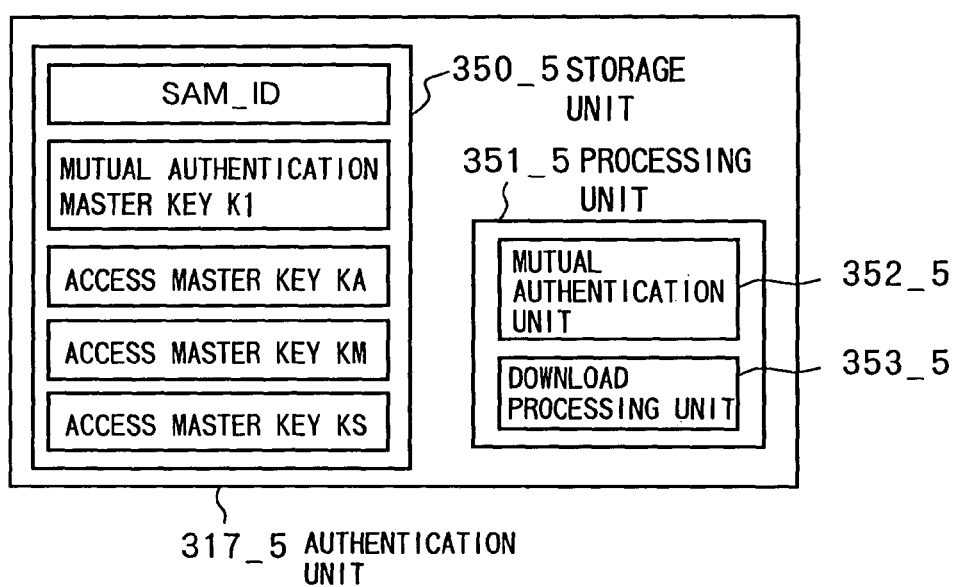
FIG. 55 is a functional block diagram of the authentication unit of the manager of the SAM chip shown in FIG. 48.

FIG. 55 is a functional block diagram of the authentication unit 317_5.

As shown in FIG. 55, the authentication unit 317_5 has a storage unit 350_5 and processing unit 351_5.

As shown in FIG. 55, the storage unit 350_5 stores a SAM_ID, mutual authentication master key information K1, and access master key information KA, KM, and KS.

The SAM_ID, mutual authentication master key information K1, and access master key information KA and KM are the same as those explained above.

The access master key information KS is the key information required for downloading a program of the OS layer of the software structure of the SAM chip 308 shown in FIG. 49 to the external memory 307 or SAM chip 308.

The processing unit 351_5, as shown in FIG. 55, has a mutual authentication unit 352_5 and download processing unit 353_5.

The mutual authentication unit 352_5 is the same as the mutual authentication unit 352_1 shown in the above-mentioned FIG. 51.

Figure 56:
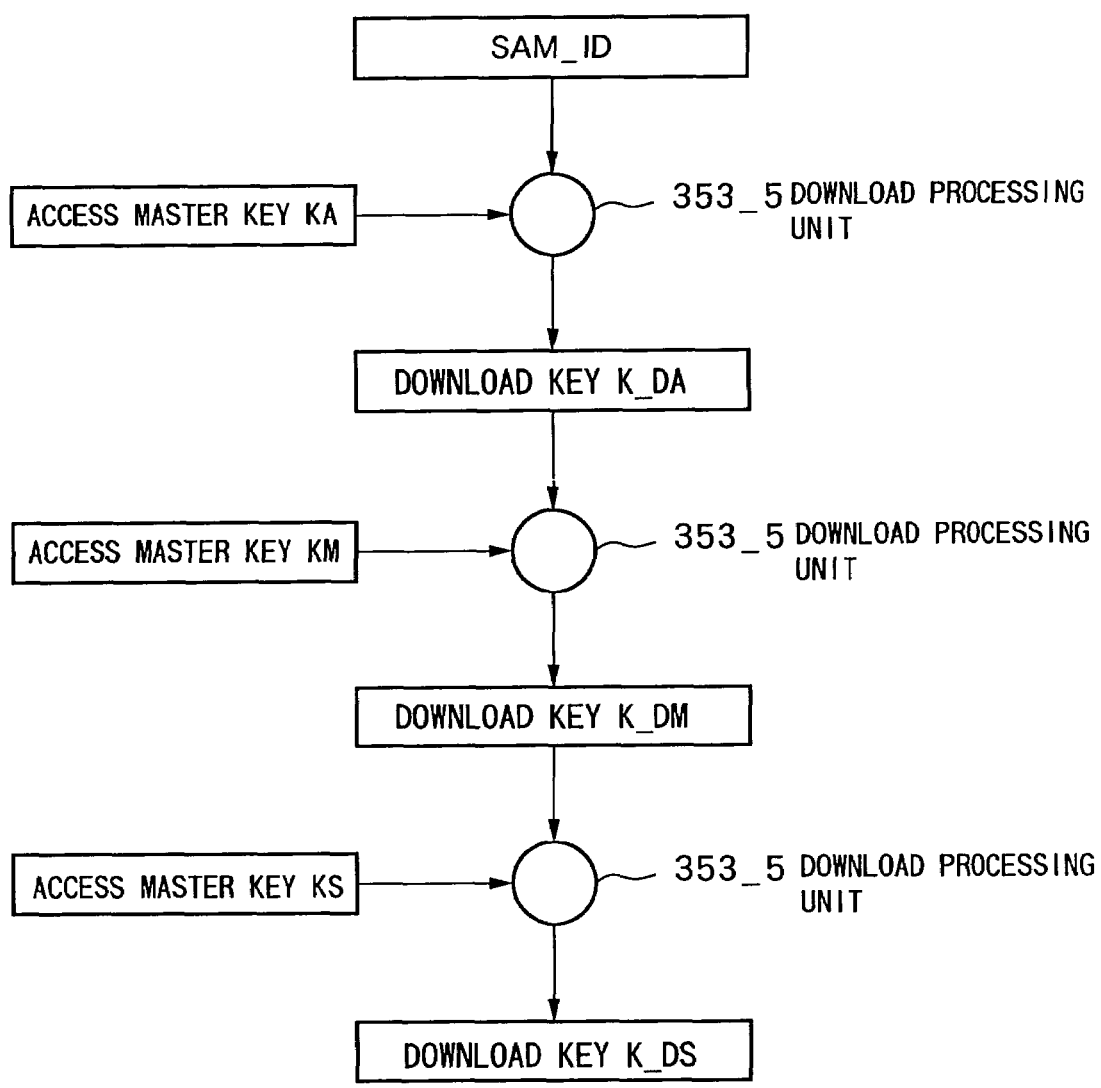
FIG. 56 is a view for explaining the function of the download processing unit shown in FIG. 55.

The download processing unit 353_5, when downloading a program to the external memory 307, as shown in FIG. 56, encrypts the SAM_ID as plain text using the access master key information KA to generate the download key information K_DA. Next, the download processing unit 353_5 encrypts the download key information K_DA as plain text using the access master key information KM to generate the download key information K_DM. Next, the download processing unit 353_5 encrypts the download key information K_DM as plain text using the access master key information KS to generate the download key information K_DS. Next, the download processing unit 353_5 uses the download key information K_DS to generate the download signature information and transmits this to the SAM chip 308.

In the present embodiment, the authentication units 317_1, 317_4, and 317_5 store information in the storage units 350_1, 350_4, and 350_5 in a secure state. When these units are destroyed by outside factors or forced open, this is detected by a detection unit and the information stored in the storage units 350_1, 350_4, and 350_5 is deleted.

SAM Unit 309

[External Memory 307]

Figure 57:
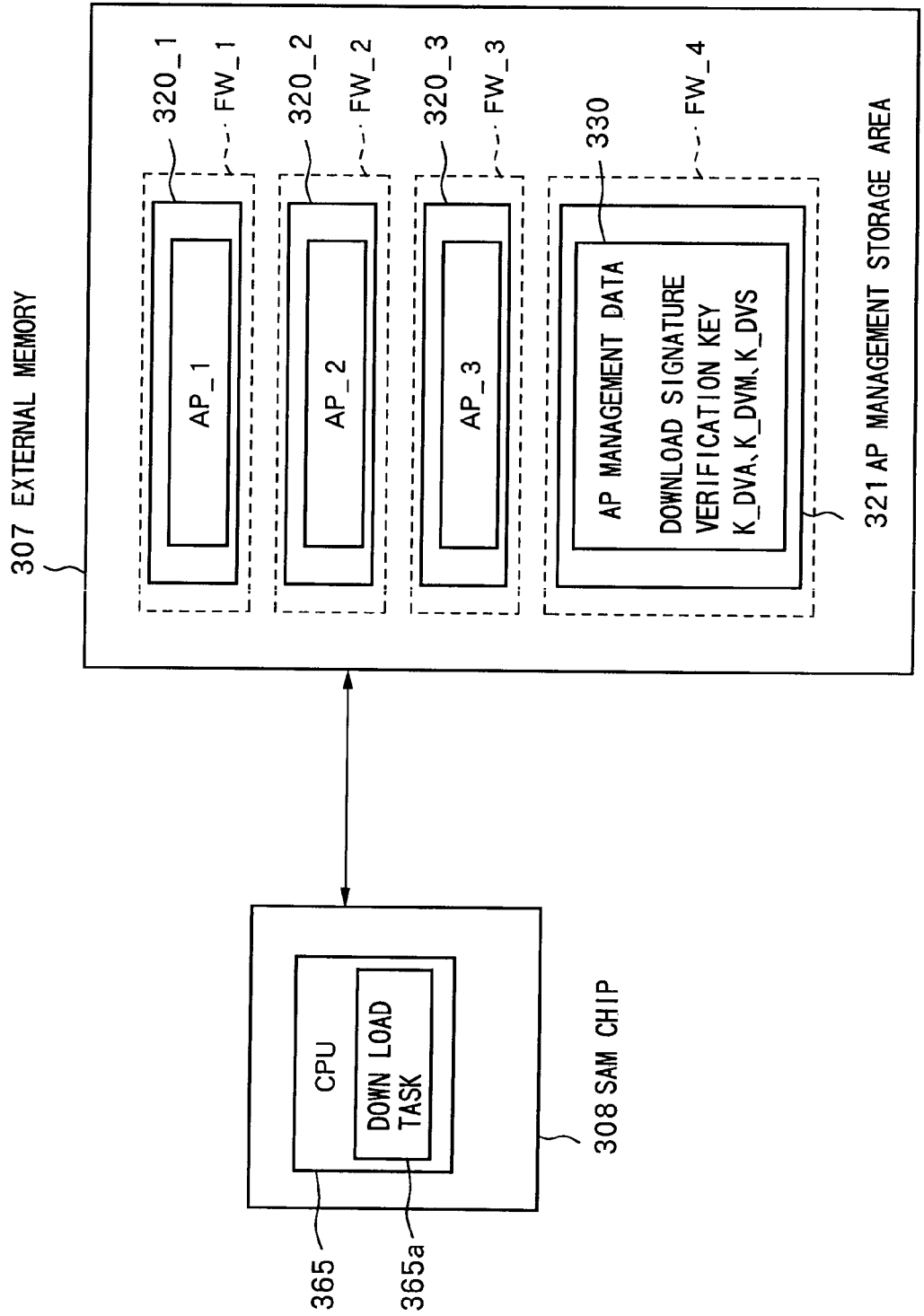
FIG. 57 is a view for explaining the external memory of the SAM unit shown in FIG. 48.

FIG. 57 is a view for explaining the storage areas of the external memory 307.

As shown in FIG. 57, the storage areas of the external memory 307 include an AP storage area 320_1 in which the application program AP_1 of the business 315_1 is stored, an AP storage area 320_2 in which the application program AP_2 of the business 315_2 is stored, an AP storage area 320_3 in which the application program AP_3 of the business 315_3 is stored, and an AP management storage area 321 used by the manager of the SAM chip 308.

The application program AP_1 stored in the AP storage area 320_1 is comprised of a plurality of program modules. Access to the AP storage area 320_1 is restricted by the firewall FW_1.

The application program AP_2 stored in the AP storage area 320_2 is comprised of a plurality of program modules. Access to the AP storage area 320_2 is restricted by the firewall FW_2.

The application program AP_3 stored in the AP storage area 320_3 is comprised of a plurality of program modules. Access to the AP storage area 120_3 is restricted by the firewall FW_3.

In the present embodiment, the above program module is the minimum unit downloaded for example from the outside of the SAM unit 309 to the external memory 307. The number of the program modules forming each application program can be freely determined by the corresponding business.

Further, the application programs AP_1, AP_2, and AP_3 stored in the external memory 307 are scrambled. They are descrambled when read into the SAM chip 308.

Further, the application programs AP_1, AP_2, and AP_3 are, for example, produced by the businesses 315_1, 315_2, and 315_3 using the personal computers 316_1, 316_2, and 316_3 shown in FIG. 48 and are downloaded through the SAM chip 308 to the external memory 307.

Access to the AP management storage area 321 is restricted by the firewall FW_4.

Note that the firewalls FW_1, FW_2, FW_3, and FW_4 correspond to the firewalls FW shown in FIG. 49.

The AP management storage area 321 stores the AP management data 330.

The AP management data 330 includes for example the SAM_ID, mutual authentication key information K2 (or mutual authentication master key information K1), and download signature verification key information K_DA, KDVM, and KDVS.

Here, the download signature verification key information K_DVA is key information for verifying the legitimacy of the signature information generated using the download key information K_DA.

The download signature verification key information K_DVM is key information for verifying the legitimacy of the signature information generated using the download key information K_DM.

The download signature verification key information K_DVS is key information for verifying the legitimacy of the signature information generated using the download key information K_DS.

The download signature verification key information is key information used for signature verification performed when downloading that program module through the SAM chip 308 to the external memory 307.

[SAM Chip 308]

Figure 58:
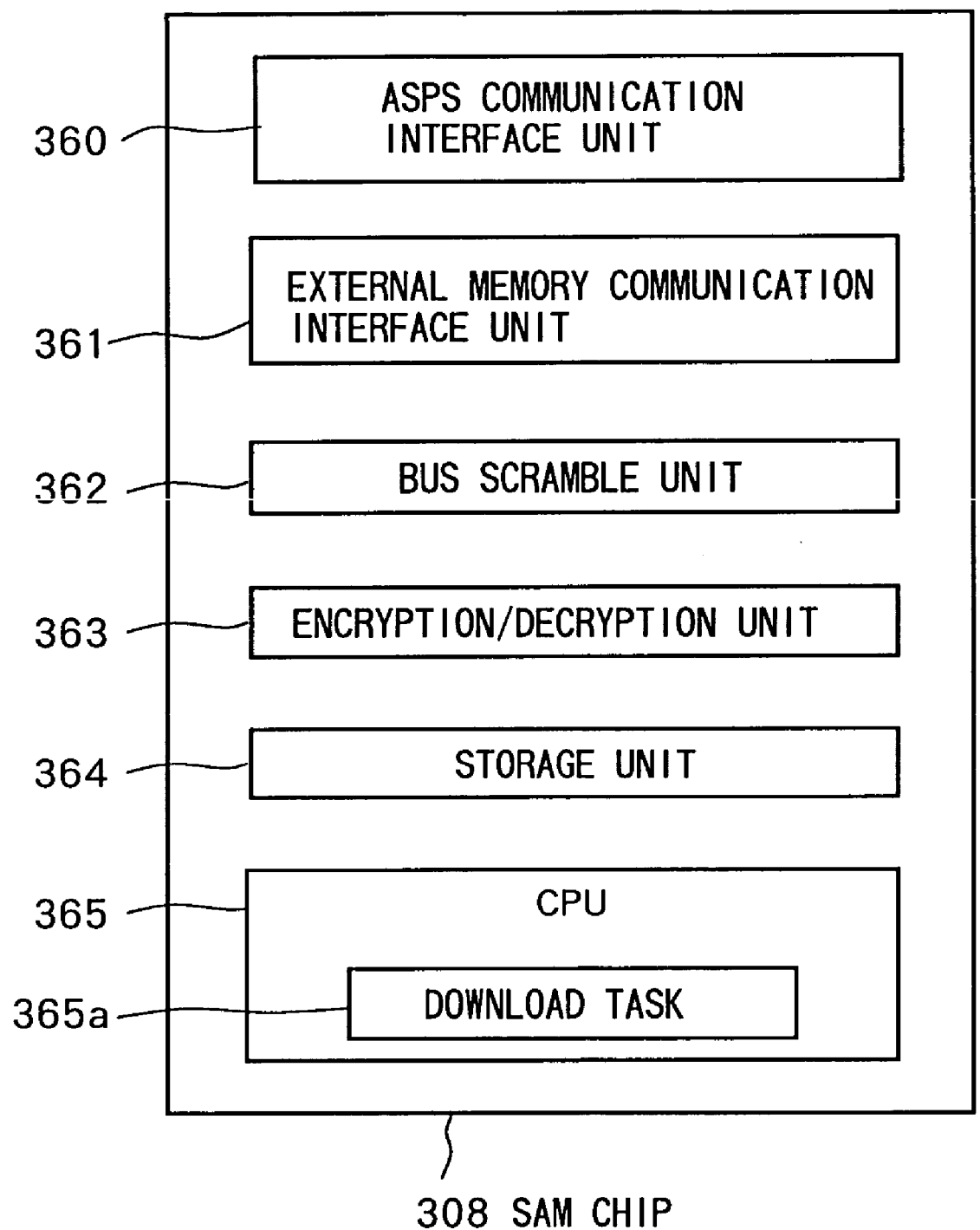
FIG. 58 is a functional block diagram of the SAM chip shown in FIG. 48.

FIG. 58 is a functional block diagram of the SAM chip 308 shown in FIG. 48.

As shown in FIG. 58, the SAM chip 308 has an ASPS communication interface unit 360, external memory communication interface unit 361, bus scramble unit 362, encryption/decryption unit 363, storage unit 364, and CPU 365.

The SAM chip 308 is a tamper-resistant module.

The ASPS communication interface unit 360 is an interface used for input and output of data with the ASP server 306 shown in FIG. 48.

The external memory communication interface unit 361 is an interface used for input and output of data with the external memory 307.

The bus scramble unit 362 scrambles output data and descrambles input data when inputting and outputting data through the external memory communication interface unit 361.

The encryption/decryption unit 363 encrypts data and decrypts encrypted data.

The storage unit 364 stores data used for the processing by the CPU 365.

The CPU 365 executes various processing including execution of an application program by the SAM chip 308 based on a predetermined program (program of the present invention) in the form of tasks etc.

The CPU 365, for example, executes a download task 365a for performing processing for downloading program modules through the Internet 310.

Next, the download operation of program modules by the download task 365a of the CPU 365 will be explained.

Figure 59:
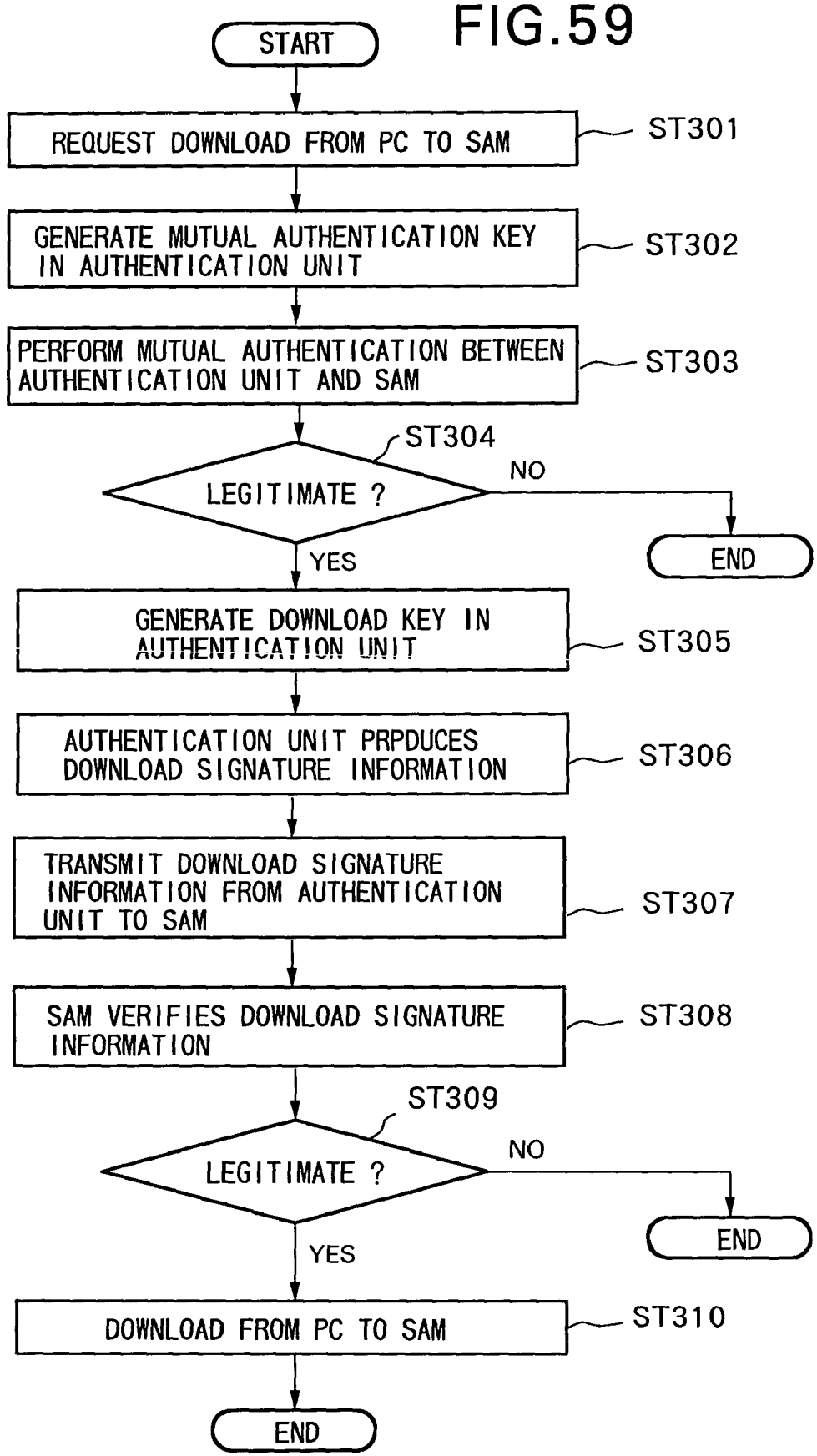
FIG. 59 is a flow chart for explaining the operation for downloading an application program from a personal computer to an external memory shown in FIG. 48.

FIG. 59 is a flow chart for explaining that download operation.

In the following embodiment, the explanation will be given of the operation when a business 315_AP1 downloads program modules of the application program AP_1 shown in FIG. 49 and FIG. 57.

Step ST301:

The personal computer 316_1 shown in FIG. 48 transmits a download request designating the module name of each program module to be downloaded comprising the application program AP_1 through the authentication unit 317_1, Internet 310, ASP server 306, and ICE 318 to the SAM chip 308.

Step ST302:

The mutual authentication unit 352_1 of the processing unit 351_1 of the authentication unit 317_1, as shown in FIG. 51, encrypts the SAM_ID as plain text using the mutual authentication master key information K1 to generate the mutual authentication key information K2.

Step ST303:

The mutual authentication unit 352_1 of the processing unit 351_1 of the authentication unit 317_1 performs mutual authentication with the download task 365a of the CPU 365 of the SAM chip 308 using the mutual authentication key information K2 generated at step ST302.

Step ST304:

When the mutual legitimacy in the mutual authentication of step ST303 is confirmed, the unit proceeds to the processing of step ST305, while when not, it ends the processing.

Step ST305:

The download processing unit 353_1 of the processing unit 351_1 of the authentication unit 317_1 shown in FIG. 50, as shown in FIG. 52, encrypts the SAM_ID as plain text using the access master key information KA to generate the download key information K_DA.

Step ST306:

The download processing unit 353_1 uses the download key information K_DA generated at step ST305 to generate the download signature information.

Step ST307:

The download processing unit 353_1 transmits the download signature information generated at step ST306 to the SAM chip 308.

Step ST308:

The download task 365a of the CPU 365 of the SAM chip 308 shown in FIG. 58 uses the download signature verification key information K_DVA shown in FIG. 57 to judge the legitimacy of the download signature information received at step ST307.

At this time, the download task 365a judges if the download request has been made at the AP layer based on the module names received at step ST301 and specifies the download signature verification key information K_DVA.

Step ST309:

If it is judged at step ST308 that the download signature information is legitimate, the task proceeds to the processing of step ST310, while if not, it ends the processing.

Step ST310:

The download task 365a of the CPU 365 of the SAM chip 308 shown in FIG. 58 specifies the address in the external memory 307 corresponding to a module name designated at step ST301 by viewing the module management data 330 and downloads the program module received from the personal computer 316_1 to that specified address on the external memory 307.

Note that when the software developer 315_MID downloads program modules of the higher handler layer and lower handler layer shown in FIG. 49 to the external memory 307, at step ST305, the download key information K_DM is generated by the routine explained using FIG. 54. Using this, at step ST306, the download signature information is generated. Further, at step ST308, in the SAM chip 308, the download signature verification key information K_DVM shown in FIG. 57 is used to verify the download signature information.

Further, when the software developer 315_SUP downloads a program module of the OS layer shown in FIG. 49 to the external memory 307, at step ST305, the routine explained using FIG. 56 is used to generate the download key information K_DS. Using this, at step ST306, the download signature information is generated. Further, at step ST308, in the SAM chip 308, the download signature verification key information K_DVS shown in FIG. 57 is used to verify the download signature information.

Note that the software developers 315_MID and 315_SUP can use the access master key information KA to download the program module of the AP layer to the external memory 307.

Further, the software developer 315_SUP can use the access master key information KA and KM to download program modules of the higher handler layer and lower handler layer to the external memory 307.

Next, the processing for a transaction using the IC card 303 by the communication system 301 shown in FIG. 48 will be explained.

Figure 60:
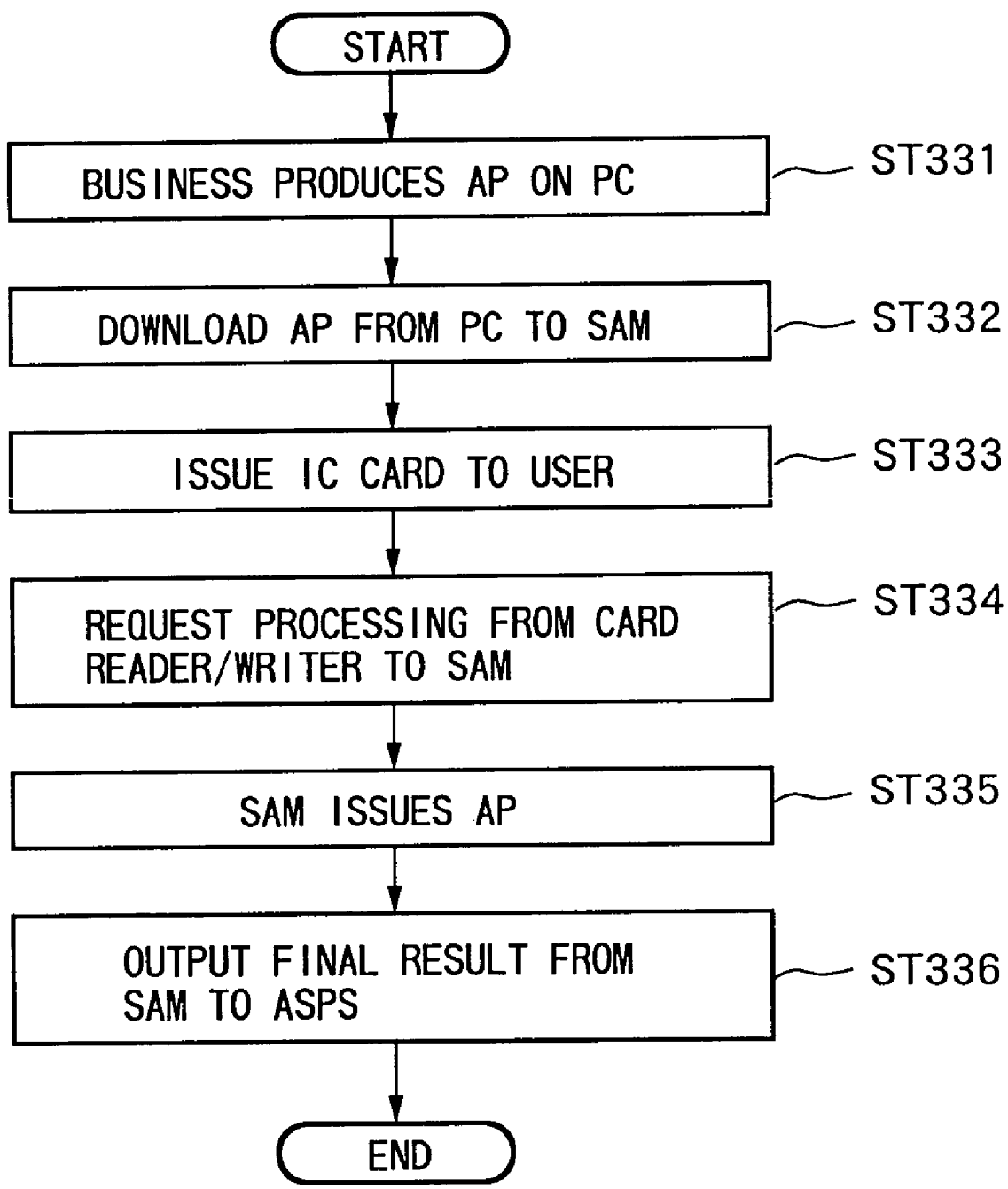
FIG. 60 is a view for explaining processing for a transaction using an IC card of the communication system shown in FIG. 48.

FIG. 60 is a view for explaining the overall operation of the communication system 301 shown in FIG. 48.

Step ST331:

The businesses 315_1 to 315_3 or a part requested by these businesses produce application programs AP_1, AP_2, and AP_3 for those businesses to perform processing for transactions using the IC card 303 on the personal computers 316_1, 316_2, and 316_3 shown in FIG. 48.

At this time, download processing explained using FIG. 59 is performed.

Step ST332:

The application programs AP_1, AP_2, and AP_3 are downloaded through the authentication units 317_1, 317_2, and 317_3 from the personal computers 316_1, 316_2, and 316_3 to the SAM chip 308.

At this time, the processing explained using FIG. 56 is performed.

Step ST333:

The user is issued the IC card 303.

The IC card 303 stores the key information used for transactions with a business which the user has contracted with.

Note that the contract between the user and a business may be concluded after issuance of the IC card 303 through the Internet 310 etc.

Step ST334:

For example, when a user desires to use the personal computer 305 to access the server 302 through the Internet 310 to purchase a product, the server 302 issues a processing request through the Internet 310 to the ASP server 306.

When the ASP server 306 receives a processing request from the server 302, it accesses the personal computer 305 through the Internet 310. Further, the processing request for the IC card 303 issued by the card reader/writer 304 is sent through the personal computer 305, Internet 310, and ASP server 306 to the SAM chip 308.

Step ST335:

The SAM chip 308, in accordance with the processing request received at step ST334, selects an application program by the settlement processing routine task and executes the selected application program.

Step ST336:

The SAM chip 308 outputs the result of execution of the application program to the ASP server 306.

As explained above, according to the communication system 301, by the authentication units 317_1, 317_2, and 317_3 holding the access master key information KA, the authentication unit 317_4 holding the access master key information KM, the authentication unit 317_5 holding the access master key information KS, and, as explained above, performing processing for downloading a program module to the external memory 307, it becomes possible to download a program modules in accordance with rights given in accordance with the software hierarchy shown in FIG. 49. Therefore, it is possible to prevent an unauthorized party from illicitly exchanging or tampering with program modules to be executed by the SAM chip 308.

Further, according to the communication system 301, as explained earlier, the authentication units 317_1, 317_4, and 317_5 store information in a secure state in the storage units 350_1, 350_4, and 350_5. When such a unit is destroyed by an external factor or forced open, this is detected by a detection unit and the stored information in the storage units 350_1, 350_4, and 350_5 is deleted. Therefore, illicit use of the key information used for downloading to the SAM chip 308 can be avoided.

Further, according to the communication system 301, when the SAM chip 308 operates a plurality of application programs, since data transfer or viewing of data and codes between application programs is restricted by the firewalls FW_1, FW_2, and FW_3, illicit interference or tampering with the processing of each application program by another application program can be prevented. Further, it is possible to enhance the secrecy of each application program.

Further, according to the communication system 301, by configuring each application program by a plurality of program modules, it is possible to download to the external memory 307 in program modules units.

Further, according to the communication system 301, by encrypting the highly confidential key information used for operation of the IC card 303 in addition to the usual scrambling and storing it in the external memory 307, it is possible to improve the security level of the key information.

Further, according to the Internet 301, the application program can execute encryption and decryption when accessing codes by the bus scramble function, so it is possible to prevent an application program stored in the external memory 307 from being illicitly analyzed etc. while processing of the SAM chip 308 is halted.

Figure 61:
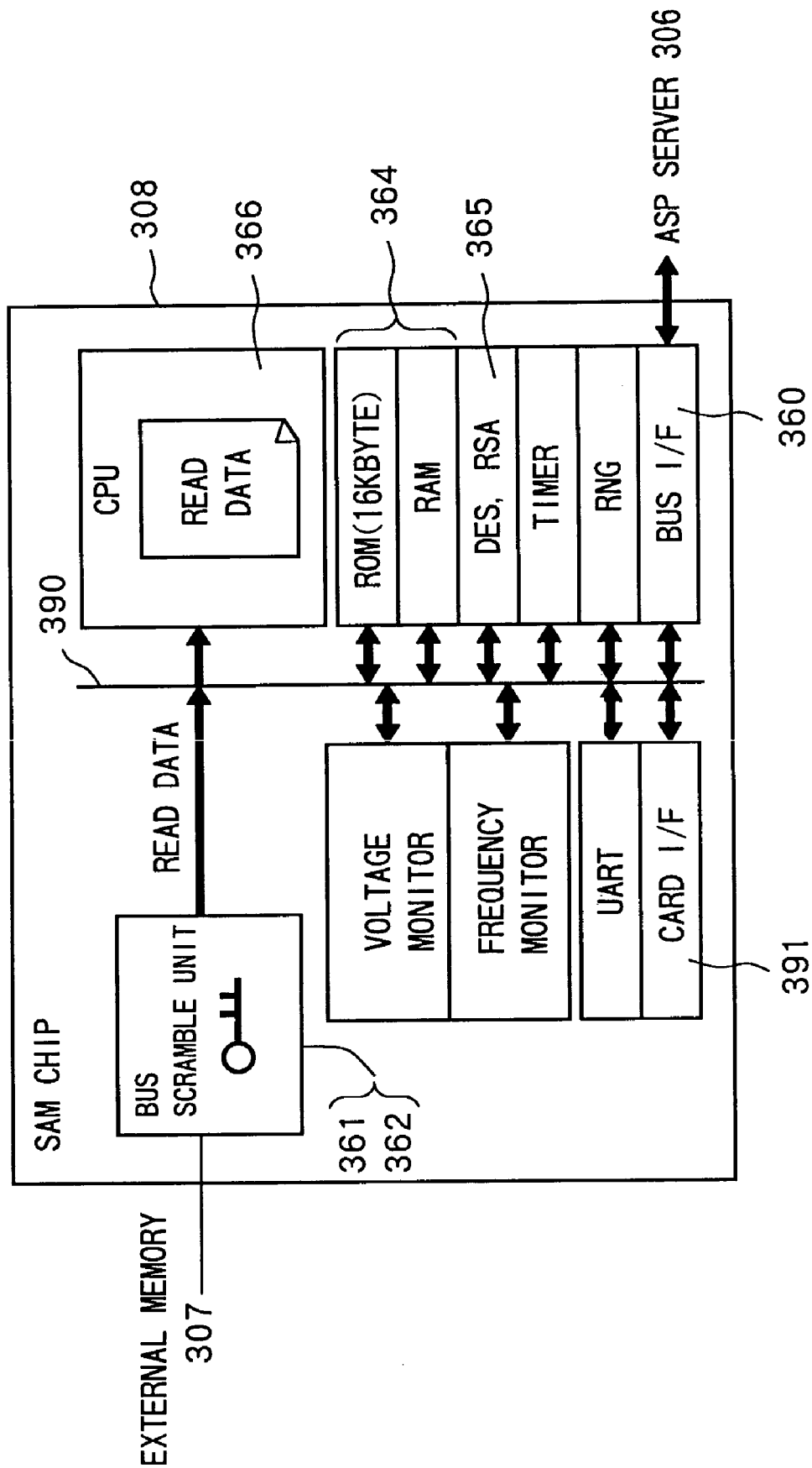
FIG. 61 is a functional block diagram showing more specifically the function blocks of the SAM chip shown in FIG. 58.

FIG. 61 is a functional block diagram showing more specifically the function blocks of the SAM chip 308 shown in FIG. 58.

As shown in FIG. 61, the SAM chip 308 is connected through an internal bus 390 to the ASPS communication interface unit 360, external memory communication interface unit 361, bus scramble unit 362, encryption/decryption unit 365, storage unit 364, and CPU 366.

Figure 62:
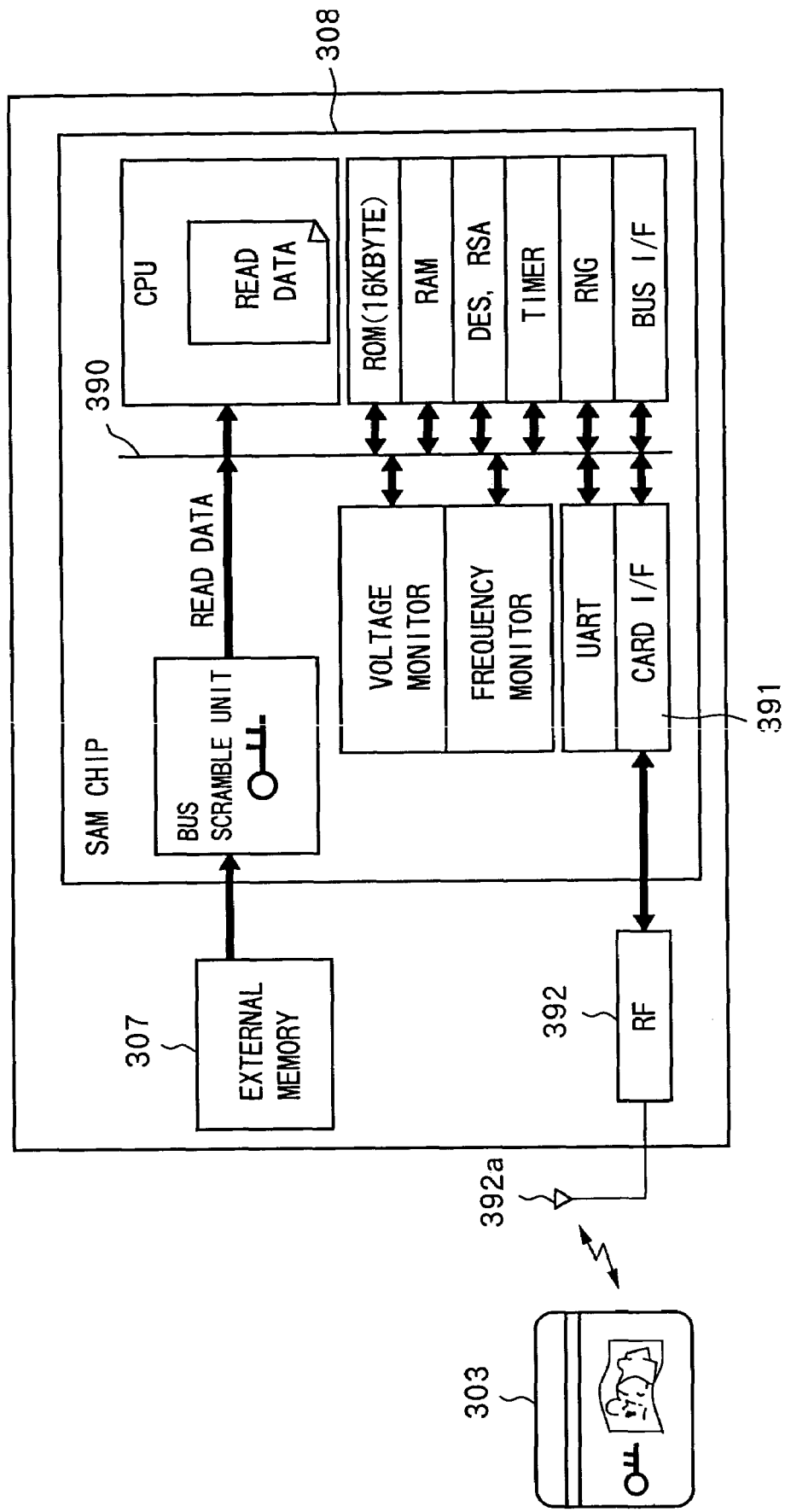
FIG. 62 is a view for explaining another mode of use of the SAM chip.

In the SAM chip 308 shown in FIG. 61, for example as shown in FIG. 62, it is also possible to connect the card I/F unit 391 connected to the internal bus 390 to an RF reception/transmission unit 392 outside of the SAM chip 308 and transfer data with the IF card 303 by a noncontact system through an antenna 392a of the RF reception/transmission unit 392.

The present invention is not limited to the above explained embodiment.

For example, in the above explained embodiment, the case of downloading program modules from the personal computers 316_1 to 316_5 through the SAM chip 308 to the external memory 307 was illustrated, but the present invention can similarly be applied using the function of the above explained download task 365a even when downloading program modules from the personal computers 316_1 to 316_5 to a storage unit 364 in the SAM chip 308.

Figure 63:
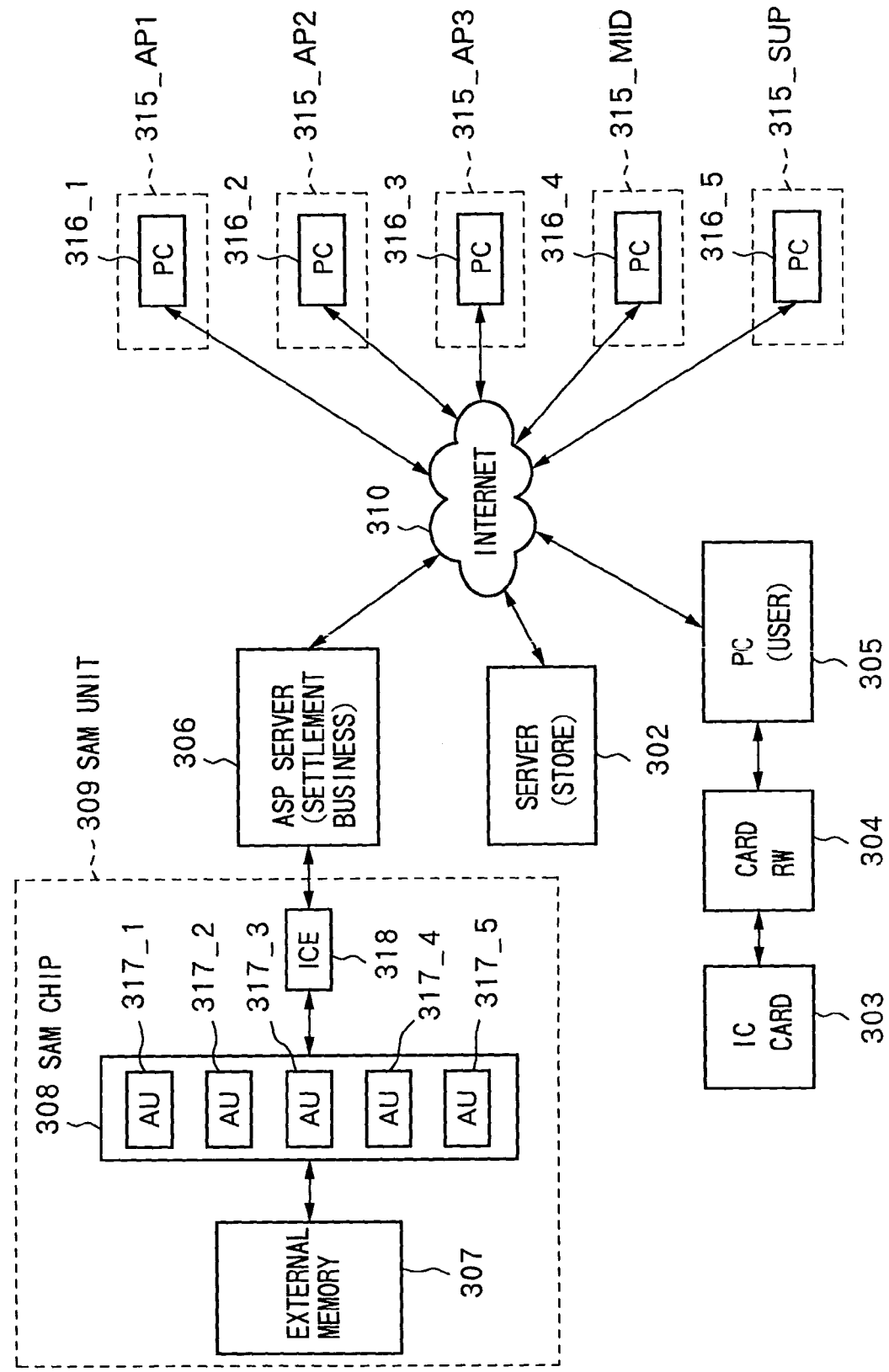
FIG. 63 is a view for explaining a modification of the communication system shown in FIG. 48.

Further, in the above explained embodiment, the case of providing the authentication units 317_1 to 317_5 for the Internet 310 at the personal computer 316_1 to 316_6 side was illustrated, but as shown in FIG. 63, it is also possible to provide the authentication units 317_1 to 317_5 in the SAM chip 308 and allow access to the authentication units 317_1 to 317_5 to the corresponding personal computers 316_1 to 316_5.

Fifth Embodiment

The present embodiment is an embodiment corresponding to the 17th and 18th aspects of the invention.

Figure 64:
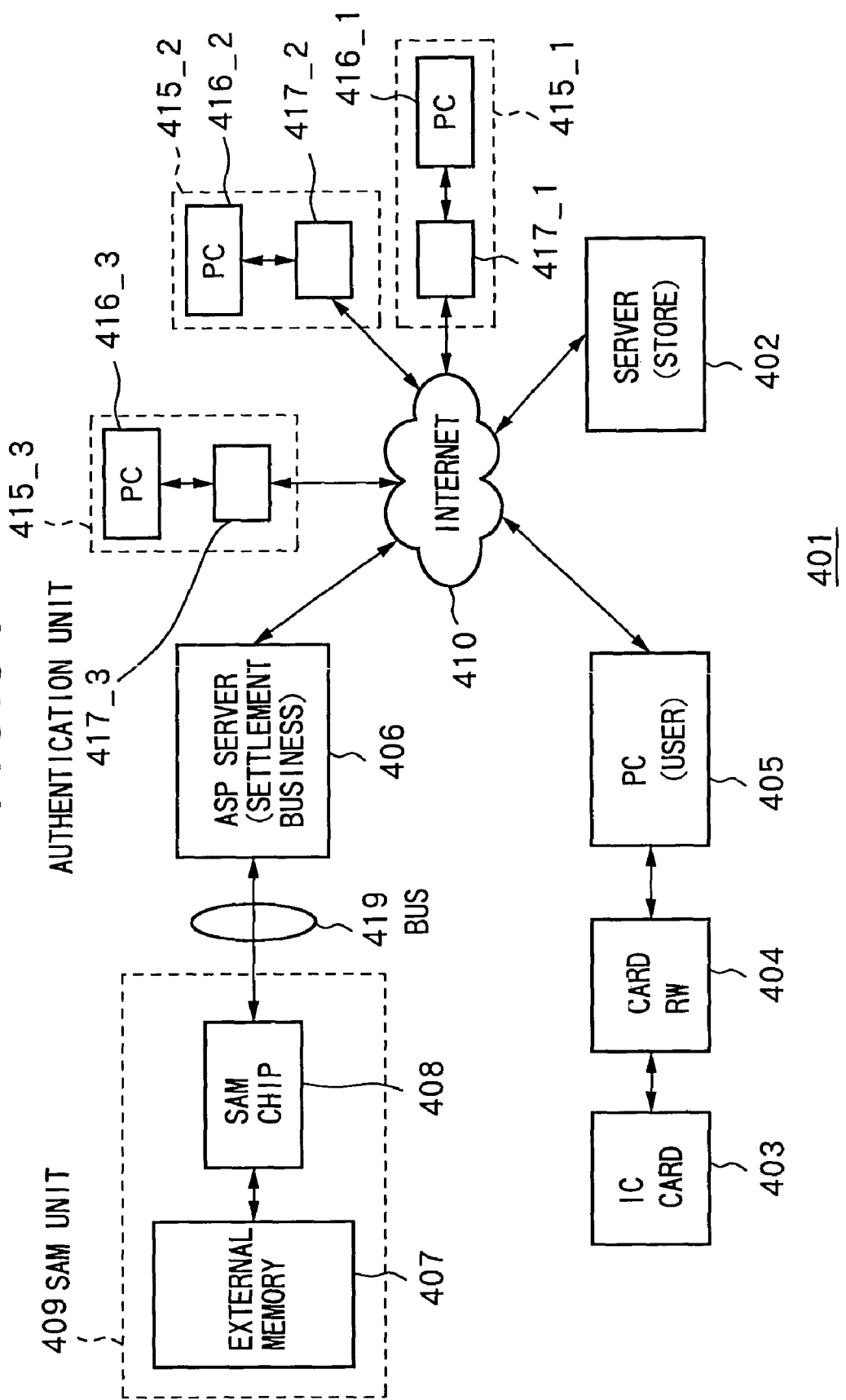
FIG. 64 is a view of the overall configuration of the communication system of an embodiment of the present invention.

FIG. 64 is a view of the overall configuration of the communication system 401 of the present embodiment.

As shown in FIG. 64, the communication system 401 uses the server 402, IC card 403, card reader/writer 404, personal computer 405, ASP (application service provider) server 406, SAM (secure application module) unit 409, personal computers 416_1, 416_2, and 416_3, and authentication units 417_1, 417_2, and 417_3 to communicate through the Internet 410 and perform settlement processing or other processing for a procedure using the IC card 403.

The SAM unit 409 has an external memory 407 and SAM chip 408.

Figure 65:
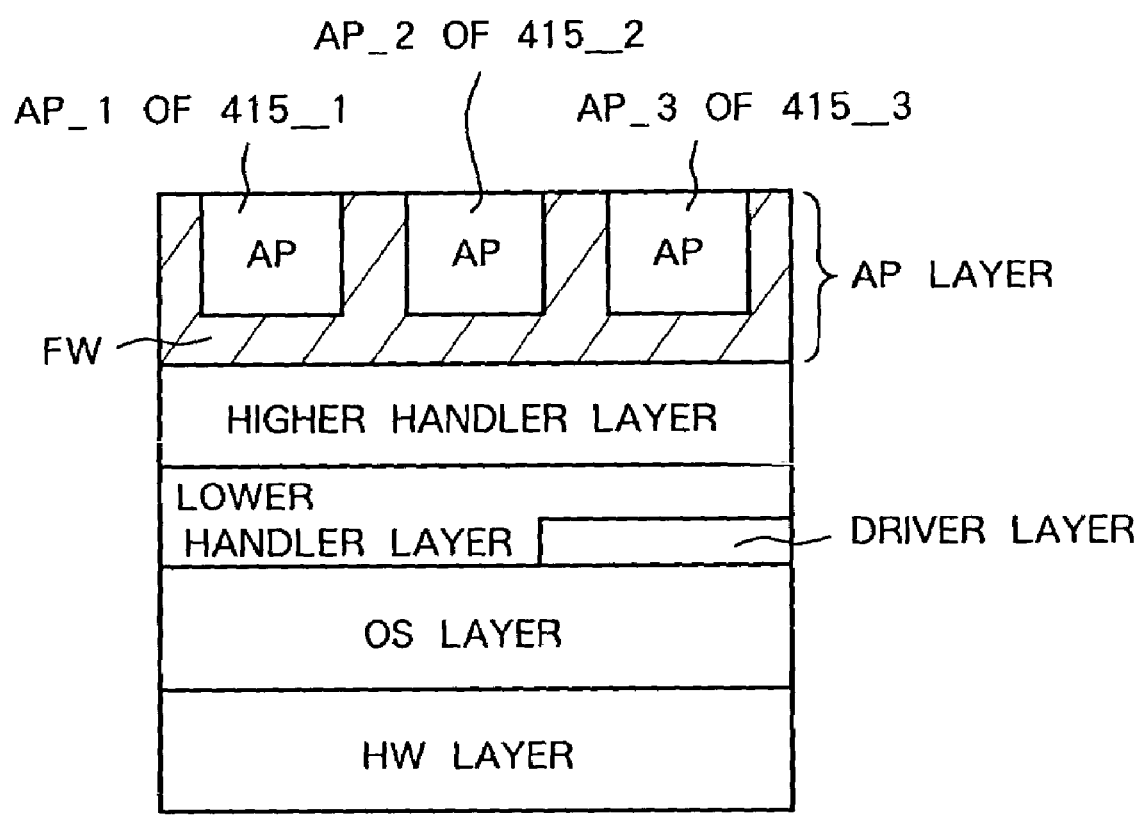
FIG. 65 is a view for explaining the software configuration of the SAM chip shown in FIG. 64.

The SAM chip 408 has a software configuration shown in FIG. 65. As shown in FIG. 65, the SAM chip 408 has, from a bottom layer toward a top layer, an HW (hardware) layer, OS layer, lower handler layer, higher handler layer, and AP layer.

The lower handler layer includes a driver layer.

Here, the AP layer includes application programs AP_1, AP_2, and AP_3 defining procedures for use of the IC card 403 by credit card companies or other businesses 415_1, 415_2, and 415_3 shown in FIG. 64.

In the AP layer, the application programs AP_1, AP_2, and AP_3 and the higher handler layer are provided between them with firewalls FW.

The SAM chip 408 is connected through a bus 419 using a SCSI port, the Ethernet, etc. to the ASP server 406. The ASP server 406 is connected through the Internet 410 to a plurality of terminal apparatuses including a personal computer 405 of the end user and personal computers 416_1, 416_2, and 416_3 of the businesses 415_1, 415_2, and 415_3.

The personal computer 405, for example, is connected through a serial port or USB port to a Dumb type card reader/writer 404. The card reader/writer 404 realizes for example wireless communication corresponding to the physical level with the IC card 403.

Operational commands to the IC card 403 and response packets from the IC card 403 are generated and analyzed at the SAM unit 409 side. Therefore, the card reader/writer 404, personal computer 405, and ASP server 406 interposed between them only act to store the commands or response content in data payload portions and relay the same. They are not involved in encryption or decryption of data, authentication, and other actual operations in the IC card 403.

The businesses 415_1, 415_2, and 415_3 use the personal computers 416_1, 416_2, and 416_3 to produce the application programs AP_1, AP_2, and AP_3 and download the produced application programs through the authentication units 417_1, 417_2, and 417_3 through the SAM chip 408 to preassigned storage areas in the external memory 407.

At this time, since the businesses 415_1, 415_2, and 415_3 have no relation with each other, the storage areas in the external memory 407 where the application programs AP_1, AP_2, and AP_3 can be downloaded are decided in advance and whether one has the right to download to such a storage area is verified by the SAM chip 408.

Further, the transfer and viewing of data among the application programs AP_1, AP_2, and AP_3 are restricted by the firewalls FW.

When downloading the application programs AP_1, AP_2, and AP_3 to the SAM chip 408, the authentication units 417_1, 417_2, and 417_3, as explained later, perform mutual authentication with the SAM chip 408, produce the download signature verification key information, etc.

Next, the SAM unit 409 shown in FIG. 64 will be explained in detail.

External Memory 407

Figure 66:
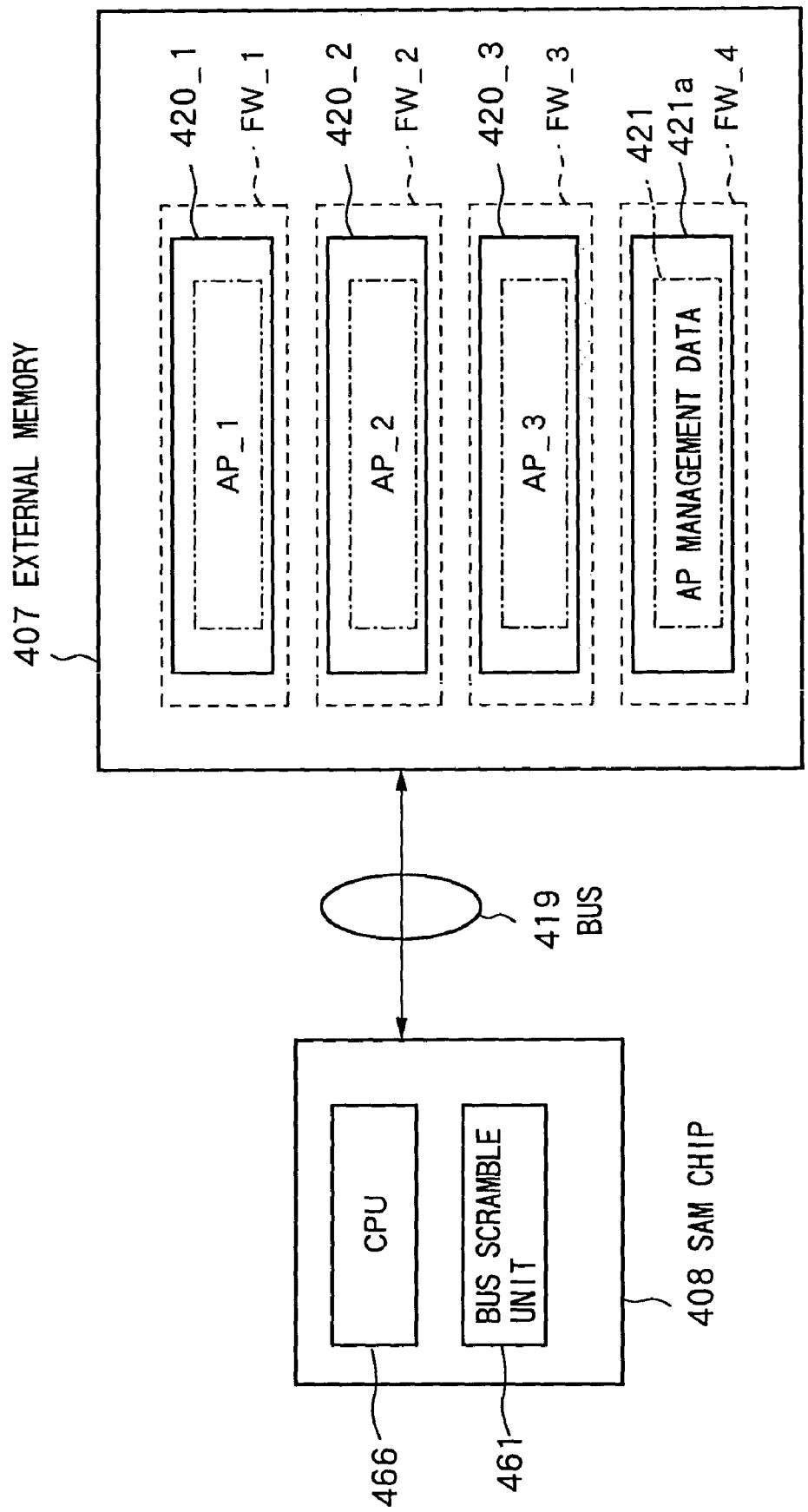
FIG. 66 is a view for explaining the external memory of the SAM unit shown in FIG. 64.

FIG. 66 is a view for explaining the storage areas of the external memory 407.

As shown in FIG. 66, the storage areas of the external memory 407 include an AP storage area 420_1 for storing the application program AP_1 of the business 415_1, an AP storage area 420_2 for storing the application program AP_2 of the business 415_2, an AP storage area 420_3 for storing the application program AP_3 of the business 415_3, and an AP management storage area 421 used by the manager of the SAM chip 408.

The application program AP_1 stored in the AP storage area 420_1 is comprised of a plurality of program modules. Access to the AP storage area 420_1 is restricted by the firewall FW_1.

The application program AP_2 stored in the AP storage area 420_2 is comprised of a plurality of program modules. Access to the AP storage area 420_2 is restricted by the firewall FW_2.

The application program AP_3 stored in the AP storage area 420_3 is comprised of a plurality of program modules. Access to the AP storage area 420_3 is restricted by the firewall FW_3.

In the present embodiment, the above program module is the minimum unit downloaded for example from the outside of the SAM unit 409 to the external memory 407. The number of the program modules forming each application program can be freely determined by the corresponding business.

Further, the application programs AP_1, AP_2, and AP_3 are, for example, produced by the businesses 415_1, 415_2, and 415_3 using the personal computers 416_1, 416_2, and 416_3 shown in FIG. 64 and are downloaded through the SAM chip 408 to the external memory 407.

Access to the AP management storage area 421a is allowed only by the manager of the SAM chip 408 by the firewall FW_4.

Note that the firewalls FW_1, FW_2, FW_3, and FW_4 correspond to the firewalls FW shown in FIG. 65.

The AP management storage area 421 stores the module management data 421 shown in FIG. 66.

Here, the AP management data 421 is used by the SAM chip 408 for managing execution of the application programs AP_1, AP_2, and AP_3.

In the present embodiment, the application programs AP_1, AP_2, and AP_3 and AP management data 421 stored in the external memory 407 are, as explained later, scrambled by the bus scramble unit 461 in the SAM chip 408 using the scramble key K. When read into the SAM chip 408, they are descrambled using the scramble key K.

SAM Chip 408

Figure 67:
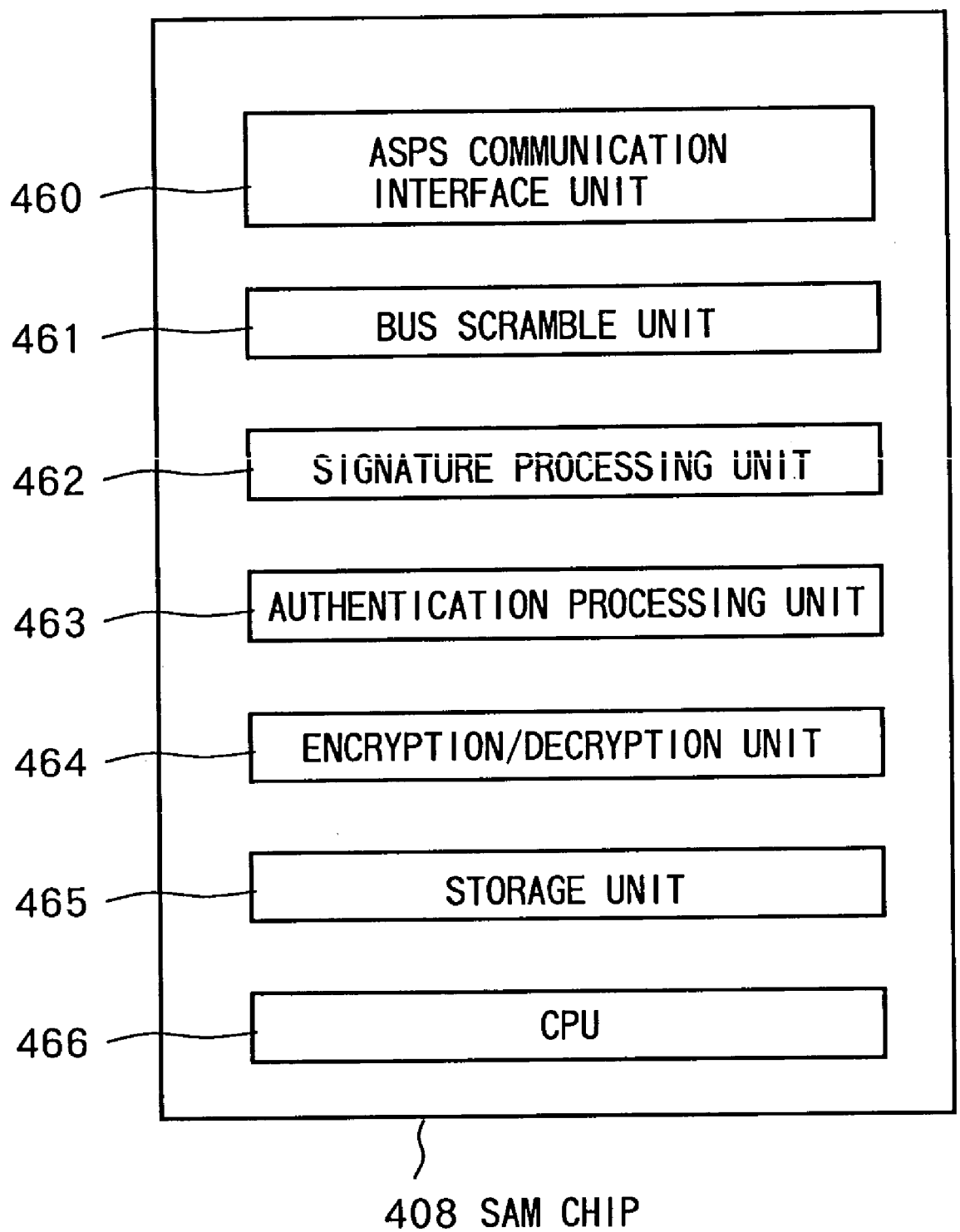
FIG. 67 is a functional block diagram of the SAM chip shown in FIG. 64.

FIG. 67 is a functional block diagram of the SAM chip 408 shown in FIG. 64.

As shown in FIG. 67, the SAM chip 408 has an ASPS communication interface unit 460, bus scramble unit 461, signature processing unit 462, authentication processing unit 463, encryption/decryption unit 464, storage unit 465, and CPU 466.

The SAM chip 408 is a tamper-resistant module.

Here, the CPU 466 corresponds to the data processing circuit of the present invention, while the bus scramble unit 461 corresponds to the data input/output circuit of the present invention.

Further, the SAM chip 408 corresponds to the semiconductor circuit of the present invention, while the external memory 407 corresponds to the semiconductor storage circuit of the present invention.

The ASPS communication interface unit 460 is an interface used for input and output of data with the ASP server 406 shown in FIG. 64.

The bus scramble unit 461 scrambles data to be written in the external memory 407 and descrambles data read from the external memory 407.

That is, the external memory 407 stores data in a scrambled state.

The processing of the bus scramble unit 461 will be explained in detail later.

The signature processing unit 462, as explained later, produces a signature and verifies a signature when downloading an application program through the Internet 410 and when executing an application program.

The authentication processing unit 463 as explained later performs mutual authentication with the other party when downloading an application program through the Internet 410 to the external memory 407.

The encryption/decryption unit 464 encrypts data and decrypts encrypted data.

The storage unit 465 for example stores the data necessary for the processing of the CPU 466.

The CPU 466 executes the application programs AP_1, AP_2, and AP_3 while accessing the external memory 407 through the bus scramble unit 461 and performs various processing corresponding to the services of the SAM chip 408.

Next, the processing of the bus scramble unit 461 will be explained in detail.

Note that, in the present embodiment, the case of use of the bus scramble unit 461 when accessing the external memory 407 is illustrated, but the bus scramble unit 461 can also be applied in the case of inputting and outputting data with the outside by another SAM chip 408 through an I/O bus etc.

The bus scramble unit 461 encrypts the data input from the CPU 466 using a predetermined scramble key K, then writes it through the bus 419 in the external memory 407.

Further, the bus scramble unit 461 decrypts the data read through the bus 419 from the external memory 407 using the scramble key K and outputs it to the CPU 466.

[Address Space]

The encryption block length of the encryption algorithm used by the bus scramble unit 461 is made Nc, while the data bus width of the bus 419 is made Nb. In the following example, consider the case where Nc is a whole multiple of Nb, that is, a whole number n (=Nc/Nb).

Note that the address space of the CPU 466 (address space in SAM chip 408) and the address space used when the bus scramble unit 461 accesses the external memory 407 (hereinafter also referred to as the "external memory address space") differ due to the addition of parity and scrambling of the address.

Figure 68:
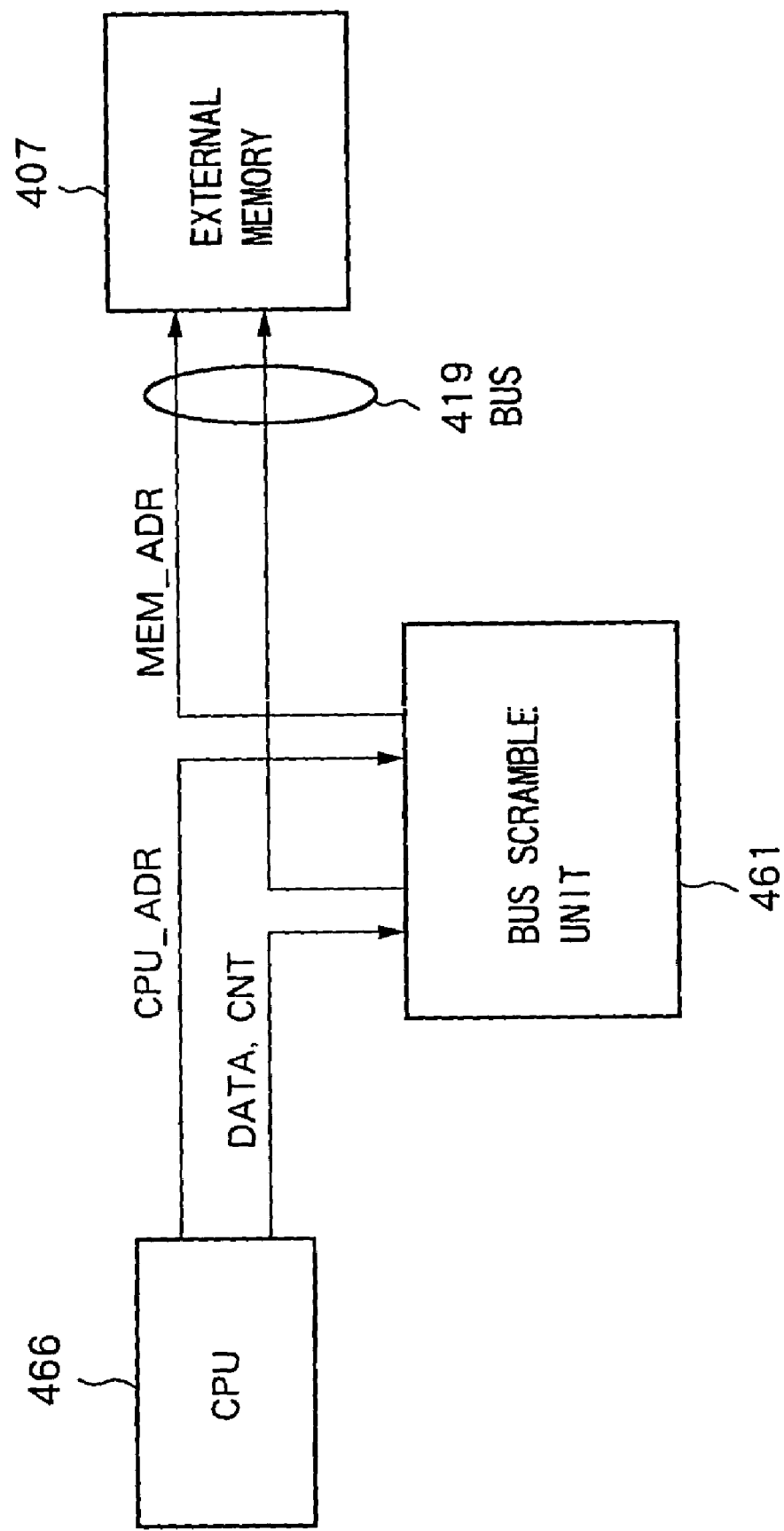
FIG. 68 is a view for explaining the relation between the CPU, bus scramble unit, and external memory shown in FIG. 66.

Therefore, the bus scramble unit 461, as shown in FIG. 68, converts an address CPU_ADR input from the CPU 466 (first address of the present invention) to an address MEM_ADR of the external memory address space (second address of the present invention) using a predefined map f (address conversion algorithm). The bus scramble unit 461 uses the address MEM_ADR to access the external memory 407.

Figure 69:
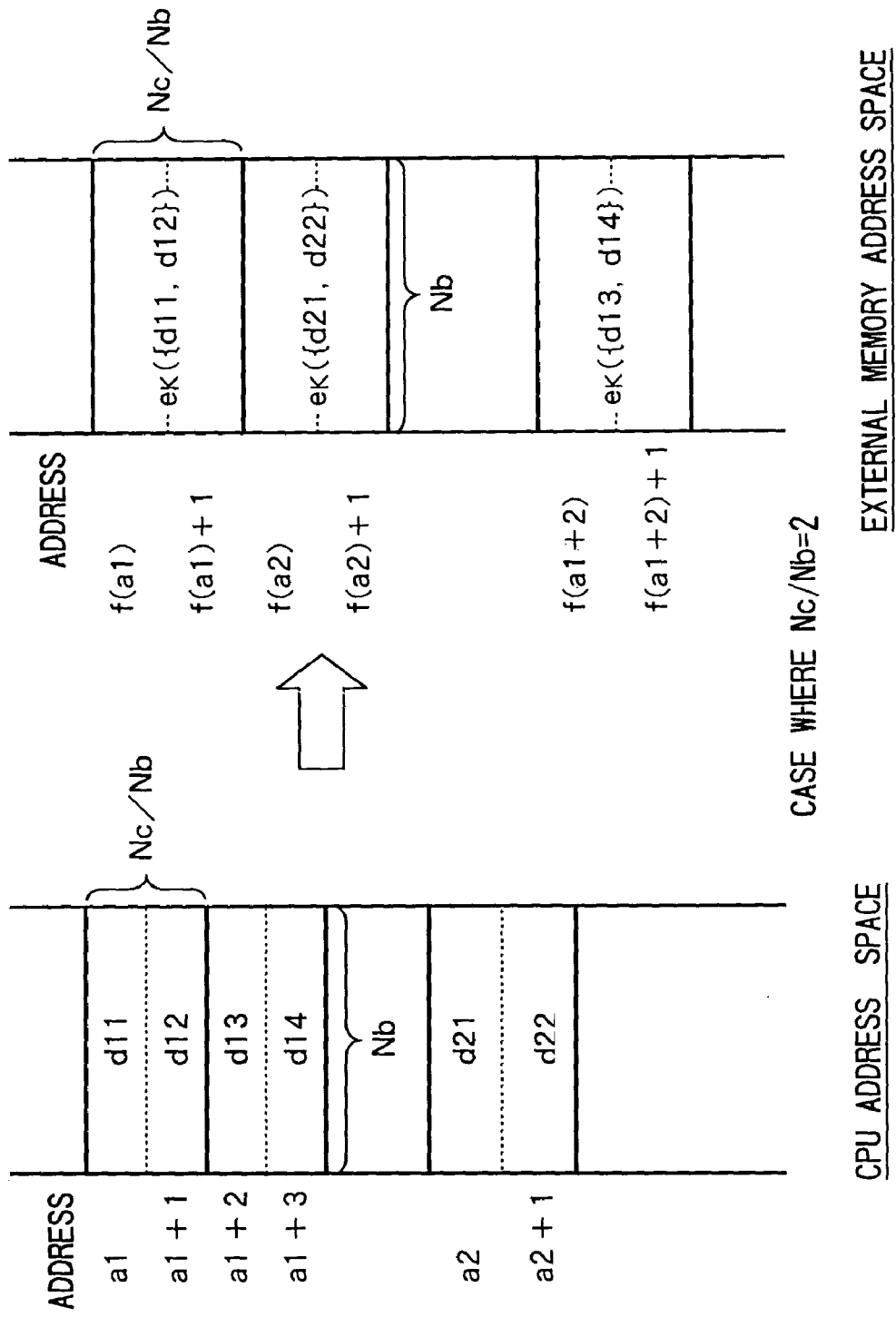
FIG. 69 is a view for explaining the address space between the CPU and external memory shown in FIG. 68.

This map f, for example, as shown in FIG. 69, is defined only when the address a1, which is an address CPU_ADR, is "a1 mod Nc/Nb=0". For the other address a2, the external memory 407 is accessed by f (a2−(a2 mod Nc/Nb)).

Here, "x mod y" is the remainder after dividing x by y.

That is, the bus scramble unit 461 reads and writes data with the external memory 407 in units of the encryption block length Nc.

Here, when Nc/Nb=n and the smallest whole number of n or more is m, the bus scramble unit 461 performs transactions accessing the external memory 407 through the bus 419 (data input/output transactions of the present invention) in units of m number of transactions.

[Configuration of Bus Scramble Unit 461]

Figure 70:
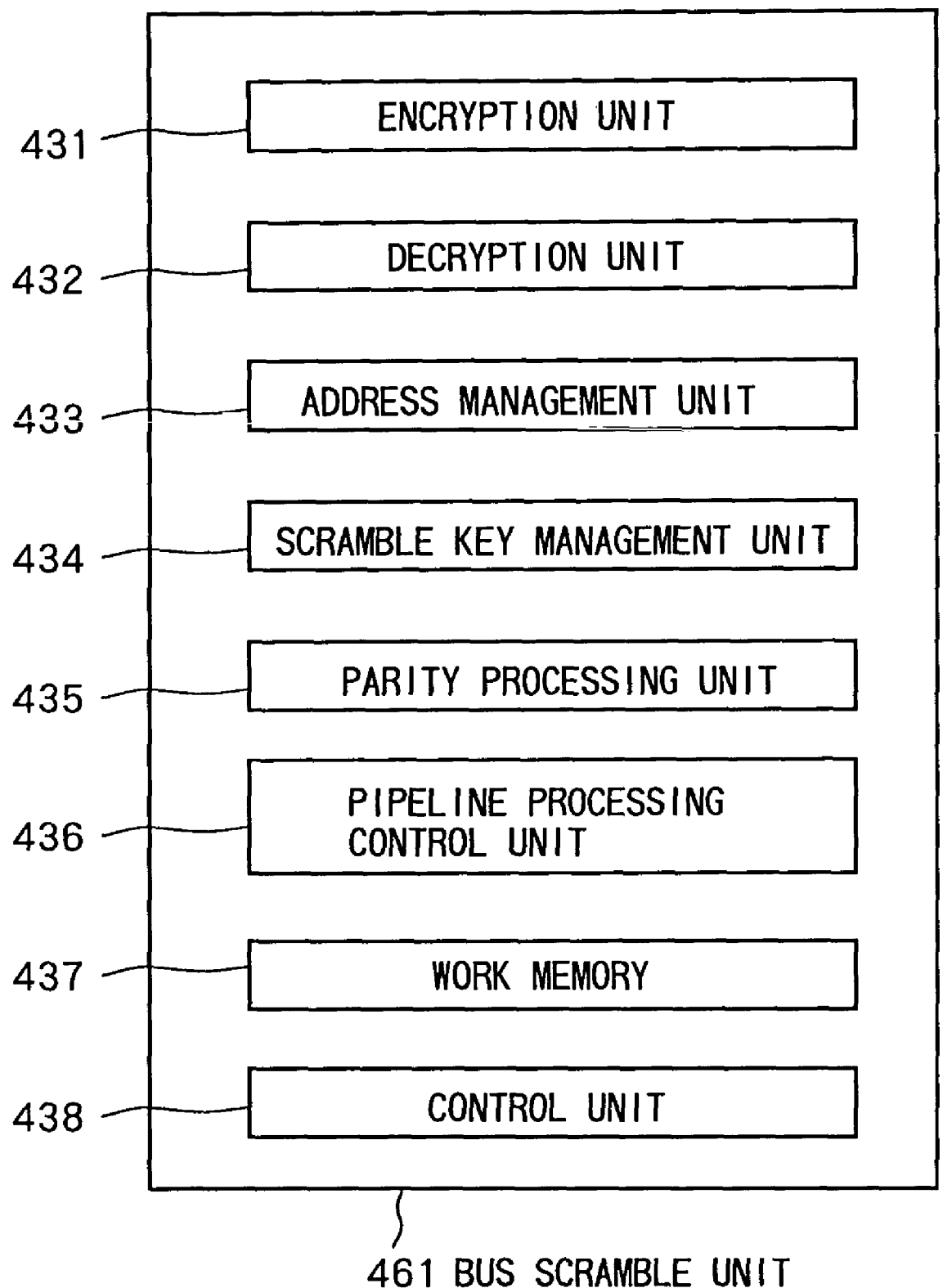
FIG. 70 is a functional block diagram of the bus scramble unit shown in FIG. 67.

FIG. 70 is a functional block diagram of the bus scramble unit 461.

As shown in FIG. 70, the bus scramble unit 461 has an encryption unit 431, decryption unit 432, address management unit 433, scramble key management unit 434, parity processing unit 435, pipeline processing control unit 436, work memory 437, and control unit 438.

The encryption unit 431 encrypts data input from the CPU 466 using a predetermined scramble key K.

The decryption unit 432 decrypts data read from the external memory 407 using the predetermined scramble key K.

The address management unit 433 converts the address CPU_ADR input from the CPU 466 to the address MEM_ADR explained above.

The scramble key management unit 434 manages the scramble key K used at the encryption unit 431 and decryption unit 432 and suitably switches the scramble key K.

The parity processing unit 435 adds parity data to the data to be written in the external memory 407 and verifies the parity data added to data read from the external memory 407.

The pipeline processing control unit 436 divides the processing of the bus scramble unit 461 into a plurality of stages and controls the system so that the pipeline processing is performed in units of stages.

The work memory 437 is used for the processing of the bus scramble unit 461.

The control unit 438 comprehensively controls the processing of the bus scramble unit 461.

[Write Operation to External Memory 407]

Figure 71:
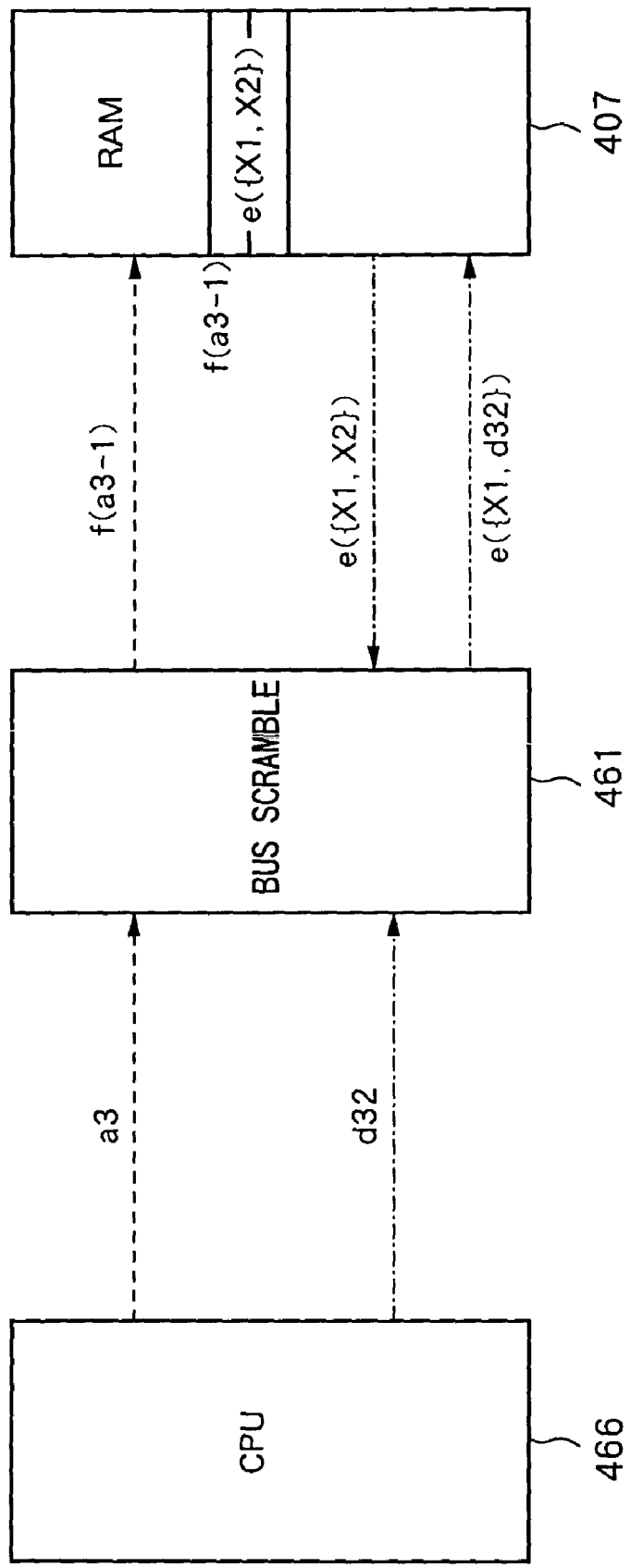
FIG. 71 is a view for explaining a write operation of the external memory by the bus scramble unit shown in FIG. 67.

FIG. 71 is a view for explaining the operation of the bus scramble unit 461 when the CPU 466 shown in FIG. 67 writes data in the external memory 407.

Figure 72:
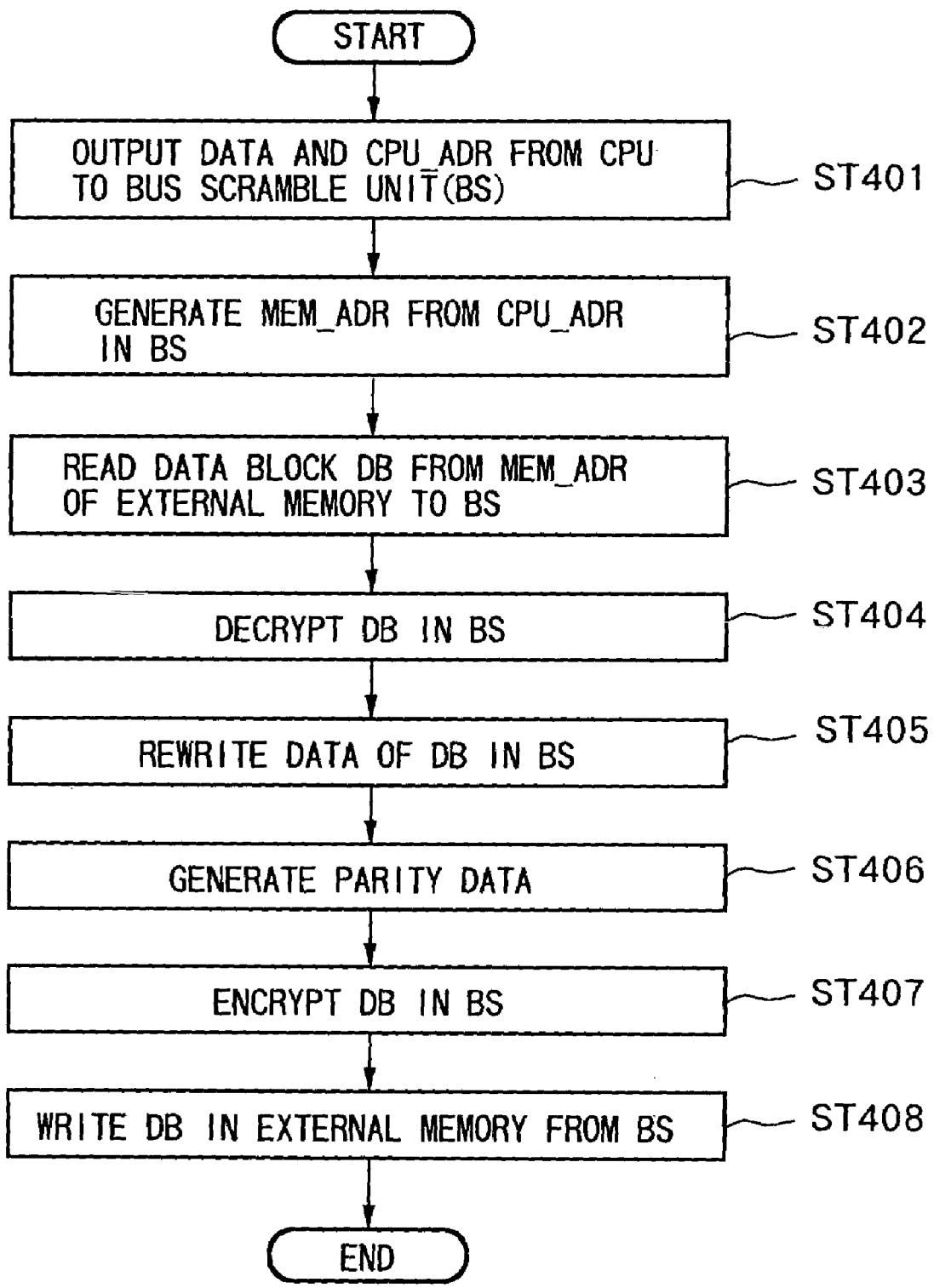
FIG. 72 is a flow chart of the operation shown in FIG. 71.

FIG. 72 is a flow chart for explaining the operation shown in FIG. 71.

Step ST401:

The CPU 466 outputs to the bus scramble unit 461 the data DATA to be written, that is, "d32", and the address CPU_ADR, that is, "a3".

That data "d32" is written in the work memory 437 shown in FIG. 70 of the bus scramble unit 461.

Step ST402:

When Nc>Nb, the address management unit 433 shown in FIG. 70 uses the address "a3" to find the map f (a3−(a3 mod Nc/Nb)), that is, the map f (a3−1) and uses that map f (a3−1) as the address MEM_ADR of the external memory address space.

Step ST403:

The control unit 438 shown in FIG. 70 uses the address MEM_ADR f (a3−1) obtained at step ST402 to read from the external memory 407 the encrypted data block e ({X1, X2}) and writes this in the work memory 437.

Step ST404:

The decryption unit 432 shown in FIG. 70 decrypts the data block e ({X1, X2}) read from the work memory 437 to generate the data block {X1, X2}. Further, the parity processing unit 435 uses the parity data added to the data block e ({X1, X2}) for parity processing, then writes the data block {X1, X2} again in the work memory 437.

Step ST405:

The control unit 438 rewrites the "X2" corresponding to the address "a3" in the data block {X1, X2} corresponding to the address read from the work memory 437 and already decrypted to the write data "d32" to generate the data block {X1, d32} and writes this in the work memory 437.

Step ST406:

The parity processing unit 435 generates the parity data of the data block {X1, d32}.

Step ST407:

The encryption unit 431 encrypts the data block {X1, d32} read from the work memory 437 using the scramble key K.

Step ST408:

The control unit 438 writes the data block {X1, d32} at the address MEM_ADR f (a3−1) of the external memory 407 and writes parity data generated at step ST406 in a predetermined area of the external memory 407.

Note that the control unit 438 judges if the address next input from the CPU 466 is "a3−1" before encrypting the data block at step ST407. If "a3−1", it rewrites the data block X1 by the write data, then encrypts it and writes it in the external memory 407.

Due to this, it is possible to reduce the number of steps in the case of writing to successive addresses.

Further, even when writing data of a data length Nb in the external memory 407, the control unit 438, for example, pads data by the data of (Nc-Nb) to obtain data of the data length Nc, then encrypts it and writes it in the external memory 407.

That is, a storage area of a data length Nc in the external memory 407 is assigned even to data of a data length Nb.

[Read From External Memory 407]

Figure 73:
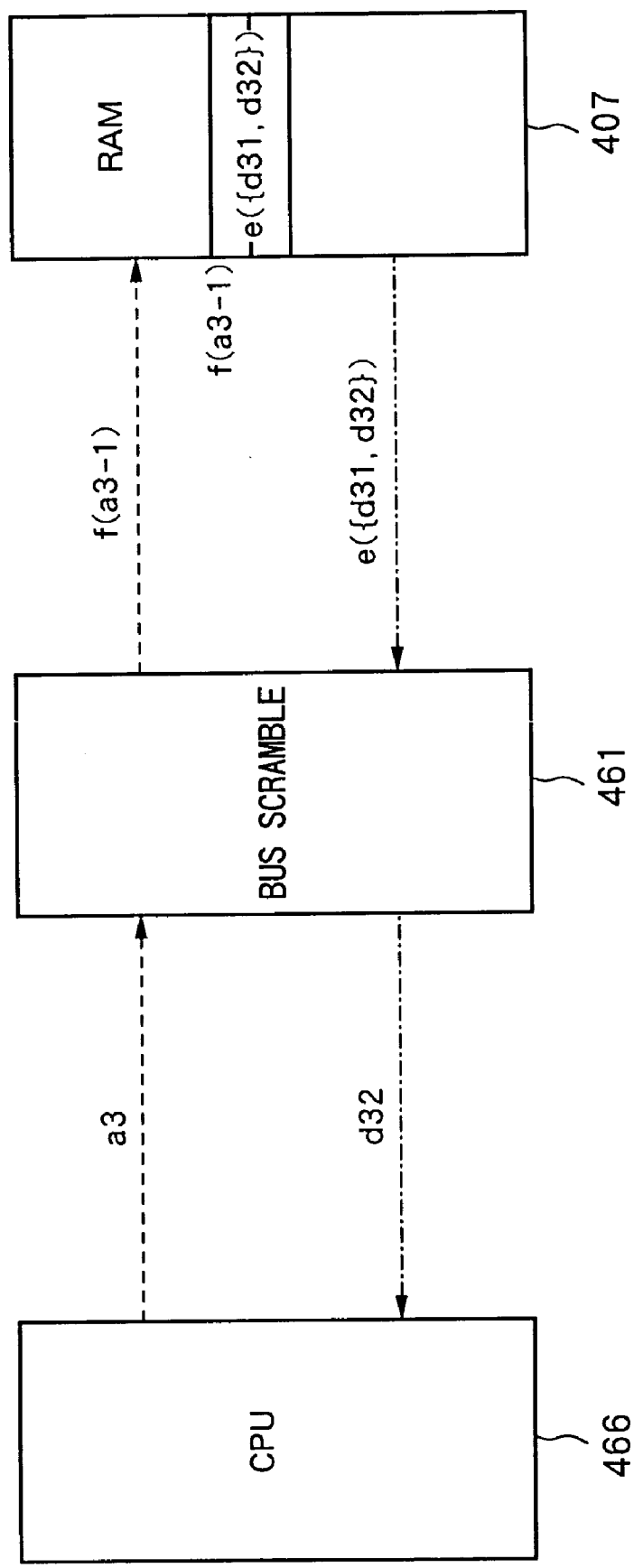
FIG. 73 is a view for explaining a read operation of the external memory by the bus scramble unit shown in FIG. 67.

FIG. 73 is a view for explaining a read operation from the external memory 407 to the bus scramble unit 461.

Figure 74:
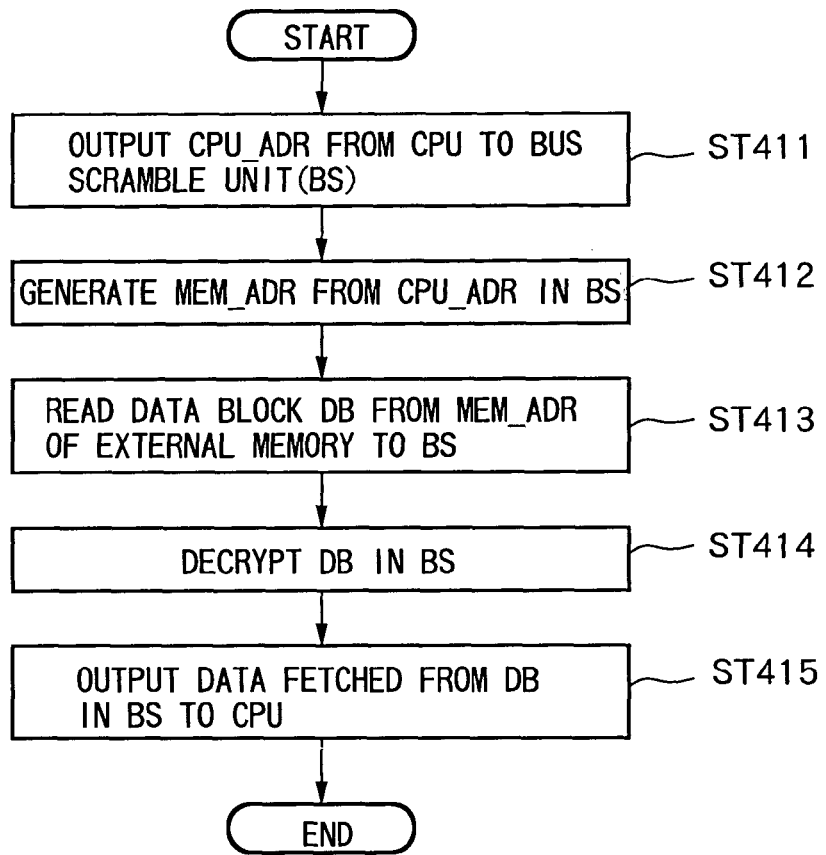
FIG. 74 is a flow chart of the operation shown in FIG. 73.

FIG. 74 is a flow chart for explaining that read operation.

Step ST411:

The CPU 466 outputs to the bus scramble unit 461 the address CPU_ADR "a3" to be read from.

Step ST412:

When Nc>Nb, the address management unit 433 shown in FIG. 70 uses the address "a3" to find the map f (a3−(a3 mod Nc/Nb)), that is, the map f (a3−1), and uses that map f (a3−1) as the address MEM_ADR of the external memory address space.

Step ST413:

The CPU 466 shown in FIG. 67 uses the address MEM_ADR f (a3−1) obtained at step ST402 to read the encrypted (scrambled) data block e ({d31, d32}) from the external memory 407 and writes this in the work memory 437.

Step ST414:

The decryption unit 432 shown in FIG. 70 decrypts the data block e ({d31, d32}) read from the work memory 437 to generate {d31, d32}. Further, the parity processing unit 435 uses the parity data added to the data block e ({d31, d32}) for parity processing, then writes the data block {d31, d32} again in the work memory 437.

Step ST415:

The control unit 438 fetches the data "d32" corresponding to the CPU_ADR "a3" in the data block {d31, d32} read from the work memory 437 and already decrypted and outputs the same to the CPU 466.

That is, it fetches the "(a3 mod Nc/Nb)+1" th data in the data block and outputs it to the CPU 466.

[Management of Scramble Key]

The scramble key management unit 434 shown in FIG. 70 manages a scramble key used in the encryption unit 431 and decryption unit 432 as follows.

The scramble key management unit 434 may use a different key for every address in the external memory 407. Therefore, it is necessary to hold a plurality of scramble keys. One example of the method for this is shown below.

Figure 75:
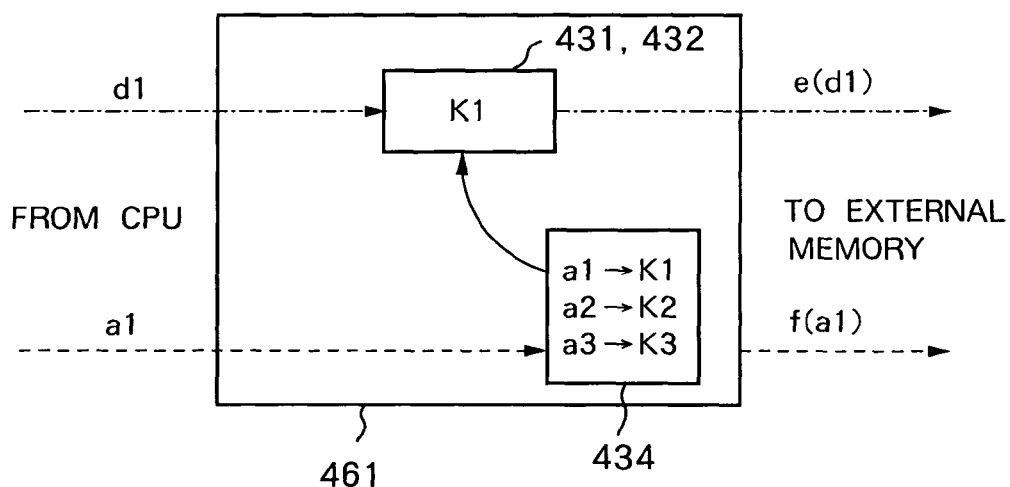
FIG. 75 is a view for explaining switch processing of a scramble key in a scramble key management unit shown in FIG. 70.

The scramble key management unit 434, as shown in FIG. 75, stores a plurality of scramble keys K1, K2, and K3. It switches the key used according to the address from the CPU 466 and outputs the same to the encryption unit 431 and decryption unit 432.

Specifically, when accessing the address "a1", it uses the scramble key K1, when accessing the address "a2", it uses the scramble key K2, and when accessing the address "a3", it uses the scramble key K3.

Figure 76:
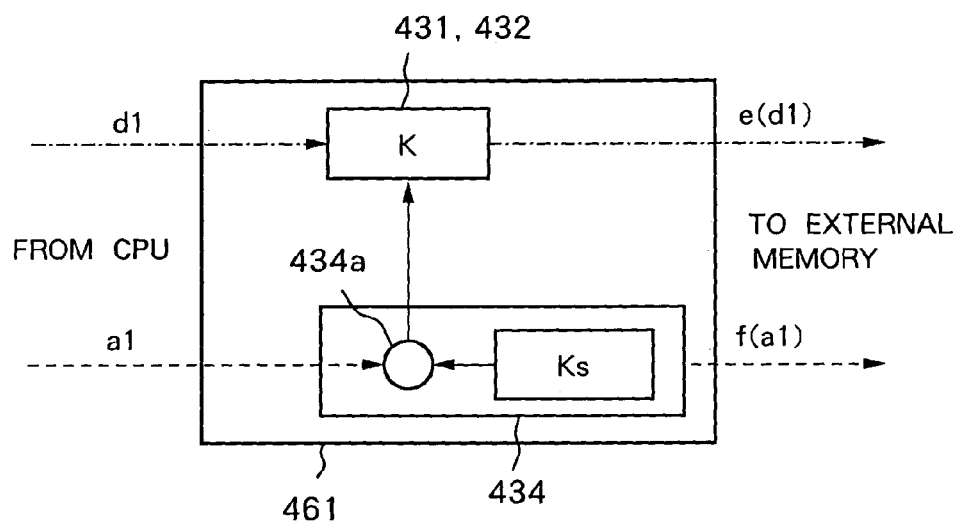
FIG. 76 is a view for explaining switch processing of a scramble key in a scramble key management unit shown in FIG. 70.

Further, as shown in FIG. 76, the computation circuit 434a in the scramble key management unit 434 performs processing using the key Ks forming the class and the address input from the CPU 466 and outputs the computation result as the scramble key K to the encryption unit 431 and decryption unit 432.

That computation may include encryption or decryption of a padding address number by Ks, finding the exclusive OR (XOR), or other computation.

Further, the bus scramble unit 461 may hold the scramble keys at a predetermined location of the bus and input the scramble key corresponding to the address issued by the CPU 466 through that bus. In this case, since the data bus for transmitting the scramble key is the same as the bus of the bus scrambler, control by a memory controller becomes necessary. The location for holding the scramble keys may be anywhere inside or outside of the SAM chip 408, but if outside of the chip, to ensure the security of the path to the chip, the key is encrypted by a transport key and decrypted at the time of arrival at the bus scramble unit 461. The bus scramble unit 461 holds the transport key in the form of hardware or software.

In the bus scramble unit 461, however, even if changing the scramble key for each address input from the CPU 466, if continually accessing a certain address, the possibility rises of the scrambling of the address area being analyzed by spending some time. Therefore, the scramble key is not a constant one. It is made variable by a technique as shown below for example.

The scramble key management unit 434, for example, causes the generation of a random number when powering up the SAM chip 408 or the like so as to generate a scramble key. The scramble key basically need only be known by the bus scrambler, so the problems of delivery of the key, synchronization, etc. do not arise.

Further, the scramble key management unit 434 switches the scramble key used for every access to the external memory 407. In this case, it is necessary that the key for encrypting data already in the external memory 407 and the currently held key not be the same.

Figure 77:
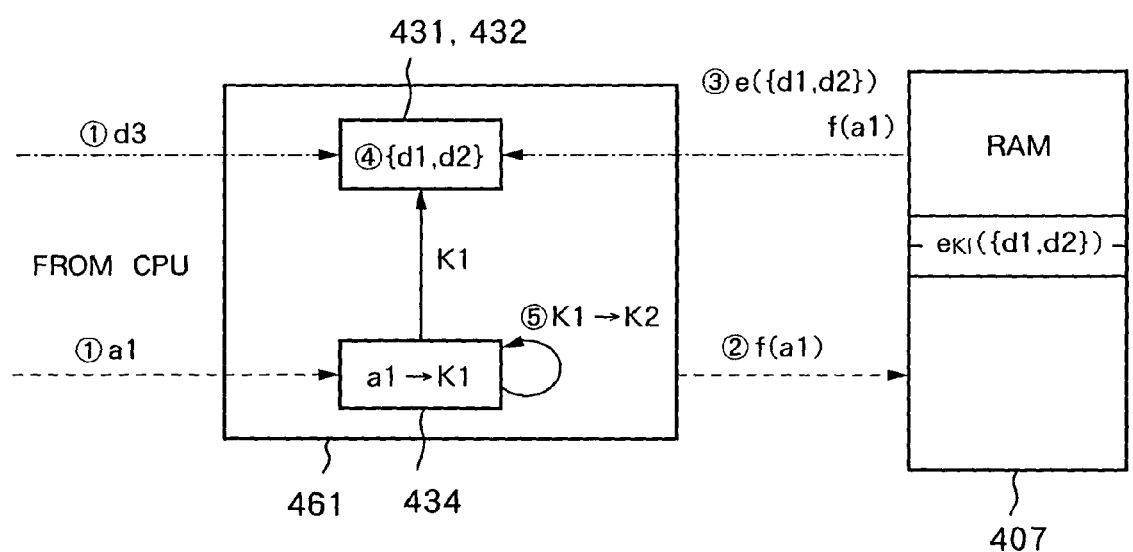
FIG. 77 is a view for explaining switch timing of a scramble key in the scramble key management unit shown in FIG. 70.
Figure 78:
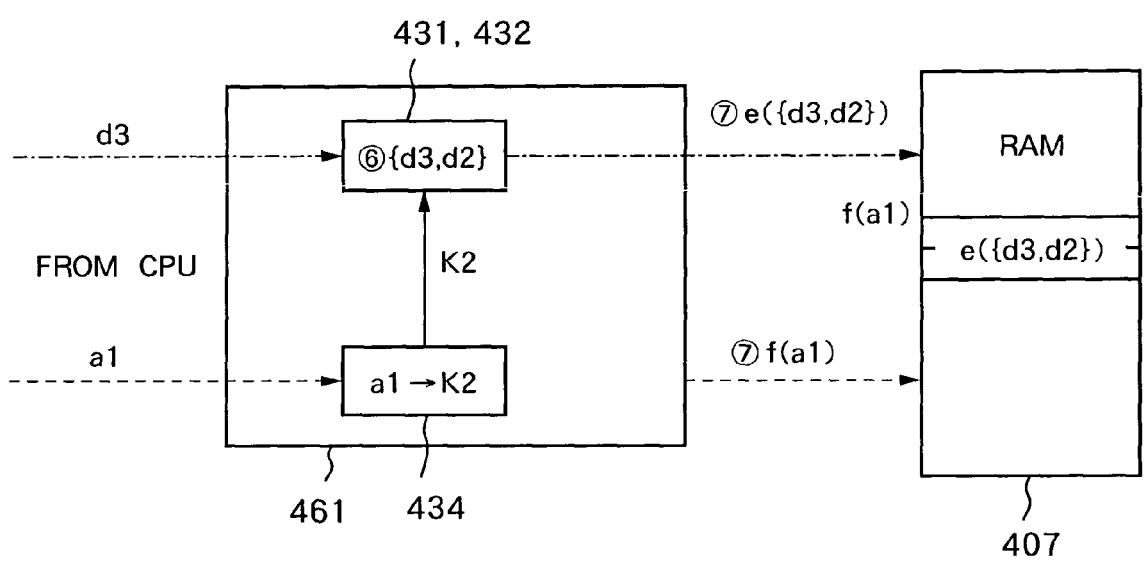
FIG. 78 is a view for explaining switch timing of a scramble key in the scramble key management unit shown in FIG. 70.

Therefore, for example, the scramble key is updated as shown in FIG. 77 and FIG. 78.

[1]: The encryption unit 431 inputs the data "d3" from the CPU 466, while the bus scramble unit 461 inputs the address "a1" from the CPU 466.

[2]: The bus scramble unit 461 accesses the address "f (a1)" of the external memory 407.

[3]: The data "e ({d1, d2})" is read from the address "f (a1)" of the external memory 407 to the decryption unit 432.

[4]: The decryption unit 432 decrypts the data "e ({d1, d2})" to generate the data "(d1, d2)".

At this time, the scramble key management unit 434 selects the scramble key K1, while the decryption unit 432 performs decryption using the scramble key K1.

Further, rewriting is performed by the data "d3", and the data "{d3, d2}" is generated.

[5]: The bus scramble unit 461 changes the scramble key from K1 to K2. The scramble keys K1 and K2 are values of timers, values stored at the addresses, or values generated by random number generation or other techniques.

[6]: The encryption unit 431 encrypts the rewritten data "{d3, d2}" using the changed scramble K2 to generate the data "e ({d3, d2})".

[7] The data "e ({d3, d2})" is written at the address "f (a1)" of the external memory 407.

[Parity Processing of Parity Processing Unit 435]

When writing data into the external memory 407, the parity processing unit calculates in advance the parity data of the data before encryption and writes that parity data in the external memory 407 along with the encrypted data.

Due to this, when some sort of physical trouble occurs in the external memory 407, data is tampered with, etc., this is detected at the time of readout, whereby more secure execution of a program becomes possible.

Further, due to the addition of the parity data, even if the length of the plain text and the length of the encrypted text are the same, the address space of the CPU 466 and address space of the external memory 407 will never completely match. This is because, for example, when writing at the address "a1" the data "d1", at the same time as writing the Nc portion at f (a1), it is necessary to write the parity "p1" (size Np) of the data "d1" somewhere in the external memory 407. The parity data is stored at any storage area in the external memory 407 in for example the following case.

The parity data is placed immediately next to the data obtained by encrypting the corresponding plain text. In this case, the bus scramble unit 461 reads the data "e (d1)" from the address "f (a1)" of the external memory 407, then reads the parity data "p1" from the address "f (a1)+Nc/Nb". In this case, the bus scramble unit 461 does not have to perform any special calculations other than the map f of the address.

Further, in addition, the external memory 407 has secured in it in advance a storage area exclusively for the parity data.

The parity data "p1" is written in that exclusive storage area. In this case, the bus scramble unit 461 has to perform processing based on the parity address map fp. The parity data "p1" is written in the address "fp (a1)" in the external memory 407.

When the parity processing unit 435 detects a parity error, it halts the processing of the CPU 466 etc. to prevent illicit processing of the data or program. Note that the content of the parity processing is not particularly limited.

[Pipeline Processing by Pipeline Processing Control Unit 436]

In the present embodiment, for example, under the control of the pipeline processing control unit 436, for example, processing of the bus scramble unit 461 is divided into a plurality of stages and a pipeline is formed using the stages as units so as to enable the access time to the external memory 407 as seen from the CPU 466 to be shortened.

That is, when not forming a pipeline, at least the time required for processing one encryption block is required for one access of the memory from the CPU 466 to the external memory 407.

For example, if forming a pipeline for the processing performed by bus scramble unit 461 in accordance with a read instruction of data of the address "a1" issued by the CPU 466, for example, when the CPU 466 requests data of a higher address continuously from the address "a1" by program codes etc., if the bus scramble unit 461 reads in advance the data of the address "f (a1+Nc/Nb)" after the address "f (a1)", it is possible to eliminate the overhead of the encryption and decryption processing.

For example, if considering the case where when the time for the memory access is ignored, encryption of each data is performed in three rounds such as with triple DES or the like, 1 clock is required for one round of encryption, and Nc/Nb=1, the CPU 466 issues instructions designating the addresses "a1", "a1+1", and "a1+2" for reading data consecutively from the external memory 407.

At this time, three rounds of decryption become necessary, and three clocks are required for decrypting each data.

Figure 79:
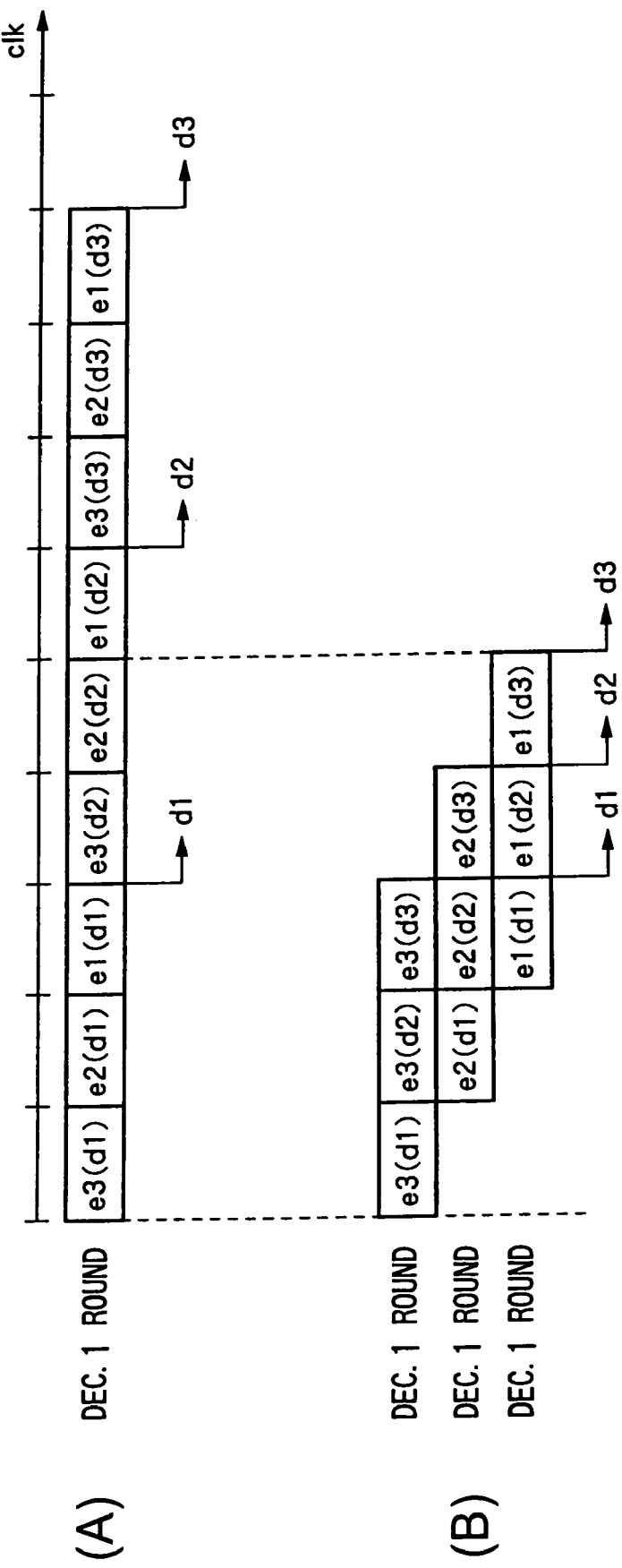
FIG. 79 illustrates pipeline processing by a pipeline processing control unit shown in FIG. 70 delineated as steps A–B.

If pipeline processing is not performed, as shown in FIG. 79 segment A, three clocks after the CPU 466 issues the first read instruction, the data "e3 (d1)" read from the external memory 407 using the address "a1" is decrypted three times to obtain the data "d1" which is then input to the CPU 466. Next, after another three clocks, the data "e3 (d2)" read from the external memory 407 using the address "a1" is decrypted three times to obtain the data "d2" which is then input to the CPU 466. Next, after another three clocks, the data "e3 (d3)" read from the external memory 407 using the address "a1+2" is decrypted three times to obtain the data "d3" which is then input to the CPU 466.

That is, all of the data "d1, "d2", and "d3" is input to the CPU 466 nine clocks after the CPU 466 issues the first read instruction.

As opposed to this, in the present embodiment, the pipeline processing control unit 436 converts the decryption processing of the decryption unit 432 into pipeline processing in three stages as shown in FIG. 79 segment B using each round as a stage.

Due to this, on the other hand, while it takes three clocks from which the CPU 466 first issues a read instruction for the data corresponding to the address "a1" to be input to the CPU 466, subsequently data corresponding to the addresses "a1+1" and "a1+2" are input successively to the CPU 466 every clock.

Due to this, all of the data "d1", "d2", and "d3" is input to the CPU 466 five clocks after the CPU 466 first issues a read instruction.

Note that, when the CPU 466 requests data of the address "a2" far from the address "a1" after "a1", the data on the pipeline is discarded and the data of the addresses "a2", "a2+1" . . . is packed in the pipeline.

[Address Scramble by Address Management Unit 433]

When the SAM chip 408 repeatedly accesses specific consecutive address areas in the external memory 407, it becomes possible to predict to a certain extent that this is a subroutine or array. If an array or other data, it becomes easy for an attacker to obtain beneficial (critical for the operating side) data by focusing the attack on it.

To avoid this, in the present embodiment, the address bus between the CPU 466 and SAM chip 408 is passed through the bus scramble unit 461 and the address management unit 433 is made to scramble the addresses as well so as to make it possible to prevent access to consecutive areas in the external memory 407. This scrambling corresponds to the above-mentioned map f. If not scrambling the addresses, the map f becomes a map of only the areas secured for the parity data. For example "$\forall a \in [CPU\ address\ space], f(a)=(1+p)a$". Here, p is the alignment size of the parity data.

Next, the overall operation of the communication system 401 shown in FIG. 64 will be explained.

Figure 80:
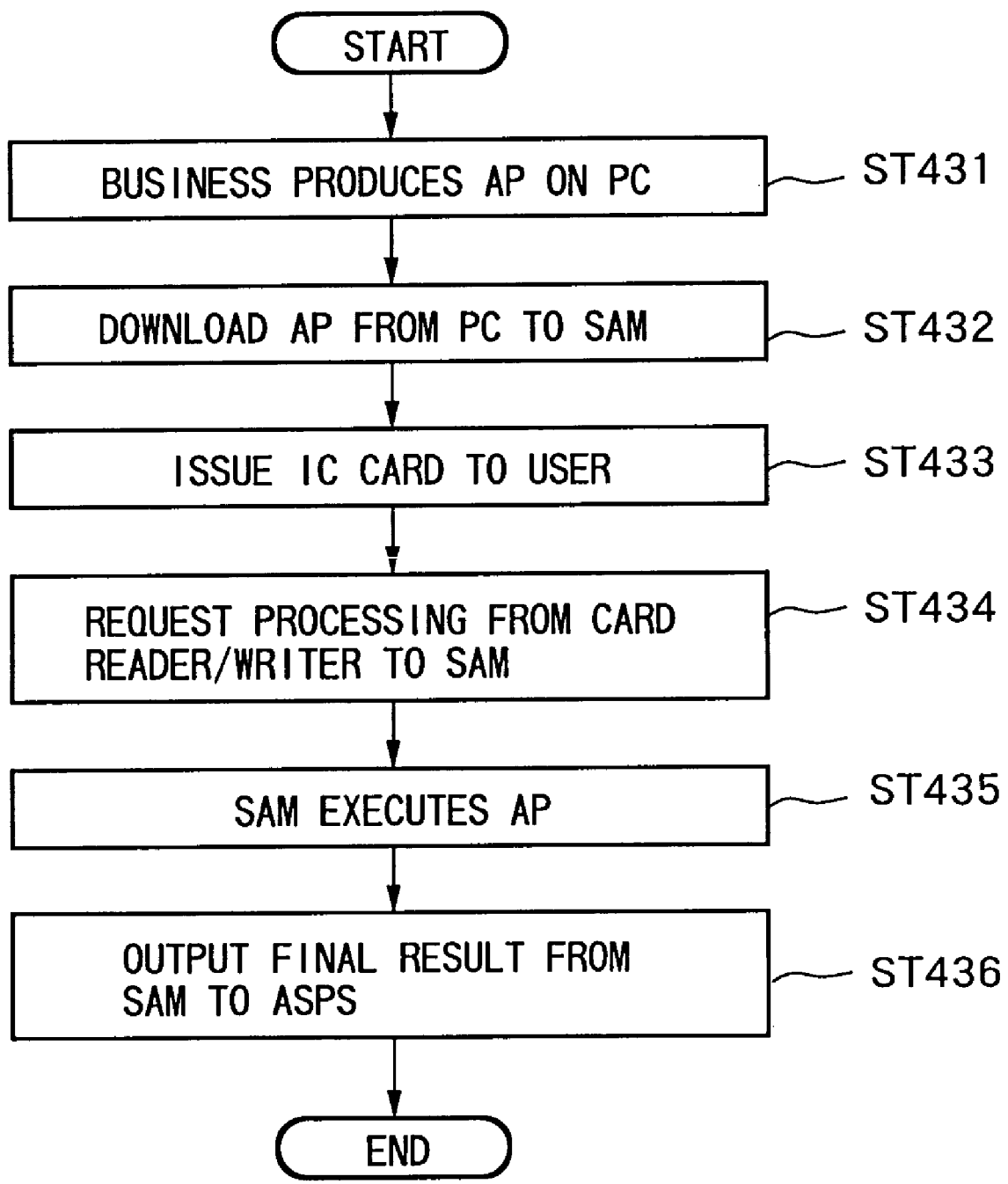
FIG. 80 is a view for explaining the overall operation of the communication system shown in FIG. 64.

FIG. 80 is a view for explaining the overall operation of the communication system 401 shown in FIG. 64.

Step ST431:

The businesses 415_1 to 415_3 or a party requested by these businesses produce the application programs AP_1, AP_2, and AP_3 for the processing for transactions performed by the businesses using the IC card 403 for example on the personal computers 416_1, 416_2, and 416_3 shown in FIG. 64.

Further, the manager of the SAM chip 408 generates AP management data 421, scrambles it, and stores it in the external memory 407.

Step ST432:

The application programs AP_1, AP_2, and AP_3 are downloaded through the authentication units 417_1, 417_2, and 417_3 from the personal computers 416_1, 416_2, and 416_3 to the SAM chip 408.

Step ST433:

The user is issued the IC card 403

The IC of the IC card 403 stores the key information used for transactions by the user with the business contracted with.

Note that, the contract between the user and a business may also be concluded after issuance of the IC card 403 through the Internet 410 etc.

Step ST434:

For example, when the user uses the personal computer 405 to access the server 402 through the Internet 410 to try to purchase a product, the server 402 issues a processing request through the Internet 410 to the ASP server 406.

When the ASP server 406 receives a processing request from the server 402, it accesses the personal computer 405 through the Internet 410. Further, a processing requesting relating to the IC card 403 issued from the card reader/writer 404 is transmitted through the personal computer 405, Internet 410, and ASP server 406 to the SAM chip 408.

Step ST435:

The SAM chip 408 selections an application program in accordance with the processing request received at step ST434 and executes that selected application program.

In the execution of that application program, the SAM chip 408 and external memory 407 communicate based on the processing of the above-mentioned bus scramble unit 461.

Step ST436:

The SAM chip 408 outputs the execution results of the application program to the ASP server 406.

Figure 81:
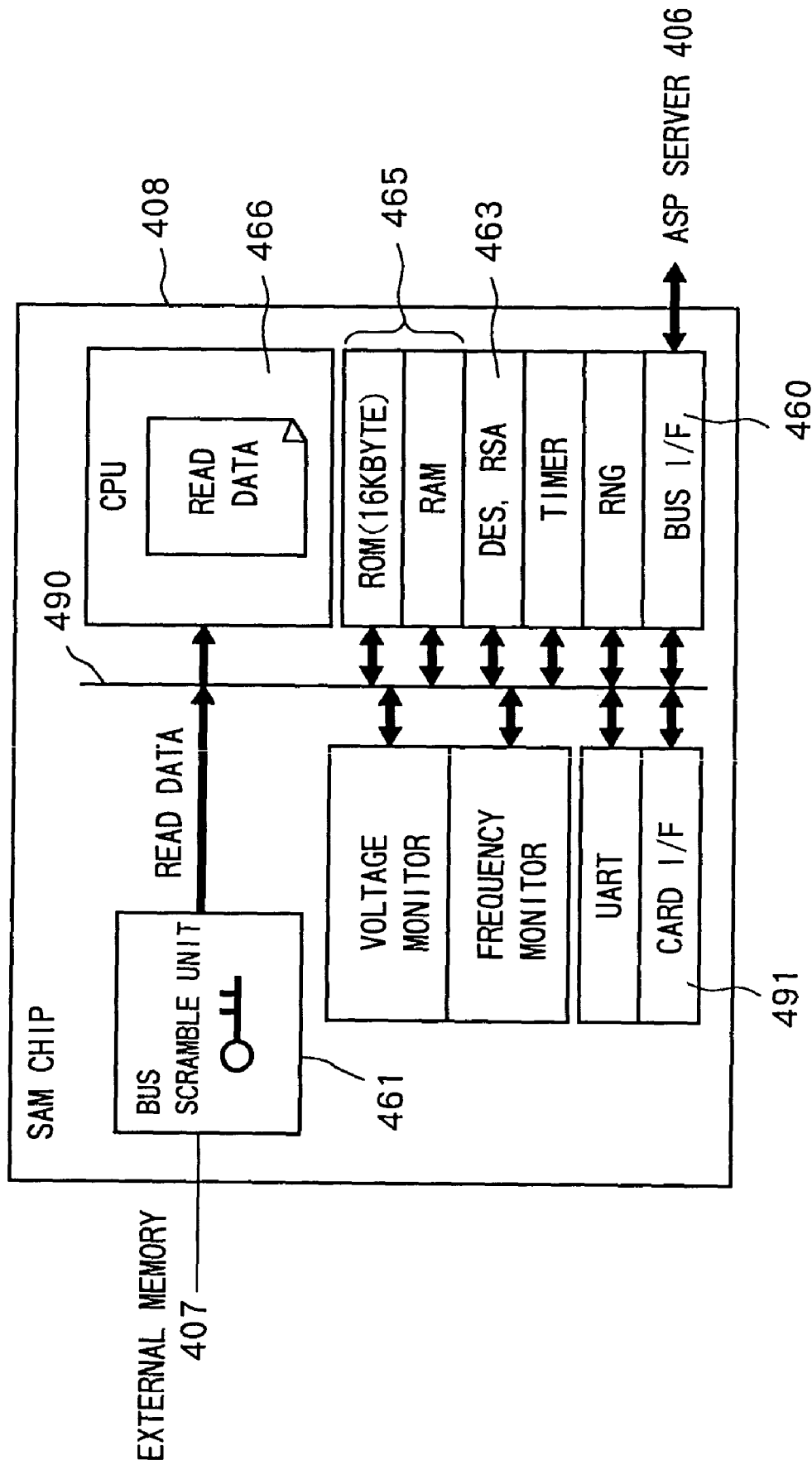
FIG. 81 is a functional block diagram showing more specifically the function blocks of the SAM chip shown in FIG. 67.

FIG. 81 is a functional block diagram showing more specifically the function blocks of the SAM chip 408 shown in FIG. 67.

As shown in FIG. 81, the SAM chip 408 is connected through an internal bus 490 to a card I/F unit 491, ASP communication interface unit 460, bus scramble unit 461, encryption/decryption unit 465, storage unit 463, and CPU 466.

Part of the functions of the signature processing unit 462 and authentication processing unit 463 shown in FIG. 67 are for example realized by the CPU 466.

Figure 82:
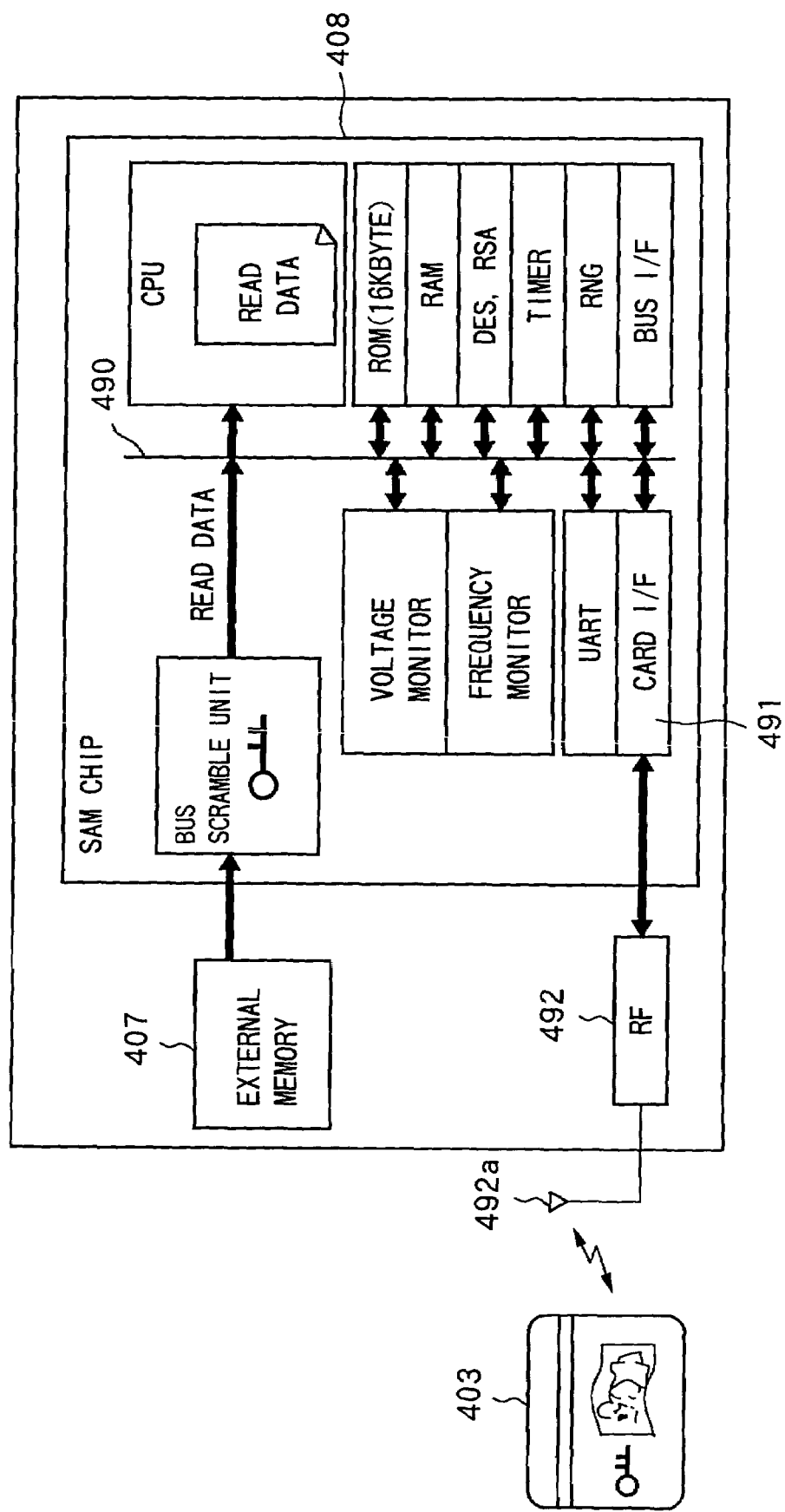
FIG. 82 is a view for explaining another mode of use of the SAM chip.

The SAM chip 408 shown in FIG. 81, for example as shown in FIG. 82, may connect the card I/F unit 491 connected to the internal bus 490 to an RF reception/transmission unit 492 outside of the SAM chip 408 and transfer data with the IC card 203 by a noncontact system through an antenna 492*a* of the RF reception/transmission unit 492.

As explained above, according to the communication system 401, by giving the above-mentioned functions to the bus scramble unit 461 in the SAM chip 408, the following effects are obtained.

That is, according to the communication system 401, it is possible to store for example confidential data relating to processing using the IC card 403 in an external memory 407 in a secure state.

Further, according to the communication system 401, by forming the processing of the bus scramble unit 461 into a pipeline, it is possible for the SAM chip 408 to access the external memory 407 at a high speed.

Further, according to the communication system 401, by giving the bus scramble unit 461 a parity function, it is possible to improve the reliability of the data read from the external memory 407.

Sixth Embodiment

The present embodiment is an embodiment corresponding to the 19th aspect of the invention.

[Related Art of Present Embodiment]

First, a computer for executing a transaction business program using an IC card of a related art of the present invention will be explained.

Figure 83:
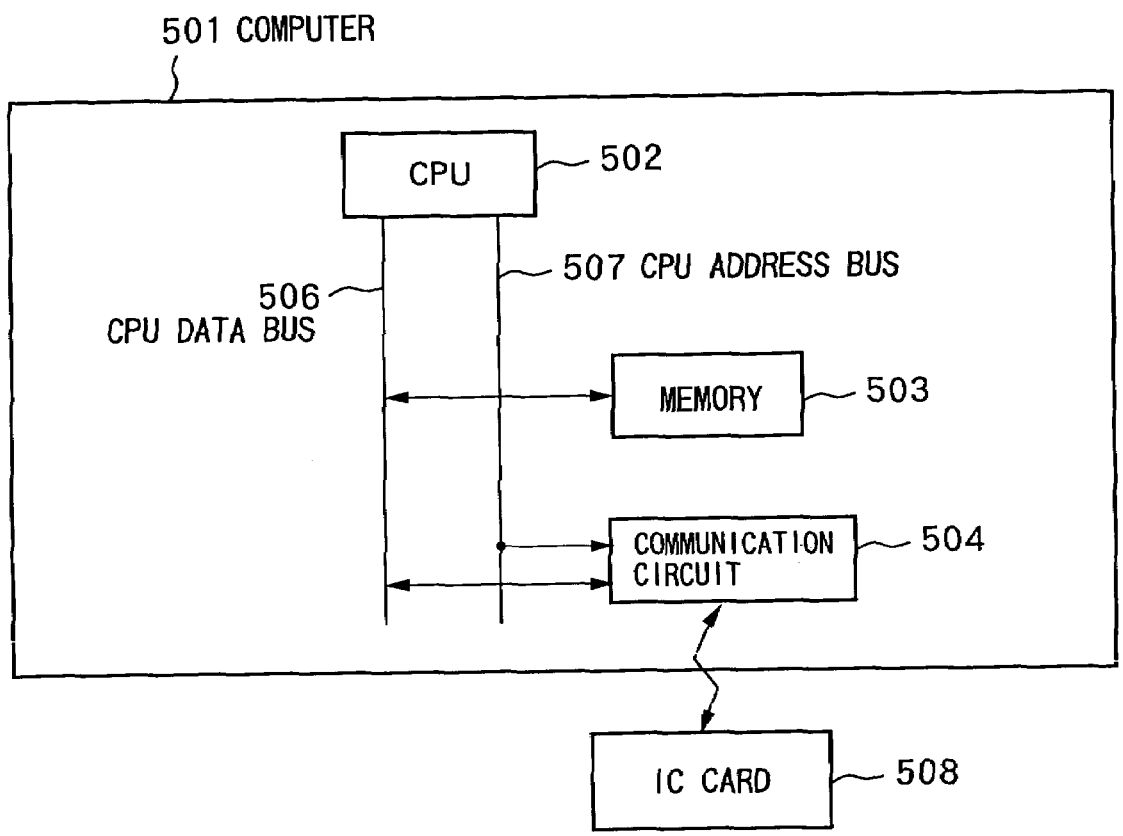
FIG. 83 is a functional block diagram of a computer used in electronic settlement forming a related art of the present invention.

FIG. 83 is a functional block diagram of a computer 501 used in electronic settlement of a related art of the present invention.

As shown in FIG. 83, the computer 501 has a CPU 502, memory 503, and communication circuit 504.

The CPU 502, memory 503, and communication circuit 504 are connected to a CPU data bus 506.

The CPU 502 and communication circuit 504 are connected to a CPU address bus 507.

The CPU 502 comprehensively controls the operation of the computer 501, operates based on instructions of a program stored in the memory 503, and accesses the memory 503 during its operation.

The communication circuit 504 communicates with the IC card 508 by the contact system or noncontact system. In the contact type, the IC card 508 and the communication circuit 504 are connected by electrical contacts. Further, in the noncontact type, the IC card 508 and the communication circuit 504 are connected through electromagnetic waves or light etc.

The data received from the IC card 508 through the communication circuit 504 is processed by the CPU 502 in accordance with a program stored in the memory 503. Further, the data obtained by the processing by the CPU 502 is transmitted through the communication circuit 504 to the IC card 508.

Further, the CPU 502 writes the results of settlement generated by communication with the IC card 508 in the memory 503.

Figure 84:
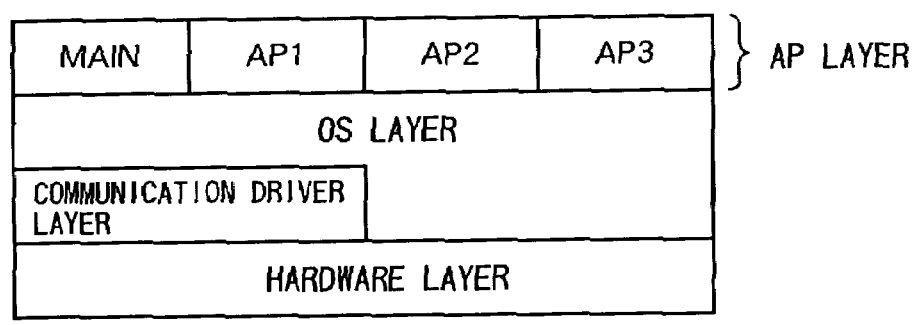
FIG. 84 is a view for explaining the software structure of a computer of FIG. 83 and an embodiment of the present invention.

FIG. 84 is a view for explaining the software configuration of the CPU 502 shown in FIG. 83.

In FIG. 84, the bottommost layer is the hardware layer, that is, the hardware component of the CPU 502 shown in FIG. 83.

Above the hardware layer is positioned a communication driver layer. The communication driver layer has positioned in it a communication driver layer for controlling the communication circuit 504 connected to the CPU 502. The program of the communication driver layer is usually stored in a nonvolatile memory.

Above the communication driver layer is an operating system (OS) layer for providing the program forming the foundation for the operation of the CPU 502. The OS layer provides the highest application (AP) layer with higher concept services compared with the lower layers. For example, the later explained function "get card type ( )", "read card data ( )", and "write card data ( )" are examples.

Further, above the OS layer is an AP layer defining the specific functions (services) realized by the computer 501. The AP layer has, for example, application programs MAIN, AP1, AP2, and AP3.

In the present embodiment, the explanation will be given illustrating the provision of settlement or other transactions using the IC card 508 as the application program.

For example, in the OS layer and AP layer, the function for determining the type of the IC card 508 is defined by "get card type ( )".

In the OS layer and AP layer, the type of the IC card 508 can be specified by calling up this function. For example, assume that there are three types of IC cards 508, that is, Types A, B, and C. The return values of the function for the IC cards 508 are defined as in FIG. 85.

For example, assuming that the Type B IC card 508 is used, the return value of the result of execution of the function "get card type ( )" becomes "2".

Further, in the OS layer and AP layer, "read data (*rp)" is defined as the function for reading data from the internal memory of the IC card 508.

Here, "*rp" is similar in concept to a pointer in the C language, "*" shows that the following variable is a pointer variable, and "rp" shows a specific location in the internal memory of the IC card 508. When "*rp" is indicated, this shows the content of the "rp address" in the memory of the IC card 508. Assume now that the internal memory stores data as shown in FIG. 86.

Further, if assuming that "rp=102H", the return value of the function "read data (*rp)" becomes "56H" and it is possible to read the data of the "102H address".

Further, in the OS layer and AP layer, "write data (*wp, wdata)" is defined as the function for writing data at a specific address of the internal memory of the IC card 508. Here, "*wp" is similar to the concept of a pointer in the C language, "*" indicates that the following variable is a pointer variable, and "wp" indicates a specific address of the internal memory of the IC card 508. When "*wp" is indicated, the content of the wp address of the internal memory of the IC card 508 is indicated. "wdata" is a variable in the write data. Assume now that the memory of the IC card 508 stores data as shown in FIG. 87. Here, if "wp=102H" and "wdata=73H" and executing the function "write data (*wp, wdata)", as shown in FIG. 87, the data of the "102H address" of that memory is rewritten to "73H".

The application programs AP1, AP2, and AP3 shown in FIG. 84 define operations for transactions relating to different types of IC cards 508. The correspondence is shown in FIG. 88.

In FIG. 84, the application program MAIN is executed first at the time of startup of the computer 501. The application program MAIN uses the above-mentioned function "get card type ( )" to determine the type of the IC card 508 used. The CPU 502 selects and executes the corresponding application program in accordance with the type of the IC card 508 determined based on the correspondence table shown in FIG. 88.

If imagining a situation in which IC cards 508 of the Type A, Type B, and Type C are handled by different businesses, the application programs AP1, AP2, and AP3 are produced by the individual businesses. Further, the storage areas of the internal memory of the IC card 508 are shared by the application programs AP1, AP2, and AP3. The application programs use portions assigned to them in advance.

As explained above, the application programs AP1, AP2, and AP3 are produced by the individual businesses, but sometimes there is an error in a program, an application program of another business is read by a business with malicious intent by an illicit program of that business, or a storage area in the IC card 508 for which one is not allowed access is illicitly accessed.

[Embodiment of the Present Invention]

Figure 89:
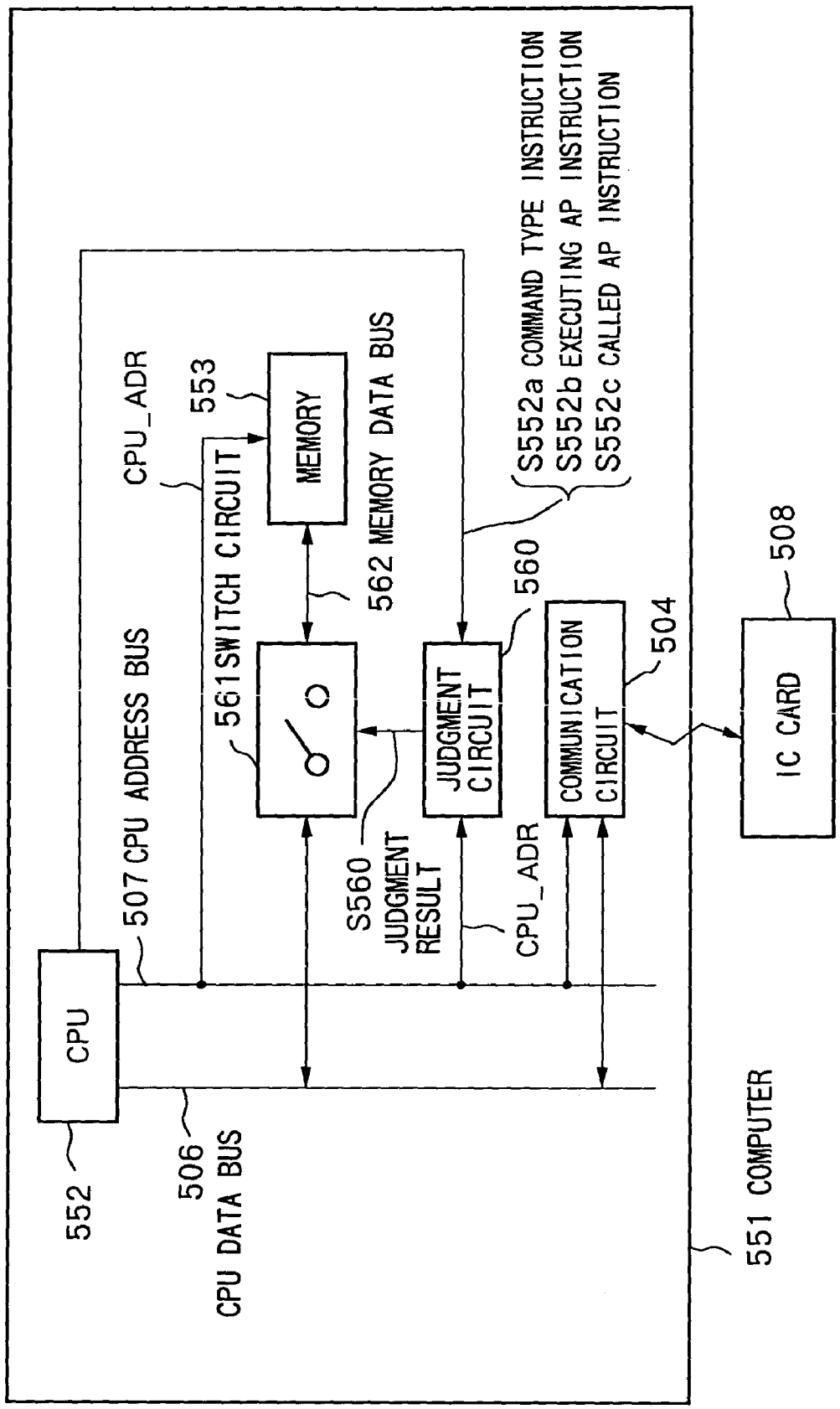
FIG. 89 is a view of the configuration of a computer according to an embodiment of the present invention.

FIG. 89 is a view of the configuration of the computer 551 according to an embodiment of the present invention.

As shown in FIG. 89, the computer 551 has a CPU 552, memory 553, communication circuit 504, judgment circuit 560, and switch circuit 561.

Here, the CPU 552 corresponds to the computation circuit of the present invention, the memory 553 corresponds to the storage circuit of the present invention, the communication circuit 504 corresponds to the communication circuit of the present invention, the judgment circuit 560 corresponds to the connection control circuit of the present invention, and the switch circuit 561 corresponds to the connection switching circuit of the present invention.

The CPU data bus 506 has a CPU 552, switch circuit 561, judgment circuit 560, and communication circuit 504 connected to it.

The CPU data bus 506 corresponds to the transmission line of the present invention.

Further, the switch circuit 561 is connected through a memory data bus 562 to the memory 553.

Further, the CPU address bus 507 has a memory 553, judgment circuit 560, and communication circuit 504 connected to it.

When the CPU 552 accesses the memory 553 or a peripheral device outside of the computer 551 etc., the CPU address bus 507 transmits a CPU_ADR showing the address.

In FIG. 89, the communication circuit 504 and IC card 508 given the same reference numerals as in FIG. 83 are the same as those explained in FIG. 83.

Further, the CPU 552 has the software structure as explained above using FIG. 84. That is, as the application programs AP1, AP2, and AP3, ones which define processing for transactions relating to three types of IC cards 508, that is, Types A, B, and C, are used.

The data received from an IC card 508 through the communication circuit 504 is processed by the CPU 552 in accordance with a program stored in the memory 553. Further, the data obtained by the processing by the CPU 552 is transmitted to the IC card 508 through the communication circuit 504.

Further, the CPU 552 writes the result of settlement generated by communication with the IC card 508 in the memory 553.

The switch circuit 561 switches the CPU data bus 506 and memory data bus 562 between the connection state and disconnection state based on a judgment result signal S560 from a judgment circuit 560 (control signal of the present invention).

Further, the CPU 552 executes the instructions (codes) of the programs of the OS layer, program MAIN, and application programs AP1, AP2, and AP3 shown in FIG. 84 fetched (read) from the memory 553.

The CPU 552, in accordance with the execution of those instructions, generates an instruction type instructing signal S552a, executing AP instructing signal S552b, and if necessary a called AP instructing signal S552c and outputs these to the judgment circuit 560.

Here, the instruction type instructing signal S552a is a signal indicating whether which of the fetch instruction, read instruction, and write instruction the CPU 552 executed.

Here, the fetch instruction is an instruction for the CPU 552 to fetch the instruction codes through the CPU data bus 506.

The read instruction is an instruction for the CPU 552 to read data through the CPU data bus 506.

The write instruction is an instruction for the CPU 552 to write data through the CPU data bus 506.

Further, the executing AP instructing signal S552b is a signal showing of which program the instruction being executed by the CPU 552 belongs in the instructions of the application programs AP1, AP2, AP3, and MAIN and OS programs shown in FIG. 84.

The called AP instructing signal S552c shows which program of the application programs AP1, AP2, AP3, and MAIN and OS programs the program module of the call destination belongs when a program module being executed by the CPU 552 calls up another program module.

Further, the CPU 552 halts the CPU data bus 506 and its operation when as explained later the switch circuit 561 enters a disconnection state.

Next, the judgment circuit 560 will be explained in detail.

The judgment circuit 560 generates a judgment result signal S560 based on the instruction type instructing signal S552a and executing AP instructing signal S552b input from the CPU 552 and the address CPU_ADR input through the CPU address bus 507 from the CPU 552 and outputs this to the switch circuit 561.

Figure 90:
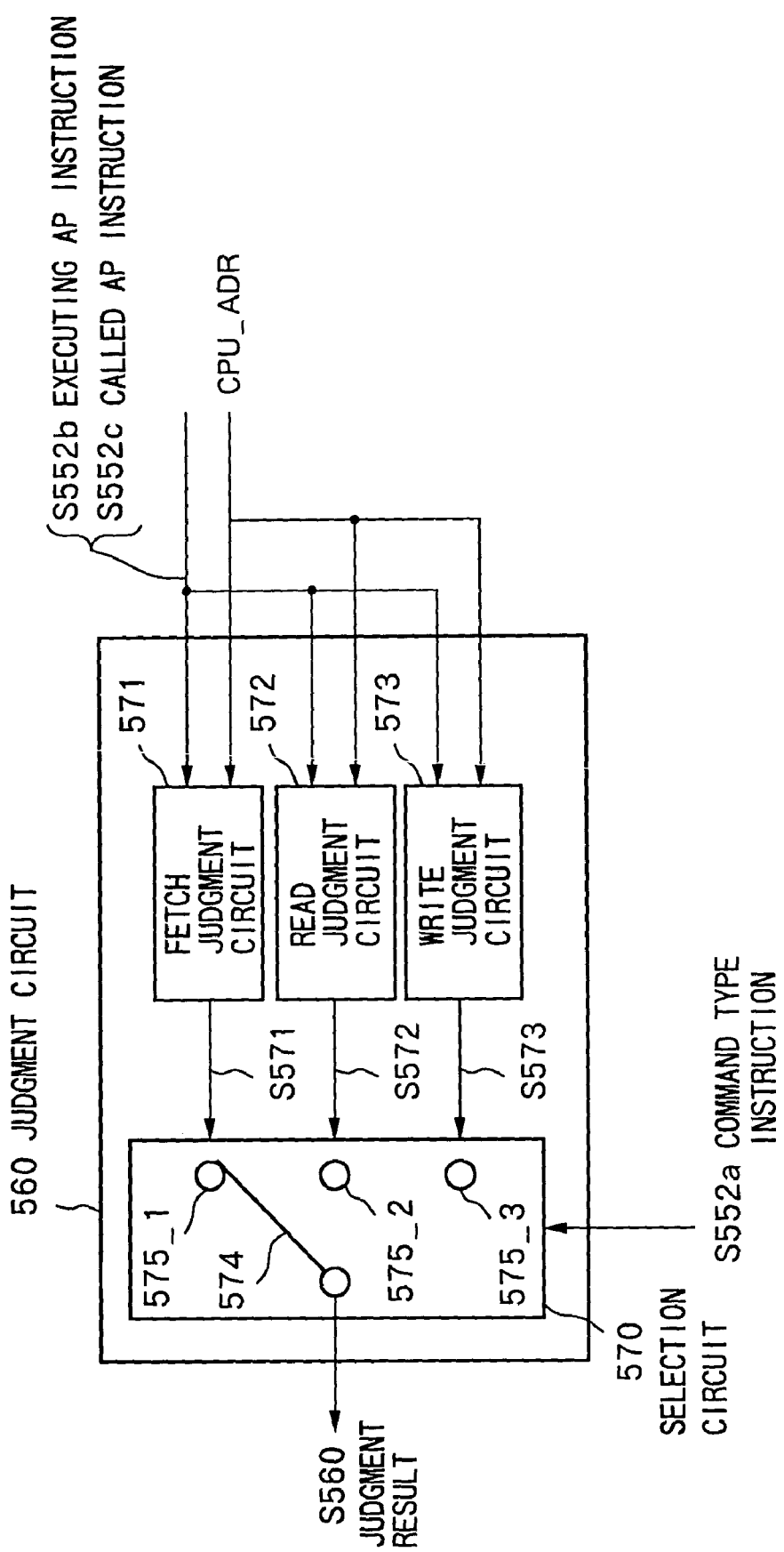
FIG. 90 is a view of the configuration of a judgment circuit shown in FIG. 89.

FIG. 90 is a view of the configuration of the judgment circuit 560 shown in FIG. 89.

As shown in FIG. 90, the judgment circuit 560 has a selection circuit 570, fetch judgment circuit 571, read judgment circuit 572, and write judgment circuit 573.

The selection circuit 570 connects the switch 574 to one terminal of the terminals 575_1, 575_2, and 575_3 based on the instruction type instructing signal S552a input from the CPU 552 shown in FIG. 89.

Specifically, the selection circuit 570 connects the switch 574b to the terminal 575_1 when the instruction type instructing signal S552a indicates a fetch instruction.

Due to this, the fetch judgment result signal S571 output from the fetch judgment circuit 571 is output through the terminal 575_1 and switch 574 as the judgment result signal S560 from the judgment circuit 560 to the switch circuit 561.

Further, the selection circuit 570 connects the switch 574 to the terminal 575_2 when the instruction type instructing signal S552a indicates a read instruction.

Due to this, the read judgment result signal S572 output from the read judgment circuit 572 is output through the terminal 575_2 and switch 574 as the judgment result signal S560 from the judgment circuit 560 to the switch circuit 561.

Further, the selection circuit 570 connects the switch 574 to the terminal 575_3 when the instruction type instructing signal S552a indicates a write instruction.

Due to this, the write judgment result signal S573 output from the write judgment circuit 573 is output through the terminal 575_3 and switch 574 as the judgment result signal S560 from the judgment circuit 560 to the switch circuit 561.

The fetch judgment circuit 571 uses the executing AP instructing signal S552b, called AP instructing signal S552c, and address CPU_ADR input from the CPU 552 to generate the fetch judgment result signal S571 and outputs this toward the terminal 575_1 of the selection circuit 570.

Figure 91:
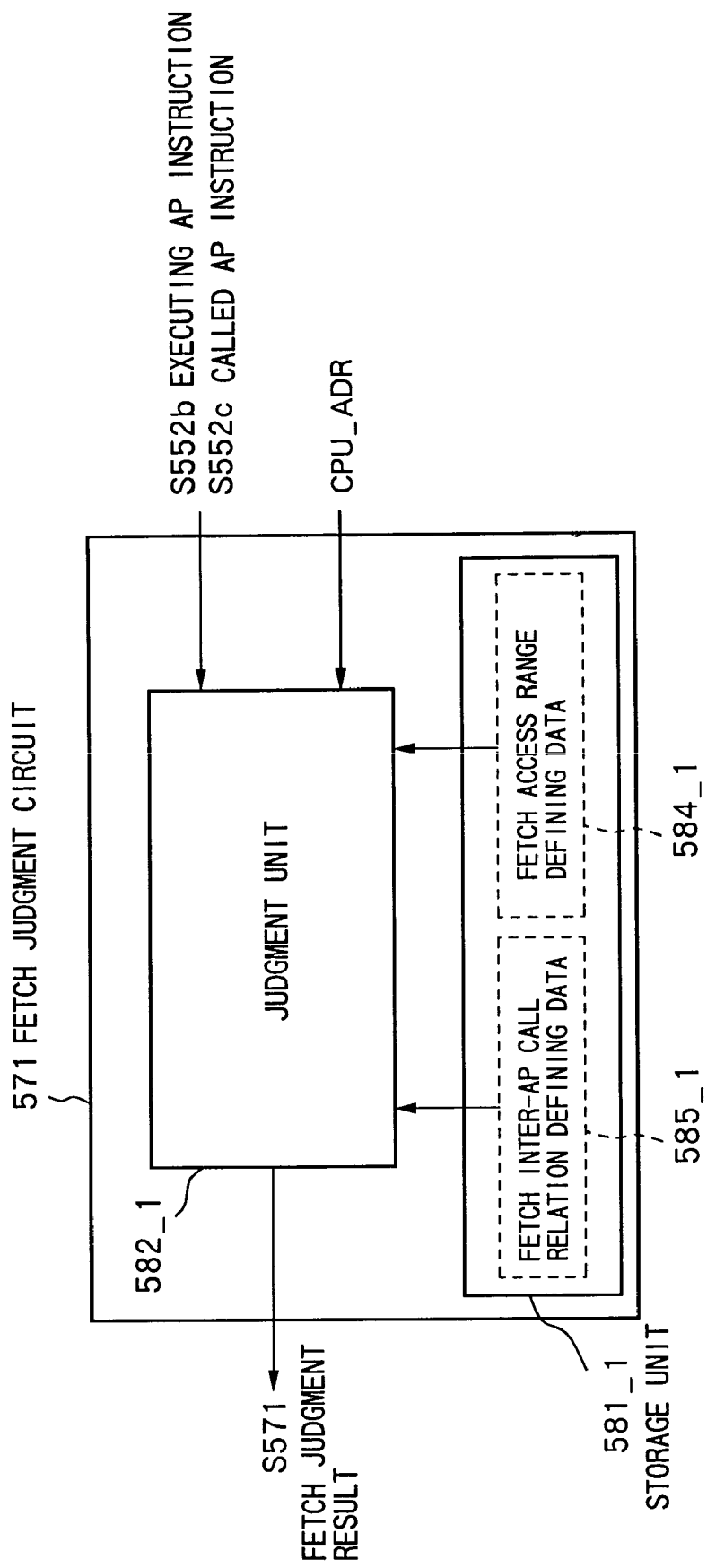
FIG. 91 is a view of the configuration of a fetch judgment circuit shown in FIG. 90.

FIG. 91 is a view of the configuration of the fetch judgment circuit 571 shown in FIG. 90.

As shown in FIG. 91, the fetch judgment circuit 571 has a storage unit 581_1 and judgment unit 582_1.

The storage unit 581_1 stores the fetch access range defining data 584_1 and fetch inter-AP call relation defining data 58.

The fetch access range defining data 584_1 defines the addresses in the memory 553 accessible when the CPU 552 is executing the fetch instruction for each case where the CPU 552 is executing programs of the OS layer and application programs MAIN, AP1, AP2, and AP3 shown in FIG. 84.

FIG. 92 is a view for explaining the fetch access range defining data 584_1.

The column (vertical) direction in FIG. 92 shows the programs of the OS layer and the application programs MAIN, AP1, AP2, and AP3 shown in FIG. 84.

The "FROM" in the row (horizontal) direction shows the start address of the storage area in the memory 553 where storage of the program of the corresponding column is allowed.

The "FROM" in the row direction shows the start address of the address range of the memory 553 where the program of the corresponding column is allowed access.

The "TO" in the row direction shows the end address of the address range of the memory 553 where the program of the corresponding column is allowed access.

For example, the application program AP1 is allowed access to the range of the addresses "2000H" to "2FFFH" of the memory 553.

The fetch inter-AP call relation defining data 585_1 shows the combinations of programs to which program modules which may be called from or called belong when a program module is called up when the CPU 552 is executing a fetch instruction.

Figure 93:
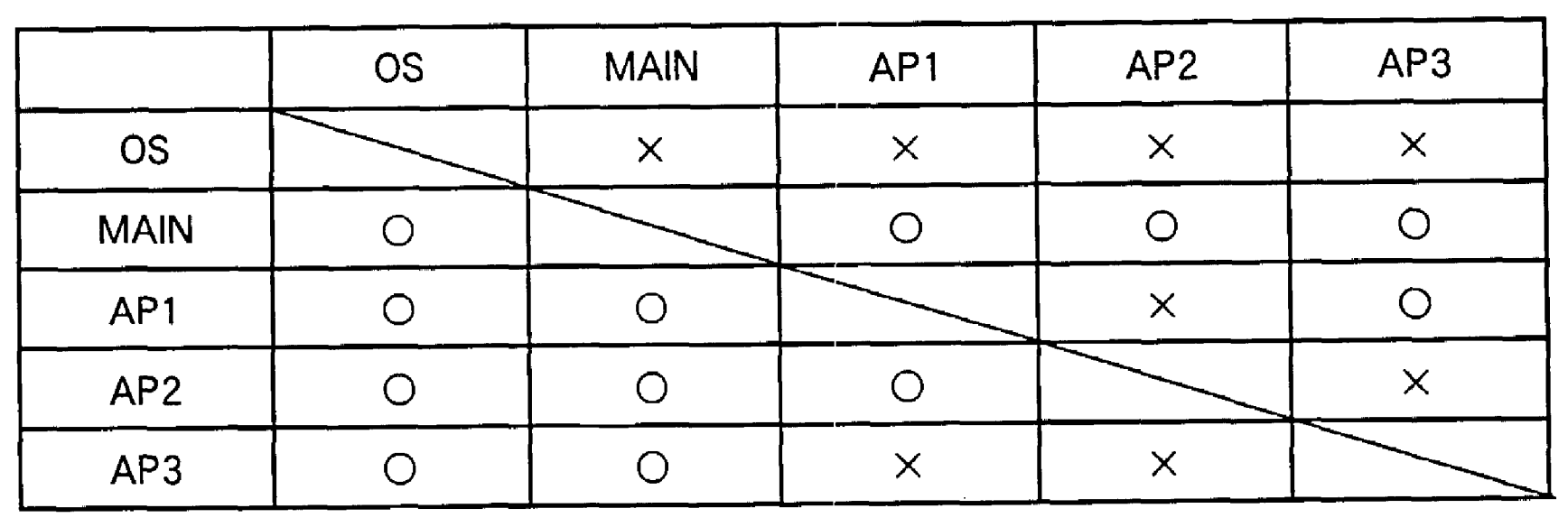

FIG. 93 is a view for explaining the fetch inter-AP call relation defining data 585_1.

The column direction of FIG. 93 shows the programs of the OS layer and application programs MAIN, AP1, AP2, and AP3 shown in FIG. 84.

The row direction of FIG. 93 shows the programs of the OS layer and application programs MAIN, AP1, AP2, and AP3 shown in FIG. 84.

The intersecting positions of the columns and rows show whether a program module of a program of the corresponding column is allowed to call up a program module of a program of the corresponding row. The "o" indicates that call up is allowed, while the "x" indicates that callup is not allowed.

For example, a program module of the application program AP1 is allowed to call up a program module of an OS program, MAIN, and application program AP3, but is not allowed to call up a program module of the application program AP2.

The judgment unit 582_1 judges if the address CPU_ADR is included in the address range of the memory 553 defined by the "FROM" and "TO" of the column shown in FIG. 92 corresponding to the program indicated by the executing AP instructing signal S552b based on the executing AP instructing signal S552b and address CPU_ADR input from the CPU 552 shown in FIG. 89 and the fetch access range defining data 584_1 read from the storage unit 581_1.

When judging that it is included in that judgment, the judgment unit 582_1 for example generates a fetch judgment result signal S571 instructing connection and outputs it toward the terminal 575_1 of the selection circuit 570 shown in FIG. 90.

On the other hand, when judging that it is not included in that judgment, the judgment unit 582_1 generates for example a fetch judgment result signal S571 instructing disconnection (break) and outputs it toward the terminal 575_1 of the selection circuit 570 shown in FIG. 90.

Further, when a program module of a program being executed by the CPU 552 calls up a program module of another program, the judgment unit 582_1 judges if that callup is allowed by the combination shown by the fetch inter-AP call relation defining data 585_1 shown in FIG. 93 based on the executing AP instructing signal S552b and called AP instructing signal S552c input from the CPU 552 shown in FIG. 89 and the fetch inter-AP call relation defining data 585_1 read from the storage unit 581_1.

When judging that it is allowed in that judgment, the judgment unit 582_1 for example generates a fetch judgment result signal S571 instructing connection and outputs this toward the terminal 575_1 of the selection circuit 570 shown in FIG. 90.

On the other hand, when judging that it is not allowed in that judgment, the judgment unit 582_1 generates for example a fetch judgment result signal S571 instructing disconnection and outputs this toward the terminal 575_1 of the selection circuit 570 shown in FIG. 90.

The read judgment circuit 572 uses the executing AP instructing signal S552b, called AP instructing signal S552c, and address CPU_ADR input from the CPU 552 to generate the read judgment result signal S572 and outputs this toward the terminal 575_2 of the selection circuit 570.

Figure 94:
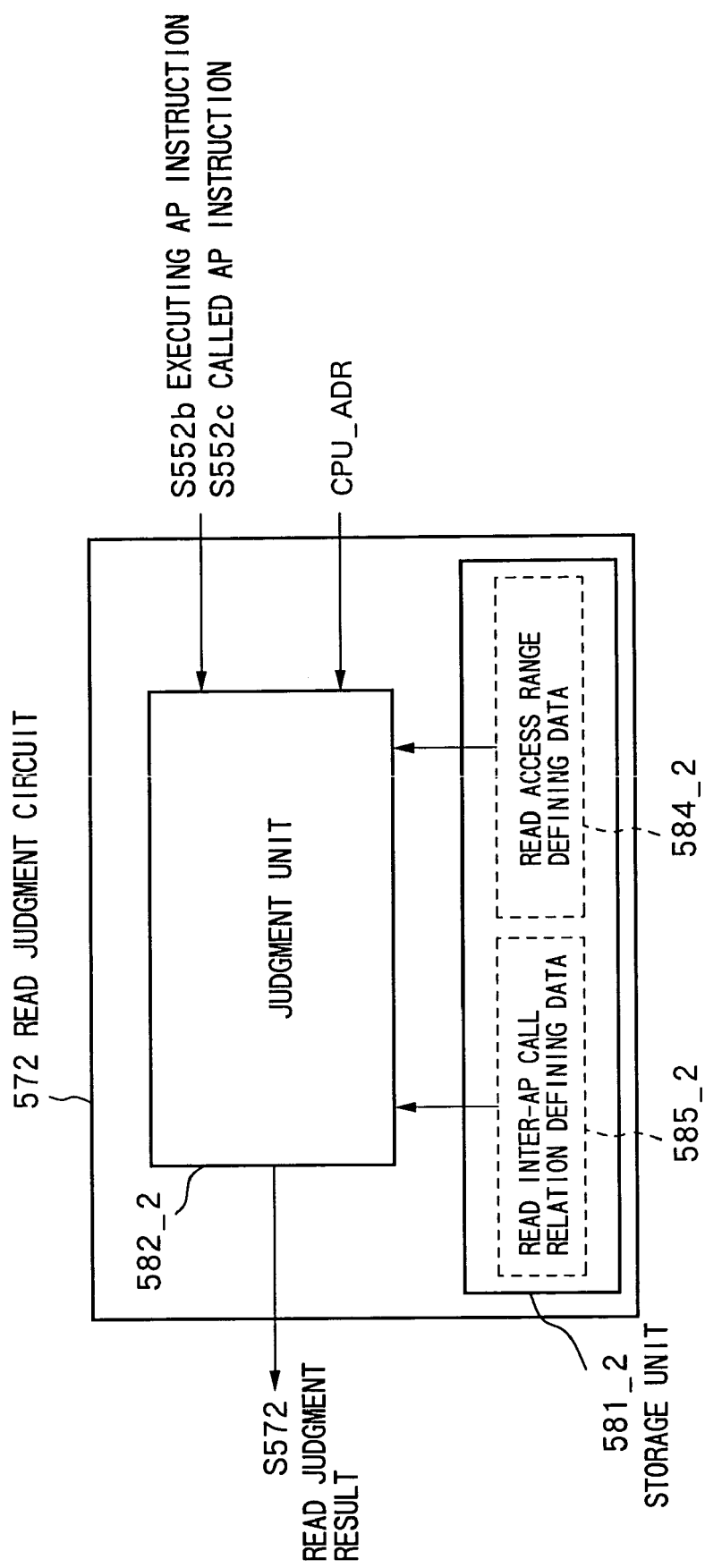
FIG. 94 is a view of the configuration of a read judgment circuit shown in FIG. 90.

FIG. 94 is a view of the configuration of the read judgment circuit 572 shown in FIG. 90.

As shown in FIG. 94, the read judgment circuit 572 has a storage unit 581_2 and judgment unit 582_2.

The storage unit 581_2 stores the read access range defining data 584_2 and read inter-AP call relation defining data 585_2.

The read access range defining data 584_2 defines the addresses in the memory 553 accessible when the CPU 552 is executing a read instruction for each case where the CPU 552 is executing programs of the OS layer and application programs MAIN, AP1, AP2, and AP3 shown in FIG. 84.

FIG. 95 is a view for explaining the read access range defining data 584_2.

The column (vertical) direction in FIG. 95 shows the programs of the OS layer and the application programs MAIN, AP1, AP2, and AP3 shown in FIG. 84.

The "FROM" in the row (horizontal) direction shows the start address of the storage area in the memory 553 where storage of the program of the corresponding column is allowed.

The "FROM" in the row direction shows the start address of the address range of the memory 553 where the program of the corresponding column is allowed access.

The "TO" in the row direction shows the end address of the address range of the memory 553 where the program of the corresponding column is allowed access.

The read inter-AP call relation defining data 585_2 shows the combinations of programs to which program modules which may call from or be called from belong when a program module is called up when the CPU 552 is executing a read instruction.

Figure 96:
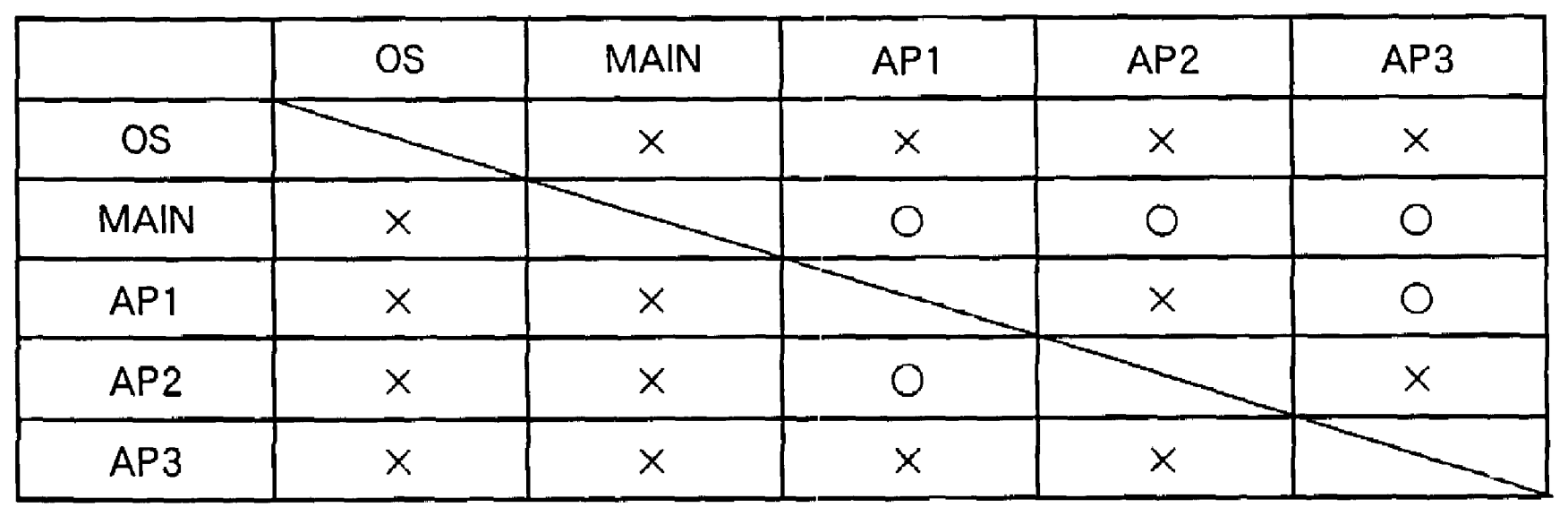

FIG. 96 is a view for explaining the read inter-AP call relation defining data 585_2.

The column direction of FIG. 96 shows the programs of the OS layer and application programs MAIN, AP1, AP2, and AP3 shown in FIG. 84.

The row direction of FIG. 96 shows the programs of the OS layer and application programs MAIN, AP1, AP2, and AP3 shown in FIG. 84.

The intersecting positions of the columns and rows show whether a program module of a program of the corresponding column is allowed to call up a program module of a program of the corresponding row. The "o" indicates that callup is allowed, while the "x" indicates that callup is not allowed.

The judgment unit 582_2 judges if the address CPU_ADR is included in the address range of the memory 553 defined by the "FROM" and "TO" of the column shown in FIG. 95 corresponding to the program indicated by the executing AP instructing signal S552b based on the executing AP instructing signal S552b and address CPU_ADR input from the CPU 552 shown in FIG. 89 and the read access range defining data 584_2 read from the storage unit 581_2.

When judging that it is included in that judgment, the judgment unit 582_2 for example generates a read judgment result signal S572 instructing connection and outputs it toward the terminal 575_2 of the selection circuit 570 shown in FIG. 90.

On the other hand, when judging that it is not included in that judgment, the judgment unit 582_2 generates for example a read judgment result signal S572 instructing disconnection (break) and outputs it toward the terminal 575_2 of the selection circuit 570 shown in FIG. 90.

Further, when a program module of a program being executed by the CPU 552 calls up a program module of another program, the judgment unit 582_2 judges if that callup is allowed by the combination shown by the read inter-AP call relation defining data 585_2 shown in FIG. 96 based on the executing AP instructing signal S552b and called AP instructing signal S552c input from the CPU 552 shown in FIG. 89 and the read inter-AP call relation defining data 585_2 read from the storage unit 581_2.

When judging that it is allowed in that judgment, the judgment unit 582_2 for example generates a read judgment result signal S572 instructing connection and outputs this toward the terminal 575_2 of the selection circuit 570 shown in FIG. 90.

On the other hand, when judging that it is not allowed in that judgment, the judgment unit 582_2 generates for example a read judgment result signal S572 instructing disconnection and outputs this toward the terminal 575_2 of the selection circuit 570 shown in FIG. 90.

The write judgment circuit 573 uses the executing AP instructing signal S552b, called AP instructing signal S552c and address CPU_ADR input from the CPU 552 to generate the write judgment result signal S573 and outputs this toward the terminal 575_3 of the selection circuit 570.

Figure 97:
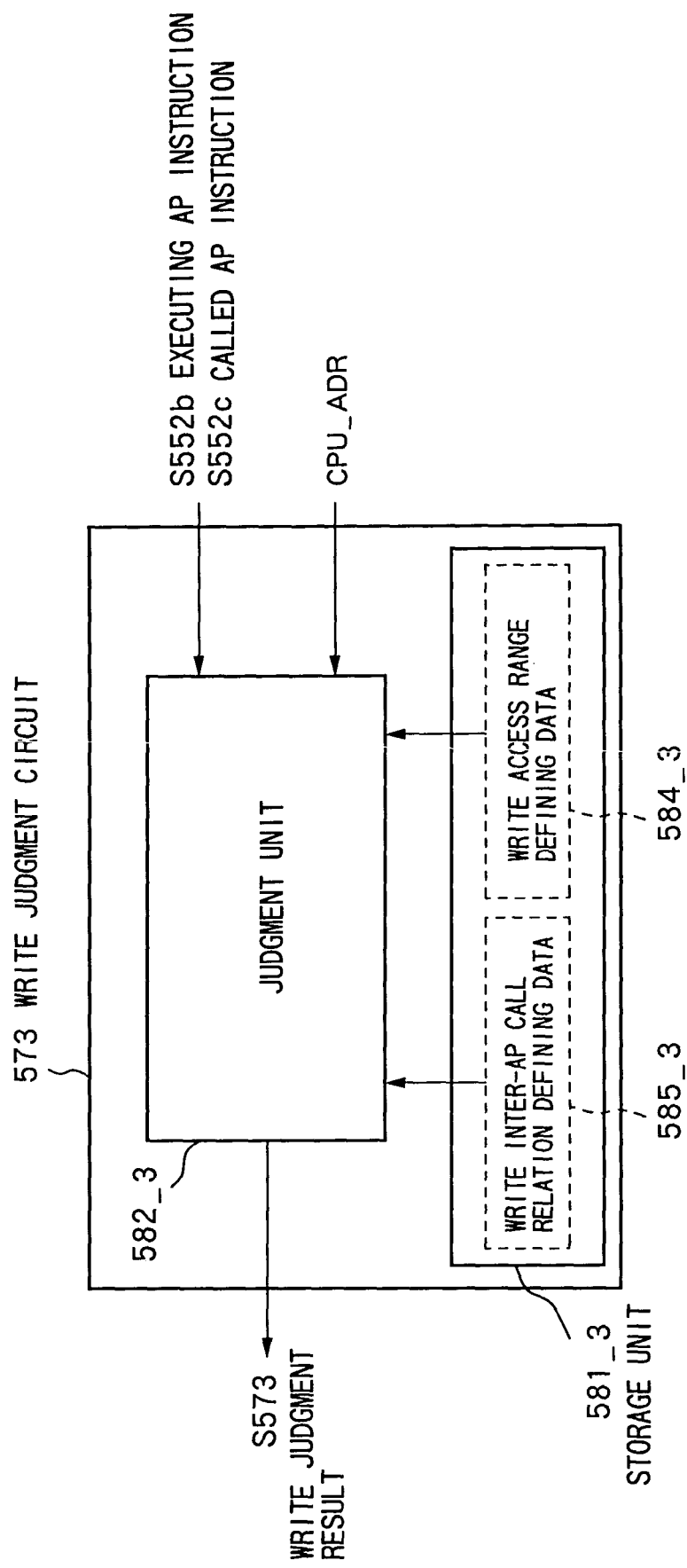
FIG. 97 is a view of the configuration of a write judgment circuit shown in FIG. 90.

FIG. 97 is a view of the configuration of the write judgment circuit 573 shown in FIG. 90.

As shown in FIG. 97, the write judgment circuit 573 has a storage unit 581_3 and judgment unit 582_3.

The storage unit 581_3 stores the write access range defining data 584_3 and write inter-AP call relation defining data 585_3.

The write access range defining data 584_3 defines the addresses in the memory 553 accessible when the CPU 552 is executing the write instruction for each case where the CPU 552 is executing programs of the OS layer and application programs MAIN, AP1, AP2, and AP3 shown in FIG. 84.

FIG. 98 is a view for explaining the write access range defining data 584_3.

The column (vertical) direction in FIG. 98 shows the programs of the OS layer and the application programs MAIN, AP1, AP2, and AP3 shown in FIG. 84.

The "FROM" in the row (horizontal) direction shows the start address of the storage area in the memory 553 where storage of the program of the corresponding column is allowed.

The "FROM" in the row direction shows the start address of the address range of the memory 553 where the program of the corresponding column is allowed access.

The "TO" in the row direction shows the end address of the address range of the memory 553 where the program of the corresponding column is allowed access.

The write inter-AP call relation defining data 585_3 shows the combinations of programs to which program modules which may call or be called from belong when a program module is called up when the CPU 552 is executing a read instruction.

Figure 99:
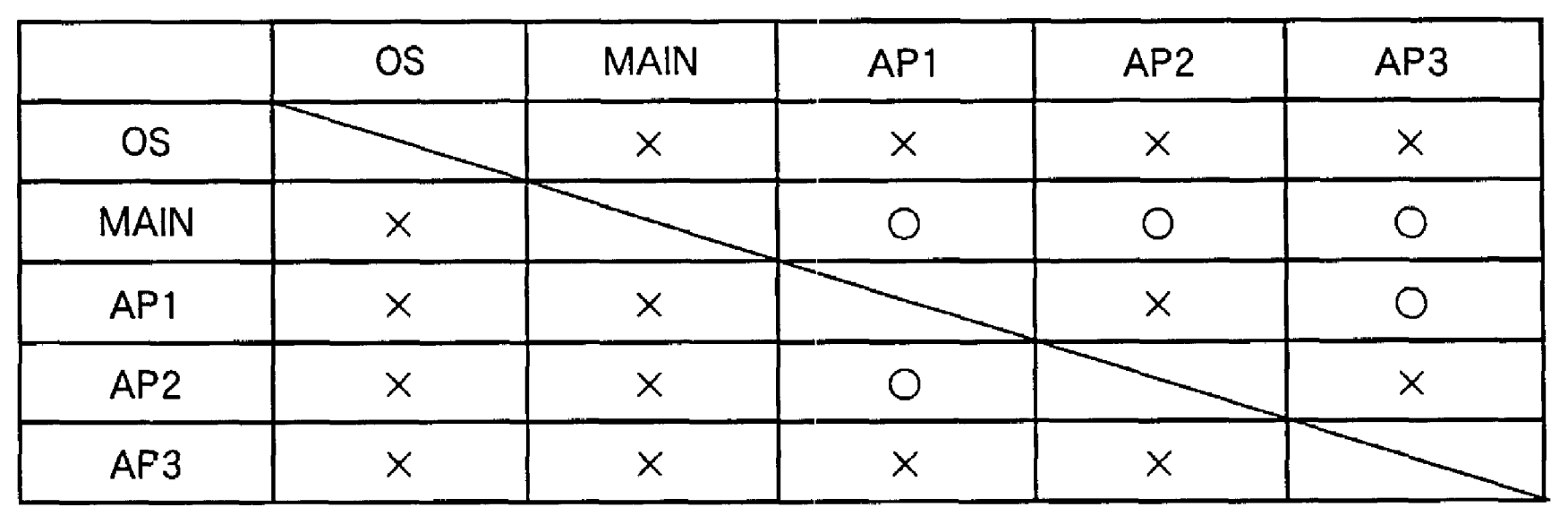

FIG. 99 is a view for explaining the write inter-AP call relation defining data 585_3.

The column direction of FIG. 99 shows the programs of the OS layer and application programs MAIN, AP1, AP2, and AP3 shown in FIG. 84.

The row direction of FIG. 99 shows the programs of the OS layer and application programs MAIN, AP1, AP2, and AP3 shown in FIG. 84.

The intersecting positions of the columns and rows show whether a program module of a program of the corresponding column is allowed to call up a program module of a program of the corresponding row. The "o" indicates that callup is allowed, while the "x" indicates that callup is not allowed.

The judgment unit 582_3 judges if the address CPU ADR is included in the address range of the memory 553 defined by the "FROM" and "TO" of the column shown in FIG. 98 corresponding to the program indicated by the executing AP instructing signal S552b based on the executing AP instructing signal S552b and address CPU_ADR input from the CPU 552 shown in FIG. 89 and the write access range defining data 584_3 read from the storage unit 581_3.

When judging that it is included in that judgment, the judgment unit 582_3 for example generates a write judgment result signal S573 instructing connection and outputs it toward the terminal 575_3 of the selection circuit 570 shown in FIG. 90.

On the other hand, when judging that it is not included in that judgment, the judgment unit 582_3 generates for example a write judgment result signal S573 instructing disconnection (break) and outputs it toward the terminal 575_3 of the selection circuit 570 shown in FIG. 90.

Further, when a program module of a program being executed by the CPU 552 calls up a program module of another program, the judgment unit 582_3 judges if that callup is allowed by the combination shown by the write inter-AP call relation defining data 585_3 shown in FIG. 99 based on the executing AP instructing signal S552b and called AP instructing signal S552c input from the CPU 552 shown in FIG. 89 and the write inter-AP call relation defining data 585_3 read from the storage unit 581_3.

When judging that it is allowed in that judgment, the judgment unit 582_3 for example generates a write judgment result signal S573 instructing connection and outputs this toward the terminal 575_3 of the selection circuit 570 shown in FIG. 90.

On the other hand, when judging that it is not allowed in that judgment, the judgment unit 582_3 generates for example a write judgment result signal S573 instructing disconnection and outputs this toward the terminal 575_3 of the selection circuit 570 shown in FIG. 90.

Next, the selection circuit 570 will be explained.

The selection circuit 570 connects the switch 574 to one of the terminals 575_1, 575_2, and 575_3 based on the instruction type instructing signal S552a from the CPU 552.

Specifically, when the instruction type instructing signal S552a indicates a fetch instruction, the selection circuit 570 connects the switch 574 to the terminal 575_1 and outputs the fetch judgment result signal S571 as the judgment result S560 to the switch circuit 561. Due to this, the connection/disconnection of the switch circuit 561 is controlled by the fetch judgment result signal S571.

Further, when the instruction type instructing signal S552a indicates a read instruction, the selection circuit 570 connects the switch 574 to the terminal 575_2 and outputs the read judgment result signal S572 as the judgment result S560 to the switch circuit 561. Due to this, the connection/disconnection of the switch circuit 561 is controlled by the read judgment result signal S572.

Further, when the instruction type instructing signal S552a indicates a write instruction, the selection circuit 570 connects the switch 574 to the terminal 575_3 and outputs the write judgment result signal S573 as the judgment result S560 to the switch circuit 561. Due to this, the connection/disconnection of the switch circuit 561 is controlled by the write judgment result signal S573.

Next, examples of the operation of the computer 551 will be explained.

[First Example of Operation]

Next, an example of the operation where the computer 551 executes a fetch instruction in the process of execution of a program module of the application program AP1 and designates the address "2100H" of the address memory 553 will be explained.

In this case, a CPU_ADR indicating "2100H" flows on the CPU address bus 507, and an instruction type instructing signal S552a indicating a fetch instruction and an executing AP instructing signal S552b indicating AP1 are output from the CPU 552 to the judgment circuit 560.

Further, the judgment unit 582_1 shown in FIG. 91 judges if the address "2100H" is included in the address range "2000H" to "2FFFH" of the memory 553 defined by the "FROM" and "TO" of the column shown in FIG. 92 corresponding to the AP1 based on the executing AP instructing signal S552b and address CPU_ADR input from the CPU 552 and fetch access range defining data 584_1 shown in FIG. 92 read from the storage unit 581

Further, the judgment unit 582_1 generates a fetch judgment result signal S571 instructing connection and outputs it toward the terminal 575_1 of the selection circuit 570 shown in FIG. 90.

Further, the selection circuit 570 connects the switch 574 to the terminal 575_1 since the instruction type instructing signal S552a indicates a fetch.

Due to this, a fetch judgment result signal S571 instructing connection is output through the selection circuit 570 as the judgment result signal S560 to the switch circuit 561 shown in FIG. 89.

Further, the switch circuit 561 places the CPU data bus 506 and memory data bus 562 in the connection state to allow the CPU 552 to access the memory 553.

Note that, in the above explained case, when the address CPU_ADR indicates "3100H", since that address is not included in the address range "2000H" to "2FFFH", a fetch judgment result signal S571 instructing disconnection is output from the selection circuit 570 to the switch circuit 561. Due to this, the switch circuit 561 sets the CPU data bus 506 and memory data bus 562 in the disconnection state to prevent the CPU 552 from accessing the memory 553.

[Operation of Second Example]

Next, an example of the operation in the case where a program module of the application program AP2 calls up a program of the application program AP1 when the computer 551 executes a read instruction will be explained.

In this case, the executing AP instructing signal S552b showing AP2 and the called AP instructing signal S552c showing AP1 are output from the CPU 552 to the read judgment circuit 572.

The judgment unit 582_2 of the read judgment circuit 572 views the read inter-AP call relation defining data 585_2 shown in FIG. 96 and judges if a call from the AP2 to AP1 is allowed.

Further, the judgment unit 582_2 generates a read judgment result signal S572 instructing connection and outputs this toward the terminal 575_2 of the selection circuit 570 shown in FIG. 90.

Further, the selection circuit 570 connects the switch 574 to the terminal 575_2 since the instruction type instructing signal S552a indicates a read instruction.

Due to this, a read judgment result signal S572 instructing connection is output through the selection circuit 570 as the judgment result signal S560 to the switch circuit 561 shown in FIG. 89.

Further, the switch circuit 561 sets the CPU data bus 506 and memory data bus 562 to the connection state, whereby the CPU 552 can access the memory 553.

On the other hand, in the above case, when the program module of the application program AP2 calls up a program of the application program AP3, it is judged from the read inter-AP call relation defining data 585_2 shown in FIG. 96 that a call from the AP2 to AP3 is not allowed.

Further, the judgment unit 582_2 generates the read judgment result signal S572 instructing disconnection and outputs this toward the terminal 575_2 of the selection circuit 570 shown in FIG. 90.

Due to this, a read judgment result signal S572 instructing disconnection is output through the selection circuit 570 as the judgment result signal S560 to the switch circuit 561 shown in FIG. 89.

Further, the switch circuit 561 sets the CPU data bus 506 and memory data bus 562 to the disconnection state to prevent the CPU 552 from accessing the memory 553.

As explained above, the judgment circuit 560 and switch circuit 561 determine the connection state between the memory 553 and CPU data bus 506 based on data defined in advance in accordance with each program in accordance with a program being executed by the CPU 552.

Therefore, an application program being executed by the CPU 552 can be prevented from illicitly accessing instructions and data of another application program stored in the memory 553 and a high security can be obtained among application programs even when the CPU 552 is executing a plurality of application programs.

The present invention is not limited to the above explained embodiment.

Figure 100:
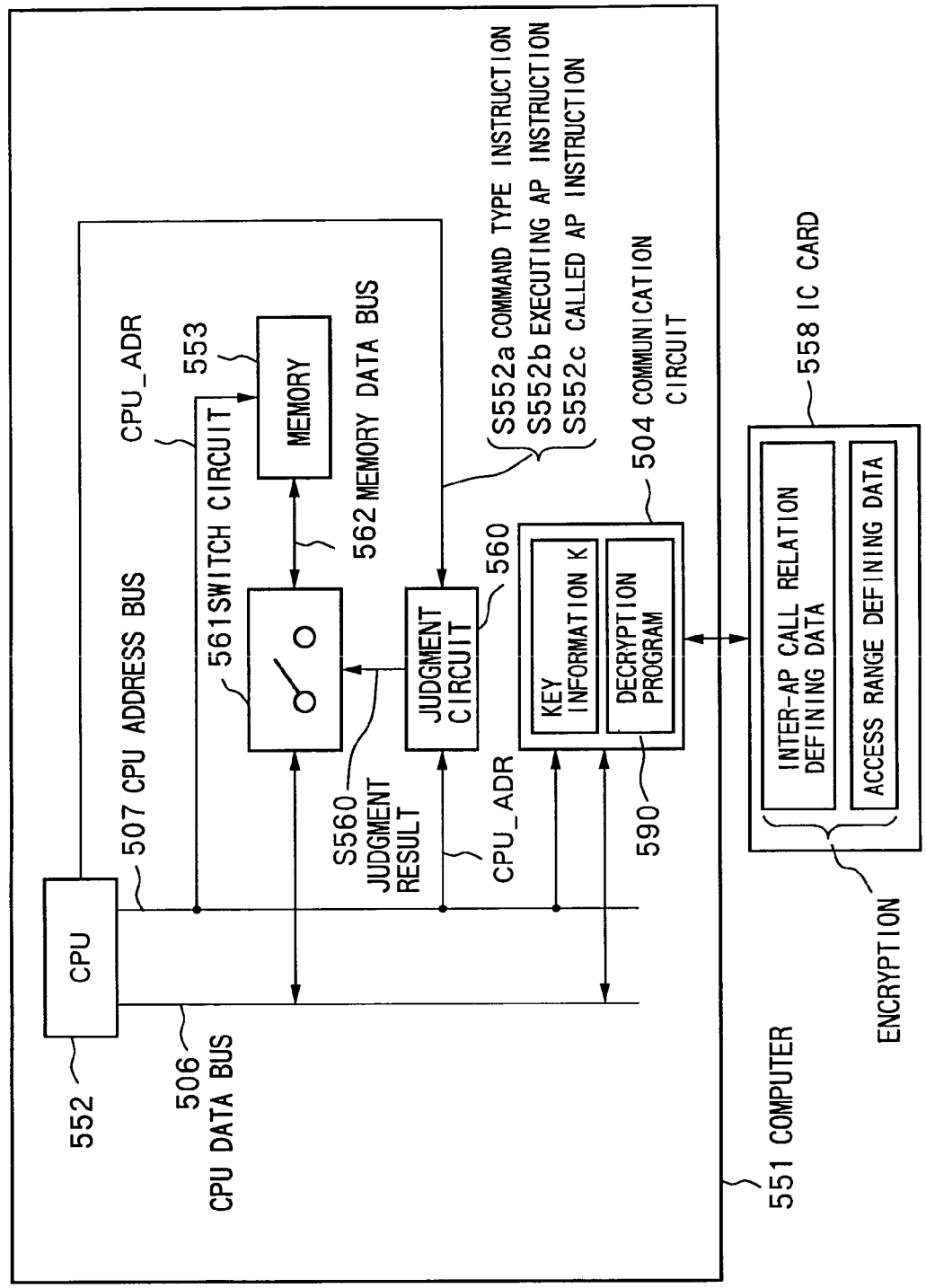
FIG. 100 is a view for explaining another embodiment of the present invention.

For example, in the above explained embodiment, the case was illustrated where the judgment circuit 560 stored fetch access range defining data 584_1, fetch inter-AP call relation defining data 585_1, read access range defining data 584_2, read inter-AP call relation defining data 585_2, write access range defining data 584_3, and write inter-AP call relation defining data 585_3, but as shown in FIG. 100, it is also possible to use an IC card 558 storing such data in a state encrypted using key information K.

In this case, the judgment circuit 560 holds the key information K and decryption program 590, accesses the IC card 558 through the CPU data bus 506 and communication circuit 504, reads the fetch access range defining data 584_1, fetch inter-AP call relation defining data 585_1, read access range defining data 584_2, read inter-AP call relation defining data 585_2, write access range defining data 584_3, and write inter-AP call relation defining data 585_3 from the IC card 558, and uses the same decrypted using a predetermined decryption program 590 and key information K.

Further, the present invention may store the above decryption program in an encrypted state in the IC card 558, read this through the communication circuit 504 and CPU data bus 506 into the judgment circuit 560, decrypt this by the judgment circuit 560 using predetermined key information, store the decrypted decryption program in the memory 553, and have the judgment circuit 560 read and execute the decryption program from the memory 553.

Figure 101:
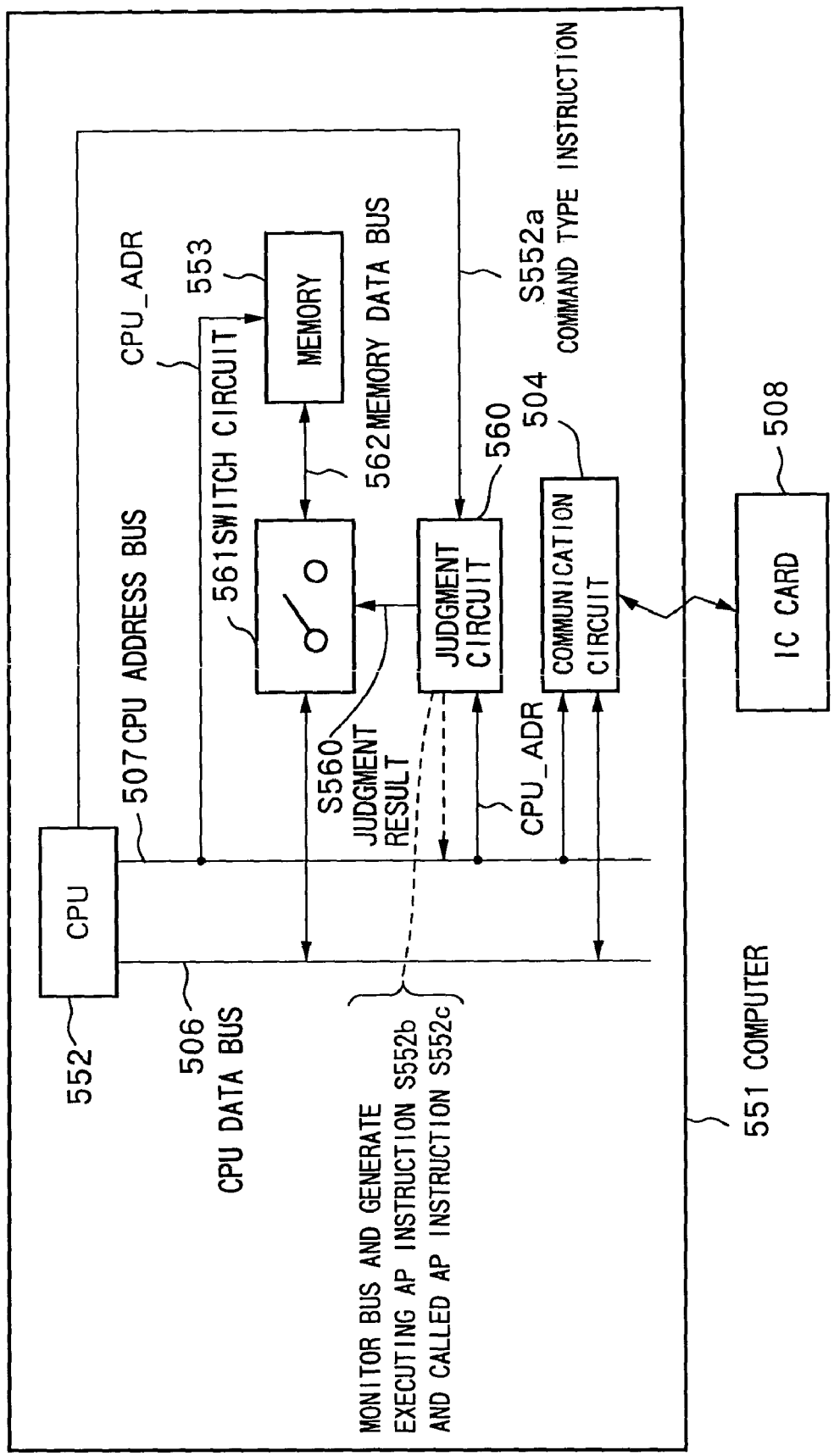
FIG. 101 is a view for explaining another embodiment of the present invention.

Further, in the above explained embodiment, the case was shown of the CPU 552 outputting to the judgment circuit 560 an executing AP instructing signal S552b and called AP instructing signal S552c, but these signals may also be generated, as shown in FIG. 101, by the judgment circuit 560 monitoring the CPU address bus 507.

Seventh Embodiment

The present embodiment is an embodiment corresponding to the 20th and 21st aspects of the invention.

Figure 102:
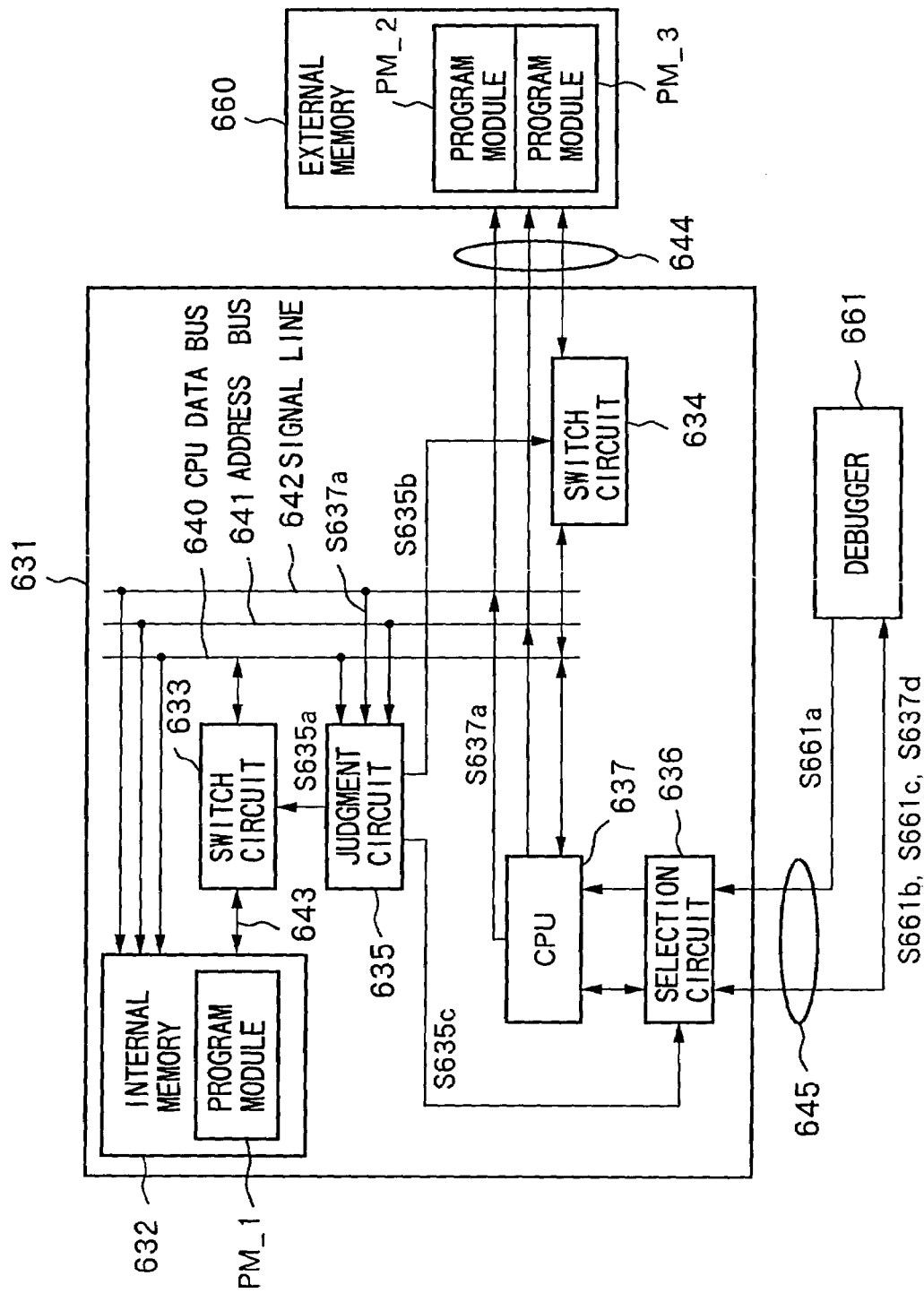
FIG. 102 is a view of the configuration of a semiconductor chip of a first embodiment of the present invention.

FIG. 102 is a view of the configuration of a semiconductor chip 631 of an embodiment of the present invention.

As shown in FIG. 102, the semiconductor chip 631 has an internal memory 632, switch circuit 633, switch circuit 634, judgment circuit 635, selection circuit 636, and CPU 637.

The internal memory 632, switch circuit 633, switch circuit 634, judgment circuit 635, and CPU 637 are connected to a CPU data bus 640.

The internal memory 632, judgment circuit 635, and CPU 637 are connected to an address bus 641.

The internal memory 632, judgment circuit 635, and CPU 637 are connected to a signal line 642.

Further, the internal memory 632 is further connected to an internal data bus 643.

Further, the switch circuit 634 is further connected through an external data bus 644 to an external memory 660.

Further, the selection circuit 636 is further connected through an external data bus 645 to a debugger 661.

Here, the semiconductor chip 631 corresponds to the semiconductor circuit of the first aspect of the invention, the CPU data bus 640 corresponds to the first transmission line of the first semiconductor circuit, the program module PM_1 corresponds to an instruction for executing a program of the first aspect of the invention, the internal memory 632 corresponds to the storage circuit of the first aspect of the invention, the CPU 637 corresponds to the processing circuit of the first aspect of the invention, the switch circuit 633 corresponds to the first connection switching circuit of the first aspect of the invention, the switch circuit 634 corresponds to the second connection switching circuit of the first aspect of the invention, the judgment circuit 635 corresponds to the connection control circuit of the first aspect of the invention, the selection circuit 636 corresponds to the third connection switching circuit of the first aspect of the invention, the external memory 660 corresponds to the storage apparatus of the first aspect of the invention, and the debugger 661 corresponds to the external apparatus of the first aspect of the invention.

Further, the signal line 642 corresponds to the third transmission line of the first aspect of the invention, while the address bus 641 corresponds to the fourth transmission line of the first aspect of the invention.

Further, the judgment result signal S635a corresponds to the first control signal of the first aspect of the invention, the judgment result signal S635b corresponds to the second control signal of the first aspect of the invention, and the judgment result signal S635c corresponds to the third control signal of the first aspect of the invention.

Figure 103:
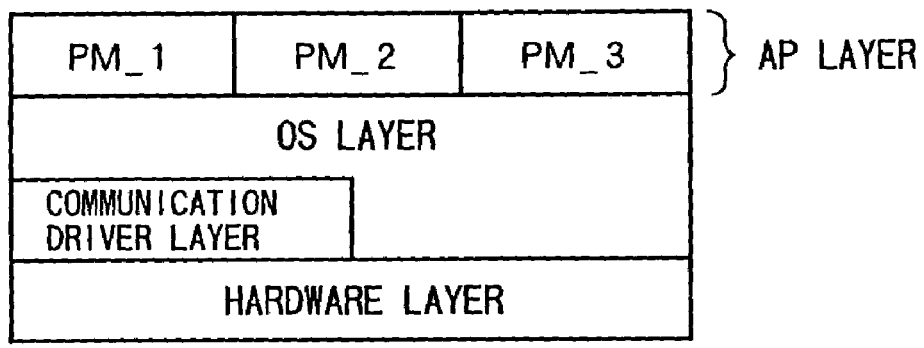
FIG. 103 is a view for explaining the software configuration of the semiconductor chip shown in FIG. 102.

FIG. 103 is a view for explaining the software configuration of the semiconductor chip 631 shown in FIG. 102.

In FIG. 103, the bottommost layer is the hardware layer, that is, the hardware component of the semiconductor chip 631 shown in FIG. 102.

Above the hardware layer is positioned a communication driver layer. The communication driver layer has positioned in it a communication driver layer for controlling the communication. The program of the communication driver layer is usually stored in a nonvolatile memory.

Above the communication driver layer is an operating system (OS) layer for providing the program forming the foundation for the operation of the semiconductor chip 631. The OS layer provides the highest application (AP) layer with higher concept services compared with the lower layers.

Further, above the OS layer is an AP layer defining the specific functions (services) realized by the semiconductor chip 631. The AP layer has, for example, application programs AP1, AP2, and AP3 realized by the program modules PM_1, PM_2, and PM_3 shown in FIG. 102.

The internal memory 632 stores the program module PM_1 of the application program AP1 shown in FIG. 103.

Figure 104:
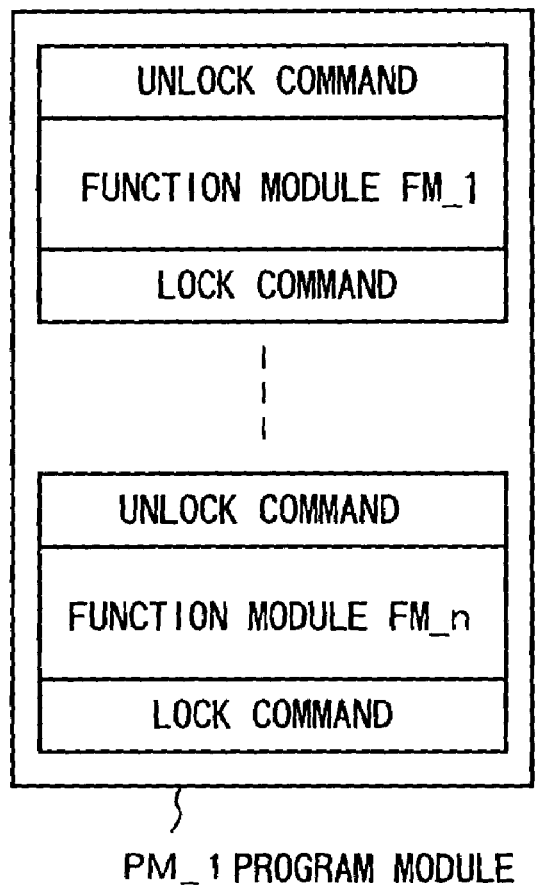
FIG. 104 is a view for explaining the configuration of a program module shown in FIG. 102.

FIG. 104 is a view for explaining the configuration of the program module PM_1.

As shown in FIG. 104, the program module PM_1 is comprised of a plurality of function modules. FIG. 104 shows the case where it is comprised of n number of function modules FM_1 to FM_n.

As shown in FIG. 104, the instruction (code) at the head of each of the function modules FM_1 to FM_n is an unlock instruction, while the tail instruction is a lock instruction.

Here, a lock instruction is an instruction instructing a later explained judgment circuit 635 to hold the switch circuit 633 in the connection state until the next unlock instruction.

Further, an unlock instruction is an instruction instructing the switch circuit 633 to switch to the disconnection state.

The switch circuit 633 is interposed between the CPU data bus 640 and the internal data bus 643.

The switch circuit 633 becomes either the connection state or disconnection state based on the judgment result signal S635a input from the judgment circuit 635.

The switch circuit 634 is interposed between the CPU data bus 640 and external data bus 644.

The switch circuit 634 becomes either the connection state or disconnection state based on the judgment result signal S635b input from the judgment circuit 635.

The judgment circuit 635 monitors the address bus 641 and signal line 642. When the address signal output by the CPU 637 to the address bus 641 indicates the address where the program module PM_1 is stored in the internal memory 632, and the instruction type instructing signal S637a output by the CPU 637 to the signal line 642 indicates a fetch instruction, it generates a judgement result signal S635a instructing connection. In other cases, it generates a judgment result signal S635a instructing disconnection.

The judgment circuit 635 outputs the judgment result signal S635a to the switch circuit 633.

Further, when the judgment circuit 635 generates a judgment result signal S635a instructing connection, it generates a judgment result signal S635b instructing disconnection and outputs it to the switch circuit 634.

Further, when the judgment circuit 635 generates a judgment result signal S635a instructing disconnection, it generates a judgment result signal S635b instructing connection and outputs this to the switch circuit 634.

Further, when the judgment circuit 635 generates a judgment result signal S635a instructing connection, it generates a judgment result signal S635c instructing invalidity/disconnection and outputs this to the selection circuit 636.

Further, when the judgment circuit 635 generates a judgment result signal S635a instructing disconnection, it generates a judgment result signal S635c instructing validity/connection and outputs this to the selection circuit 636.

Further, when a function module in the program module PM_1 is called up by a branch instruction included in another function module being executed by the CPU 637 during execution of the program module PM_1 shown in FIG. 104 by the CPU 637, the judgment circuit 635 outputs a judgment result signal S635a instructing connection to the switch circuit 633 conditional on the instruction at the head of the called function module first starting a fetch (that is, when a branch instruction designating the instruction at the head of the called function module is being executed).

As explained using FIG. 104, since the head of each function module has an unlock instruction (disconnection release instruction of the first aspect of the invention) positioned at it, the judgment circuit 635 outputs a judgment result signal S635a instructing connection to the switch circuit 633 based on the unlock instruction until the next lock instruction (disconnection start instruction of the first aspect of the invention) is executed. At this time, as explained earlier, the switch circuit 634 is issued a judgment result signal S635b instructing disconnection, while the selection circuit 636 is issued a judgment result signal S635c instructing invalidity/disconnection, so a temporary halt of the operation of the CPU 637 by the debugger 661 or acquisition of the CPU internal status information from the CPU 637 are not possible. Therefore, the function modules FM_1 to FM_n shown in FIG. 104 cannot be accessed from the program modules PM_2 and PM_3 present in the external memory 660 or the debugger 661.

Further, when a function module in the program module PM_1 is called up by the CPU 637 executing a branch instruction included in another function module while the CPU 637 is executing the program module PM_1 shown in FIG. 104, when first fetching an instruction other than the instruction positioned at the head of the function module of that call destination, the judgment circuit 635 outputs a judgment result signal S635a instructing disconnection to the switch circuit 633. Further, in this case, the judgment circuit 635, for example, halts the operation of the CPU 637 or performs predetermined error processing.

When the judgment result signal S635c from the judgment circuit 635 indicates invalidity/disconnection, the selection circuit 636 invalidates the HALT signal S661a input from the debugger 661 (operation halt request of first aspect of the invention) and does not output it to the CPU 637. Here, the HALT signal S661a is a signal instructing a temporary halt to the operation of the CPU 637.

When the judgment result signal S635c from the judgment circuit 635 indicates invalidity/disconnection, the selection circuit 636 invalidates the CPU internal status read request signal S661b and CPU internal status rewrite request signal S661c input from the debugger 661 and does not output them to the CPU 637.

Here, the CPU internal status read request signal S661b is a signal for requesting information showing the internal status of the CPU 637.

The CPU internal status rewrite request signal S661c is a signal for requesting a rewrite of information showing the internal status of the CPU 637.

On the other hand, when the judgment result signal S635c from the judgment circuit 635 indicates validity/connection, the selection circuit 636 outputs the HALT signal S661a input from the debugger 661 to the CPU 637.

When the judgment result signal S635c from the judgment circuit 635 indicates validity/connection, the selection circuit 636 outputs the CPU internal status read request signal S661b and CPU internal status rewrite request signal S661c input from the debugger 661 to the CPU 637. Further, the selection circuit 636 outputs the CPU internal status signal S637d input from the CPU 637 in accordance with the CPU internal status read request signal S661b to the debugger 661.

The CPU 637 outputs the address of the internal memory 632 to the address bus 641 and instruction type instructing signal S637a showing the type of the instruction being executed to the signal line 642 and in accordance with the same performs processing using the instructions and data of the program module PM_1 read from the internal memory 632 through the switch circuit 633 and CPU data bus 640.

Further, the CPU 637 outputs the address of the external memory 660 to the address bus 641 and the instruction type instructing signal S637a to the signal line 642 and in accordance with the same performs processing using the instructions and data of the program modules PM_2, PM_3 read from the external memory 660 through the external data bus 644, switch circuit 634, and CPU data bus 640.

When a HALT signal S661a is input through the selection circuit 636 from the debugger 661, the CPU 637 halts the operation of the CPU 637.

Further, when the CPU 637 receives as input a CPU internal status read request signal S661b through the selection circuit 636 from the debugger 661, it outputs an internal status signal S637d including information showing the internal status in the CPU 637 designated by that signal S661b through the selection circuit 636 to the debugger 661.

Further, when the CPU 637 receives as input a CPU internal status rewrite request signal S661c through the selection circuit 636 from the debugger 661, it rewrites the information showing the internal status of the CPU 637 by the content designated by that signal S661c. Due to this, the operation of the CPU 637 is controlled by the debugger 661.

The debugger 661 uses the HALT signal S661a in accordance with the debugging object to control the operation of the CPU 637, monitors the operation of the CPU 637 using the internal status read request signal S661b and internal status signal S637d, and customizes the CPU 637 by the CPU internal status rewrite request signal S661c.

Next, examples of the operation of the semiconductor chip 631 will be explained.

[First Example of Operation]

For example, consider the case where the debugger 661 outputs to the selection circuit 636 one of the HALT signal S661a, CPU internal status read request signal S661b, and CPU internal status rewrite request signal S661c.

In this case, when the CPU 637 accesses the internal memory 632 through the CPU data bus 640 and switch circuit 633, that is, when the switch circuit 633 is in the connection state, due to the judgment result signal S635c from the judgment circuit 635, the selection circuit 636 becomes the invalidity/disconnection state, and the selection circuit 636 does not output the HALT signal S661a, CPU internal status read request signal S661b, and CPU internal status rewrite request signal S661c to the CPU 637.

Therefore, the debugger 661 cannot access the CPU 637 and cannot access the internal memory 632 either.

On the other hand, when the CPU 637 is not accessing the internal memory 632, that is when the switch circuit 633 is in the disconnection state, due to the judgment result signal S635c from the judgment circuit 635, the selection circuit 636 becomes the validity/connection state, and the selection circuit 636 outputs the HALT signal S661a, CPU internal status read request signal S661b, and CPU internal status rewrite request signal S661c to the CPU 637.

Therefore, the debugger 661 can monitor and set the operation of the CPU 637, but since the switch circuit 633 is in the disconnection state, cannot access the internal memory 632.

[Second Example of Operation]

For example, consider the case where the CPU 637 is accessing the external memory 660 through the switch circuit 634 and external data bus 644.

In this case, due to the judgment result signals S635b and S635c from the judgment circuit 635, the switch circuit 634 and selection circuit 636 become the connection state, but due to the judgment result signal S635a, the switch circuit 633 becomes the disconnection state. Therefore, the internal memory 632 cannot be accessed from the external data buses 644 and 645.

As explained above, in the semiconductor chip 631, when the internal memory 632 and the CPU data bus 640 are in the connection state, external access from the external data buses 644 and 645 is not allowed.

Therefore, according to the semiconductor chip 631, it is possible to reliably protect the program module PM_1 stored in the internal memory 632 from illicit access from outside of the semiconductor chip 631 and therefore possible to maintain the confidentiality of the program module PM_1.

Further, according to the semiconductor chip 631, the process of execution of the program module PM_1 by the CPU 637 cannot be monitored and analyzed from the outside.

Further, according to the semiconductor chip 631, it is possible to prevent a confidential program module PM_1 from being illicitly accessed from program modules PM_2 and PM_3 stored in the external memory 660.

Eighth Embodiment

The present embodiment is an embodiment corresponding to the 20th and 21st aspects of the invention.

Figure 105:
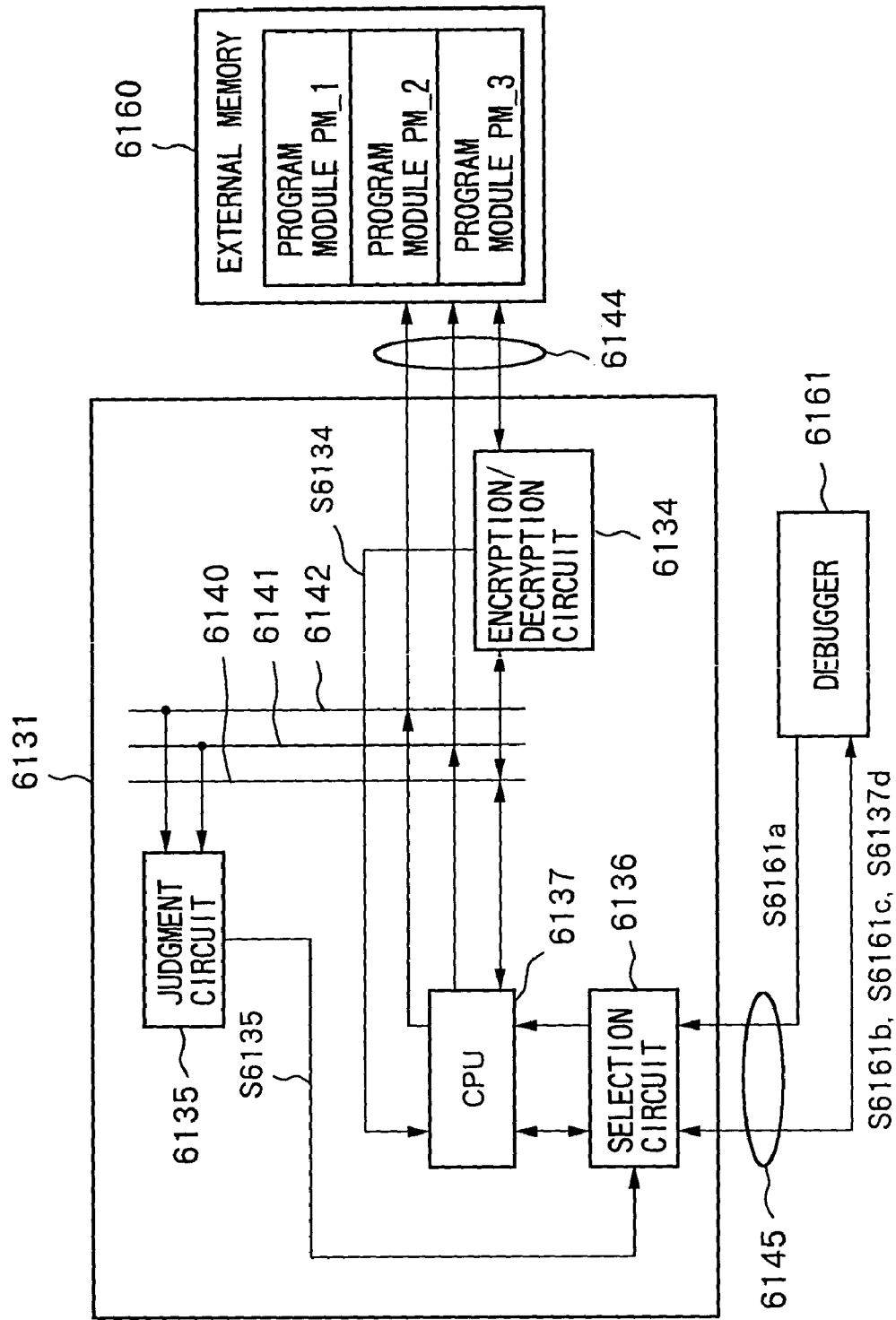
FIG. 105 is a view of the configuration of a semiconductor chip of a second embodiment of the present invention.

FIG. 105 is a view of the configuration of the semiconductor chip 6131 of an embodiment of the present invention.

As shown in FIG. 105, the semiconductor chip 6131 has an encryption/decryption circuit 6134, judgment circuit 6135, selection circuit 6136, and CPU 6137.

The encryption/decryption circuit 6134 and CPU 6137 are connected to a CPU data bus 6140.

The judgment circuit 6135 and CPU 6137 are connected to an address bus 6141.

The judgment circuit 6135 and CPU 6137 are connected to a signal line 6142.

Further, the encryption/decryption circuit 6134 is further connected through an external data bus 6144 to an external memory 6160

Further, the selection circuit 6136 is further connected through an external data bus 6145 to a debugger 6161.

Note that in the semiconductor chip 6131 as well, the software structure shown in FIG. 103 is similarly applied.

Here, the semiconductor chip 6131 corresponds to the semiconductor circuit of the second aspect of the invention, the external data bus 6144 corresponds to the first transmission line of the first aspect of the invention, the external memory 6160 corresponds to the storage apparatus of the second aspect of the invention, the program module PM_1 corresponds to the instruction for executing a program of the second aspect of the invention, the encryption/decryption circuit 6134 corresponds to the encryption/decryption circuit of the second aspect of the invention, the judgment circuit 6135 corresponds to the control circuit of the second aspect of the invention, the selection circuit 6136 corresponds to the selection circuit of the second aspect of the invention, the CPU 6137 corresponds to the second computation circuit, and the external data bus 6145 corresponds to the second transmission line of the second aspect of the invention.

First, the external memory 6160 will be explained.

As shown in FIG. 105, the external memory 6160 stores the program modules PM_1, PM_2, and PM_3.

In the present embodiment, the case where the program module PM_1 has confidentiality will be illustrated.

The confidential program module PM_1 is encrypted and stored in the external memory 6160. The nonconfidential program modules PM_2 and PM_3 may be encrypted or not.

Figure 106:
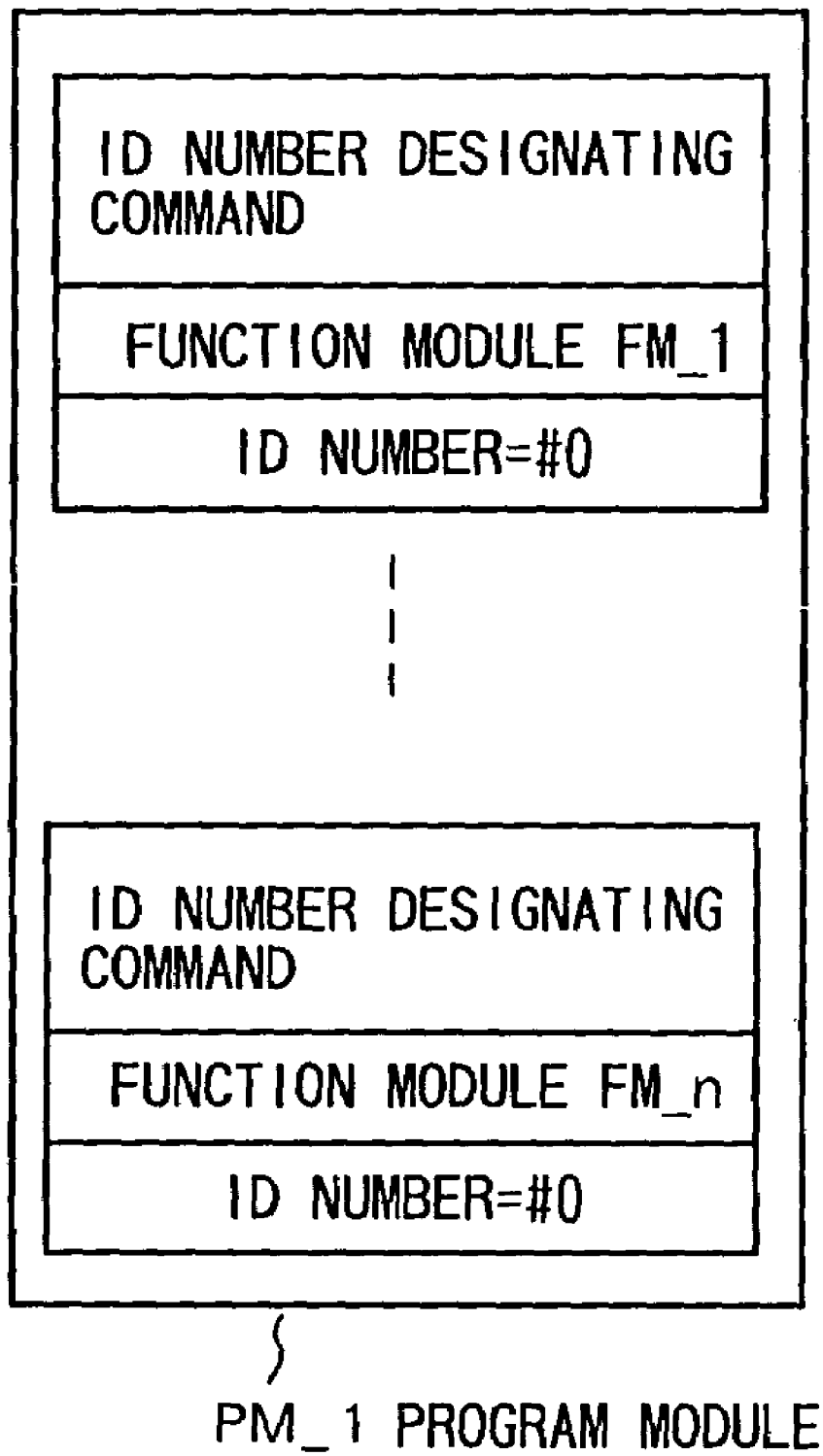
FIG. 106 is a view for explaining the configuration of a program module shown in FIG. 105.

FIG. 106 is a view for explaining the configuration of the program module PM_1.

As shown in FIG. 106, the program module PM_1 is comprised of a plurality of function modules. FIG. 106 shows the case where it is comprised of n number of function modules FM_1 to FM_n.

As shown in FIG. 106, the heads of the function modules FM_1 to FM_n are set with ID number designating information designating the ID numbers. The ID number designating instructions are not encrypted.

Here, an ID number is information for identifying a corresponding function module. As explained later, when the encryption/decryption circuit 6134 decrypts the function modules, it is used for specifying the key information to be used for that decryption.

Further, at the tail ends of the function modules FM_1 to FM_n are placed instructions designating the ID number as "#0" (instructions indicating that the following instructions do not use keys, that is, are not encrypted)

Figures 107, 108:
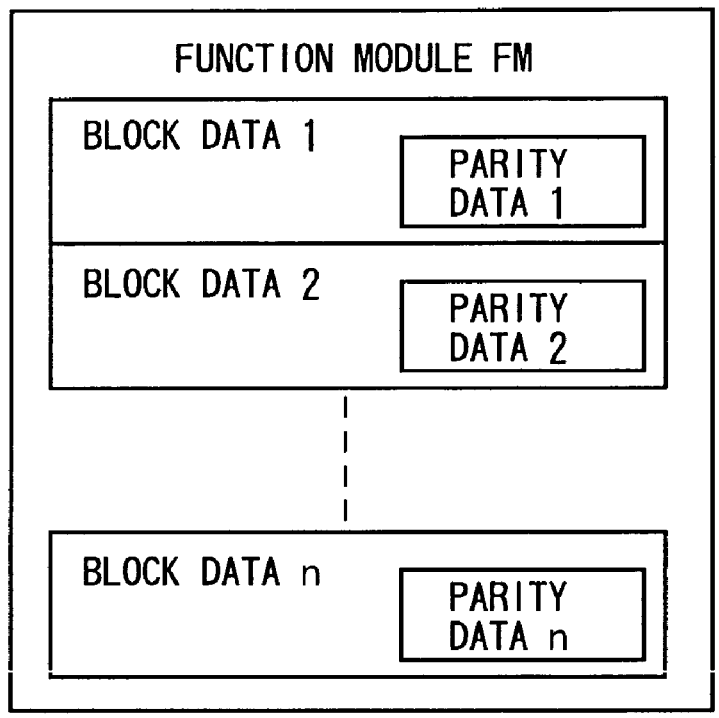
FIG. 107 is a view for explaining the unit of encryption and decryption performed by the encryption/decryption circuit shown in FIG. 105 and parity data.
FIG. 108 is a view for explaining key information table held by the encryption/decryption circuit shown in FIG. 105.

The function modules, as shown in FIG. 107, are encrypted in units of block data of predetermined data lengths. The block data 1 to n have parity data 1 to n added to them.

The encryption/decryption circuit 6134, for example, encrypts the function modules shown in FIG. 106 of the program module PM_1 to be written in the external memory 6160, as shown in FIG. 107, in units of predetermined block data.

At this time, the encryption/decryption circuit 6134 encrypts each function block using any key information and sets at the head of each function block unencrypted (plain text) ID number designating instructions (information) designating the ID number for identifying the function modules as explained earlier using FIG. 106.

Further, the encryption/decryption circuit 6134 generates and holds the key information table 6190 shown in FIG. 108 showing the ID numbers designated for the function modules (key specifying information of the second aspect of the invention) and key information used for encrypting the function modules linked together.

Further, when the encryption/decryption circuit 6134 encrypts the block data, as shown in FIG. 107, it generates parity data for the block data and stores that parity data linked with the corresponding block data in the external memory 6160. At this time, the encryption/decryption circuit 6134 generates parity data so that the sum total of the block data and parity data becomes a predetermined value.

Further, the encryption/decryption circuit 6134 obtains key information for the function module input from the external memory 6160 by viewing the key information table 6190 shown in FIG. 108 using as a key the ID number designated by the ID number designating instruction at the head of that function module. Further, the encryption/decryption circuit 6134 uses that key information to encrypt that function module in units of the above-mentioned block data.

Further, the encryption/decryption circuit 6134 decrypts the function module, then judges the legitimacy of the parity data corresponding to that function module. At this time, if judging it legitimate, it outputs that decrypted data to the CPU 6137. On the other hand, if judging it is not legitimate, it halts the operation of the CPU 6137 or performs predetermined error processing.

Note that, in the present embodiment, the data length of the block data and the data length of the function module may be the same or different.

The judgment circuit 6135 generates a judgment result signal S6135 instructing invalidity/disconnection and outputs it to the selection circuit 6136 when the CPU 6137 is accessing (for example, fetching) a confidential program module PM_1.

Further, judgment circuit 6135 generates a judgment result signal S6135 instructing validity/connection and outputs it to the selection circuit 6136 when the CPU 6137 is not accessing (for example, fetching) a confidential program module PM_1.

The judgment circuit 6135 monitors the addresses and instructions output by the CPU 6137 and flowing over the address bus 6141 and signal line 6142 and, based on the same, judges if the CPU 6137 is accessing the program module PM_1.

When the judgment result signal S6135 from the judgment circuit 6135 indicates invalidity/disconnection, the selection circuit 6136 invalidates the HALT signal S6161a input from the debugger 6161 (operation halt request of second aspect of the invention) and does not output it to the CPU 6137. Here, the HALT signal S6161a is a signal instructing to temporarily halt the operation of the CPU 6137.

When the judgment result signal S6135 from the judgment circuit 6135 indicates invalidity/disconnection, the selection circuit 6136 invalidates the CPU internal status read request signal S6161b and CPU internal status rewrite request signal S6161c input from the debugger 6161 and does not output them to the CPU 6137.

Here, the CPU internal status read request signal S6161b is a signal requesting information showing the internal status of the CPU 6137.

The CPU internal status rewrite request signal S6161c is a signal requesting rewrite of the information showing the internal status of the CPU 6137.

On the other hand, when the judgment result signal S6135 from the judgment circuit 6135 indicates validity/connection, the selection circuit 6136 outputs the HALT signal S6161a input from the debugger 6161 to the CPU 6137.

When the judgment result signal S6135 from the judgment circuit 6135 indicates validity/connection, the selection circuit 6136 outputs the CPU internal status read request signal S6161b and CPU internal status rewrite request signal S6161c input from the debugger 6161 to the CPU 6137. Further, the selection circuit 6136 outputs the CPU internal status signal S6137d input from the CPU 6137 in accordance with the CPU internal status read request signal S6161b to the debugger 6161.

The CPU 6137 outputs to the address bus 6141 the address of the external memory 6160 and to the signal line 6142 an instruction type instructing signal S6137a showing the type of the instruction being executed and, in accordance with the same, performs processing using instructions and data of the program modules PM_1, PM_2, and PM_3 read from the external memory 6160 through the external data bus 6144 and encryption/decryption circuit 6134.

When the CPU 6137 receives as input the HALT signal S6161a through the selection circuit 6136 from the debugger 6161, the operation of the CPU 6137 is halted.

Further, when CPU 6137 receives as input the CPU internal status read request signal S6161b through the selection circuit 6136 from the debugger 6161, it outputs the internal status signal S6137d including information showing the internal status in the CPU 6137 designated by that signal S6161b through the selection circuit 6136 to the debugger 6161.

Further, when the CPU 6137 receives the CPU internal status rewrite request signal S6161c through the selection circuit 6136 from the debugger 6161, it rewrites the information showing the internal status of the CPU 6137 by the content designated by the signal S6161c. Due to this, the operation of the CPU 6137 is controlled by the debugger 6161.

The debugger 6161 uses the HALT signal S6161a corresponding to the debugging object to control the operation of the CPU 6137, monitors the operation of the CPU 6137 using the internal status read request signal S6161b and internal status signal S6137d, and customizes the CPU 6137 by the CPU internal status rewrite request signal S6161c.

Next, examples of the operation of the semiconductor chip shown in FIG. 105 will be explained.

[First Example of Operation]

In this example of operation, the case where the CPU 6137 writes into the external memory 6160 data of the program module PM_1 will be explained.

The CPU 6137 outputs the write data through the CPU data bus 6140 to the encryption/decryption circuit 6134.

Further, the encryption/decryption circuit 6134 encrypts the write data, as explained earlier, using key information corresponding to the function modules in units of block data and writes the same through the external data bus 6144 in the external memory 6160.

Further, information relating to the key information used for the encryption is added to the key information table 6190 shown in FIG. 108.

At this time, the judgment circuit 6135 outputs a judgment result signal S6135 showing invalidity/disconnection to the selection circuit 6136, and the HALT signal S6161a, CPU internal status read request signal S6161b, and CPU internal status rewrite request signal S6161c issued from the selection circuit 6136 are not output to the CPU 6137.

Further, since the write data is not encrypted on the external data bus 6144, even if the external data bus 6144 is illicitly probed, the confidentiality of the program module PM_1 is not lost.

[Second Example of Operation]

In this example of operation, the case where the CPU 6137 reads instructions or data of the program module PM_1 from the external memory 6160 will be explained.

Due to a read instruction issued by the CPU 6137, instructions or data of the program module PM_1 are read from the designated address of the external memory 6160 and output through the external data bus 6144 to the encryption/decryption circuit 6134.

Further, the encryption/decryption circuit 6134 views the key information table 6190 shown in FIG. 108 based on the ID number shown by the ID number designating instruction set at the head of each function module input and obtains the key information corresponding to that ID number.

Further, the encryption/decryption circuit 6134 decrypts the instructions or data read from the external memory 6160 using that key information in units of block data and then performs parity processing.

Further, the parity processed data or instructions are output through the CPU data bus 6140 to the CPU 6137.

At this time, the judgment circuit 6135 outputs a judgment result signal S6135 indicating invalidity/disconnection to the selection circuit 6136, and the HALT signal S6161a, CPU internal status read request signal S6161b, and CPU internal status rewrite request signal S6161c issued from the selection circuit 6136 are not output to the CPU 6137.

Further, since the write data is not encrypted on the external data bus 6144, even if the external data bus 6144 is illicitly probed, the confidentiality of the program module PM_1 is not lost.

As explained above, according to the semiconductor chip 6131, even when storing a confidential program module PM_1 in an external memory 6160 outside of the semiconductor chip 6131, the confidentiality of the program module PM_1 can be held.

That is, when a confidential program module PM_1 stored in the external memory 6160 is accessed by the CPU 6137, the selection circuit 6136 prohibits the debugger 6161 from communicating with the CPU 6137, so it is possible to prevent the processing of the program module PM_1 being executed by the CPU 6137 from being illicitly monitored by the debugger 6161.

Further, since parity processing is performed after decrypting data and instructions read from the external memory 6160, when unsuitable key information is used for the decryption or when the data and instructions are destroyed or tampered with, this can be detected by the parity processing and suitably dealt with.

The present invention is not limited to the above explained embodiment.

For example, in the above explained embodiment, the case was illustrated in which the key information table 6190 shown in FIG. 108, that is, the key information, was held in the judgment circuit 6135, but it is also possible to encrypt the key information table 6190 and store it in the external memory 6160.

Ninth Embodiment

The present embodiment is an embodiment corresponding to the 22nd to 24th aspects of the invention.

Next, this embodiment of the present invention will be explained with reference to the attached drawings.

FIG. 109 is a view of the overall configuration of the communication system 701 of the present embodiment.

As shown in FIG. 109, the communication system 701 uses the server 702, IC card 703, card reader/writer 704, personal computer 705, ASP (application service provider) server 719, and SAM (secure application module) unit 709 to communicate through the Internet 710 and perform settlement processing or other processing for a procedure using the IC card 703 (integrated circuit of the present invention).

The SAM unit 709 (data processing apparatus of the present invention) has an external memory 707 (storage circuit of the present invention) and SAM chip 708 (semiconductor circuit of the present invention).

Figure 110:
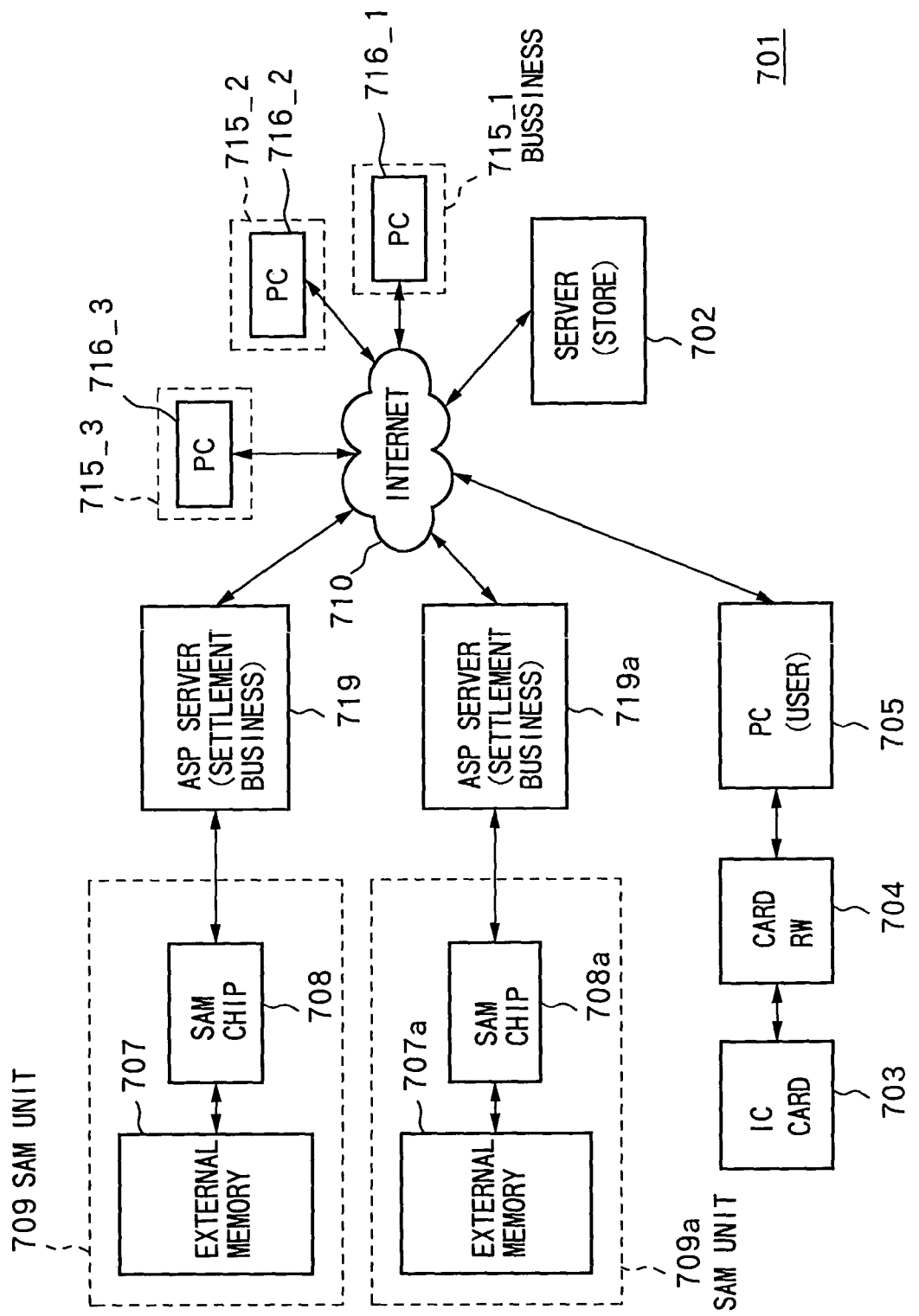
Figure 111:
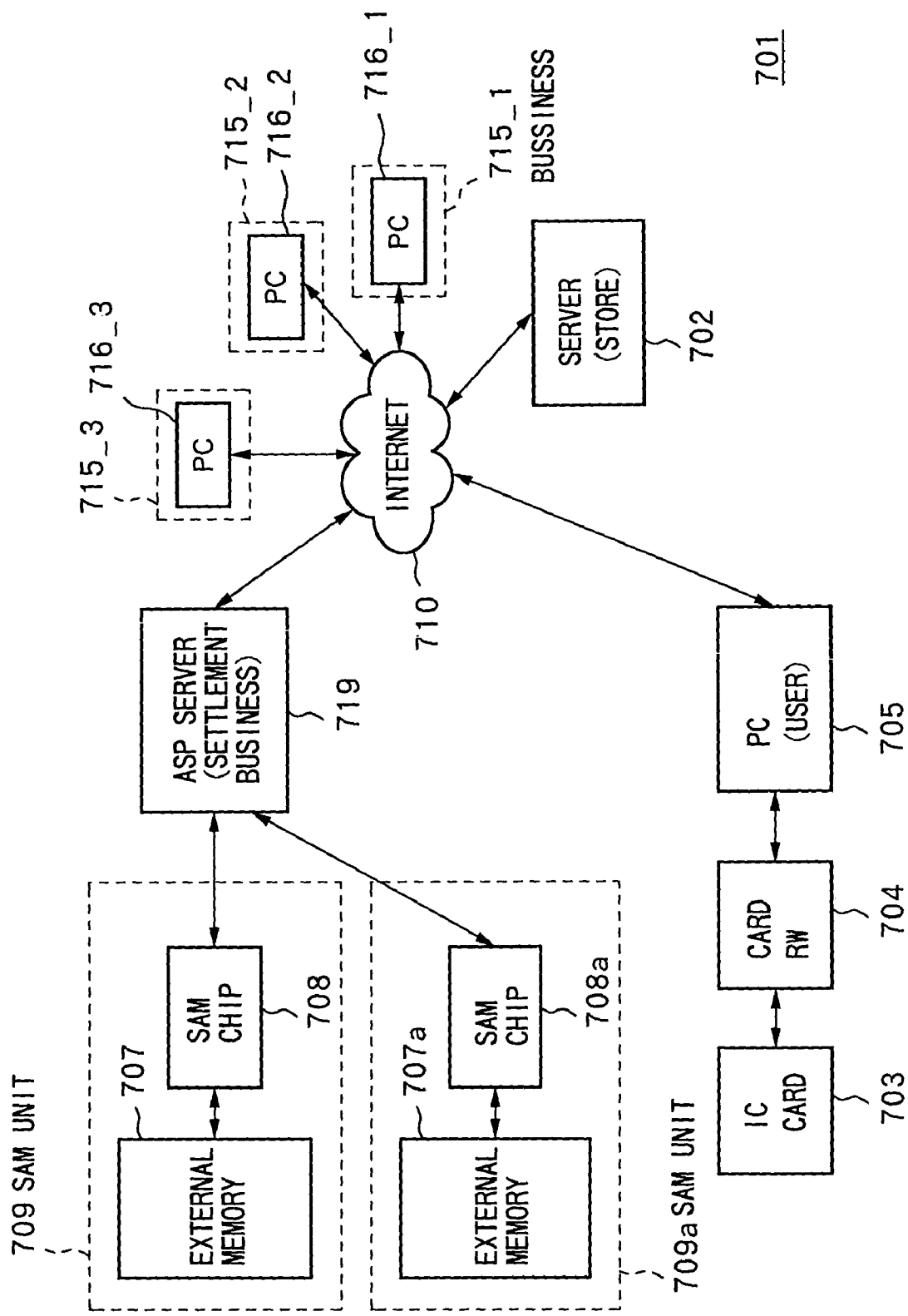

The SAM chip 708, if necessary, transfers data with another SAM chip 708a (other semiconductor circuit of the present invention). The SAM chip 708a, for example, as shown in FIG. 110, is connected with another ASP server 719a different from the SAM chip 708 or, as shown in FIG. 111, is connected to the same ASP server 719 as the SAM chip 708.

The configuration of the SAM chip 708a is basically the same as the SAM chip 708.

Next, the components shown in FIG. 109 will be explained.

[IC Card 703]

Figure 112:
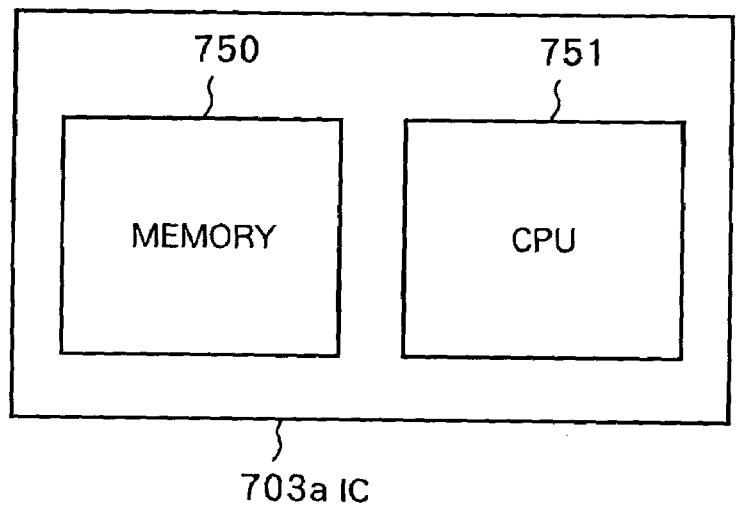
FIG. 112 is a functional block diagram of an IC card shown in FIG. 109.

FIG. 112 is a functional block diagram of an IC card 703.

As shown in FIG. 112, the IC card 703 has an IC (integrated circuit) 703a provided with a memory 750 and CPU 751.

Figure 113:
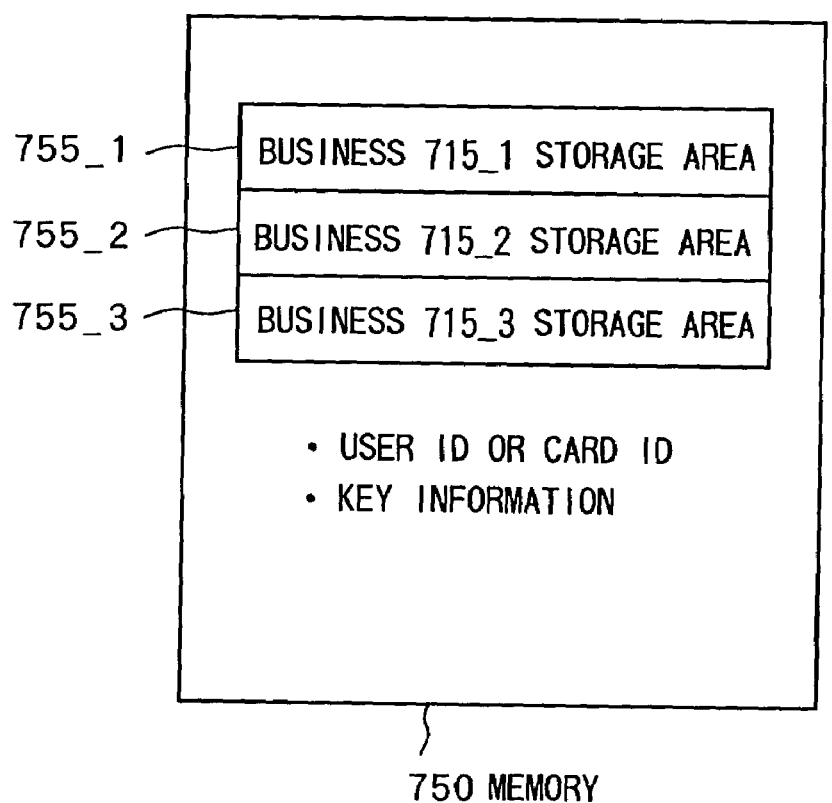
FIG. 113 is a view for explaining the memory shown in FIG. 112.

The memory 750, as shown in FIG. 113, has a storage area 755_1 used by a credit card company or other service business 715_1, a storage area 755_2 used by a service business 715_2, and a storage area 755_3 used by a service business 715_3.

Further, the memory 750 stores key data used for judging an access right to the storage area 755_1, key data used for judging an access right to the storage area 755_2, and key data used for judging an access right to the storage area 755_3. That key data is used for mutual authentication, data encryption and decryption, etc.

Further, the memory 750 stores identification information of the IC card 703 or user of the IC card 703.

Next, the SAM unit 709 will be explained in detail.

The SAM unit 709, as explained earlier, has an external memory 707 (storage circuit of the present invention) and SAM chip 708 (semiconductor circuit of the present invention)

[Software Configuration of SAM Chip 708]

Figure 114:
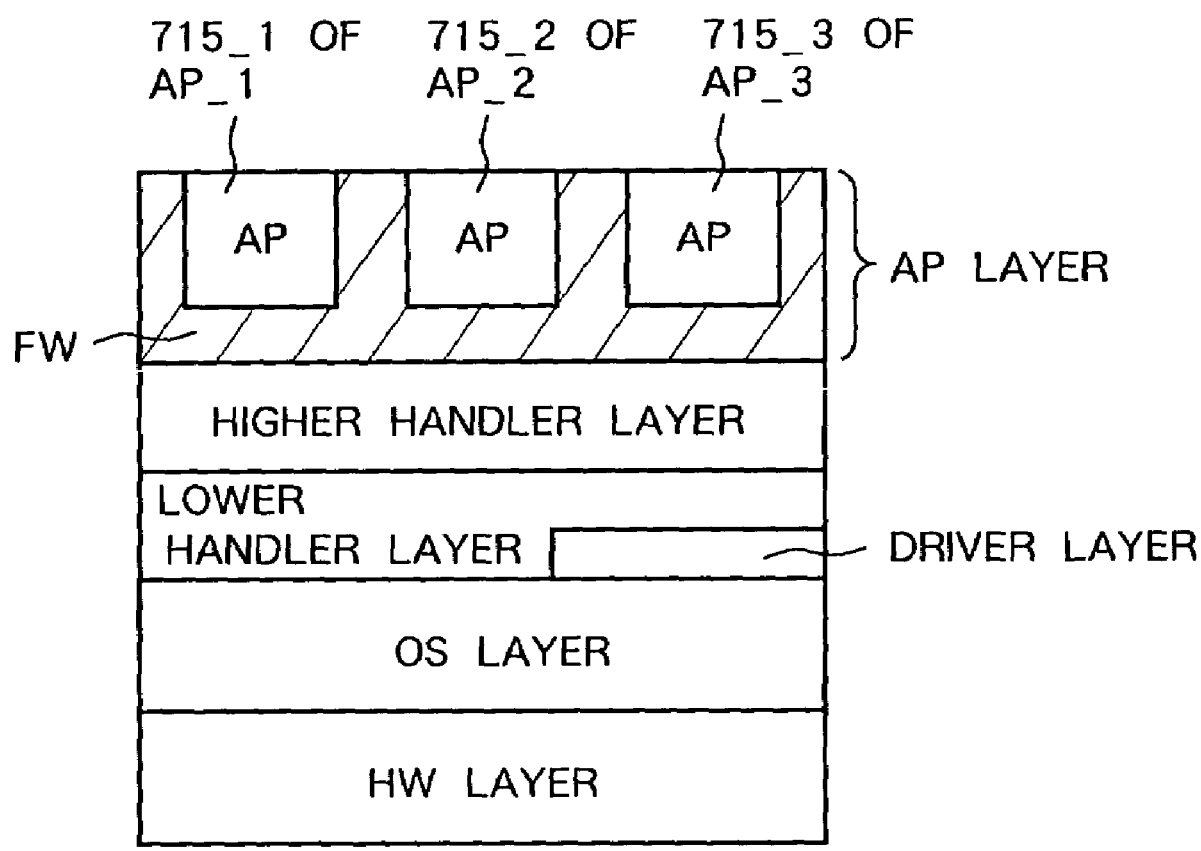
FIG. 114 is a view for explaining the software structure of the SAM chip shown in FIG. 109.

The SAM chip 708 has the software configuration as shown in FIG. 114.

As shown in FIG. 114, the SAM chip 708 has, from the bottom layer toward the top layer, an HW (hardware) layer, OS layer, lower handler layer, higher handler layer and AP layer.

The lower handler layer include a driver layer.

Here, in the AP layer, application programs AP_1, AP_2, and AP_3 (application programs of the present invention) defining procedures for use of the IC card 703 by credit card companies or other businesses 715_1, 715_2, and 715_3 shown in FIG. 109 are read out and run from the external memory 707.

In the AP layer, the application programs AP_1, AP_2, and AP_3 and the higher handler layer are provided between them with firewalls FW.

[External Memory 707]

Figure 115:
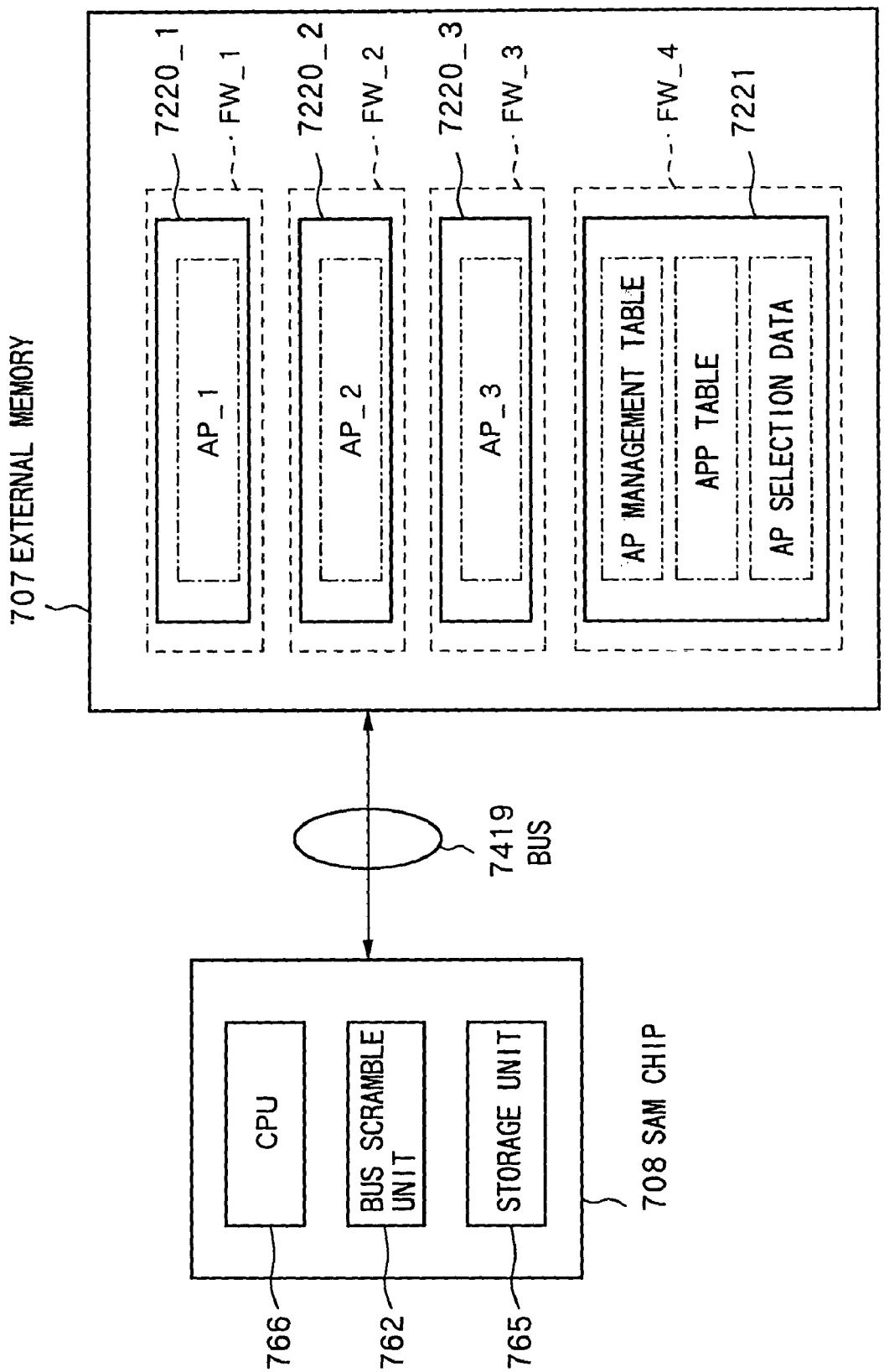
FIG. 115 is a view for explaining the storage areas of the external memory shown in FIG. 109.

FIG. 115 is a view for explaining the storage areas of the external memory 707.

As shown in FIG. 115, the storage areas of the external memory 707 include an AP storage area 7220_1 in which the application program AP_1 of the service business 715_1 is stored, an AP storage area 7220_2 in which the application program AP_2 of the service business 715_2 is stored, an AP storage area 7220_3 in which the application program AP_3 of the service business 715_3 is stored, and an AP management storage area 7221 used by the manager of the SAM chip 708.

The application program AP_1 stored in the AP storage area 7220_1 is comprised of a later explained plurality of application element data APE (data modules of the present invention). Access to the AP storage area 7220_1 is restricted by the firewall FW_1.

The application program AP_2 stored in the AP storage area 7220_2 is comprised of a later explained plurality of application element data APE. Access to the AP storage area 7220_2 is restricted by the firewall FW_1.

The application program AP_3 stored in the AP storage area 7220_3 is comprised of a later explained plurality of application element data APE. Access to the AP storage area 7220_3 is restricted by the firewall FW_1.

In the present embodiment, the application element data APE is the minimum unit downloaded for example from outside of the SAM unit 709 to the external memory 707. The number of application element data APE forming each application program can be freely determined by the corresponding service business.

Further, the application programs AP_1, AP_2, and AP_3 stored in the external memory 707 are scrambled. They are descrambled when read into the SAM chip 708.

Further, the application programs AP_1, AP_2, and AP_3 are, for example, produced by the service businesses 715_1, 715_2, and 715_3 using the personal computers 716_1, 716_2, and 716_3 shown in FIG. 109 and downloaded through the SAM chip 708 to the external memory 707.

Next, the application programs AP_1, AP_2, and AP_3 will be explained in detail.

There are one or more application programs for each service business in the SAM.

Figure 116:
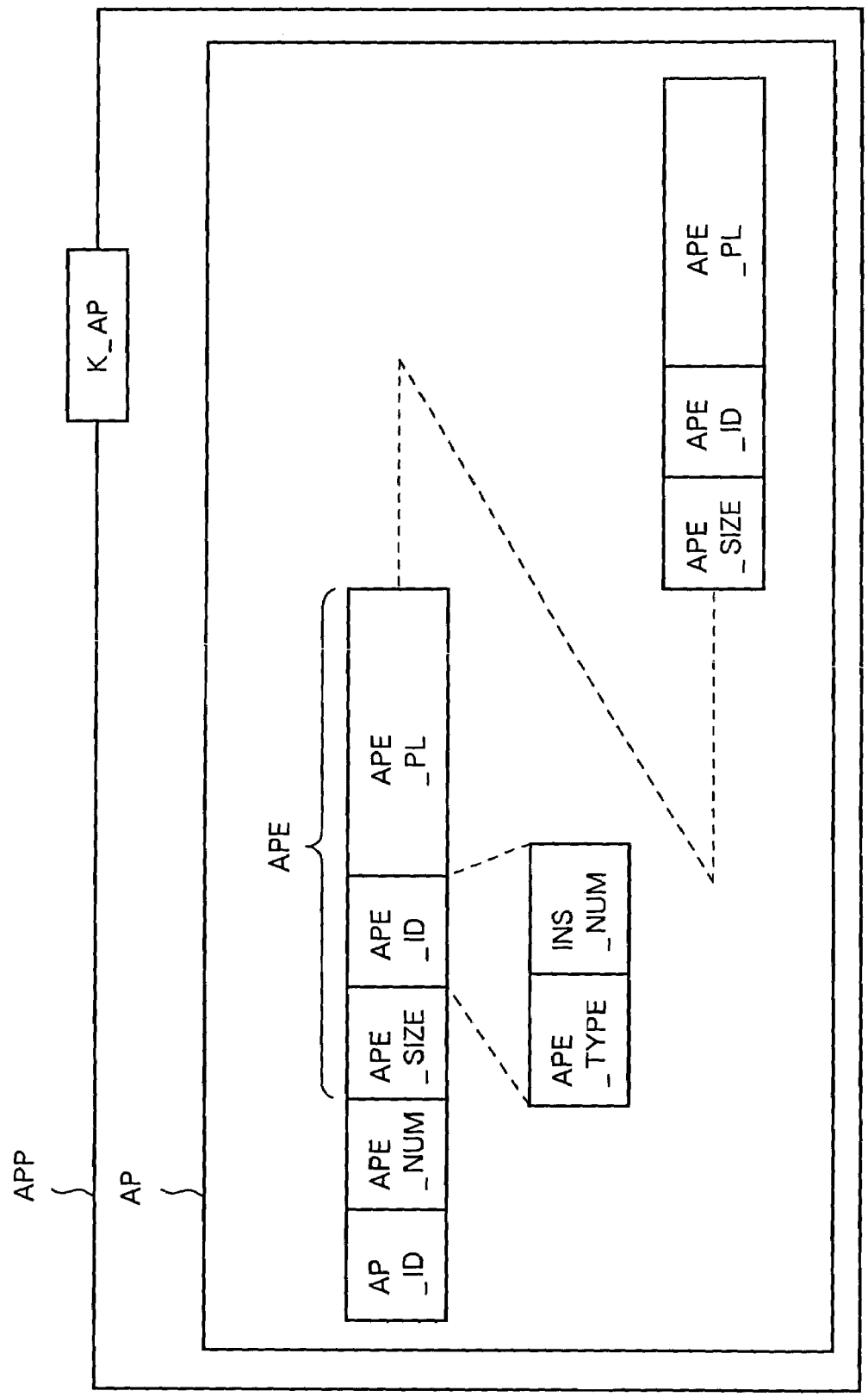
FIG. 116 is a view for explaining an application program AP shown in FIG. 115.

The application programs AP_1, AP_2, and AP_3 (hereinafter also referred to as AP) are, as shown in FIG. 116, each comprised identification data AP_ID for identifying the application program AP, data APE_NUM showing the number of the application element data APE included in that application program, and one or more application element data APE.

The identification data AP_ID is set to be different for each service business.

As shown in FIG. 116, the application element data APE is comprised of data APE_SIZE showing the data size of that application element data APE, identification data APE_ID for identifying that application element data APE, and the data proper APE_PL.

Here, the identification data APE_ID is comprised of data APE_TYPE showing the type of the application element data APE and the data INS_NUM showing the identification number (instance identification number) of the application element data APE within that type. The data INS_NUM is managed by the end user (service business) side.

For example, when the application element data APE is the file system configuration, the data APE_TYPE becomes "2" and the data INS_NUM becomes "1". Due to this, if the same SAM, it is possible to specify the application element data APE unambiguously by the identification data APE_ID.

The external memory 707 shown in FIG. 115 stores the above explained application programs AP (AP_1, AP_2, and AP_3) encrypted by the encryption key data K_AP outside of the SAM unit 709 as the application program package APP.

As the encryption key data K_AP, encryption key data differing for each application program is used.

Next, the types of the application element data APE explained using FIG. 116 will be explained.

Figure 117:
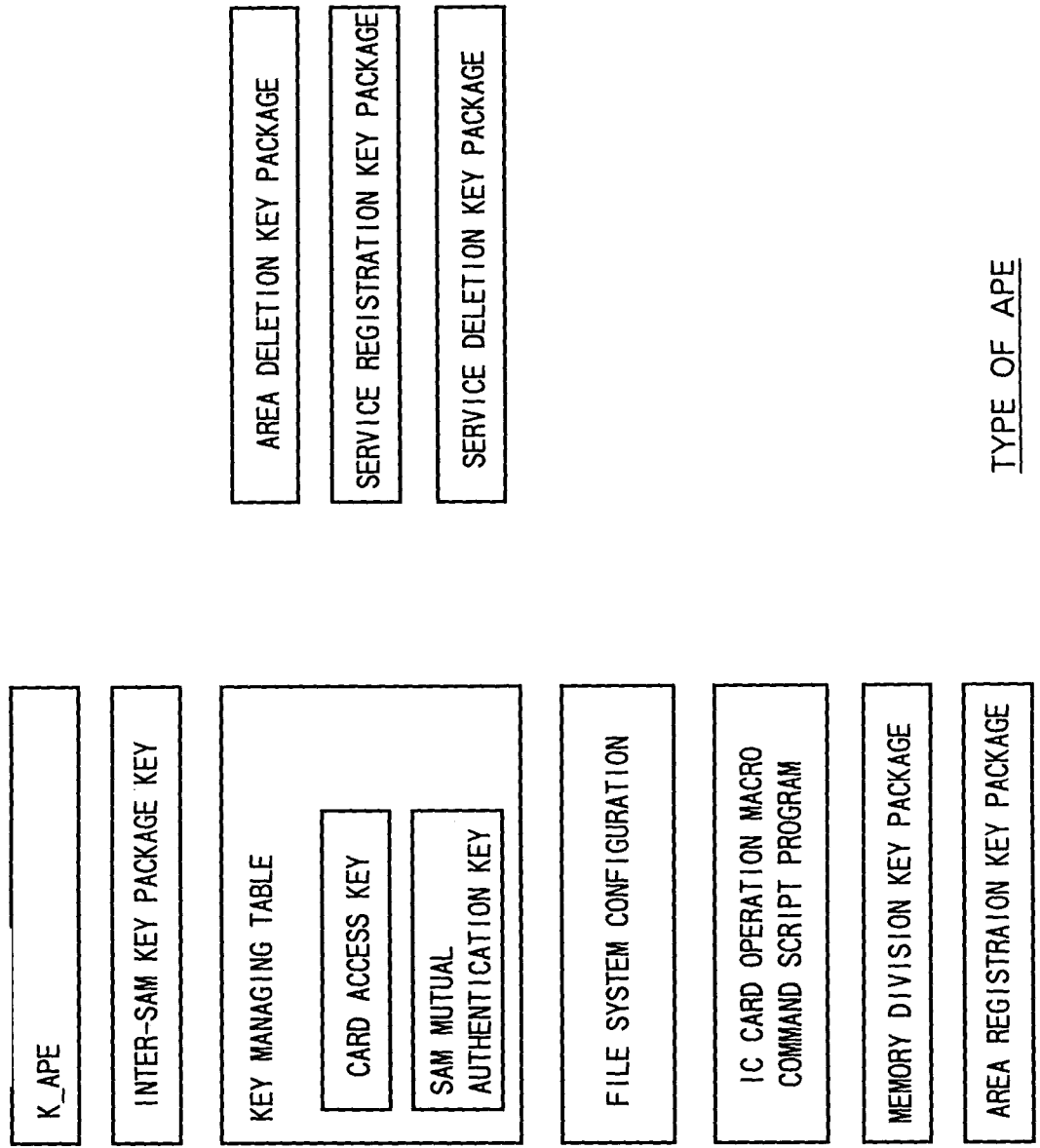
FIG. 117 is a view for explaining the types of the application element data APE shown in FIG. 116.

FIG. 117 is a view showing an example of the application element data APE stored in one AP area.

As shown in FIG. 117, the AP area stores card access key data, file system configuration data, SAM mutual authentication key data, inter-SAM key package key data, IC card operation macro command script program (processing routine data of the present invention), a memory division key package, area registration key package, area deletion key package, service registration key package, service deletion key package, and AP resource key data K_APE as the application element data APE.

Next, the application element data APE shown in FIG. 117 will be explained.

Card Access Key Data

The card access key data is the key data used for a read or write operation with respect to the memory 750 of the IC card 703. Further, key data to be viewed by the later explained IC card operation macro command script program is also included in the same type of application element data APE as the card access key data.

File System Configuration Data

The file system configuration data, for example, includes log data, negative data, and genre data.

The log data is for example data of the history of use of the application element data APE, the negative data is for example expiration information of the IC card, and the genre data is for example the record of execution at the SAM.

For example, the file system configuration selects the type of the file access (record key designation sort ring) and, if a record key, sets the record size, number of records as a whole, record signature version, record signature method type, record data size, and record signature key. Further, when writing data from the outside in the file system, it designates whether to perform the signature verification etc. Here, a "record" is the minimum unit of writing/reading of file data.

SAM Mutual Authentication Key Data

This is also used for mutual authentication between APs in the same SAM.

The SAM mutual authentication key data is key data used when accessing the corresponding application element data APE from another AP in the same SAM or another SAM.

Inter-SAM Key Package Key

The inter-SAM key package key is encryption key data used when exchanging card access key data or other data after inter-SAM mutual authentication.

IC Card Operation Macro Command Script Program

The IC card operation macro command script program is generated by the service business itself and describes the order of processing relating to the IC card 703 or transactions with the ASP server 719. The IC card operation macro command script program is set in the SAM unit 709, then analyzed by the SAM chip 708, whereby the corresponding IC card entity data is generated.

Memory Division Key Package

The memory division key package is data used for dividing the storage areas of the external memory 707 or memory of the IC card 703 before a service business starts to run a service using the IC card 703.

Area Registration Key Package

The area registration key package is data used when performing area registration in a storage area of the memory of the IC card 703 before a service business starts running a service using the IC card 703.

Area Deletion Key Package (Internal Generation)

The area deletion key package is a package which can be automatically generated in the SAM from the card access key data.

Service Registration Key (Internal Generation)

The service registration key package is used for registering application element data APE of the external memory 707 before the service business starts running a service using the IC card 703.

The service registration key package is a package which can be automatically generated in the SAM from card access key data.

Service Deletion Key Package (Internal Generation)

The service deletion key package is used for deleting application element data APE registered in the external memory 707.

The service deletion key package is a package which can be automatically generated in the SAM from card access key data.

Key Data K_APE

The key data K_APE is used as an encryption key when setting the application element data APE. Different key data K_APE is assigned for setting application element data APE for every AP area.

Next, the above explained IC card operation macro command script program (hereinafter also referred to as a script program) will be explained in detail.

The script program is a program for defining application programs AP_1, AP_2, and AP_3 of the service business 715_1, 715_2, and 715_3 running on the SAM chip 708 and procedures of processing performed by the IC card 703 when executing the application programs.

Figure 118:
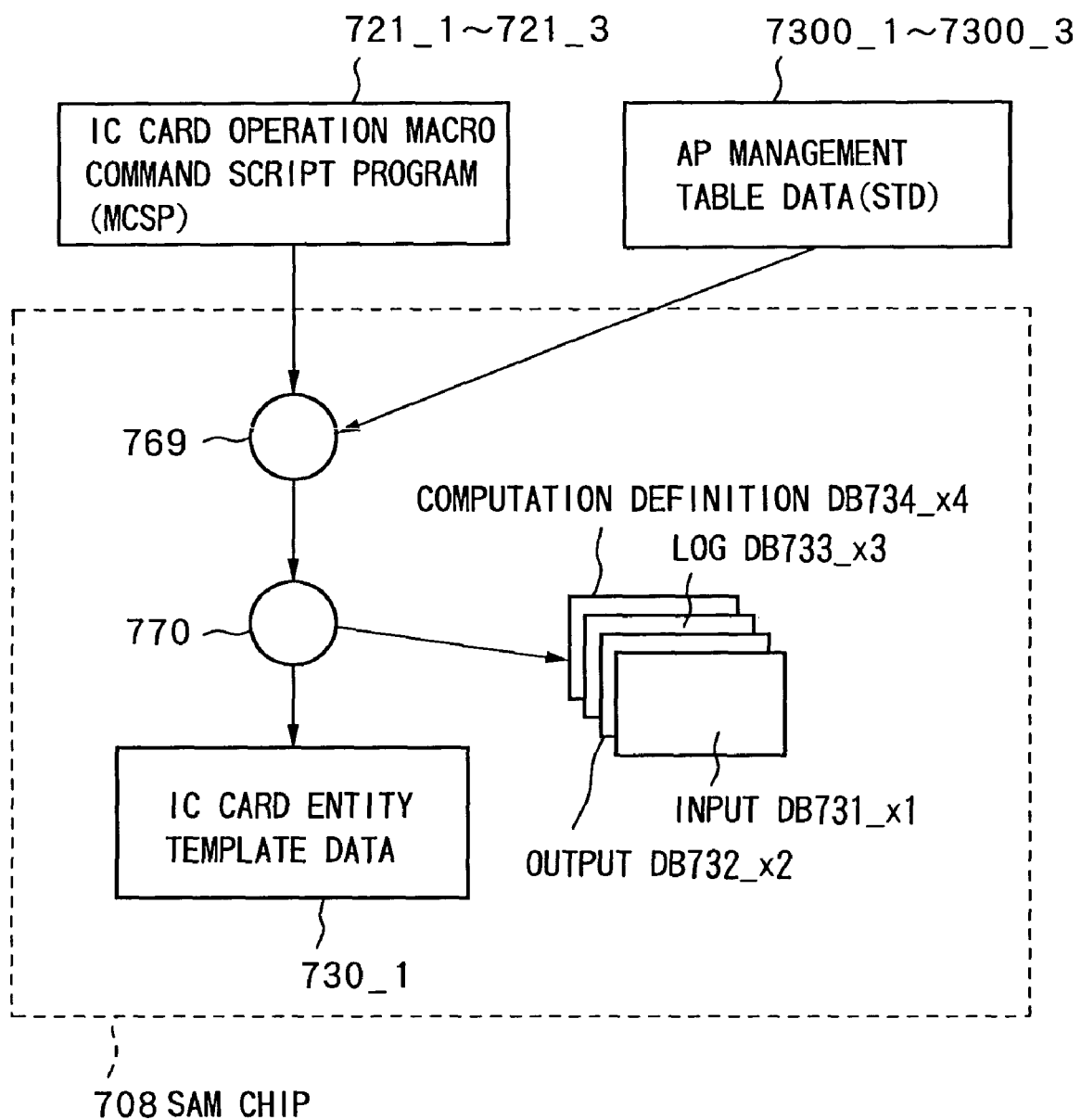
FIG. 118 is a view for explaining the processing of the SAM chip shown in FIG. 109.

In the present embodiment, as explained later, as shown in FIG. 118, the SAM chip 708 performs processing based on the script download task 769 and script interpretation task 770 and generates from the AP management table data and script program the IC card entity template data 730_1, input data block 731_x1, output data block 732_x2, log data block 733_x3, and computation defining data block 734_x4 used for procedures relating to the service businesses 715_1, 715_2, and 715_3.

FIG. 119 is a view for explaining the commands used for describing the IC card operation macro command script programs.

In the commands, commands for the SAM chip 708 itself are given the first letter "S", while commands relating to operation of the IC card 703 are given the first letter "C".

Further, the second letter is selectively used in accordance with the application. For example, for an issuer setting declaration of the IC card 703, it is "I", for a declaration of the application element APE (service type element declaration), it is "S", for a simple read declaration from the IC card 703, it is "R", for a simple write declaration to the IC card 703, it is "W", and for an application element data APE computation definition, it is "F".

The commands used for describing the script programs 721_1, 721_2, and 721_3 include the SC command, SO command, SI command, SL command, SF command, CI command, CS command, CR command, and CW command.

The SC command is a command declaring the number of the maximum number of IC card entity data which the SAM chip 708 can process simultaneously.

When the SAM chip 708 can simultaneously process 1000 sets of IC card entity data, "SC:1000" is described.

The SO command is a command for declaring the data block forming the output data block 732_x2 in which the data read from the IC card 703 will be stored among the data blocks provided in the SAM chip 708 when performing processing using the IC card 703 based on the later explained IC card entity data.

For example, when the data blocks 1 to 10 are provided, when storing the data read from the IC card 703 in the data block 1, "SO:1" is described.

The SI command is a command for declaring the data block for forming the input data block 731_x1 in which the data to be written in the IC card 703 is stored among the data blocks provided in the SAM chip 708 when performing processing using the IC card 703 based on the later explained IC card entity data.

For example, when the data blocks 1 to 10 are provided, when storing the data to be written in the IC card 703 in the data blocks 2, 3, "SI:2, 3" is described.

The SL command is a command for declaring the data block forming the log data block 733_x3 for storing the log data relating to an operation among the data blocks provided in the SAM chip 708 when performing processing using the IC card 703 based on the later explained IC card entity data.

For example, when the data blocks 1 to 10 are provided, when storing the log data in the data block 4, "SL:4" is described.

The SF command is a command for providing the data block forming the computation defining data block 734_x4 describing the definition of the relation between the application element data APE relating to the IC card 703.

The content of the computation defining data block 734_x4 becomes the pre-processing information of the IC card entity data.

The CI command is a command for declaring the issuer of the IC card 703 (service business).

The data specifying the service business defined by the CI command becomes the IC card type information of the IC card entity data.

The CS command is a command for declaring simultaneous operation of a plurality of services to the IC card 703 by citing the name APE_N of the application element data APE (service type elements). The CS command can also declare a function defining processing among application element data APE designated by the name APE_N.

For example, it is possible to declare "CS:"Rc"+"Wc"+"Wd"".

Based on the content of the CS command, APE_N designating information of the IC card entity data and processing order information are determined.

The CR command declares to store data read from the IC card 703 in a designated data block when the relation among application element data APE is not defined (when SF command is not described).

For example, when storing the data read from the IC card 703 in the data block 1, "CR:SO:1="Rc"" is described.

The CW command declares to write data stored in a designated data block to the IC card 703 when the relation among application element data APE is not defined.

For example, when writing data stored in the data block 2 in the IC card 703, "CW:SI:2=37 Wc"" is described.

The CF command declares the data block for describing computation content spanning services.

For example, when describing computation content spanning services in the SF data block 1, "CF:CES_FUNC=SF:1" is described.

Further, the SF data block 1 has described in it, for example, ""Wc"=If ("Wc">10) then ("Wc"−10; "Wd"="Wc"*0.08+"Wd")". This formula expresses the operation of subtracting 10 from the value of Wc when the remaining number of services Wc is larger than 10 and adding a number of points corresponding to 8% of Wc as cumulative points to Wd.

Next, the data stored in the AP management storage area 7221 of the external memory 707 shown in FIG. 115 will be explained.

Access to the AP management storage area 7221 is restricted by the firewall FW_4.

Note that, the firewall FW_4 corresponds to the firewall EW shown in FIG. 114.

FIG. 120 is a view for explaining details of the data stored in the AP management storage area 722.

The AP management storage area 7221, as shown in FIG. 120, stores the AP management table data 7300_1, 7300_2, and 7300_3 (management data of the present invention) and the APP table data 7310_1, 7310_2, and 7310_3 (usage allowing data of the present invention).

Here, the AP management table data 7300_1, 7300_2, and 7300_3 and the APP table data 7310_1, 7310_2, and 7310_3 are for example preregistered at the time of setup of the SAM chip 708. Further, the AP management table data 7300_1, 7300_2, and 7300_3 and the APP table data 7310_1, 7310_2, and 7310_ can be rewritten only by the manager of the SAM chip 708.

The AP management table data 7300_1, 7300_2, and 7300_3 are defined for each application program AP.

Further, the APP table data 7310_1, 7310_2, and 7310_3 are defined for each SAM mutual authentication key data.

FIG. 121 is a view for explaining the AP management table data 7300_1. The AP management table data 7300_2 and 7300_3 have the same format as the AP management table data 7300_1.

As shown in FIG. 121, it shows the identification data APE_ID, internal/external designating data IEI, identification data SAM_ID, identification data AP_ID, key data K_CARDA (second key data of the present invention), key data K_SAM (first key data of the present invention), data SET_APP, data FLAG_IP, and data FLAG_STR linked together for each of the name APE_N of the viewed application element data APE used in the IC card operation macro command script program.

The name APE_N of the application element data APE is the name assigned to the service (application element data APE) provided by the application program of the service businesses 715_1, 715_2, and 715_3. The name APE_N is an identifier viewed instead of the service number of the service which the application program of each service business can use.

Here, the identification data APE_ID is identification data of the application element data APE.

The internal/external designating data IEI is a flag for differentiating between whether the APE exists as an entity (internal designation), or whether reference is made from another SAM (external designation).

The identification data SAM_ID is identification data of the SAM at the other party transferring data when the SAM chip 708 is performing processing relating to that application element data APE.

Figure 122:
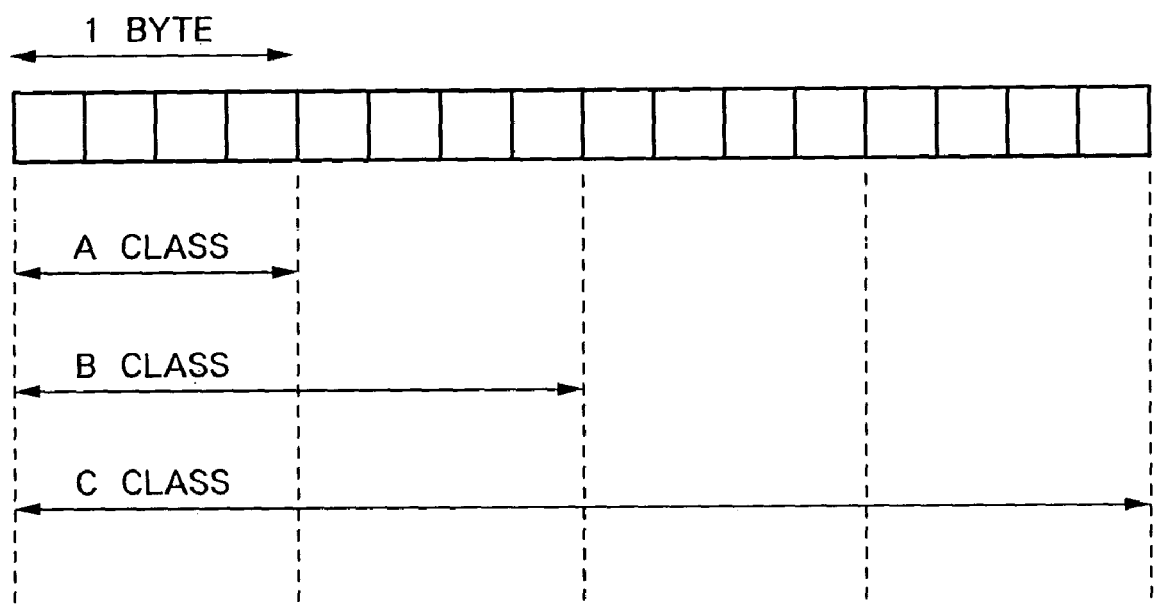

FIG. 122 is a view for explaining the SAM_ID.

The SAM_ID is 4 bytes of data and has a concept of a net mask similar to a TCP/IP. The net mask can be set in bit units.

For example, that net mask, as shown in FIG. 122, is classified into three types, that is, an A class, B class and C class. Further, between SAM's to which the same net mask is allocated, one type of key data used for mutual authentication is sufficient. In the present embodiment, for example, the same service business is allocated the same net mask.

In FIG. 122, the A class net mask is indicated by "255,XX,XX,XX", the higher 1 byte is assigned a predetermined value for specifying that class, and the lower 3 bytes are assigned values for specifying the individual SAMs belonging to that class. Here, "XX" can be set to any value. That is, the net mask of the A class can be used to define the 16777215 SAM_IDs belonging to that A class.

Further, the B class net mask is indicated by "255,255,XX,XX", the higher 2 bytes are assigned predetermined values for specifying that class, and the lower 2 bytes are assigned values for specifying the individual SAMs belonging to that class. That is, the net mask of the B class can be used to define the 65535 SAM_IDs belonging to that B class.

Further, the C class net mask is indicated by "255,255,255,XX", the higher 3 bytes are assigned predetermined values for specifying that class, and the lower 1 byte is assigned values for specifying the individual SAMs belonging to that class. That is, the net mask of the B class can be used to define the 255 SAM_IDs belonging to that C class.

The identification data AP_ID is identification data of an application program executed by the SAM of the other party transferring data when the SAM chip. 708 is performing processing relating to that application element data APE.

The key data K_CARDA is key data used for transfer of data with the memory 750 of the IC card 703 when the SAM chip 708 performs processing relating to that application element data APE.

The key data K_SAM is key data used for transfer of data with another SAM when the SAM chip 708 is performing processing relating to that application element data APE.

The data SET_APP is data for specifying the APP table data 7310_1, 7310_2, and 7310_3 used (viewed) when the SAM chip 708 performs processing relating to that application element data APE.

The data FLAG_IP is flag data showing whether to disclose data managed (held) by the SAM chip 708 to another SAM chip 708 etc.

The data FLAG_STR is flag data showing whether to allow data managed (held) by the SAM chip 708 to be held by another SAM chip 708 etc.

In FIG. 121, the APE_N "Service A" is the access key of the IC card 703 defined by the application program in that SAM 708. The key data of the "Service A" is set to be not disclosed, so cannot be viewed by an application program of another SAM or another application program of the same SAM.

Further, the "Service C" is the access key of the IC card 703 defined by that application program. When that SAM is assigned the net mask of the later explained C class, the key data of the "Service C" is disclosed to an application program on the SAM having the SAM_ID "43,17,19,XX". At this time, the SAM mutual authentication key is "TT1 . . . , TTn", Further, whether or not another SAM can hold the key data of the "Service C" until the next use is determined. When possible, when the other SAM next uses the "Service C" on the card, it is not necessary to obtain the card access key again from the SAM. The access key of the Service B is obtained not from that SAM, but from the SAM having the SAM_ID "43,13,137,XX". As the mutual authentication key between SAMs, "SS1 . . . SSn" is used.

Whether or not the access key of the "Service B" can be held until the next use is determined by a flag designated by that SAM.

The "Service B Log" indicates the file in which log data to which the SAM_ID of "43,13,137,XX" is assigned is stored. The "Service B Log" is the same SAM net mask as the "Service B", so the mutual authentication key uses "SS1 . . . SSn". Here, APP table data is provided for each mutual authentication key. In this example, permission for accessing the "Service B log" and "Service B" is defined in the APP table data 7310 of the other SAM which the AP management table data on that other SAM views.

FIG. 123 is a view for explaining the APP table data 7310_1.

The APP table data 7310_2, 7310_3, and 7310 have the same format as the APP table data 7310_1.

As shown in FIG. 123, the APP table data 7310_1 shows, for each application element data APE, its identification data APE_ID and whether that application element data APE can be read, written, or executed from another application program (another application element data APE).

For example, the APP table data 7310_1 shown in FIG. 123 shows for the "Service B log" that reading is possible, writing is possible, and execution (deletion) is impossible.

Further, the AP management storage area 7221 of the external memory 707 shown in FIG. 115 for example stores AP selection data showing the IC card type data and AP_ID linked together.

The IC card type data shows the type of the IC card 703 shown in FIG. 109 and for example is identification data of the credit card company performing settlement for transactions using the IC card 703.

In the present embodiment, the IC card operation macro command script program defines (describes) in it a service content combining the name APE_N of a plurality of application element data APE. By reflecting this in the later explained IC card entity data (job management data), it is possible to provide a service combining services corresponding to a plurality of application element data APE.

For example, a service combining the service of reading data from the IC card 703 and the service of writing data to the server 702 can be defined in the IC card entity data.

Further, the APE_N or its service number is an operational command issued to the IC card 703 and able to be analyzed by the IC card 703 when performing a service provided by the service businesses 715_1, 715_2, and 715_3.

The application program AP_1 is defined by the AP management table data 7300_1 and a predetermined IC card operation macro command script program stored in the external memory 707.

The application program AP_3 is defined by the AP management table data 7300_2 and a predetermined IC card operation macro command script program stored in the external memory 707.

The application program AP_3 is defined by the AP management table data 7300_3 and a predetermined IC card operation macro command script program stored in the external memory 707.

[SAM Chip 708]

The SAM chip 708 is connected through a SCSI port, the Ethernet, etc. to the ASP server 719. The ASP server 719 is connected through the Internet 710 to a plurality of terminal apparatuses including a personal computer 705 of an end user and personal computers 716_1, 716_2, and 716_3 of service businesses 715_1, 715_2, and 715_3.

The personal computer 705, for example, is connected through a serial port or USB port to a Dumb type card reader/writer 704. The card reader/writer 404 realizes for example wireless communication corresponding to the physical level with the IC card 703.

The operational commands to the IC card 703 and response packets from the IC card 703 are generated and analyzed at the SAM unit 709 side. Therefore, the card reader/writer 704, personal computer 705, and ASP server 719 between them only act to store the commands and response content in the data payload portion and relay the same and are not involved in the encryption or decryption of data, authentication, or other actual operations in the IC card 703.

The personal computers 716_1, 716_2, and 716_3 can download the later explained script program to the SAM chip 708 to customize the application programs AP_1, AP_2, and AP_3.

Figure 124:
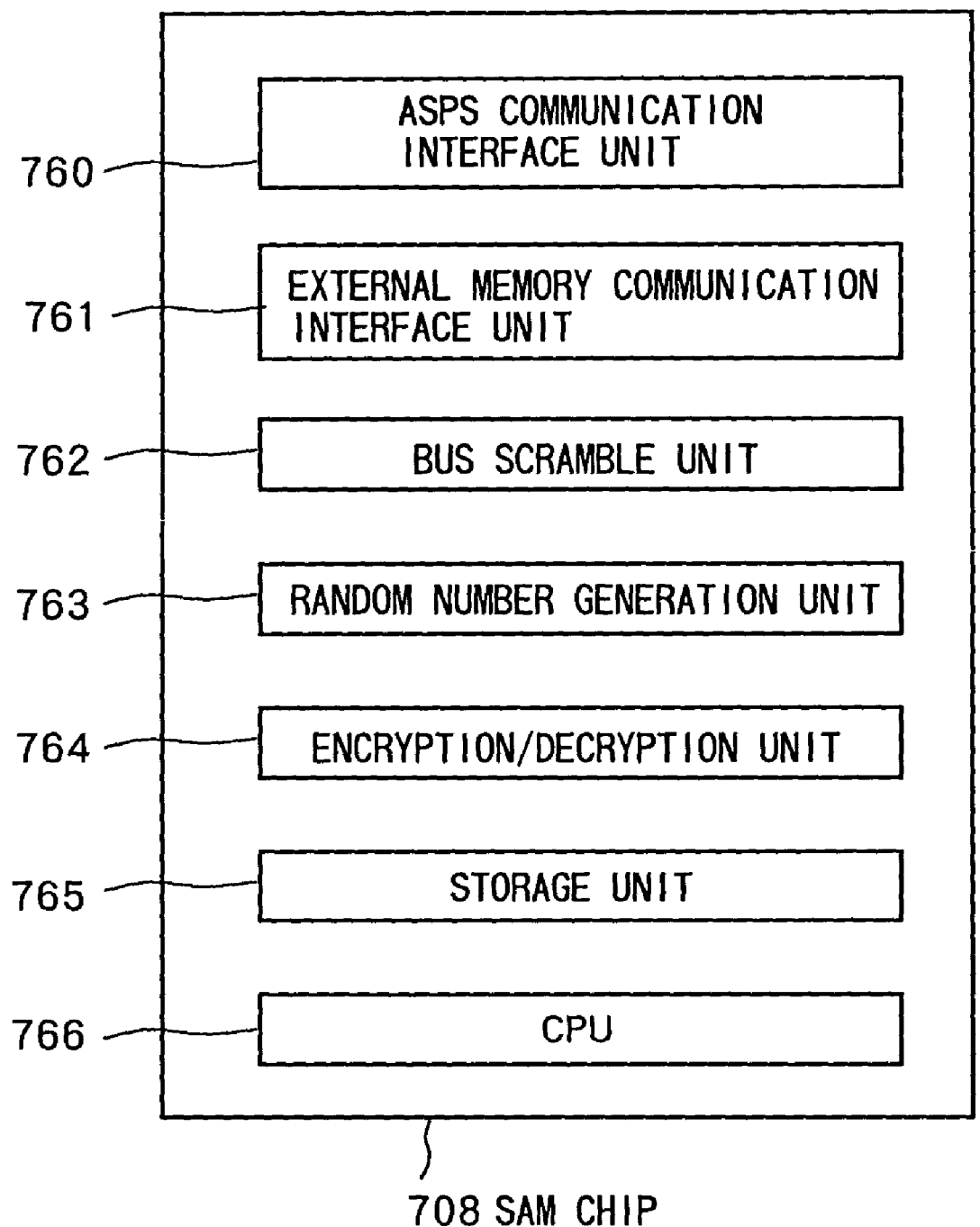

FIG. 124 is a functional block diagram of the SAM chip 708 shown in FIG. 109.

As shown in FIG. 124, the SAM chip 708 has an ASPS communication interface unit 760, external memory communication interface unit 761, bus scramble unit 762, random number generation unit 763, encryption/decryption unit 764, storage unit 765, and CPU 766.

The SAM chip 708 is a tamper-resistant module.

The ASPS communication interface unit 760 is an interface used for input and output of data with the ASP server 719 shown in FIG. 109.

The external memory communication interface unit 761 is an interface used for input and output of data with the external memory 707.

The bus scramble unit 762 scrambles output data and descrambles input data when inputting and outputting data through the external memory communication interface unit 761.

The random number generation unit 763 generates a random number used at the time of authentication processing.

The encryption/decryption unit 764 encrypts data and decrypts encrypted data.

The storage unit 765, as explained later, stores tasks, programs, and data used by the CPU 766.

The CPU 766 executes the later explained script download task, script interpretation task, entity generation task (job management data production task), and IC card procedure management task (job management data management task) or other tasks based on predetermined programs (programs of the present invention).

Next, tasks, programs, and data stored in the storage unit 765 will be explained.

Figure 125:
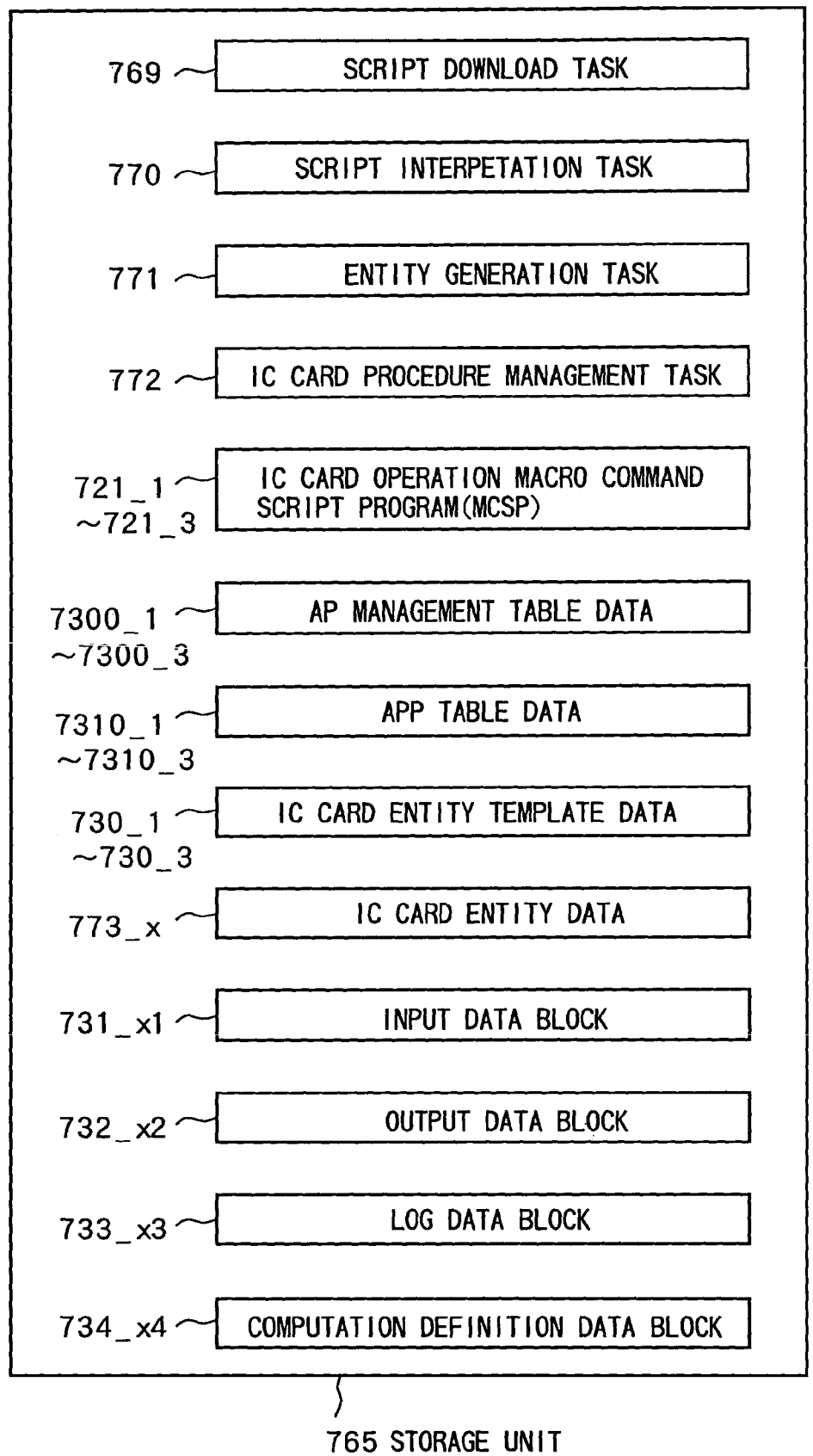

FIG. 125 is a view for explaining the tasks, programs, and data stored in the storage unit 765.

As shown in FIG. 125, it stores a script download task 769, script interpretation task 770, entity generation task 771, IC card procedure management task 772, IC card operation macro command script programs 721_1 to 721_3, AP management table data 7300_1 to 7300_3, APP table data 7310_1 to 7310_3, IC card entity template data 730_1 to 730_3, IC card entity data 773_x, input data block 731_x1, output data block 732_x2, log data block 733_x3, and computation defining data block 734_x4.

The script download task 769, as shown in FIG. 118, downloads the AP management table data 7300_1 to 7300_3 (if necessary, the APP table data 7310_1 to 7310_3), for example, from the computer of each service business and loads it in the SAM chip 708.

The script interpretation task 770 uses the service definition table data (if necessary, the APP table data 7310_1 to 7310_3) and script program to generate the IC card entity template data, input data block, output data block, log data block, and computation defining data block for each business.

The number of the data blocks generated for each service business is not particularly limited.

When the entity generation task 771 for example receives an entity production request from the ASP server 719, it performs polling with the IC card 703, then generates the IC card entity data to be used for the processing for the procedure between that IC card 703 and service business using the IC card entity plate data corresponding to that service business. At this time, the IC card entity plate data becomes the class, and the IC card entity data is generated as an instance of that class.

The processing by the entity generation task 771 for generation of the IC card entity data will be explained in detail later.

The IC card procedure management task 772 uses one or more IC card entity data 773_x present in the storage unit 765 to execute the processing for a procedure between the IC card 703 and the service businesses 715_1 to 715_3.

In the present embodiment, the plurality of processing for procedures performed between the plurality of IC cards 703 and the service businesses 715_1 to 715_3 proceed simultaneously.

The IC card procedure management task 772 executes these plurality of processing for procedures in parallel.

The IC card procedure management task 772 deletes the IC card entity data 773_x when the series of procedures have been finished.

The processing of the IC card procedure management task 772 will be explained in detail later.

The script programs 721_1 to 721_3 are input by the script download task 769 from for example the external memory 707 and stored in the storage unit 765.

The AP management table data 7300_1 to 7300_3 are input by the script download task 769 from for example the external memory 707 and stored in the storage unit 765.

The APP table data 7310_1 to 7310_3 are input by the script download task 769 from for example the external memory 707 and stored in the storage unit 765.

The IC card entity template data 730_1 to 730_3 are generated by the script interpretation task 770 and used as the templates (classes) when generating the IC card entity data 773_x of the procedures relating to the service businesses.

The IC card entity data 773_x is generated by the entity generation task 771 using the IC card entity template data 730_1 to 730_3 as for example the class as an instance of that class.

The input data block 731_x1, output data block 732_x2, log data block 733_x3, and computation defining data block 734_x4 are generated by the script interpretation task 770.

Next, the IC card entity data 773_x will be explained.

The IC card entity data 773_x is generated by the entity generation task 771 in the SAM chip 708 using the already generated corresponding IC card entity plate data of the service business for example when the SAM chip 708 receives from the ASP server 719 a processing request for processing using the IC card 703 and application program of the predetermined service business.

Figure 126:
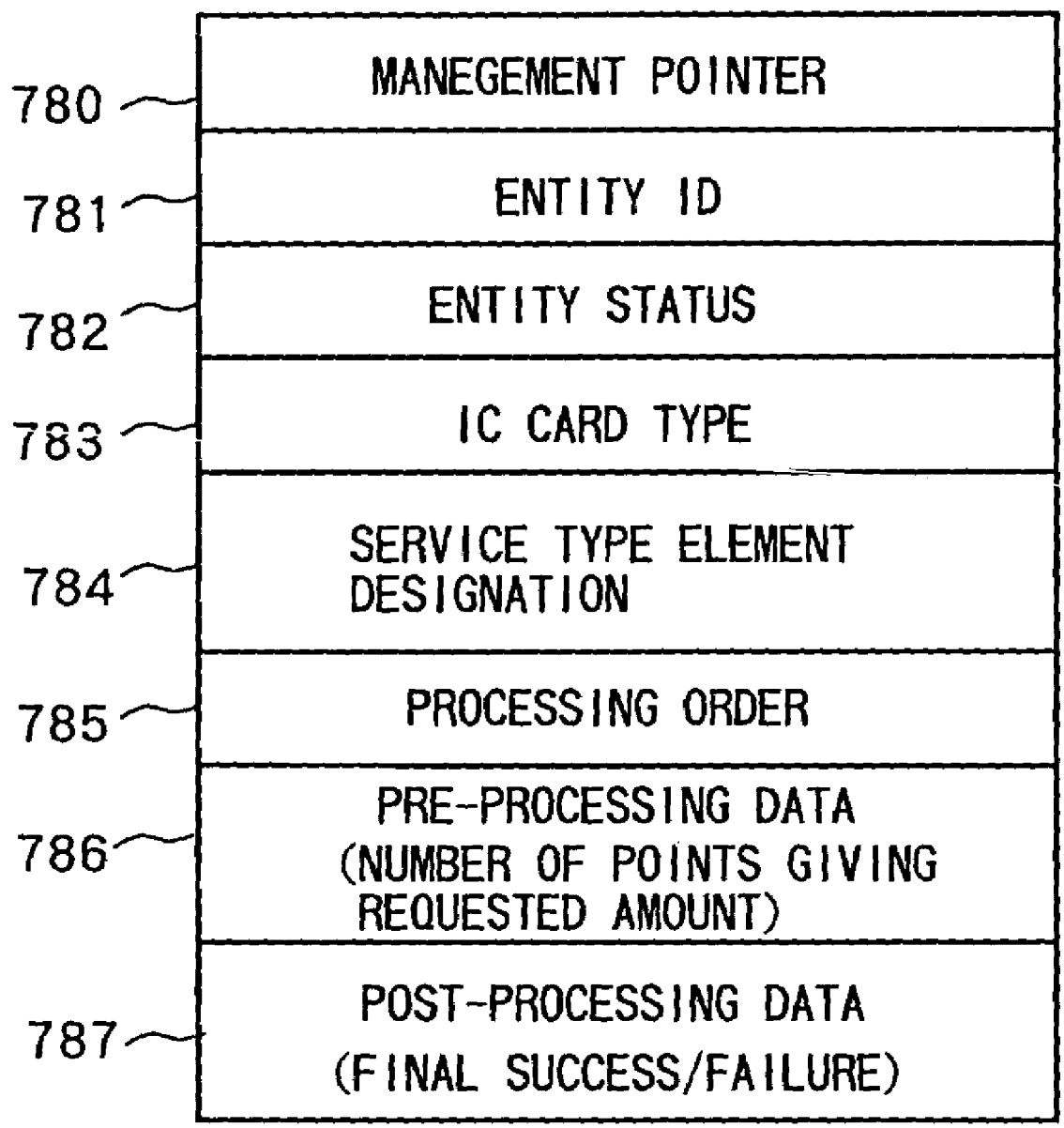

FIG. 126 is a view for explaining the format of the IC card entity data 773_x.

As shown in FIG. 126, the IC card entity data 773_x has management pointer data 780, entity ID data 781, entity status data (status data) 782, IC card type data 783, APE_N designating data 784, processing order data 785, pre-processing data 786, and post-processing data 787.

The management pointer data 780 is a bidirectional pointer for managing the IC card entity data 773_x in the storage unit 765.

The entity ID data 781 is used for requests for generation of IC card entity data 773_x, confirmation of the state of progress, deletion, and other of the series of processings using the IC card entity data 773_x. The entity ID data 781 is also a return value to be given to the end user. The entity ID data 781 corresponds to a descriptor when opening a file in a general file system.

The entity status data 782 shows the state of progress of the procedures relating to the IC card 703.

Figure 127:
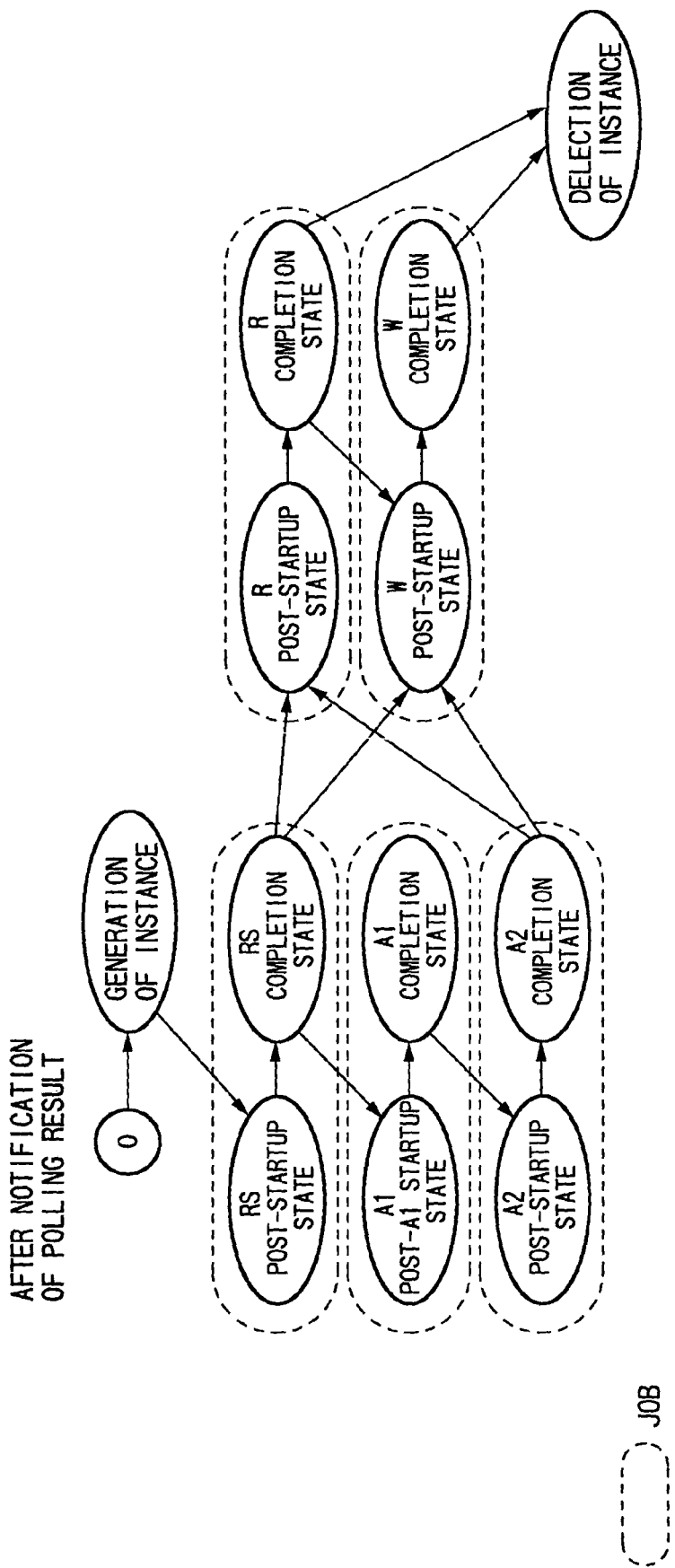

The basic states of the IC card entity data 773_x include, as shown in FIG. 127, the state of processing for investigating the services which the IC card 703 can use (RS), the state of processing by which the SAM chip 708 authenticates the IC card 703 (A1), the state of processing by which the IC card 703 authenticates the SAM chip 708 (A2), the state of processing for reading data from the IC card 703 (R), and the state of processing for writing data in the IC card 703 (W).

In the present embodiment, the processing for investigating the service businesses, the processing for the SAM chip 708 to authenticate the IC card 703, the processing for the IC card 703 to authenticate the SAM chip 708, the processing for reading data from the IC card 703, and the processing for writing data in the IC card 703 correspond to jobs.

A "job", as explained later, is a unit of processing for which the order of execution is determined by the IC card procedure management task 772.

Note that, A1 and A2 comprise the mutual authentication processing between the IC card 703 and SAM chip 708.

Further, in the present embodiment, considering the communication time on the Internet 710, the above-mentioned basic states are, as shown in the state transition chart of FIG. 127, managed divided into states after startup (after issuance of command) and completed (response received) states.

Specifically, the states of processing using the IC card entity data 773_x are managed by the instance generation (IC card entity data generation) state, RS post-startup state, RS completed state, A1 post-startup state, A1 completed state, A2 post-startup state, A2 completed state, R post-startup state, R completed state, W post-startup state, W completed state, and instance (IC card entity data) deleted state.

The IC card type data 783 is data specifying the service business issuing the IC card 703.

The IC card type data 783 is set with data defined by a CI command in the above-mentioned script program at the time of generation of the IC card entity data 773_x.

The service type element designating data 784 shows the AP management table data 7300_1 to 7300_3 and application element data APE defined in the APP table data 7310_1 to 7310_3 used in processing using the IC card entity data 773_x.

The service type element designating data 784 is set with one or more application element data APE designated by the CS command in the above-mentioned script program at the time of generation of the IC card entity data 773_x.

The processing order data 785 shows the order of execution of services (jobs) used in the processing using the IC card entity data 773_x, that is, the state transition shown in FIG. 127.

That is, the processing order data 785 uses the name APE_N of the application element data APE to show the order of execution of jobs corresponding to basic operations of the IC card 703.

Here, the jobs, as explained earlier, correspond to the RS, A1, A2, R, and W shown in FIG. 127. Specific operations on the IC card 703 are realized by the order of processing designated using the jobs. For example, for processing using a IC card 703 with only reading with no mutual authentication, the processing order information 785 is set to "RS->R". Further, in the case of reading and writing with mutual authentication, the processing order information 785 is set to "RS->A1->A2->R->W".

The processing order information 785 is set with the order of jobs shown in FIG. 127 corresponding to the order of service elements designated in the CS command in the above-mentioned script program when generating the IC card entity data 773_x.

The pre-processing information 786 is set from the ASP server 719 side with management data for performing processing using the IC card entity data 773_x.

For example, the pre-processing information 786 is set with points of a computation formula of a designated service in the SF data block (application element data APE).

Further, when an inter-service processing function is not defined, the pre-processing information 786 is set with the requested processing charge.

For example, in the case of settlement, the state relating to the amount of charge or points given etc. is set.

The post-processing information 787 is set with data of the processing result of the IC card entity data 773_x required at the ASP server 719 side. For example, in the case of settlement, it is set with data showing the existence of a normal end to the settlement.

Next, a routine for processing by the IC card procedure management task 772 shown in FIG. 125 relating to a plurality of IC cards 703 using a plurality of IC card entity data 773_x will be explained.

The IC card procedure management task 772 is constantly being started up on the CPU 766 of the SAM chip 708 shown in FIG. 124.

Figure 128:
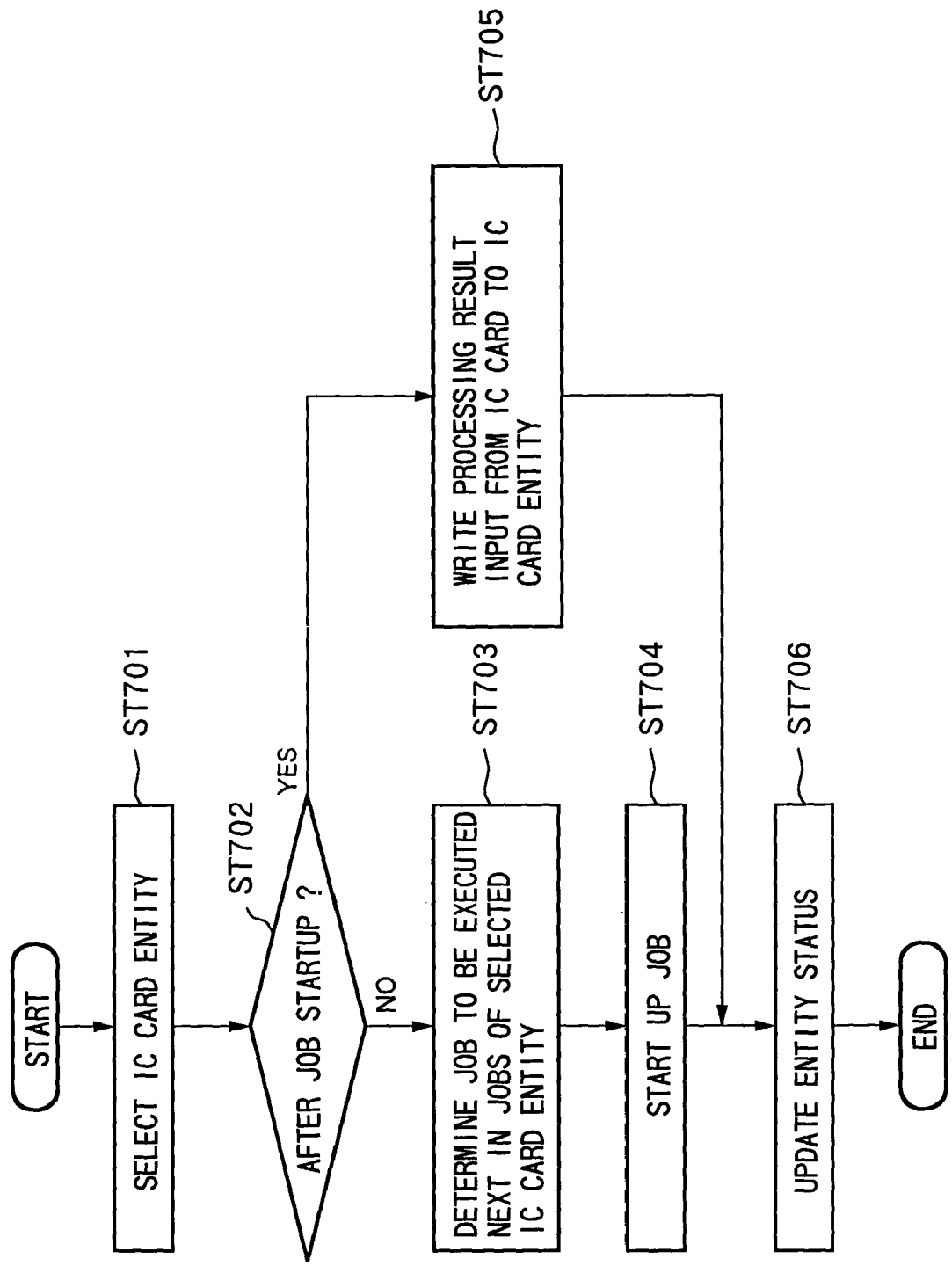

FIG. 128 is a flow chart of the processing performed by the IC card procedure management task 772.

Step ST701:

The IC card procedure management task 772 selects one IC card entity data 773_x for executing the next processing out of the plurality of IC card entity data 773_x present in the storage unit 765.

The method of selection of that IC card entity data 773_x may be to successively select IC card entity data 773_x present in the storage unit 765 or to assign a priority order and select by priority in the order of the highest priority.

Step ST702:

The IC card procedure management task 772 judges if the job of the IC card entity data 773_x selected at step ST701 has already been started up. When judging that it has started up, it proceeds to the processing of step ST705, while when judging that it has not been started up, proceeds to the processing of step ST703.

Step ST703:

The IC card procedure management task 772 judges from the entity status information 782 shown in FIG. 126 of the IC card entity data 773_x selected at step ST701 which state of the status transition chart shown in FIG. 172 the processing relating to that entity data is in and decides on the job to be executed next from the processing order information 785.

At this time, the processing order information 785 defines the order of execution of jobs using the service elements set in the service definition table data as explained earlier.

Step ST704:

The IC card procedure management task 772 starts up the selected job at step ST703.

The IC card procedure management task 772 uses the data blocks relating to that job in the input data block 731_x1, output data block 732_x2, log data block 733_x3, and computation defining data block 734_x4 explained above using FIG. 125 to execute that job.

At this time, the IC card procedure management task 772, when issuing a command to the IC card 703 in execution of a job, uses the service element corresponding to that job as a key to search through the AP management table data 7300_1 to 7300_3 to obtain the service number corresponding to that service element (operational command of IC card 703 able to be analyzed by the IC card 703). Further, the IC card procedure management task 772 uses the obtained service number to issue a command to the IC card 703.

Further, the IC card procedure management task 772, as explained using FIG. 113, when key information is required for accessing the storage area of the IC card 703a, uses the service element corresponding to that job to search through the AP management table data 7300_1 to 7300_3 and obtain the key information corresponding to that service element. Further, the IC card procedure management task 772 uses that key information to perform mutual authentication with the IC card 703, encrypt and decrypt the data, or perform other processing and obtain the right to access a predetermined storage area of the IC card 703.

Step ST705:

Step ST705 is performed when the IC card procedure management task 772 issues a command to the IC card 703 and is waiting for the processing result of the IC card 703.

When the IC card procedure management task 772 receives the processing result from the IC card 703, it sets this in the IC card entity data 773_x.

Step ST706:

The IC card procedure management task 772 updates the entity status information 782 of the IC card entity data 773_x shown in FIG. 126.

In this way, in the present embodiment, the IC card procedure management task 772 selects in order the IC card entity data 773_x for the plurality of IC cards 703 present in the SAM chip 708 while performing the processing for the plurality of IC cards 703 in parallel. Therefore, the SAM chip 708 can simultaneously proceed with the processing even when receiving processing requests for procedures using a plurality of IC cards 703.

Figure 129:
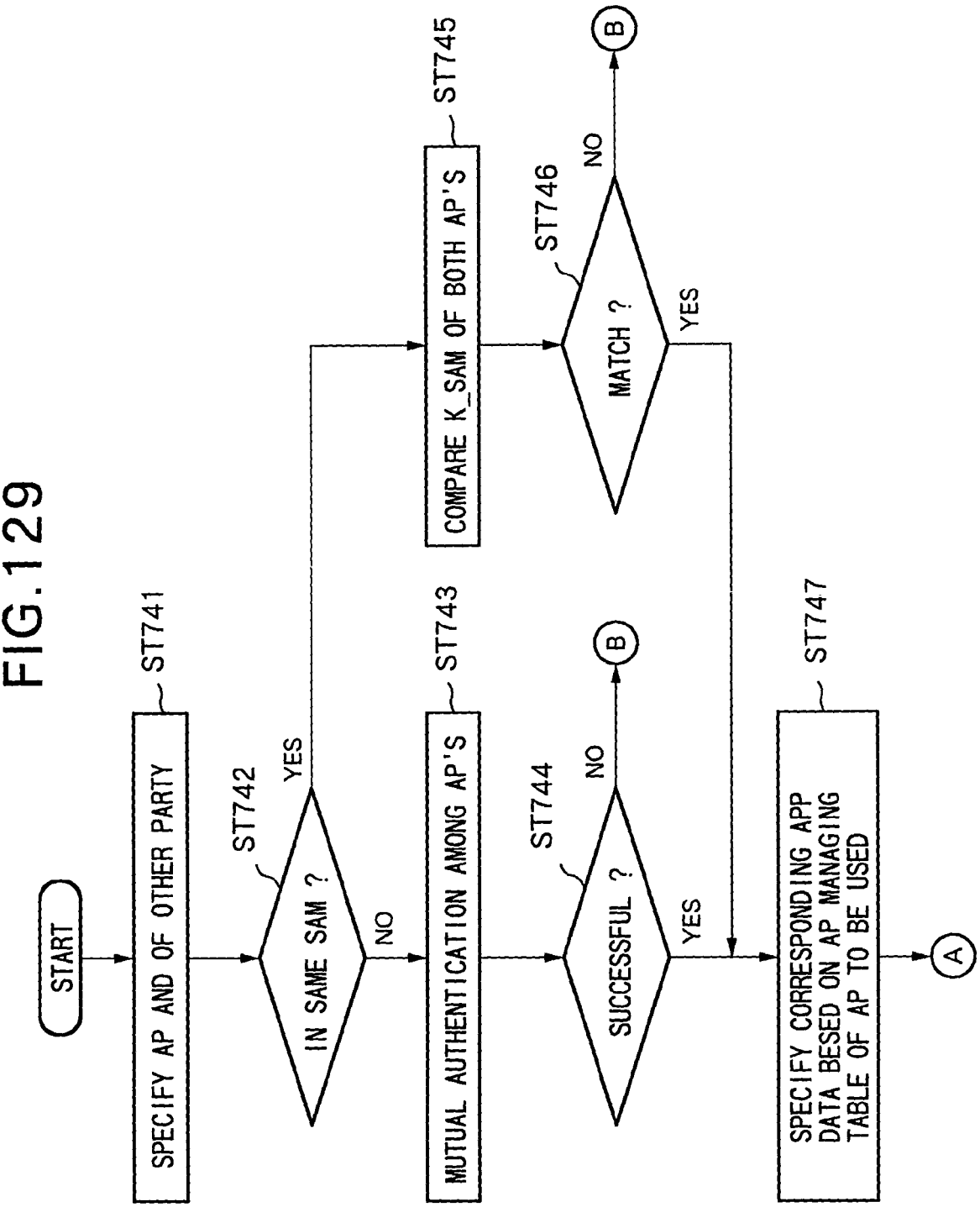
Figure 130:
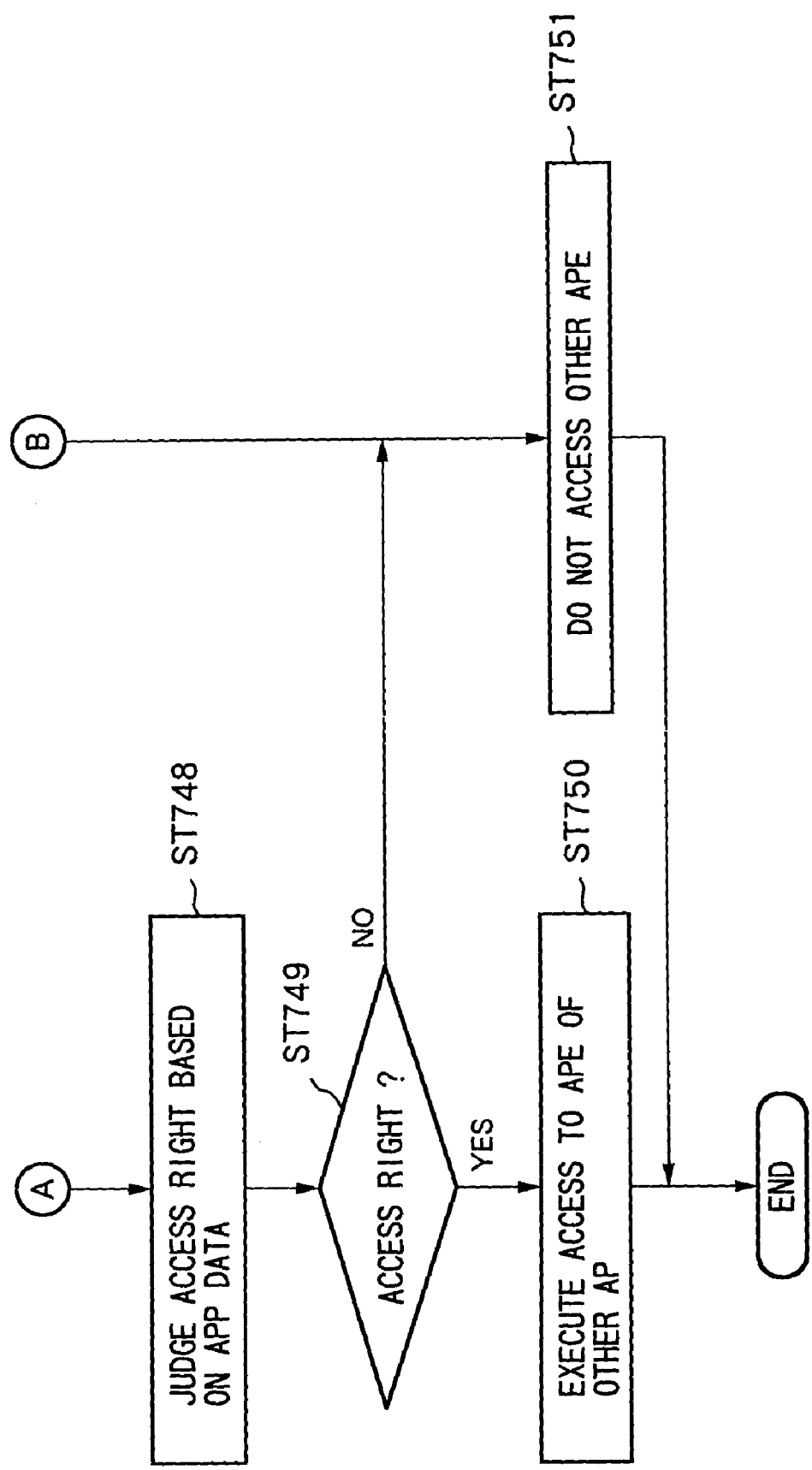

FIG. 129 and FIG. 130 are views for explaining the processing defined by another application element data APE in accordance with a routine defined by application element data APE or processing when accessing data performed by the SAM chip 708 when executing a job at step ST704 in the above explained FIG. 128.

Step ST741:

The SAM chip 708, while executing processing in accordance with predetermined application element data APE, specifies an application program for use (access) and application element data APE in that application program.

Further, that use specifies one of reading, writing, and execution of that application element data APE.

Step ST742:

The SAM chip 708 judges if the application element data APE specified at step ST741 is present in that SAM chip 708. If judging that it is not present, it proceeds to the processing of step ST743, while if judging that it is present, proceeds to the processing of step ST745.

Step ST743:

The SAM chip 708 views the AP management table data 7300_1 to 7300_3 corresponding to the application program being executed to acquire the key data K_SAM corresponding to the corresponding service (application element data APE) and uses that key data K_SAM to for mutual authentication with the SAM chip 708a having the application element data APE to be used.

Step ST744:

If the SAM chips 708 and 708a authenticate each other's legitimacy in the mutual authentication of step ST743, the SAM chip 708 proceeds to the processing of step ST747. If not, it proceeds to step ST751.

Step ST745:

The SAM chip 708 views the AP management table data 7300_1 to 7300_3 corresponding to the application program being executed and acquires the key data K_SAM corresponding to the service (application element data APE).

Further, for the application element data APE to be used specified at step ST741 as well, the SAM chip 708 similarly views the AP management table data 7300_1 to 7300_3 corresponding to that application element data APE to acquire the key data K_SAM corresponding to the corresponding service (application element data APE).

Further, the SAM chip 708 compares the two acquired key data K_SAM.

Scrambler 746:

When the SAM chip 708 judges at the processing of step ST745 that the two key data K_SAM match, the routine proceeds to the processing of step ST747, while when it does not, it proceeds to step ST751.

Step ST747:

The SAM chip 708 or 708a views the AP management table data 7300_1 to 7300_3 corresponding to the application program specified at step ST741 and specifies the APP table data 7310_1 to 7310_3 corresponding to the application element data APE used.

Step ST748:

The SAM chip 708 or 708a judges the access right of the application element data APE to be used (accessed) based on the APP table data 7310_1 to 7310_3 specified at step ST747.

Specifically, it judges the right for reading, writing, and executing the application element data APE to be used.

Step ST749:

When the SAM chip 708 or 708a judges at step ST748 that there is an access right, it proceeds to step ST750, while when it does not, it proceeds to the processing of step ST751.

Step ST750:

The SAM chip 708 or 708a uses the application element data APE specified at step ST741 for the usage specified at step ST741.

Step ST751:

The SAM chip 708 or 708a does not use the application element data APE specified at step ST741 for the usage specified at step ST741.

Further, when executing a job at step ST704 of the above explained FIG. 128, when the SAM chip 708 transfers data with the IC card 703 in accordance with the routine defined by the application element data APE, the SAM chip 708 views the AP management table data 7300_1 to 7300_3 shown in FIG. 125 to acquire the key data K_CADR corresponding to that application element data APE and uses that key data K_CARD to access the memory 750 of the IC card 703.

Next, the overall operation of the communication system 701 shown in FIG. 109 will be explained.

Figure 131:
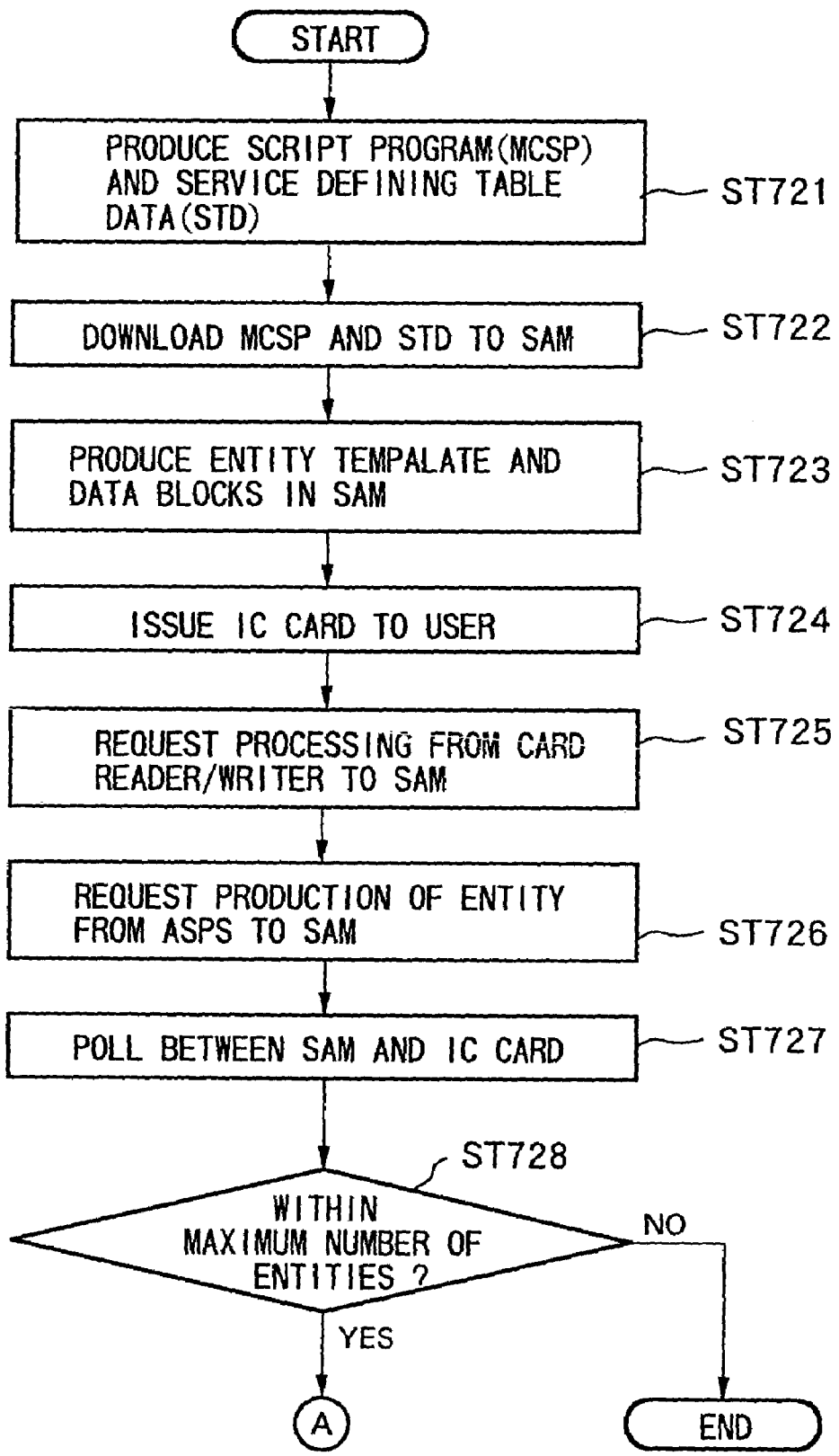

FIG. 131 and FIG. 132 are views for explaining the overall operation of the communication system 701 shown in FIG. 109

Step ST721:

The service businesses 715_1 to 715_3 or a party requested by these service businesses produce that script programs 721_1, 721_2, and 721_3 describing the processing for transactions performed by the service businesses using the IC card 703 for example on the personal computers 716_1, 716_2, and 716_3 shown in FIG. 109.

Further, the manager of the SAM chip 708 produces the AP management table data 7300_1 to 7300_3 corresponding to the service businesses 715_1 to 715_3.

Step ST722:

The AP management table data 7300_1 to 7300_3 produced at step ST721 are stored in the external memory 707.

Further, the script programs 721_1, 721_2, and 721_3 produced at step ST721 are downloaded from the personal computers 716_1, 716_2, and 716_3 through the Internet 710, ASP server 719, and SAM chip 708 to the external memory 707. The processing for that download, as shown in FIG. 118, is managed by the script download task 769 in the SAM chip 708.

Step ST723:

The script interpretation task 770 in the SAM chip 708 shown in FIG. 118 uses the AP management table data 7300_1 to 7300_3 and script program to generate IC card entity template data, an input data block, output data block, log data block, and computation defining data block for each service business.

The generated data is stored in the storage unit 765 of the SAM chip 708 shown in FIG. 124.

Step ST724:

The user is issued the IC card 703.

As shown in FIG. 113, the memory 750 of the IC 703a of the IC card 703 stores the key data used for transactions by the user with the service business contracted with.

Note that, the contract between the user and a service business may also be concluded after issuance of the IC card 703 through the Internet 710 etc.

Step ST725:

For example, when the user uses the personal computer 705 to access the server 702 through the Internet 710 to try to purchase a product, the server 702 issues a processing request through the Internet 710 to the ASP server 719.

When the ASP server 719 receives a processing request from the server 702, it accesses the personal computer 705 through the Internet 710. Further, a processing requesting relating to the IC card 703 issued from the card reader/writer 704 is transmitted through the personal computer 705, Internet 710, and ASP server 719 to the SAM chip 708.

Step ST726:

The ASP server 719 outputs to the SAM chip 708 an entity production request. That entity production request stores data showing the issuer of the IC card 703.

Step ST727:

When the SAM chip 708 receives an entity production request, it performs polling with the IC card 703.

Step ST728:

The entity generation task 771 of the SAM chip 708, after finishing the polling, judges if the number of the IC card entity data 773_x present in the SAM chip 708 is within the maximum number defined by the SC command of the script program. If within the maximum number, it proceeds to the processing of step ST729, while if not, it ends the processing.

Step ST729:

The entity generation task 771, for example, specifies, based on the data showing the issuer of the IC card 703 stored in the entity production request, which service business☐ IC card entity template data to use and uses that specified IC card entity plate data to generate the IC card entity data 773_x.

This corresponds to the instance generation shown in FIG. 127.

Step ST730:

The SAM chip 708 outputs to the ASP server 719 the entity ID of the IC card entity data 773_x generated at step ST729 at step ST731.

The IC card procedure management task 772 of the SAM chip 708 investigates the services which can be utilized by the IC card 703.

This is processing corresponding to the job RS shown in FIG. 127.

Step ST732:

The IC card procedure management task 772 of the SAM chip 708 authenticates the legitimacy of the IC card 703.

This is processing corresponding to the job A1 shown in FIG. 127.

Step ST733:

The IC card 703 authenticates the legitimacy of the SAM chip 708.

This is processing corresponding to the job A2 shown in FIG. 127.

According to steps ST732 and ST733, the IC card 703 and SAM chip 708 are mutually authenticated.

At this time, as explained earlier, in accordance with the application element data APE being executed by the SAM chip 708, the AP management table data 7300_1 to 7300_3 shown in FIG. 121 are viewed, the key data K CARD is acquired, and that key data K_CARD is used for the mutual authentication between the SAM chip 708 and CPU 751 of the IC card 703.

Step ST734:

The IC card procedure management task 772 of the SAM chip 708 reads and writes data required for the procedures with the IC card 703.

This is processing corresponding to the jobs R, W shown in FIG. 127.

Further, the IC card procedure management task 772 uses the processing formula specified based on the preprocessing data of the IC card entity data 773_x and uses the data read from the IC card 703 to perform the predetermined computation processing.

Step ST735:

The IC card procedure management task 772 of the SAM chip 708 outputs the processing result of step ST734 to the ASP server 719.

Step ST736:

For example, the IC card procedure management task 772 deletes the IC card entity data 773_x.

As explained above, according to the communication system 701 and SAM unit 709, by configuring the application program AP using a plurality of application element data APE and using the AP management table data and APP table data to define the computation content of the application element data APE, it is possible to provide diverse services using the IC card 703.

Further, according to the communication system 701, it is possible to use the AP management table data and APP table data to flexibly realize utilization of application element data APE in the same SAM and utilization of application element data APE between different SAMs while maintaining a high security.

Further, according to the communication system 701, when using application element data APE between different SAMs, since mutual authentication is performed between the SAMs, it is possible to improve the security of the application programs.

Further, according to the communication system 701, by allocating a SAM_ID of the same class to the application programs of the same service business, it is possible to prevent complicated mutual authentication processing from being performed between application element data APE of application programs of the same business and thereby lighten the burden of management of key information and processing of the SAM chip.

Further, according to the communication system 701, it is possible to generate IC card entity data 773_x for each processing for procedures occurring with the IC card 703 and have the IC card procedure management task 772 use the plurality of IC card entity data 773_x to simultaneously proceed with processing relating to the plurality of IC cards 703.

Further, according to the authentication system 701, since it is sufficient to store the IC card entity data 773_x actually used for the processing for the IC card 703 in the storage unit 765, the storage areas of the storage unit 765 can be efficiently utilized.

Further, according to the authentication system 701, as shown in FIG. 127, since the states of execution of jobs processed by the IC card procedure management task 772 are managed divided into post-startup states and completed states, after starting to execute one job, it is possible to start the processing for another job in the state waiting for data from the IC card 703. Therefore, it is possible to eliminate the wait time due to the transfer of data with the IC card 703 through the Internet 710.

Further, according to the authentication system 701, the AP management table data 7300_1 to 7300_3 describe in them names showing the types of services provided by the individual service businesses, that is, the APE_N, the numbers of services used in the IC card 703, and the key data used when providing those services. These are held in the external memory 707. Therefore, service businesses 715_1 to 715_3 not the developers of the SAM chip 708 can customize their own application programs running on the SAM chip 708 by producing script programs 721_1, 721_2, and 721_3 and downloading them through the SAM chip 708 to the external memory 707. That is, service businesses 715_1 to 715_3 can customize their own application programs without the service businesses being informed of the key data or operational commands for directly operating the IC card 703 or other highly confidential data. Further, the service businesses do not have to know the key data or card operational commands when customizing the application programs, so the load on the service businesses is lightened.

Further, according to the authentication system 701, since computation content spanning a plurality of services can be defined, it is possible to provide diverse services combining a plurality of services in the range of services which are executed simultaneous with allowance at the IC card 703 side.

Further, according to the authentication system 701, by introducing the concept of the data block, the data input and output with the IC card 703 and the log data can be easily managed.

The invention claimed is:

1. A data processing method performed by a semiconductor circuit in accordance with a plurality of processing requests, said data processing method comprising:

receiving said processing requests from an integrated circuit having a storage unit storing data to be used for processing for a procedure performed with said semiconductor circuit or a communication apparatus inputting and outputting data with said integrated circuit;

polling with said integrated circuit to determine the number of job management data;

generating job management data including job execution order data showing an order of execution of a plurality of jobs forming processing in accordance with a processing request and status data showing the state of progress of execution of said plurality of jobs for each of said plurality of processing requests, selecting one job management data from said generated plurality of job management data, selecting a job to be executed next based on said status data and said processing order data of said selected job management data, said status data differentiating between a state before issuance of an instruction relating to execution of said job to said integrated circuit and a state after issuance;

executing said selected job, updating said status data of said selected job management data in accordance with the execution of that job.

2. A data processing method as set forth in claim 1, further comprising a step of selecting one job management data from said plurality of data modules after updating said status data of said selected job management data.

3. A data processing method as set forth in claim 1, further comprising a step of deleting said job management data when all jobs forming processing in accordance with said processing request finish being executed.

4. A data processing method as set forth in claim 1, further comprising a step of issuing an instruction relating to execution of said job to said integrated circuit, then selecting and executing a job of processing of a procedure using another integrated circuit.

5. A data processing method as set forth in claim 1, further comprising a step of, when said status data of said selected job management data indicates said state after issuance of an instruction, receiving a processing result corresponding to said issued instruction and writing it in said selected job management data.

6. A data processing method as set forth in claim 1, further comprising the steps of:
   starting up a job management data production task and generating said job management data when receiving a processing request; and
   starting up a job management data management task and selecting said job, executing said job, and updating said status data when said job management data is generated.

7. A data processing method as set forth in claim 1, further comprising the steps of:
   executing a plurality of application programs corresponding to a plurality of procedure providers providing procedures performed using said integrated circuit,
   specifying a procedure provider corresponding to a processing request in accordance with that processing request, and
   generating said job management data for executing an application program corresponding to said specified procedure provider.

8. A data processing method as set forth in claim 1, further comprising a step of giving an identifier to said job management data and using said identifier to manage a plurality of job management data.

9. A data processing method as set forth in claim 1, wherein said integrated circuit is mounted on a card.

10. A semiconductor circuit for processing data in accordance with a plurality of processing requests;
   said semiconductor circuit comprising:
   an interface configured to input said plurality of processing requests, said interface receives said processing requests from an integrated circuit having a storage unit storing data to be used for processing for a procedure performed with said semiconductor circuit or a communication apparatus inputting and outputting data with said integrated circuit;
   a storage circuit configured to store job management data including job execution order data showing an order of execution of a plurality of jobs forming processing in accordance with a processing request and status data showing a state of progress of execution of said plurality of jobs,
   a control circuit configured to generate said job management data for each of the input plurality of processing requests and storing it in said storage circuit, selecting one job management data from said generated plurality of job management data, selecting and executing the job to be executed next based on said status data and said processing order data of said selected job management data, and updating said status data of said selected job management data in accordance with the execution of that job; and said status data is shown differentiating between a state before issuance of an instruction relating to execution of said job to said integrated circuit and a state after issuance, wherein said control circuit polls with said integrated circuit, then generates said job management data.

11. A semiconductor circuit as set forth in claim 10, wherein said control circuit selects one job management data from said plurality of data modules after updating said status data of said selected job management data.

12. A semiconductor circuit as set forth in claim 10, wherein said control circuit deletes said job management data when all jobs forming processing in accordance with said processing request finish being executed.

13. A semiconductor circuit as set forth in claim 10, wherein said control circuit issues an instruction relating to execution of said job to said integrated circuit, then selects and executes a job of processing of a procedure using another integrated circuit.

14. A semiconductor circuit as set forth in claim 10, wherein said control circuit, when said status data of said selected job management data indicates said state after issuance of an instruction, receives a processing result corresponding to said issued instruction and writes it in said selected job management data.

15. A semiconductor circuit as set forth in claim 10, wherein said control circuit:
   starts up a job management data production task and generates said job management data when receiving a processing request and
   starts up a job management data management task and selects said job, executes said job, and updates said status data when said job management data is generated.

16. A semiconductor circuit as set forth in claim 10, wherein said control circuit:
   executes a plurality of application programs corresponding to a plurality of procedure providers providing procedures performed using said integrated circuit,
   specifies a procedure provider corresponding to a processing request in accordance with that processing request, and
   generates said job management data for executing an application program corresponding to said specified procedure provider.

17. A semiconductor circuit as set forth in claim 10, wherein said control circuit gives an identifier to said job management data and uses said identifier to manage a plurality of job management data.

18. A semiconductor circuit as set forth in claim 10, wherein said integrated circuit is mounted on a card.

19. A semiconductor circuit as set forth in claim 10, which is a tamper-resistant semiconductor circuit.

20. A data processing method performed by a semiconductor circuit running an application program for processing relating to procedures using an integrated circuit,
   wherein said semiconductor circuit is able to view correspondence instructing data indicating correspondence between operation codes used for said application program to operate said integrated circuit and the names of said operations, that is, the operation names,
   said method comprising the steps of:
   receiving by said semiconductor as input an operation describing program describing the operations of said application program using said operation names, and
   obtaining said semiconductor circuit said operation codes corresponding to said operation names described in said operation describing program by viewing said correspondence instructing data and uses the obtained operation codes to define the processing of said application program;

generating by said semiconductor circuit job management data including job execution order data showing an order of execution of a plurality of jobs forming processing of said application program and status data showing the state of progress of execution of said plurality of jobs, selecting by said semiconductor circuit the job to be executed next based on said status data and said processing order data of said job management data, executing by said semiconductor circuit said selected job;

updating by said semiconductor circuit said status data of said selected job management data in accordance with the execution of that job;

using by said semiconductor circuit said correspondence instructing data and said operation describing program to generate template data of said job management data; and using by said semiconductor circuit said template data to generate said job management data in accordance with a processing request;

wherein said operation describing program includes a description designating a maximum number of said job management data which said semiconductor circuit can process;

generating by said semiconductor circuit said job management data in accordance with a processing request when the number of said job processing data is not more than said designated maximum number.

21. A data processing method as set forth in claim 20, wherein:

said correspondence instructs data further show the correspondence between said operation names and key information used when said integrated circuit performs operations corresponding to those operation names, and said semiconductor circuit obtains said key information corresponding to said operation names described in said operation describing program by viewing said correspondence instructing data and uses that obtained key information to define the processing of said application program.

22. A data processing method as set forth in claim 20, further comprising the steps of:

generating by said semiconductor circuit said job management data for each of a plurality of processing requests, selecting by said semiconductor circuit one job management data from said plurality of data modules, selecting by said semiconductor circuit the job to be executed next based on said status data and said processing order data of said selected job management data, executing by said semiconductor circuit said selected job, updating by said semiconductor circuit said status data of said selected job management data in accordance with execution of said job, and selecting by said semiconductor circuit one job management data from said plurality of data modules after said updating.

23. A data processing method as set forth in claim 22, further comprising a step of deleting by said semiconductor circuit said job management data when all jobs forming processing in accordance with a processing request finish being executed.

24. A data processing method as set forth in claim 22, further comprising a step of generating by said semiconductor circuit said job management data including said execution order data showing an order of execution of a plurality of jobs corresponding to a plurality of operations for said integrated circuit.

25. A data processing method as set forth in claim 22, wherein said operation describing program includes descriptions defining at least one data block among a data block storing data read from said integrated circuit, a data block storing data to be written in said integrated circuit, and a data block storing log information of processing for a procedure using said integrated circuit, said method further comprising a step of generating by said semiconductor circuit said data block based on said operation describing program.

26. A data processing method as set forth in claim 20, wherein said operation names are macro commands.

27. A data processing method as set forth in claim 20, wherein said integrated circuit is mounted in a card.

28. A semiconductor circuit for running an application program for performing processing relating to a procedure using an integrated circuit, said semiconductor circuit comprising:

a storage circuit configured to store correspondence instructing data indicating correspondence between operation codes used for said application program to operate said integrated circuit and names of said operations, that is, operation names, an interface configured to input an operation describing program describing the operation of said application program using said operation names, and a control circuit configured to obtain said operation codes corresponding to said operation names described in said input operation describing program by viewing said correspondence instructing data and using the obtained operation codes to define the processing of said application program;

generating said job management data for each of a plurality of processing requests;

selecting one job management data from said plurality of data modules;

selecting the job to be executed next based on said status data and said processing order data of said selected job management data;

executing said selected job;

updating said status data of said selected job management data in accordance with execution of said job;

selecting one job management data from said plurality of data modules after said updating;

when said operation describing program includes a description designating a maximum number of said job management data which said semiconductor circuit can process;

generating said job management data in accordance with a processing request conditional on the number of the job management data being not more than said designated maximum number.

29. A semiconductor circuit as set forth in claim 28, wherein said correspondence instructing data further shows the correspondence between said operation names and key information used when said integrated circuit performs operations corresponding to those operation names and said semiconductor circuit obtains said key information corresponding to said operation names described in said operation describing program by viewing said correspondence instructing data and uses that obtained key information to define the processing of said application program.

30. A semiconductor circuit as set forth in claim 28, wherein said control circuit:
generates job management data including job execution order data showing an order of execution of a plurality of jobs forming processing of said application program and status data showing the state of progress of execution of said plurality of jobs in accordance with a processing request,
selects the job to be executed next based on said status data and said processing order data of said job management data,
executes said selected job, and
updates said status data of said selected job management data in accordance with the execution of that job.

31. A semiconductor circuit as set forth in claim 30, wherein said control circuit
uses said correspondence instructing data and said operation describing program to generate template data of said job management data and
uses said template data to generate said job management data in accordance with a processing request.

32. A semiconductor circuit as set forth in claim 28, wherein said control circuit deletes said job management data when all jobs forming processing in accordance with a processing request finish being executed.

33. A semiconductor circuit as set forth in claim 28, wherein said control circuit generates said job management data including said execution order data indicating an order of execution of a plurality of jobs corresponding to a plurality of operations on said integrated circuit.

34. A semiconductor circuit as set forth in claim 28, wherein said control circuit,
when said operation describing program includes descriptions defining at least one data block among a data block storing data read from said integrated circuit, a data block storing data to be written in said integrated circuit, and a data block storing log information of processing for a procedure using said integrated circuit,
generates said data block based on said operation describing program.

35. A semiconductor circuit as set forth in claim 28, wherein said operation names are macro commands.

36. A semiconductor circuit as set forth in claim 28, wherein said integrated circuit is mounted in a card.

37. A semiconductor circuit as set forth in claim 28, wherein the circuit is a tamper-resistant semiconductor circuit.

* * * * *

UNITED STATES PATENT AND TRADEMARK OFFICE
CERTIFICATE OF CORRECTION

PATENT NO. : 7,240,345 B2
APPLICATION NO. : 10/257472
DATED : July 3, 2007
INVENTOR(S) : Masahiro Sueyoshi et al.

It is certified that error appears in the above-identified patent and that said Letters Patent is hereby corrected as shown below:

Column 10, line 51, delete "which" (first occurence).
Column 12, line 7, delete "performed" (first occurence).
Column 13, line 52, change "THE DRAWINGS" to --THE SEVERAL VIEWS OF THE DRAWINGS--.
Column 26, line 38, change "Step ST6" to --the IC card entity data 73_x Step ST6--.
Column 27, line 22, change "computer to" to --computer 5 to--.
Column 67, line 62, change "CPU APR" to --CPU_ADR--.
Column 84, line 22, change "Wc"" to --"Wc""--;
        line 26, change "CF:CES_FUNC=SF:1"" to --"CF:CES_FUNC=SF:1"--;
        line 41, change "EW" to --FW--;
        line 54, change "7310_can" to --7310_3can--.
Column 95, line 1, change "K CARD" to --K_CARD--.
Column 101, line 20, change "circuit" to --circuit:--.

Signed and Sealed this

Twenty-ninth Day of April, 2008

JON W. DUDAS
*Director of the United States Patent and Trademark Office*